(12) United States Patent
Asami et al.

(10) Patent No.: US 12,704,698 B2
(45) Date of Patent: Aug. 11, 2026

(54) IMAGING OPTICAL SYSTEM

(71) Applicant: DENSO CORPORATION, Kariya-city (JP)

(72) Inventors: Hiroshi Asami, Kariya-city (JP); Yusuke Akamine, Nisshin-city (JP)

(73) Assignee: DENSO CORPORATION, Aichi-pref. (JP)

( * ) Notice: Subject to any disclaimer, the term of this patent is extended or adjusted under 35 U.S.C. 154(b) by 895 days.

(21) Appl. No.: 17/477,868

(22) Filed: Sep. 17, 2021

(65) Prior Publication Data

US 2022/0003973 A1 Jan. 6, 2022

Related U.S. Application Data

(63) Continuation of application No. PCT/JP2020/008900, filed on Mar. 3, 2020.

(30) Foreign Application Priority Data

Mar. 18, 2019 (JP) ................................ 2019-050302

(51) Int. Cl.
*G02B 13/00* (2006.01)
*G02B 9/60* (2006.01)
(Continued)

(52) U.S. Cl.
CPC ........... *G02B 13/0045* (2013.01); *G02B 9/60* (2013.01); *G02B 13/04* (2013.01); *G02B 27/0025* (2013.01)

(58) Field of Classification Search
CPC .... G02B 13/0045; G02B 13/04; G02B 13/06; G02B 9/60
(Continued)

(56) References Cited

U.S. PATENT DOCUMENTS 8,699,150 B1 4/2014 Hsieh et al.
2008/0151393 A1 6/2008 Tsuchimochi
(Continued)

FOREIGN PATENT DOCUMENTS

JP H09-297264 A 11/1997
JP 2008-158198 A 7/2008
(Continued)

OTHER PUBLICATIONS https://www.intmath.com/blog/mathematics/finding-derivative-second-derivative-and-curvature-12414 https://web.archive.org/web/20200813134338/https://www.intmath.com/blog/mathematics/finding-derivative-second-derivative-and-curvature-12414 (Year: 2020).*
(Continued)

*Primary Examiner* — Cara E Rakowski
(74) *Attorney, Agent, or Firm* — Harness, Dickey & Pierce, 1PLC

(57) ABSTRACT

An imaging optical system of a present disclosure includes, in a sequential order from an object side to an image side, a first lens, a second lens, a third lens, a fourth lens, and a fifth lens. The fourth lens is configured such that (i) the light output surface has an aspherical concave shape, (ii) the light output surface has a center portion through which an optical axis passes, and a periphery thereof, and (iii) the light output surface has a portion where the negative refractive power becomes gradually weaker from the center portion toward the periphery thereof. The fifth lens has positive refractive power, a light input surface that faces toward the object side, and a light output surface that faces toward the image side. Each of the light input and output surfaces has a convex shape toward a corresponding one of the object side and image side.

17 Claims, 110 Drawing Sheets

(51) Int. Cl.
*G02B 13/04* (2006.01)
*G02B 27/00* (2006.01)

(58) Field of Classification Search
USPC ........................................ 359/714, 753, 770
See application file for complete search history.

(56) References Cited

U.S. PATENT DOCUMENTS

| | | | | |
|---|---|---|---|---|
| 2009/0052053 | A1 | 2/2009 | Iyama | |
| 2009/0141368 | A1 | 6/2009 | Iyama | |
| 2011/0176049 | A1 | 7/2011 | Hsieh et al. | |
| 2016/0124183 | A1* | 5/2016 | Hsu .................... | G02B 13/0045 359/714 |
| 2016/0320688 | A1 | 11/2016 | Sakagami | |
| 2017/0045713 | A1 | 2/2017 | Chen et al. | |
| 2017/0329109 | A1* | 11/2017 | Kubota .............. | G02B 13/0045 |

FOREIGN PATENT DOCUMENTS

| | | | |
|---|---|---|---|
| JP | 2009-014947 | A | 1/2009 |
| JP | 2009-134175 | A | 6/2009 |
| JP | 2009-145839 | A | 7/2009 |
| JP | 2016-038574 | A | 3/2016 |
| JP | 2018-109667 | A | 7/2018 |

OTHER PUBLICATIONS

International Search Report dated May 19, 2020 in corresponding application No. PCT/JP2020/008900.

* cited by examiner

FIG.2
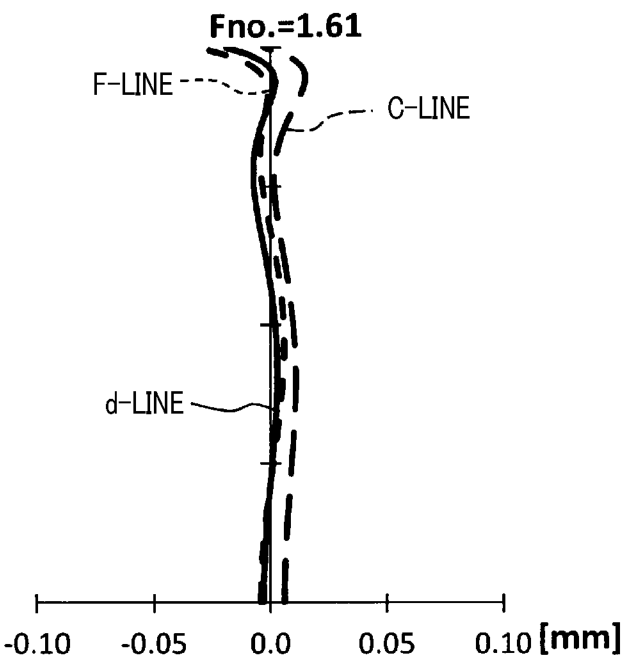
FIG.3
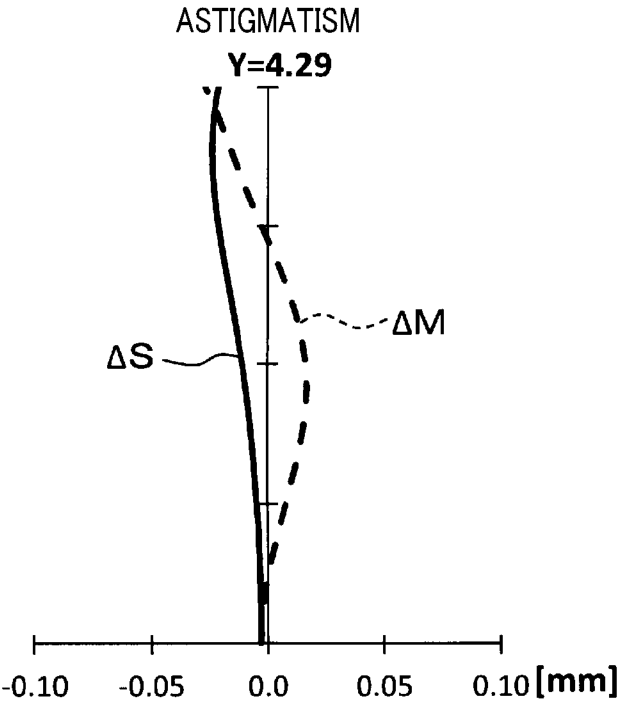

ASTIGMATISM

Y=4.27

ΔS

ΔM

-0.10 -0.05 0.0 0.05 0.10 [mm]

ASTIGMATISM

Y=4.21

ΔM

ΔS

-0.10 -0.05 0.0 0.05 0.10 [mm]

ASTIGMATISM

Y=4.23

ΔM

ΔS

-0.10 -0.05 0.0 0.05 0.10 [mm]

CHROMATIC ABERRATION
Y=4.28

-0.010 -0.005 0.0 0.005 0.010 [mm]

SPHERICAL ABERRATION

Fno.=1.61

F-LINE

C-LINE d-LINE

-0.10 -0.05 0.0 0.05 0.10 [mm]

SPHERICAL ABERRATION
Fno.=1.61 d-LINE
C-LINE
F-LINE

-0.10 -0.05 0.0 0.05 0.10 [mm]

SPHERICAL ABERRATION

Fno.=1.60 d-LINE

F-LINE

C-LINE

-0.10 -0.05 0.0 0.05 0.10 [mm]

SPHERICAL ABERRATION

Fno.=1.60 d-LINE

C-LINE

F-LINE

-0.10 -0.05 0.0 0.05 0.10 [mm]

SPHERICAL ABERRATION

ASTIGMATISM

Y=4.26

ΔS

ΔM

-0.10 -0.05 0.0 0.05 0.10 [mm]

ASTIGMATISM

Y=4.28

ΔM

ΔS

-0.10 -0.05 0.0 0.05 0.10 [mm]

IMAGING OPTICAL SYSTEM

CROSS-REFERENCE TO RELATED APPLICATION

The present application is a bypass continuation application of currently pending international application No. PCT/JP2020/008900 filed on Mar. 3, 2020 designating the United States of America, the entire disclosure of which is incorporated herein by reference.

The present application is based on and claims the benefit of priority from Japanese Patent Application No. 2019-50302 filed on Mar. 18, 2019, the disclosure of which is incorporated in its entirety herein by reference.

TECHNICAL FIELD

The present disclosure relates to retrofocus imaging optical systems.

BACKGROUND

Retrofocus imaging optical systems include a front group of one or more lenses, each of which has negative refractive power, and a back group of one or more lenses, each of which has positive refractive power. These retrofocus imaging optical systems have a longer back focal length, so that these retrofocus imaging optical systems can more easily serve as wide-angle optical systems.

Various combinations of lenses have been proposed as components of such a retrofocus imaging optical system in consideration of various factors, such as required correction of various types of aberration, required F-numbers, required angles of view, and/or required total sizes.

For example, each of Japan Patent Application Publication No. 2009-145839 and Japan Patent Application Publication No. 2009-134175 discloses a retrofocus imaging optical system comprised of a combination of five lenses.

SUMMARY

Such an optical system is configured to focus incident light from an object to thereby form an image. The side closer to the object will be referred to as an object side, and the side closer to the image will be referred to as an image side.

The retrofocus imaging optical system disclosed in the patent publication 2009-145839 includes first to fifth lenses in order from the object side; the fourth lens is a spherical lens, and the retrofocus imaging optical system disclosed in the patent publication 2009-134175 includes first to fifth lenses in order from the object side; the fourth lens has a convex surface toward the image side.

If the retrofocus imaging optical system disclosed in the patent publication 2009-145839 is designed as a wide-angle imaging optical system, the spherical fourth lens may have difficulty in correcting an increased level of astigmatism in the wide-angle imaging optical system.

Similarly, if the retrofocus imaging optical system disclosed in the patent publication 2009-134175 is designed as a wide-angle imaging optical system, the fourth lens, which has the convex surface toward the image side, may have difficulty in correcting an increased level of astigmatism in the wide-angle imaging optical system.

From these viewpoints, the present disclosure aims to provide imaging optical systems, each of which enables both a wider angle of view and a larger aperture of the corresponding one of the imaging optical systems while maintaining both a small size and a light weight thereof.

An imaging optical system according to the present disclosure, includes, in a sequential order from an object side to an image side, a first lens, a second lens, a third lens, a fourth lens, and a fifth lens. The first lens has negative refractive power. The second lens has a meniscus-shape, positive refractive power, and a light input surface that faces toward the object side; the light input surface has a concave shape. The third lens has positive refractive power, a light input surface that faces toward the object side, and a light output surface that faces toward the image side. Each of the light input and output surfaces of the third lens has a convex shape toward a corresponding one of the object side and image side. The fourth lens has negative refractive power, a light input surface that faces toward the object side, and a light output surface that faces toward the image side. The fourth lens is configured such that (1) The light output surface has an aspherical concave shape (2) The light output surface has a center portion through which an optical axis passes, and a periphery thereof (3) The light output surface has a portion where the negative refractive power becomes gradually weaker from the center portion toward the periphery thereof The fifth lens has positive refractive power, a light input surface that faces toward the object side, and a light output surface that faces toward the image side. Each of the light input and output surfaces has a convex shape toward a corresponding one of the object side and image side.

In order to expand the angle of view of a retrofocus imaging optical system more than or equal to 120 degrees, the retrofocus imaging optical system is required to have a principal point located to be closer to the image side than a backmost lens is to thereby have a short focal length of the retrofocus imaging optical system. In order for a retrofocus imaging optical system to have a principal point located to be closer to the image side than the backmost lens is, the front group of lenses, i.e., the first and second lenses, of the retrofocus imaging optical system have a stronger level of negative refractive power.

From this viewpoint, the imaging optical system includes the combination of the first lens having a stronger level of negative refractive power, and the second lens, which has a given level of positive refractive power. This results in the first lens having the main part of the total negative refractive power of the combination, and the second lens covering the remaining part of the total negative refractive power of the combination. Additionally, the second lens is configured to have the light input surface that has a concave meniscus shape for compensating for the negative refractive power. This enables the number of lenses in the front group of the imaging optical system to be minimized. Additionally, the second lens is configured to have the meniscus-shape and positive refractive power. This configuration enables efficient correction of both (i) spherical aberration in the imaging optical system, a level of which has increased due to the larger aperture, and (ii) astigmatism in the imaging optical system, a level of which has increased due to the wider angle of view.

The more the number of lenses included in the back group increases, the easier it is to satisfy an optical performance required for the imaging optical system. It is desired, however, that the number of lenses included in the back group is as small as possible in order to minimize the weight of the imaging optical system. For this reason, the back group is comprised of the third lens, the fourth lens, and the fifth lens.

In order for the combination of the third to fifth lenses to have a stronger level of positive refractive power, each of the third and fifth lenses has positive refractive power, and the fourth lens has negative refractive power. This enables aberration, such as spherical aberration and/or chromatic aberration, of the imaging optical system to be efficiently corrected while minimizing the level of refractive power possessed by each of the third to fifth lenses.

Additionally, the fourth lens is configured such that (1) The concave surface, which faces toward the image side, has an aspherical shape (2) The aspherical concave surface has a center portion through which an optical axis passes, and a periphery thereof (3) The aspherical concave surface has a portion where the negative refractive power becomes gradually weaker from the center portion toward the periphery thereof This configuration enables easy correction of astigmatism in the imaging optical system that has increased due to the wider angle of view.

In addition, the third lens configured to have positive refractive power enables rays of light, which has passed through the fourth lens, to be input on the fourth lens while being separated for their angles of view, making it possible to improve a beneficial effect of correcting the astigmatism in the imaging optical system. Each of the third and fifth lenses configured to have both the convex surfaces toward the respective object and image sides enables spherical aberration generated in each of the third and fifth lenses to be separated into both the object side and image side, making it possible to reduce the total amount of aberration in the imaging optical system.

In particular, the fifth lens configured to have the convex surface that faces toward the image side enables efficient correction of distortion in the imaging optical system.

These beneficial effects achieved by the imaging optical system based on the common configuration enable both a wider angle of view and a larger aperture of the imaging optical system while reducing a level of each type of aberration in the imaging optical system.

In contrast, although the imaging optical system disclosed in Patent Literature 2 includes the fourth lens that has a concave surface that faces toward the image side, the imaging optical system disclosed in Patent Literature is based on the premise that the second lens has negative refractive power, resulting in the configuration of the imaging optical system disclosed in Patent Literature 2 being clearly distinguished from the configuration of the imaging optical system of the present disclosure.

BRIEF DESCRIPTION OF THE DRAWINGS

The above-described object, and other objects, features, or beneficial advantages in this disclosure will be apparent from the appended drawings or the following detailed discussion. In the drawings:

FIG. 2 is a graph illustrating spherical aberration in the imaging optical system according to the first embodiment;

FIG. 3 is a graph illustrating astigmatism in the imaging optical system according to the first embodiment;

FIG. 119 is a graph illustrating how a curvature is radially changed from a center portion to a periphery of a ninth surface of the imaging optical system according to the first modification of the tenth embodiment;

FIG. 120 is a graph illustrating how a curvature is radially changed from a center portion to a periphery of a second surface of the imaging optical system according to the first modification of the tenth embodiment;

FIG. 121 is an optical diagram illustrating an imaging optical system according to a second modification of the tenth embodiment;

FIG. 122 is a graph illustrating spherical aberration in the imaging optical system according to the second modification of the tenth embodiment;

FIG. 123 is a graph illustrating astigmatism in the imaging optical system according to the second modification of the tenth embodiment;

FIG. 124 is a graph illustrating distortion in the imaging optical system according to the second modification of the tenth embodiment;

FIG. 125 is a graph illustrating chromatic aberration in the imaging optical system according to the second modification of the tenth embodiment;

FIG. 126 is a graph illustrating how a curvature is radially changed from a center portion to a periphery of an eighth surface of the imaging optical system according to the second modification of the tenth embodiment;

FIG. 127 is a graph illustrating how a curvature is radially changed from a center portion to a periphery of a ninth surface of the imaging optical system according to the second modification of the tenth embodiment;

FIG. 128 is a graph illustrating how a curvature is radially changed from a center portion to a periphery of a second surface of the imaging optical system according to the second modification of the tenth embodiment;

FIG. 129 is an optical diagram illustrating an imaging optical system according to the eleventh embodiment;

FIG. 130 is a graph illustrating spherical aberration in the imaging optical system according to the eleventh embodiment;

Figures 130, 131:
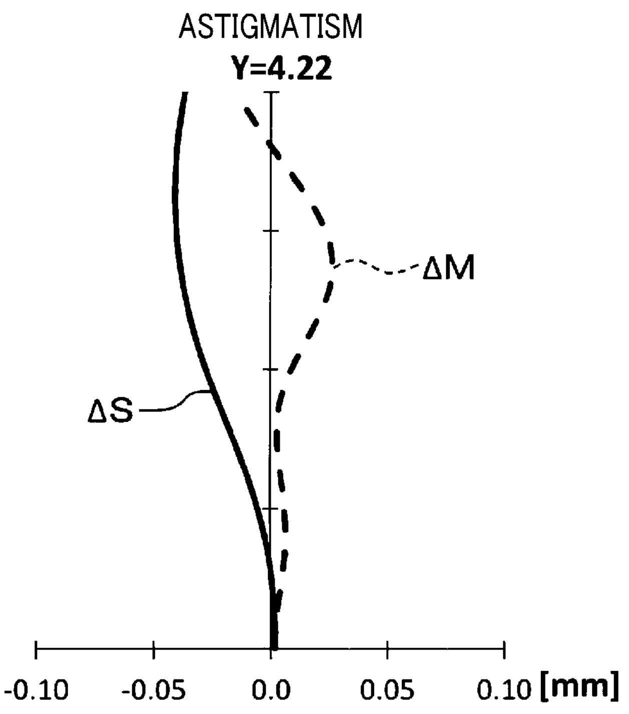
Figure 132:
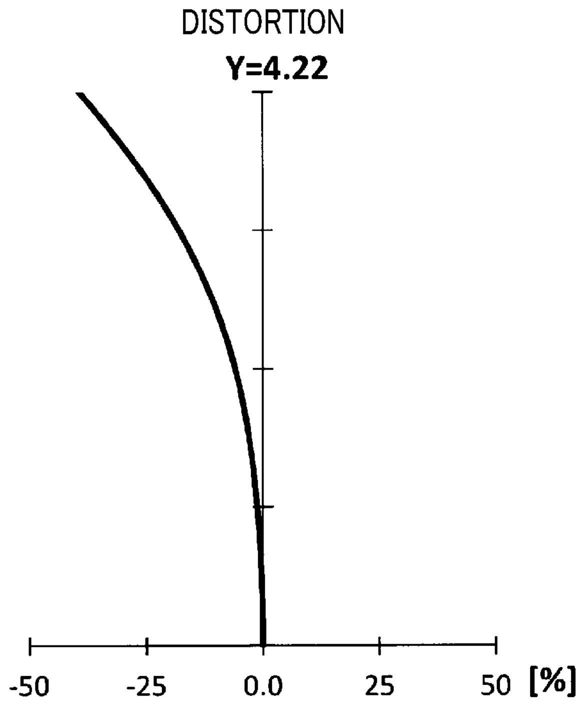
Figure 133:
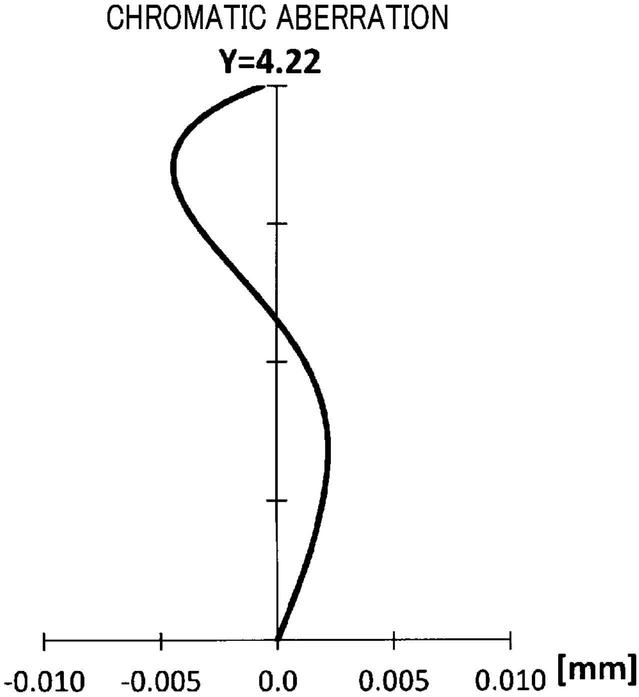
Figure 134:
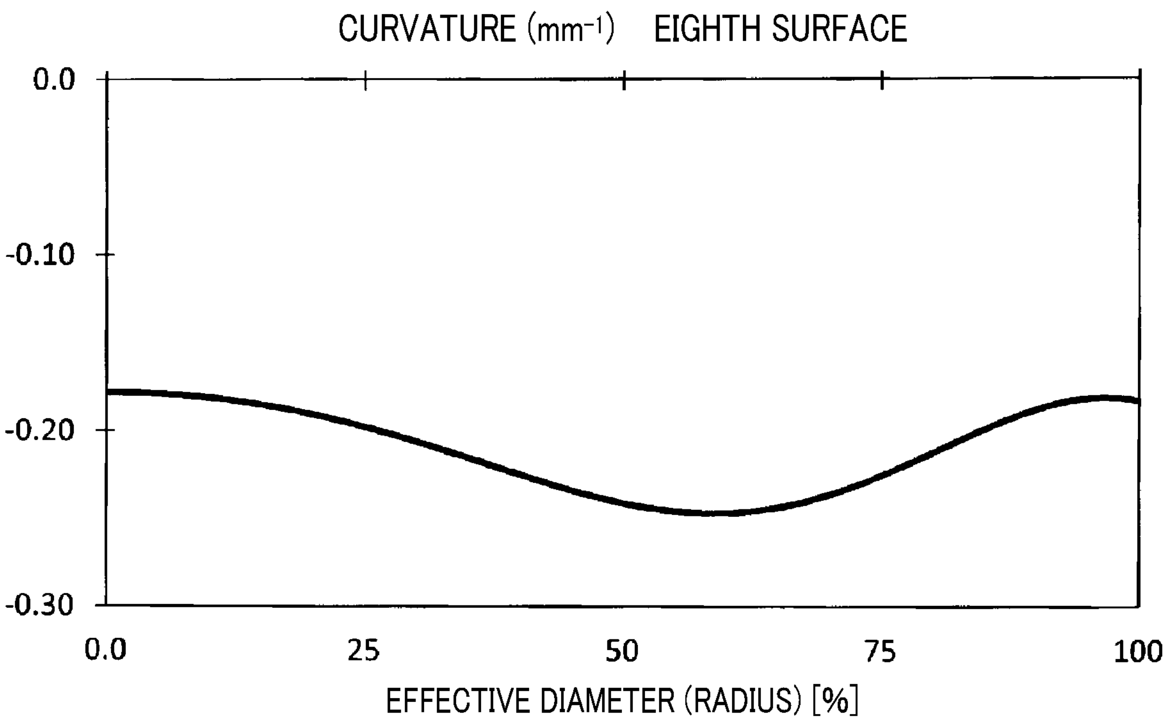
Figure 135:
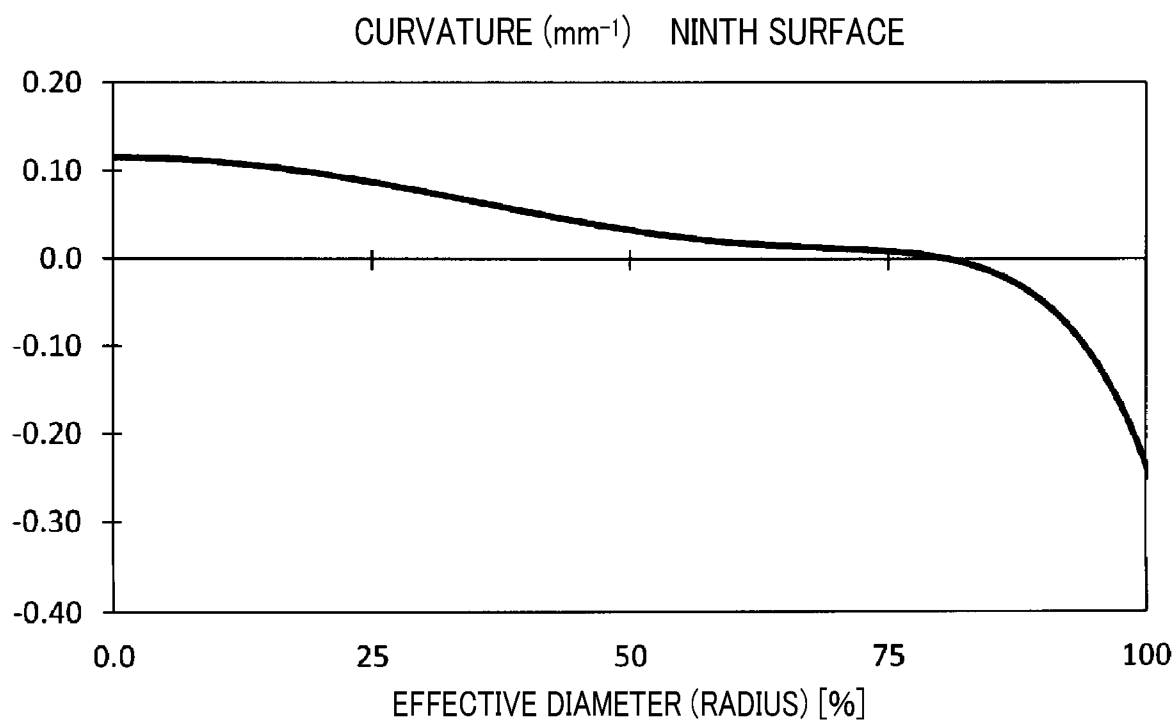
Figure 136:
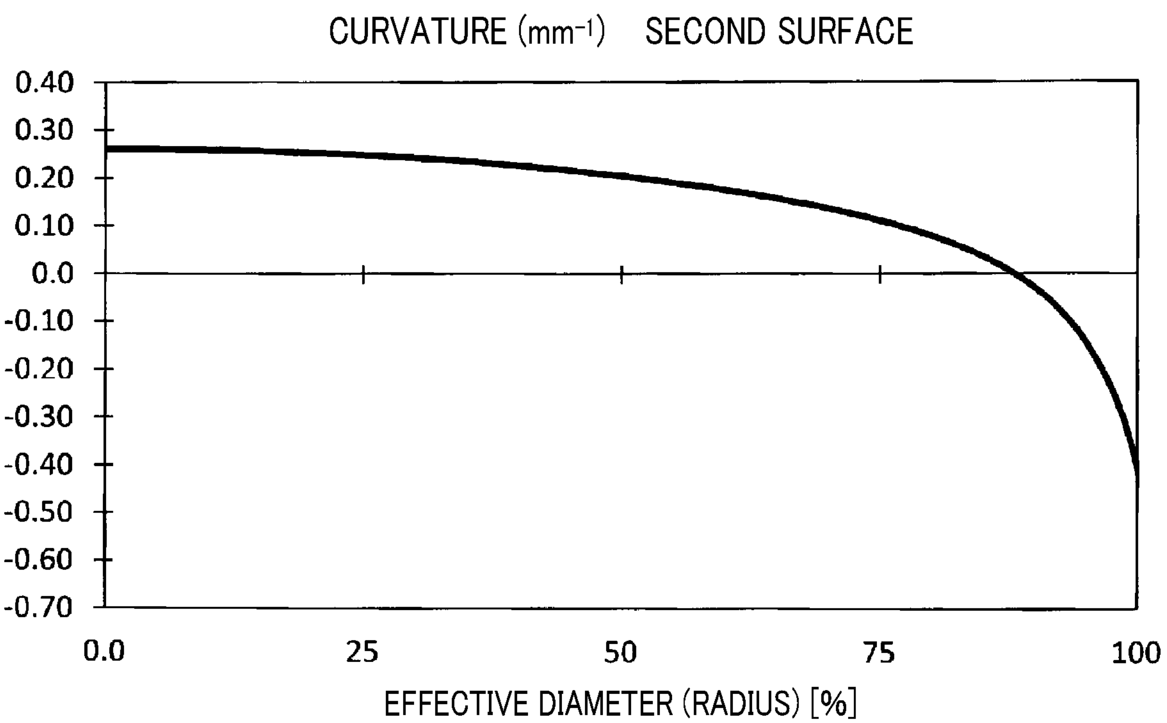
Figure 137:
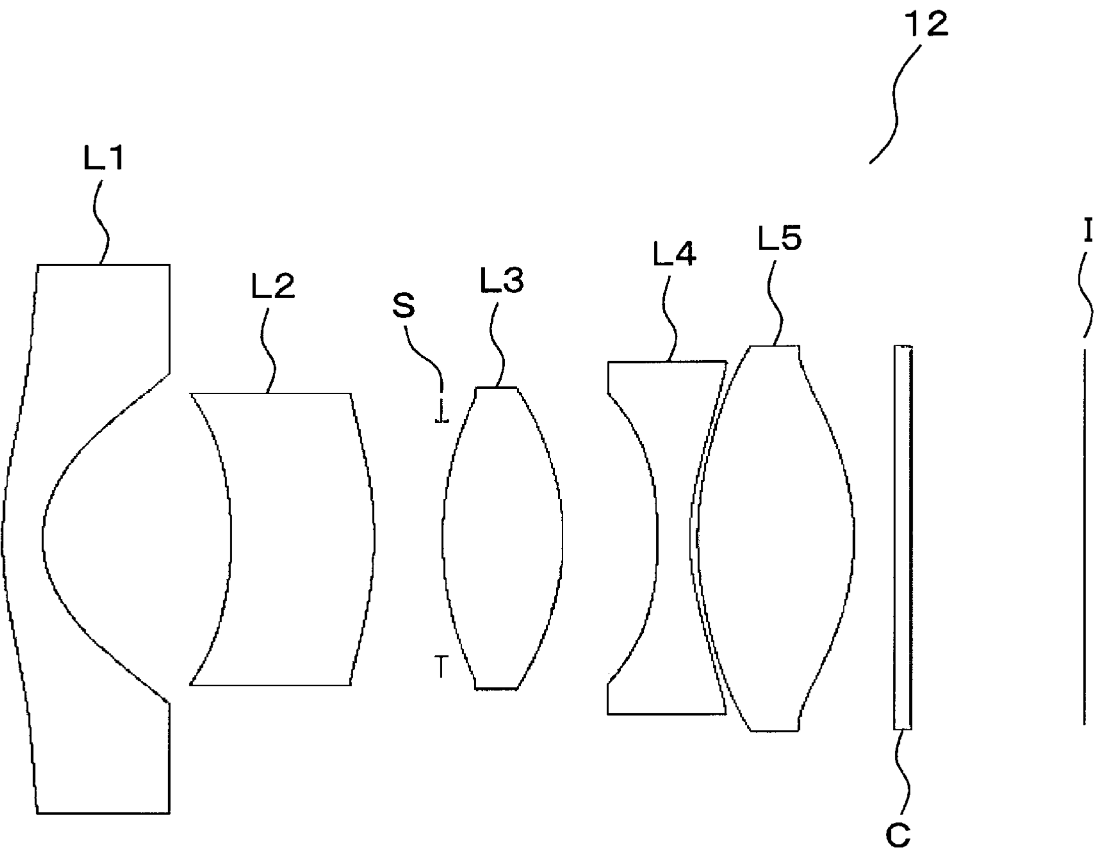
Figure 138:
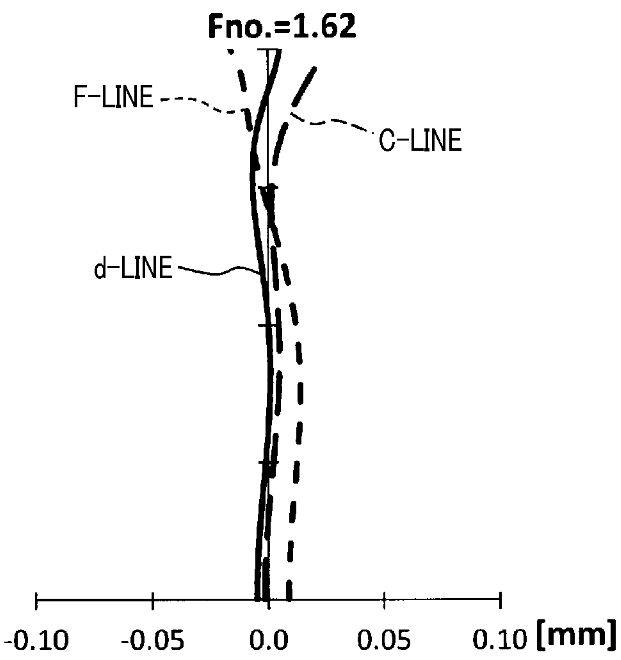
Figure 139:
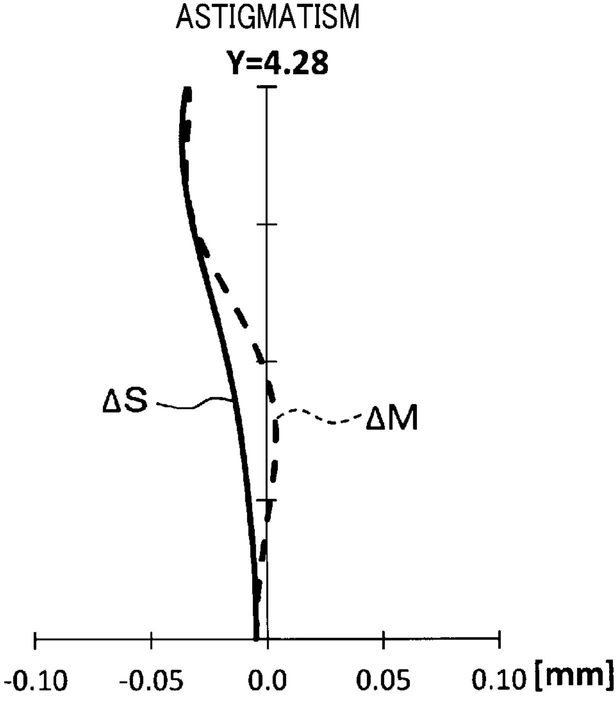
Figure 140:
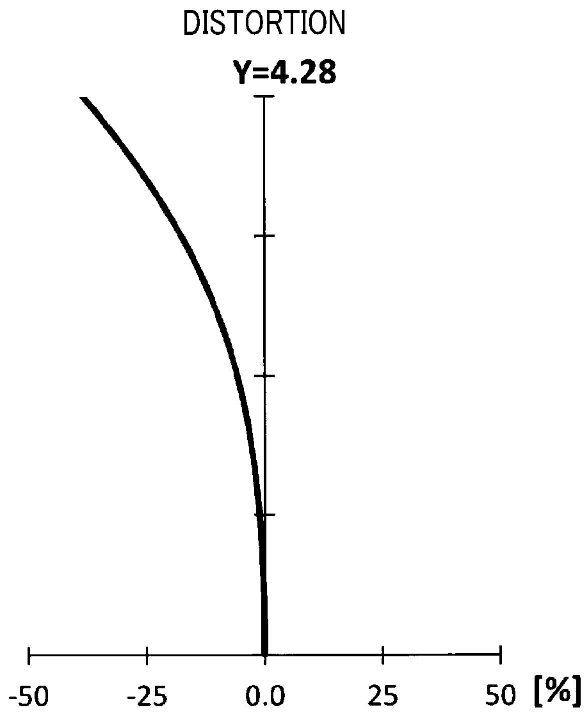
Figure 141:
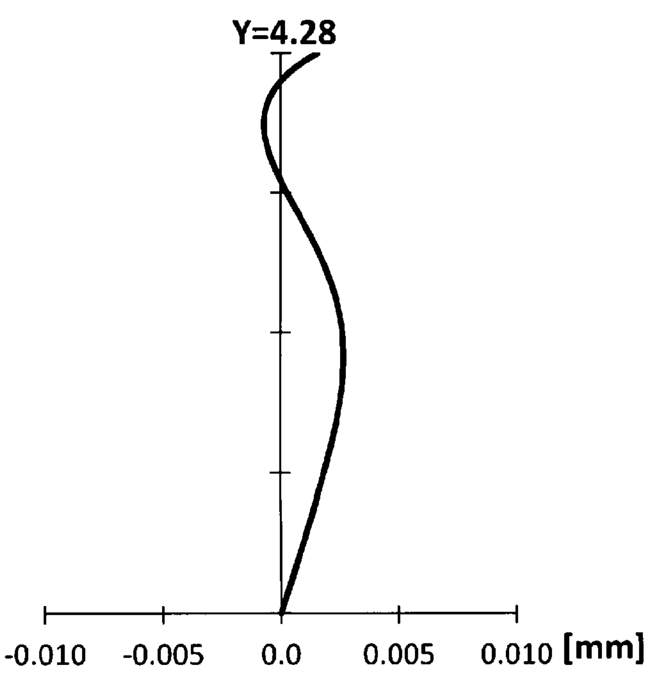
Figure 142:
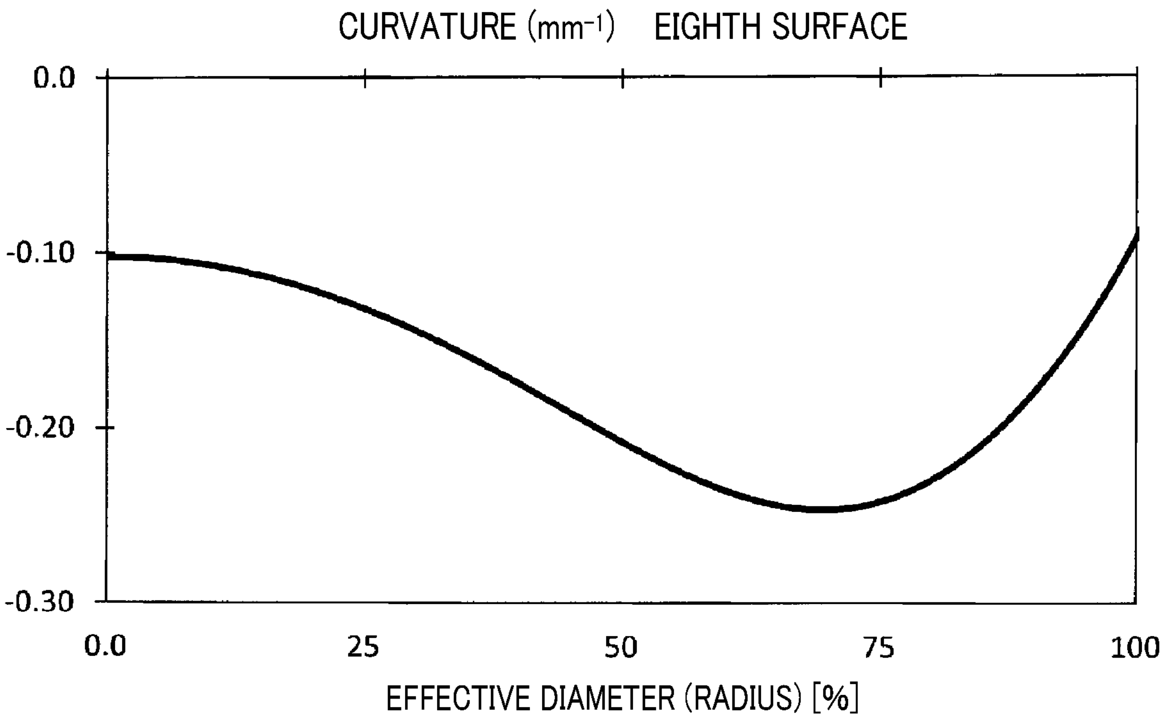
Figure 143:
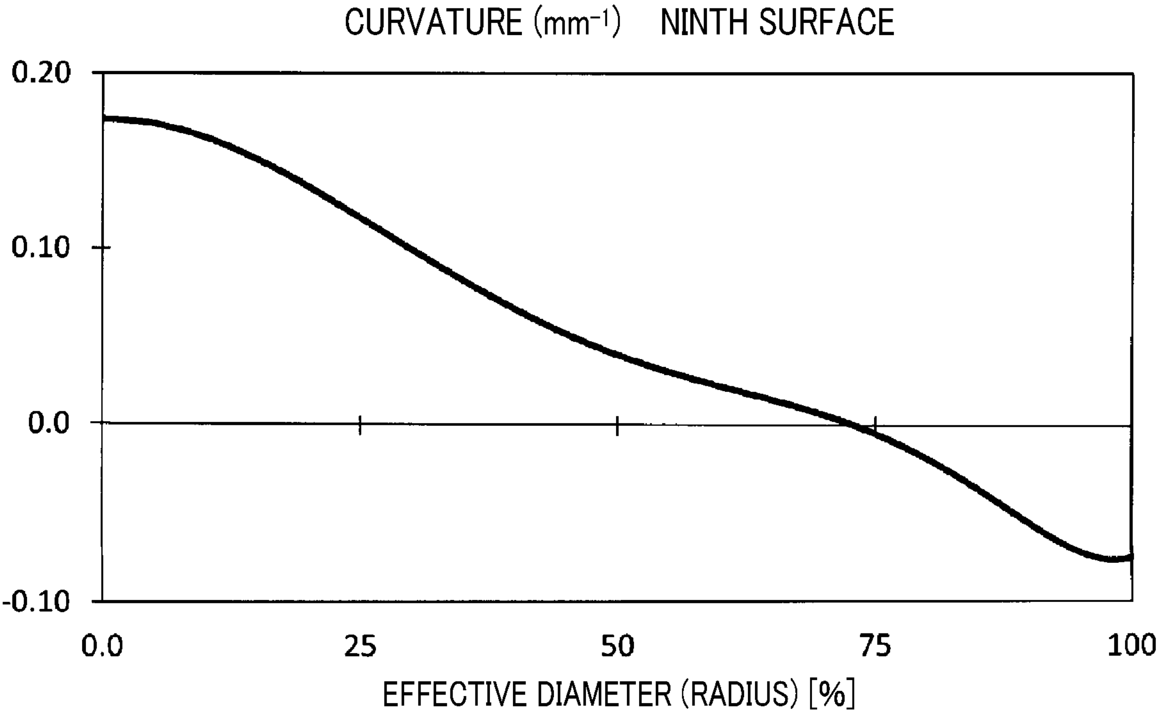
Figure 144:
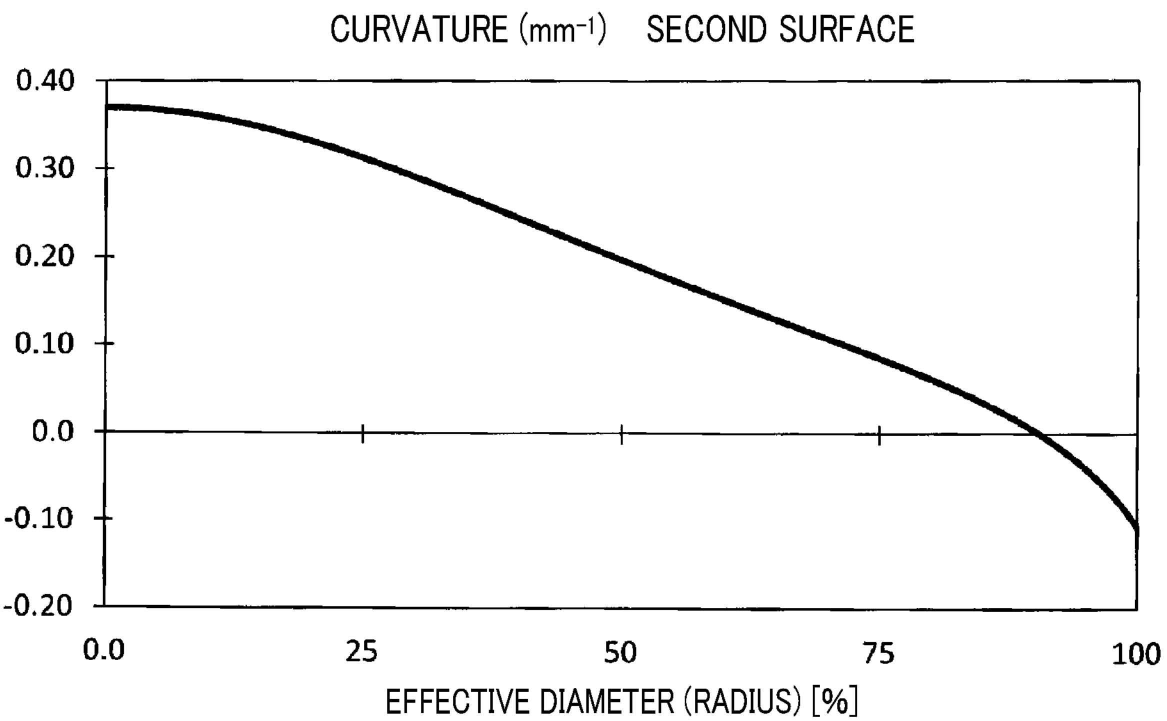
Figure 145:
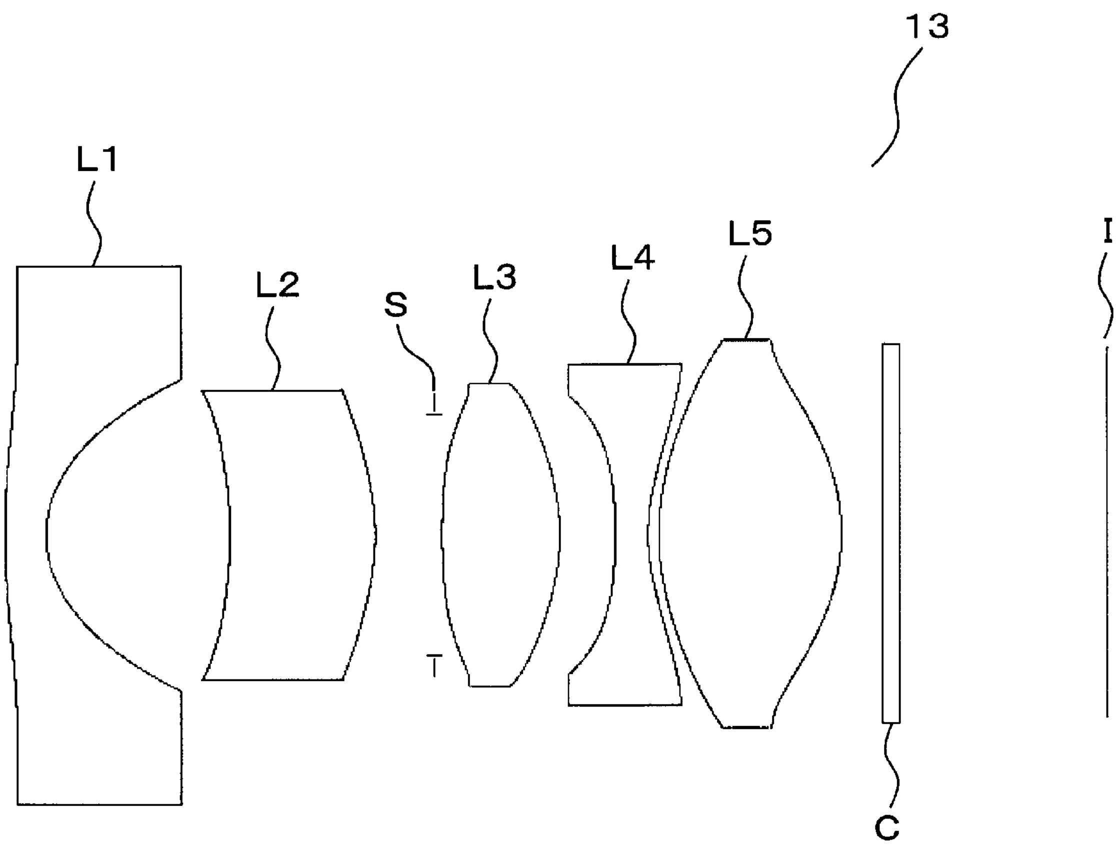
Figure 146:
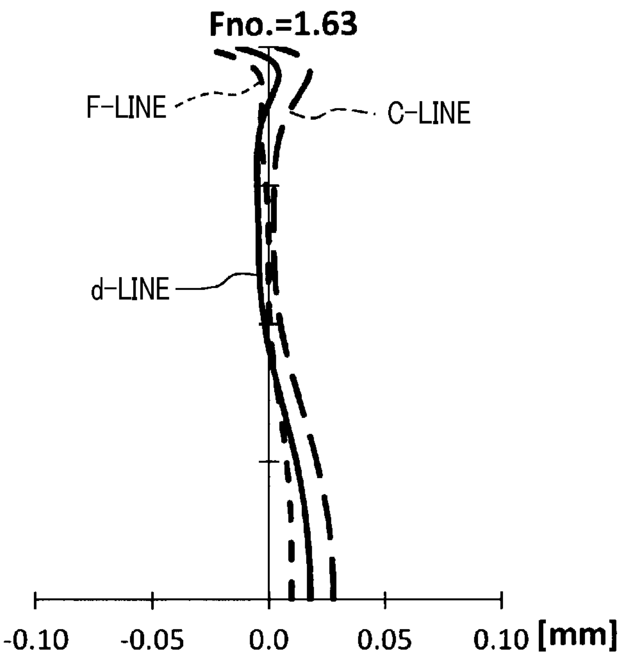
Figure 147:
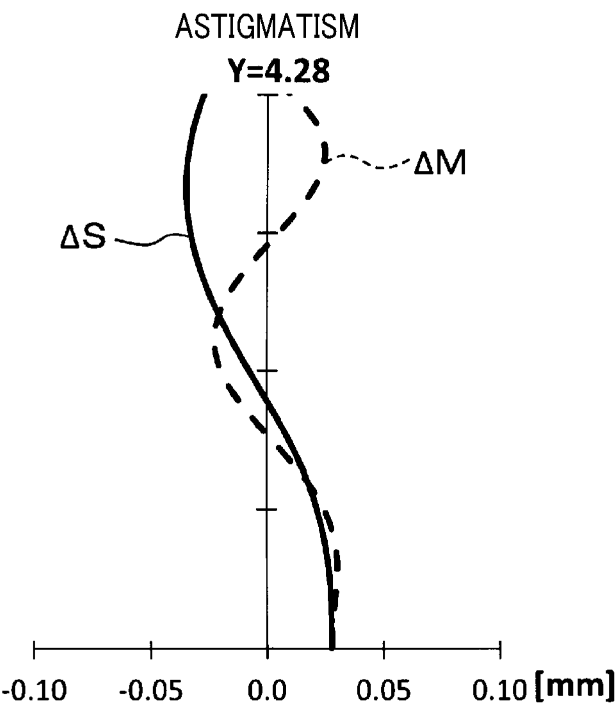
Figure 148:
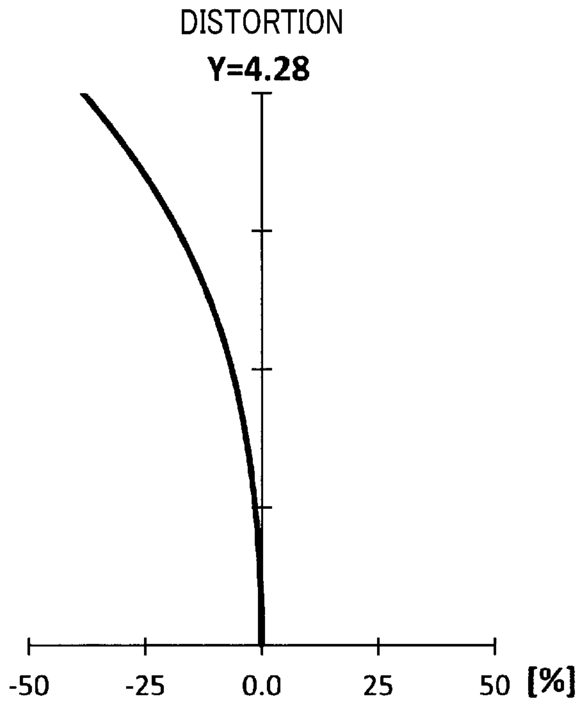
Figure 149:
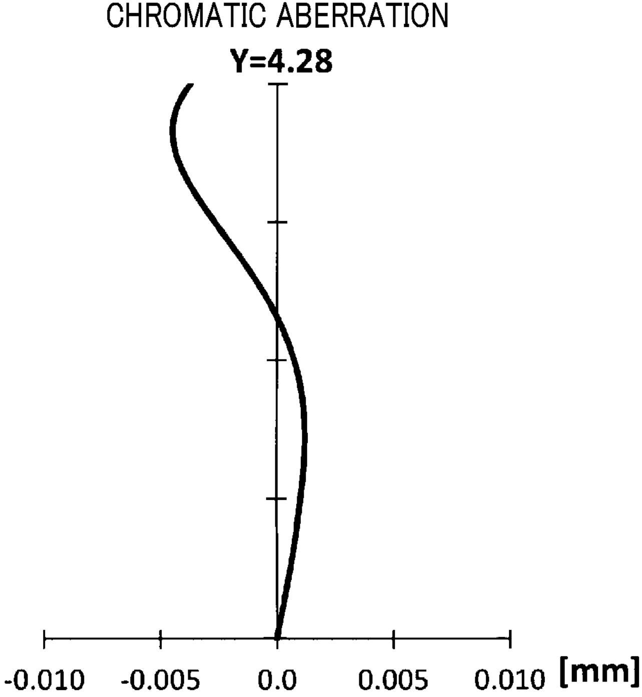
Figure 150:
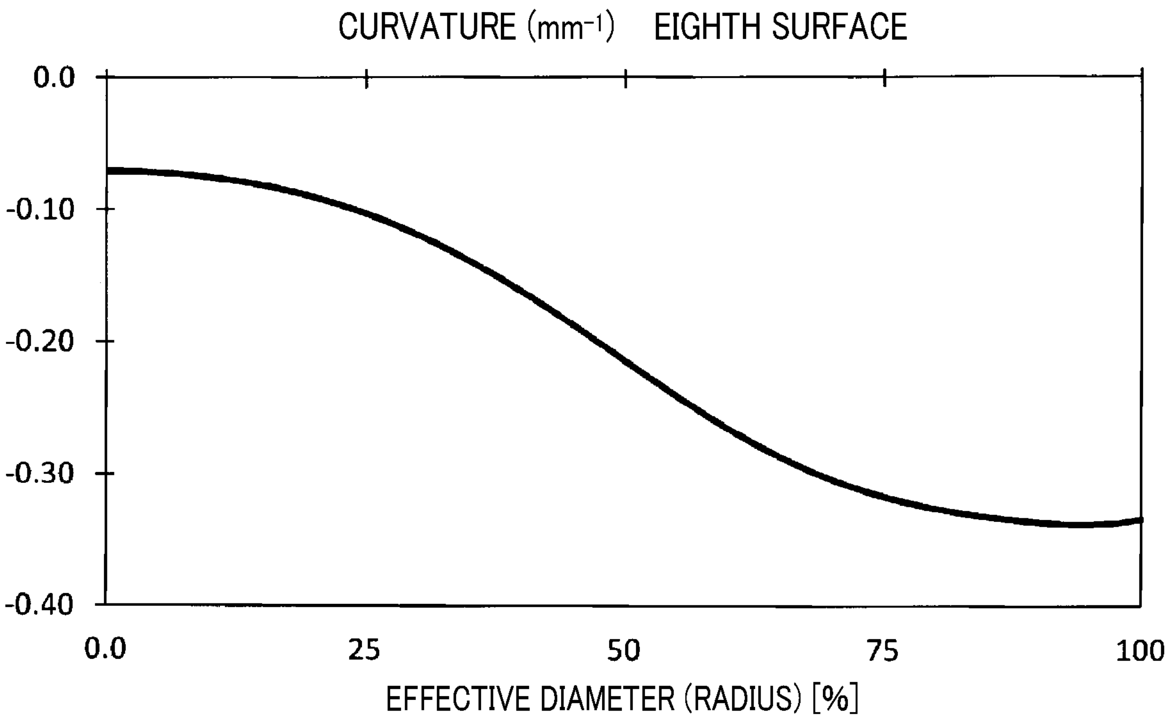
Figure 151:
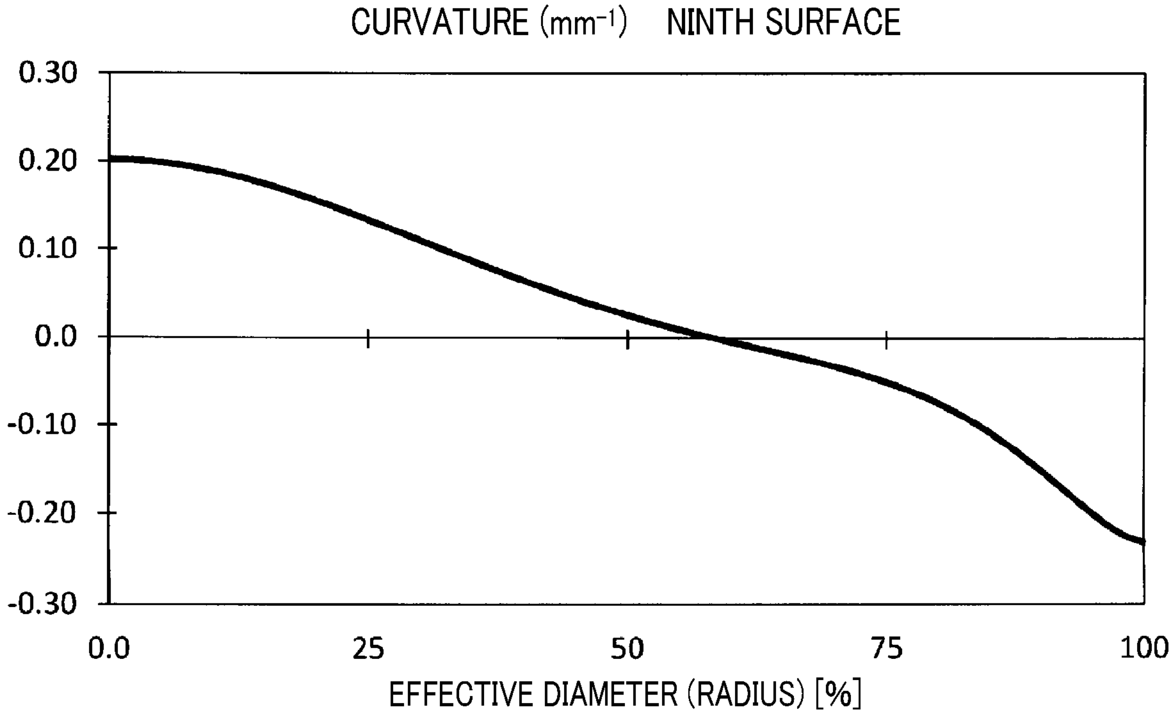
Figure 152:
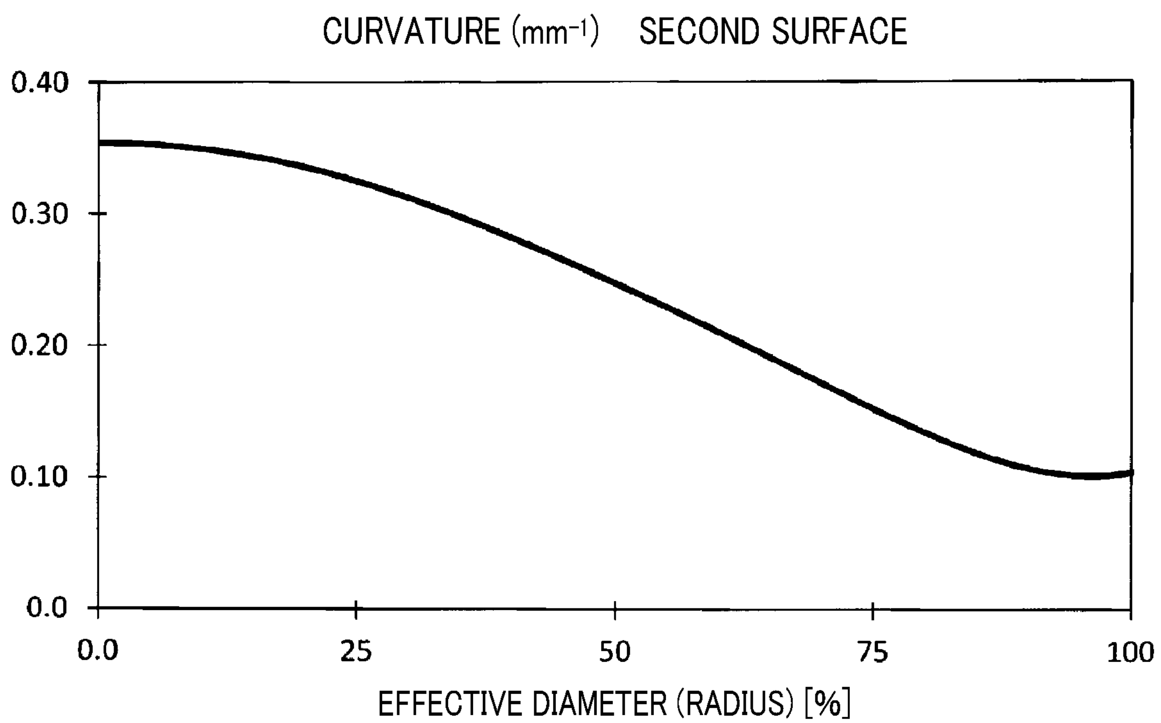
Figure 153:
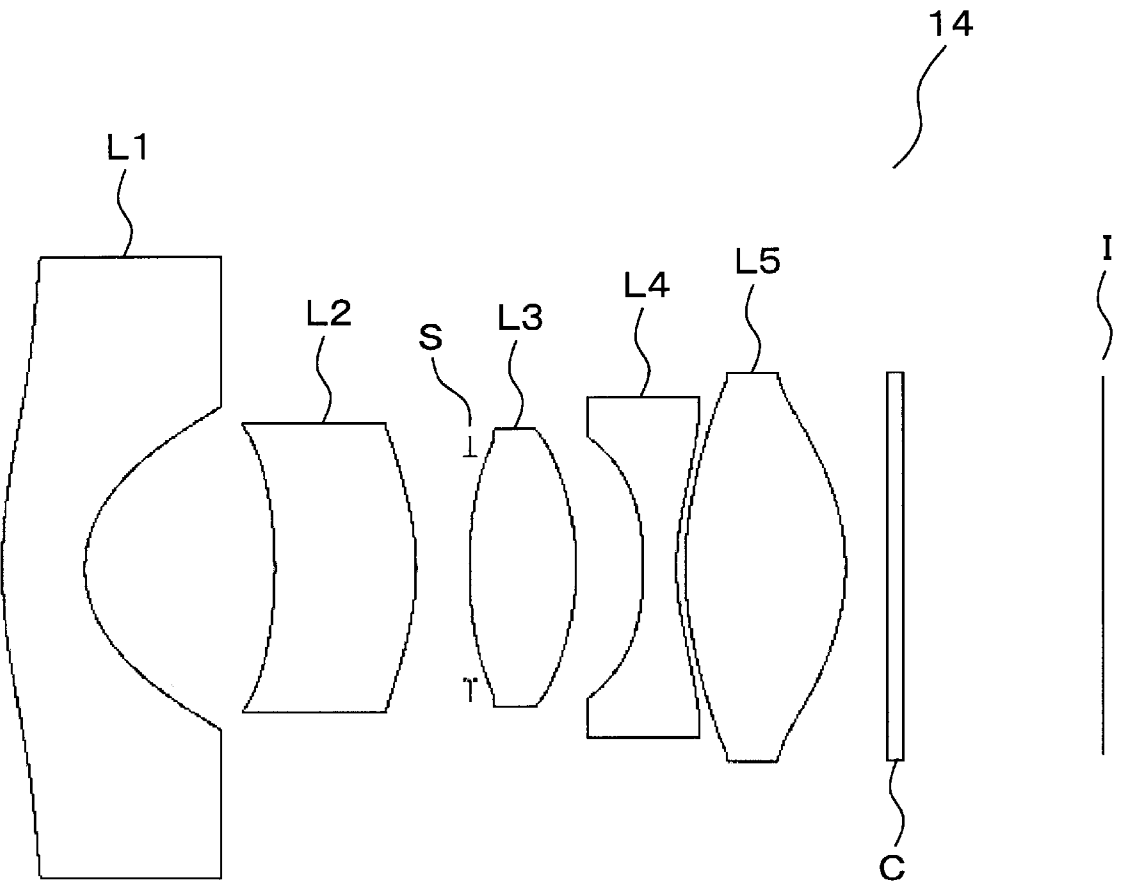
Figure 154:
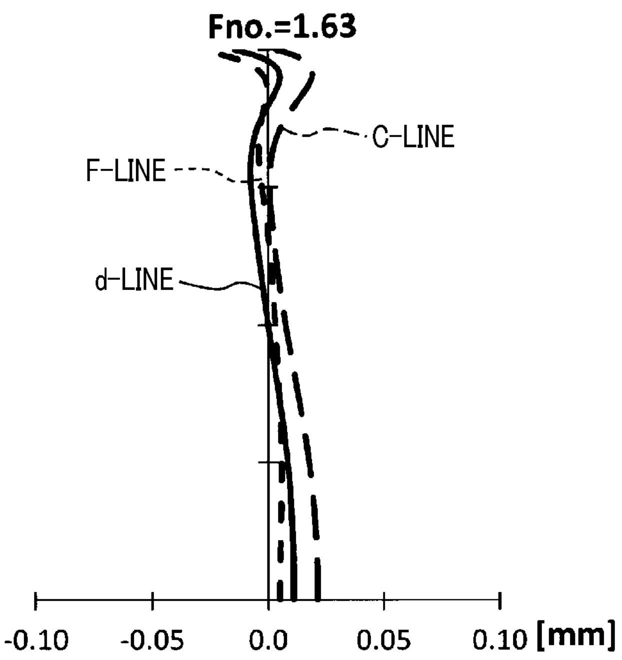
Figure 155:
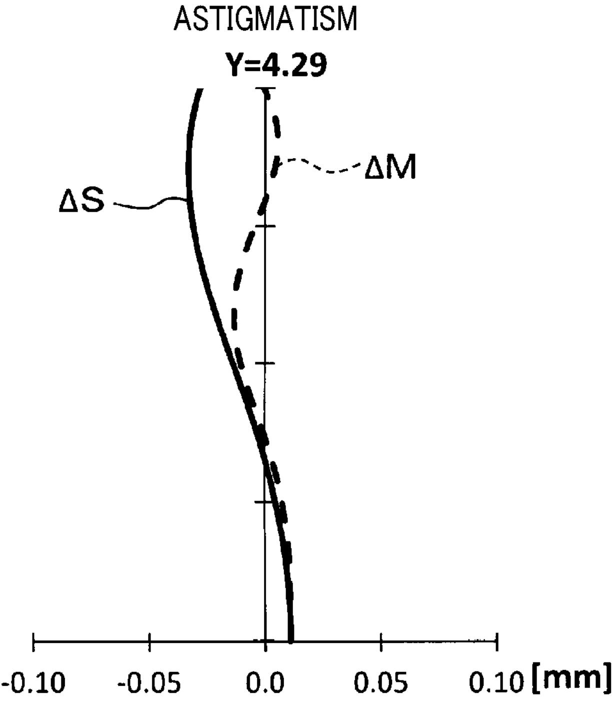
Figure 156:
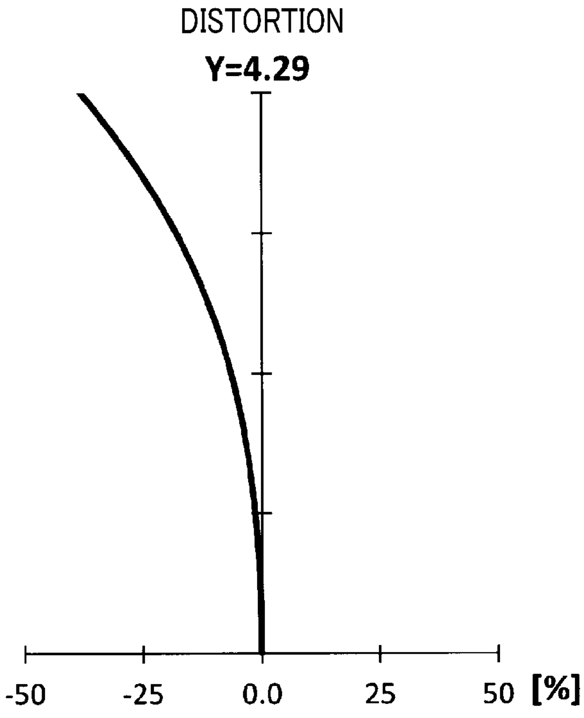
Figure 157:
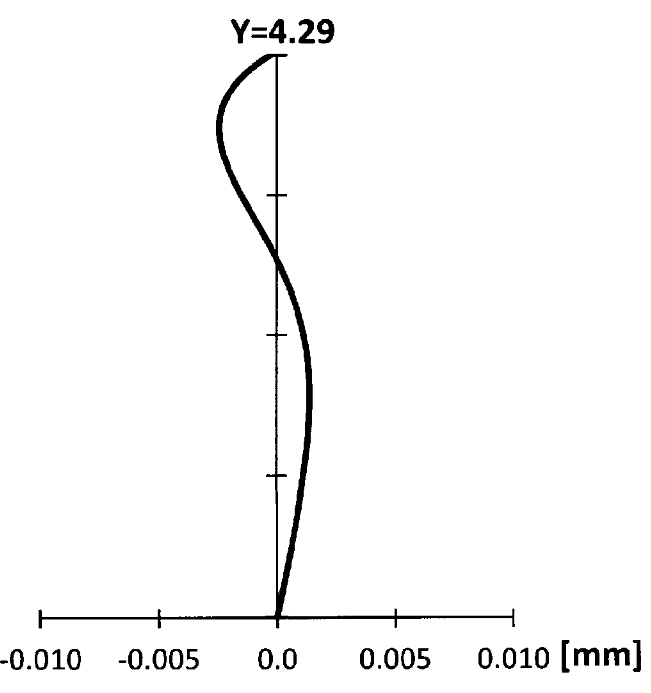
Figure 158:
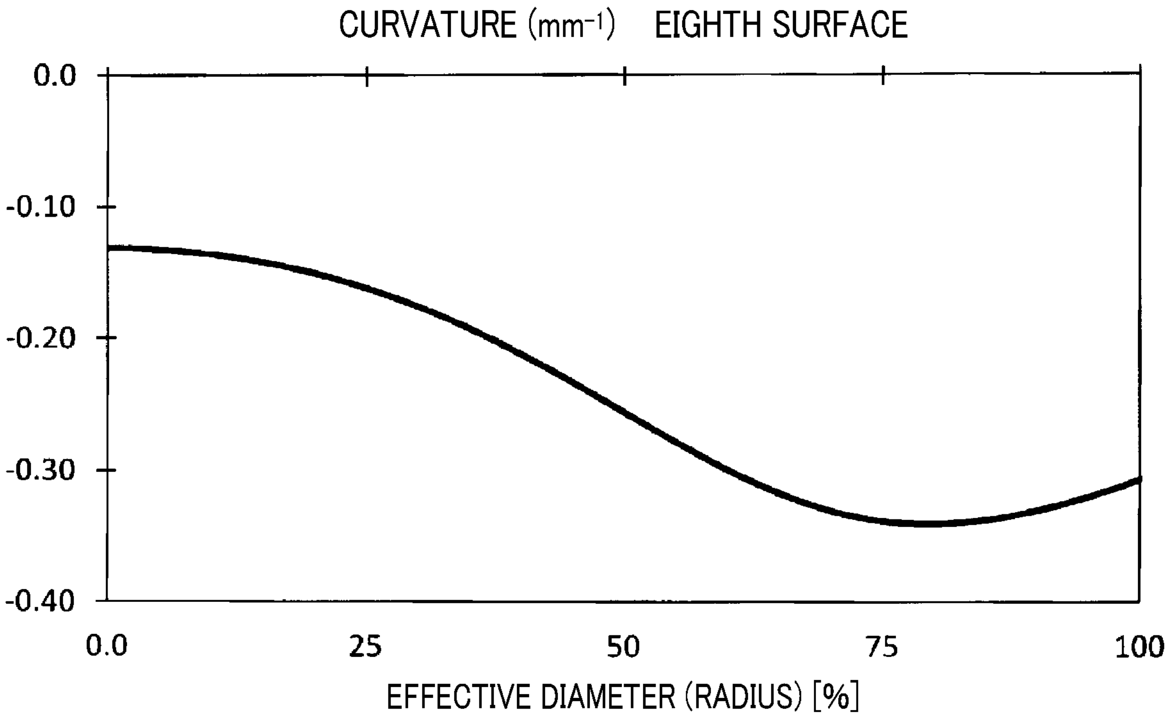
Figure 159:
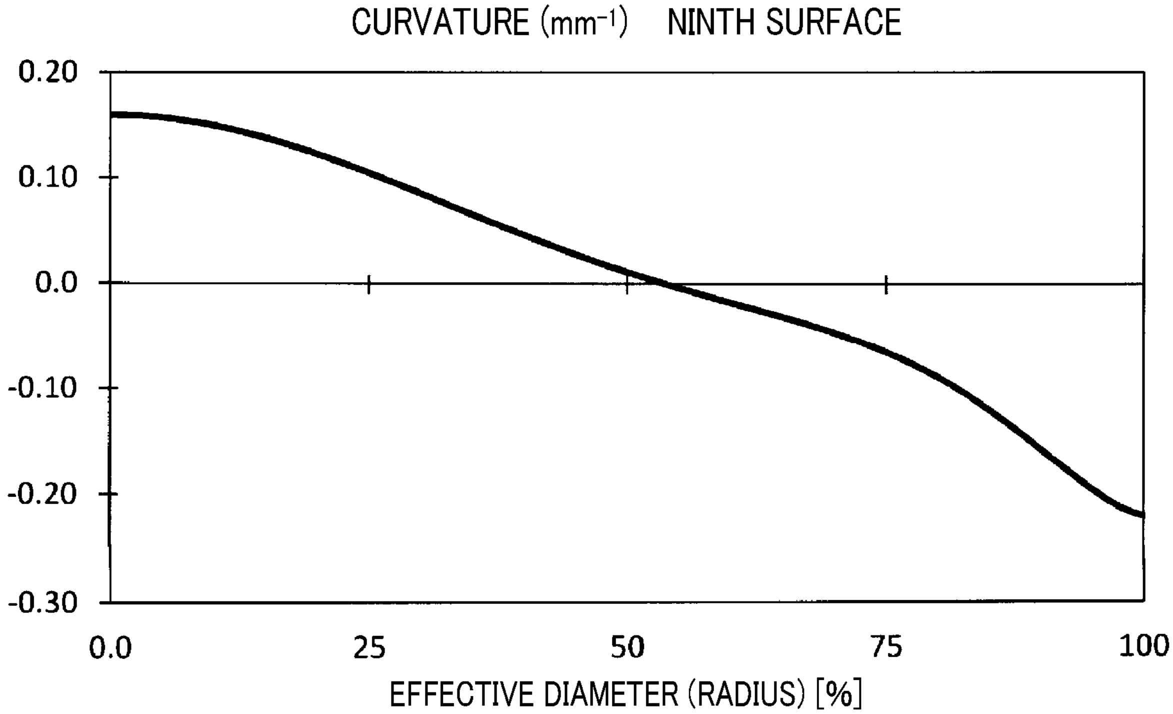
Figure 160:
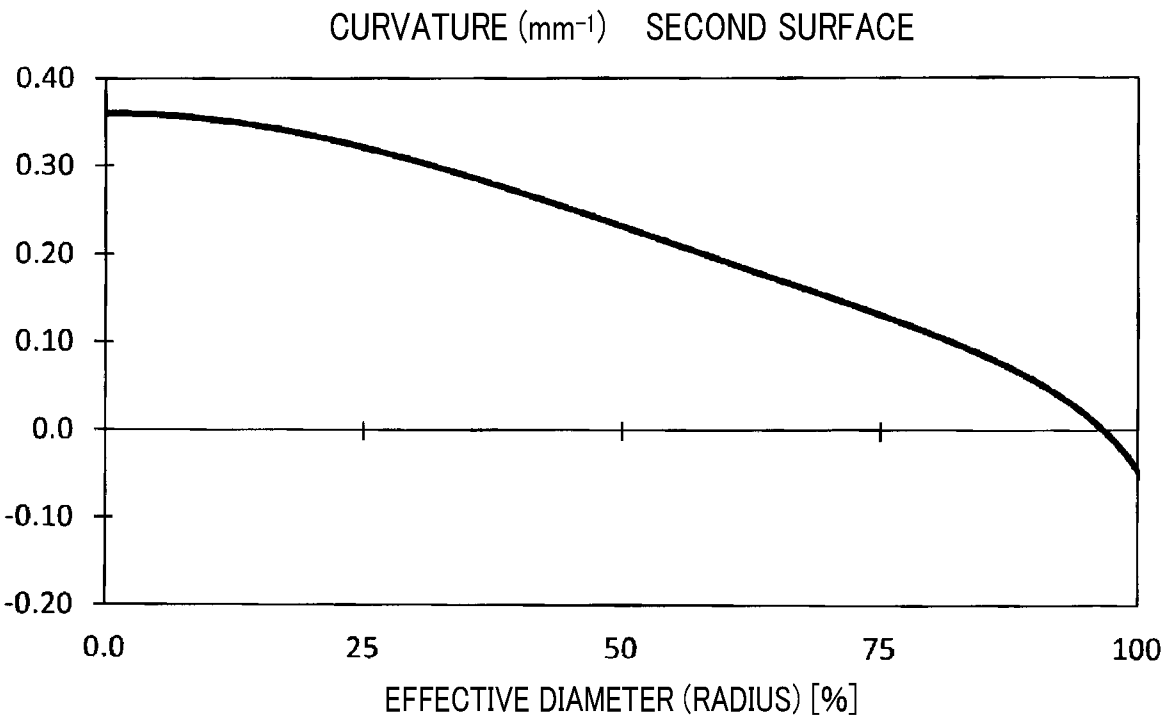
Figure 161:
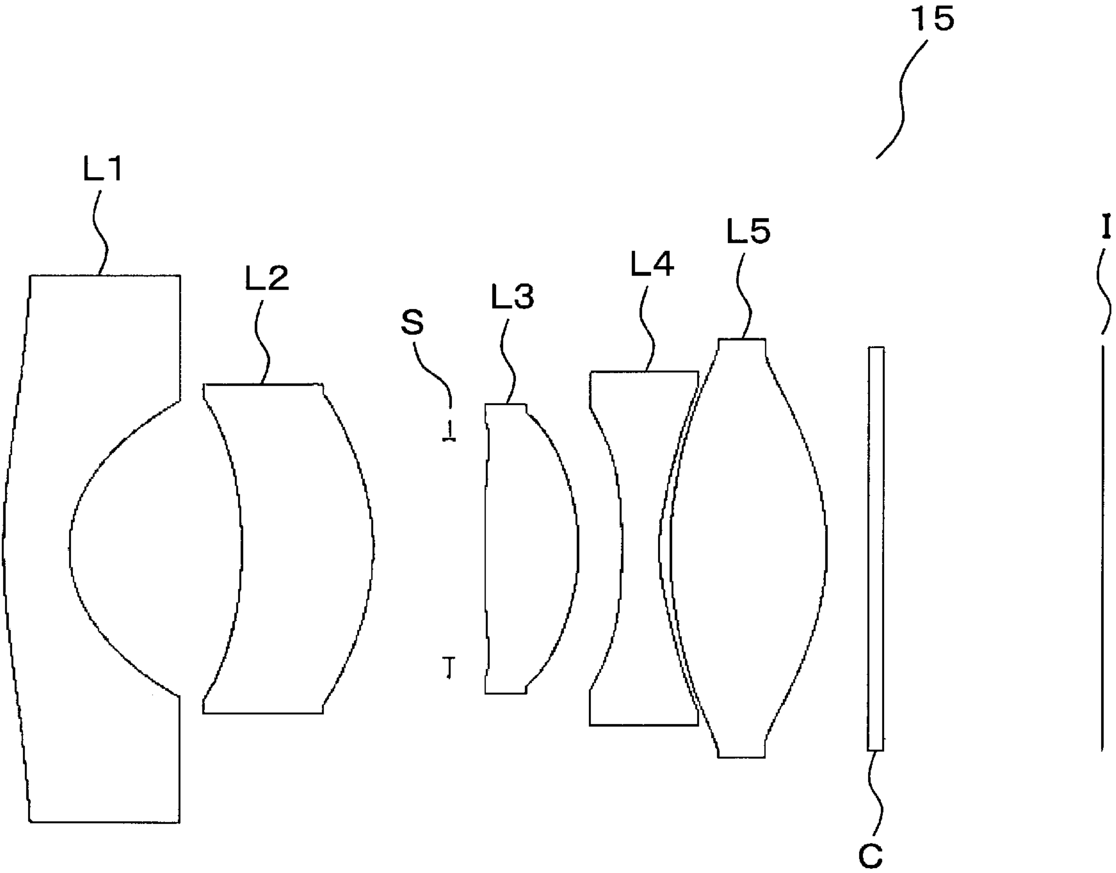
Figures 162, 163:
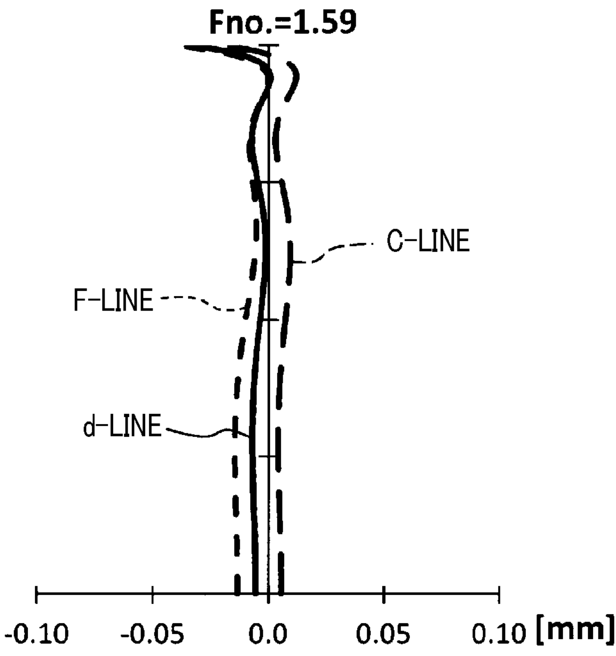
Figure 164:
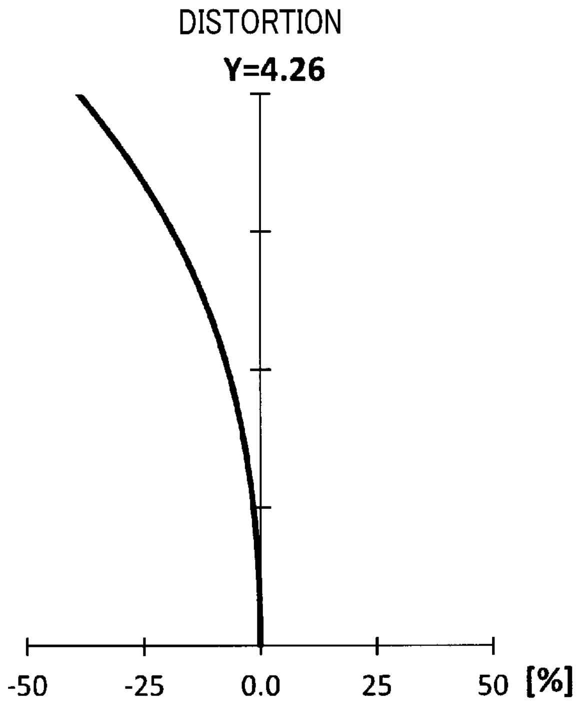
Figure 165:
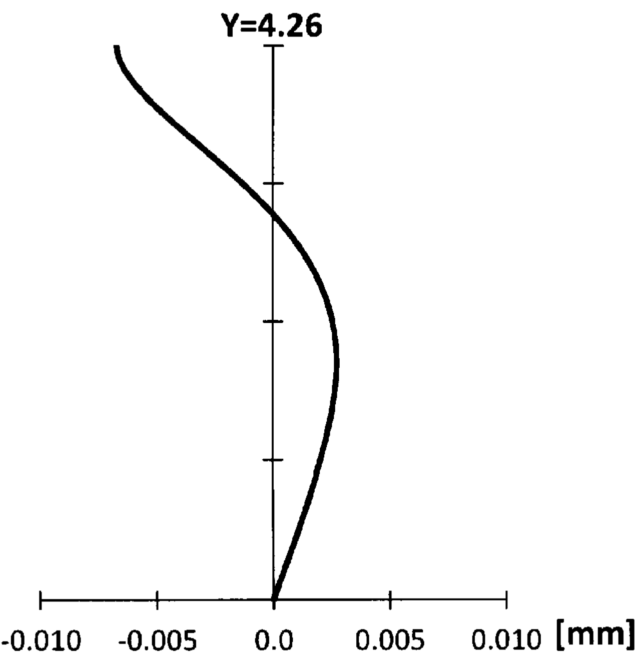
Figure 166:
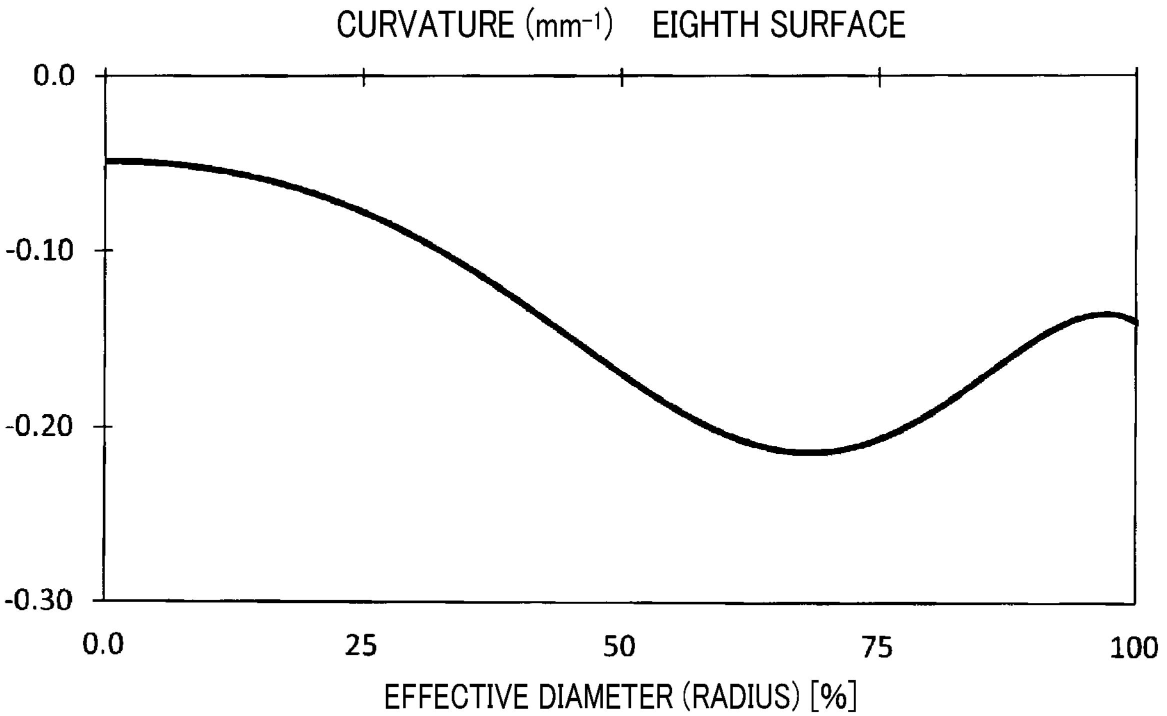
Figure 167:
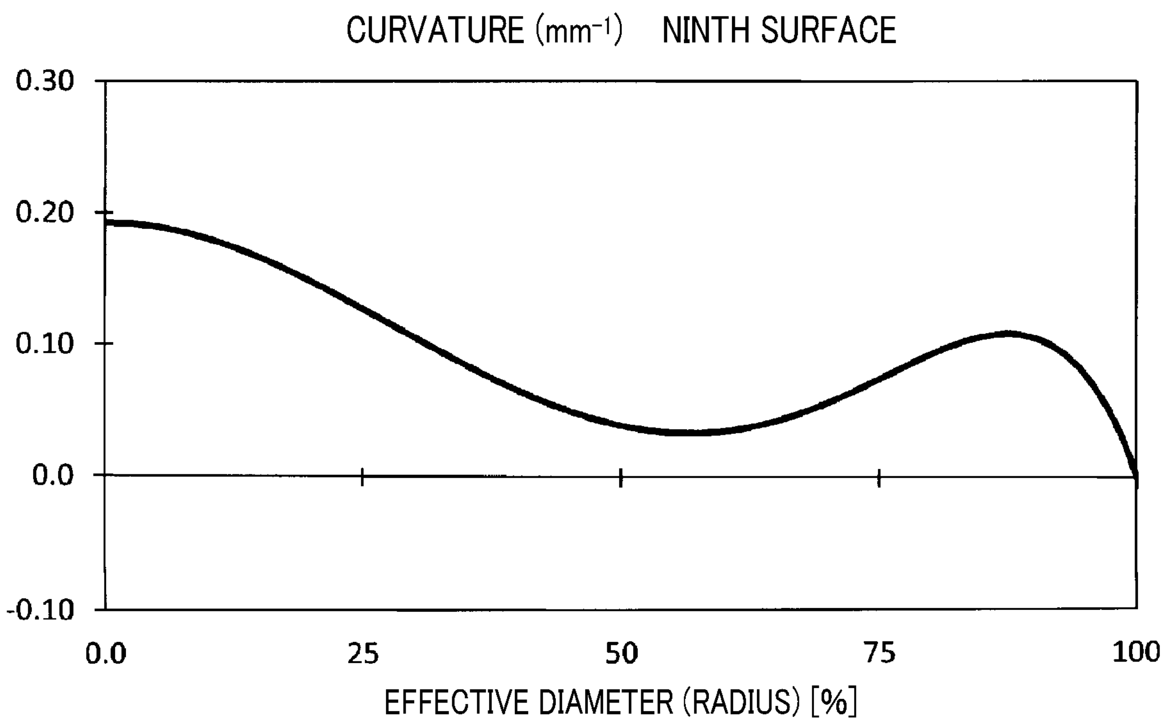
Figure 168:
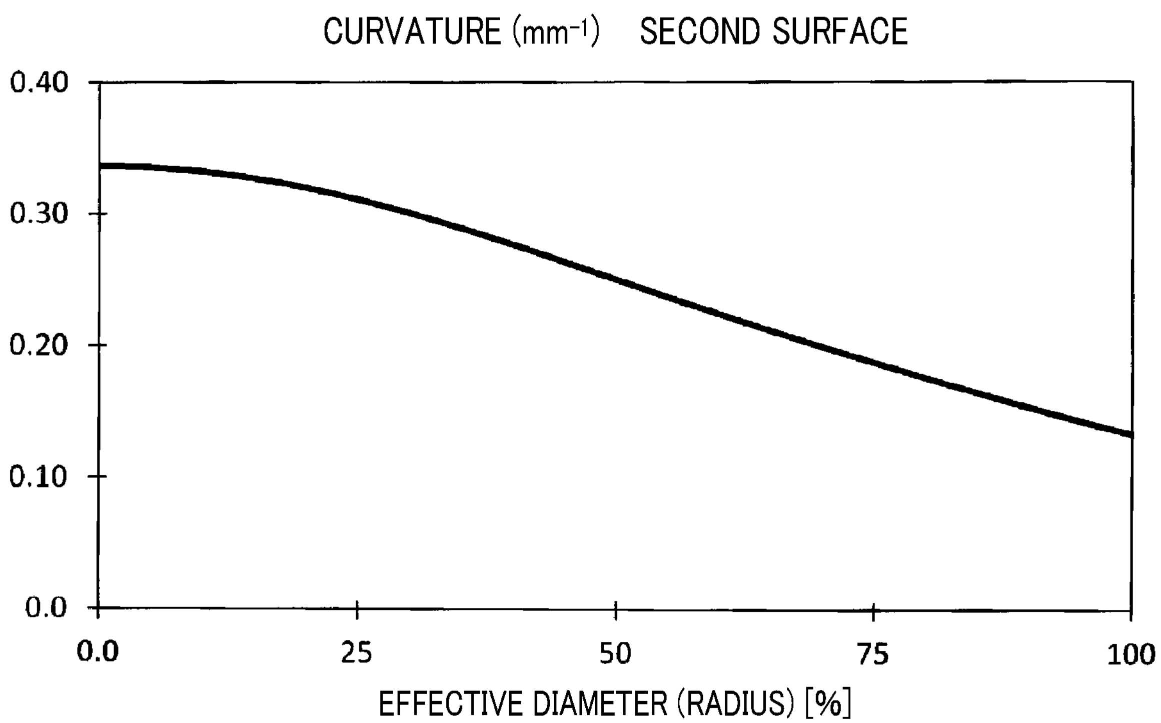
Figure 169:
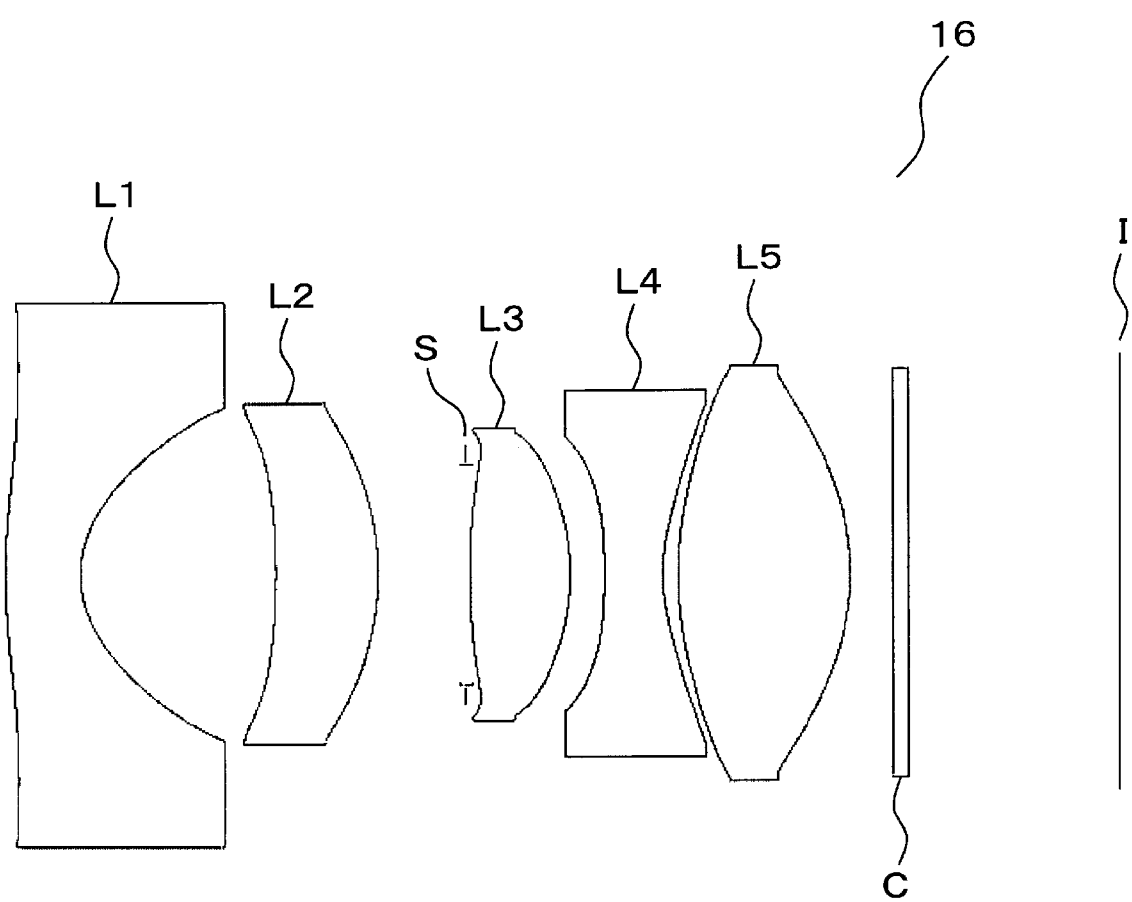
Figures 170, 171:
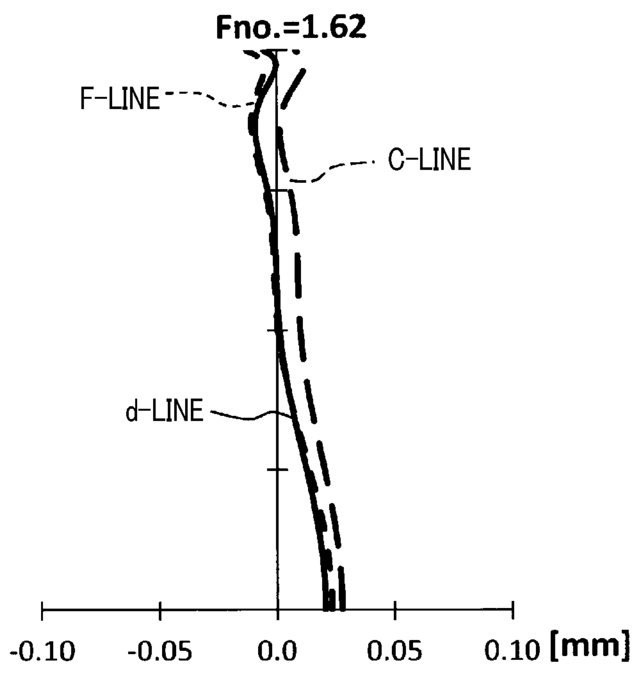
Figure 172:
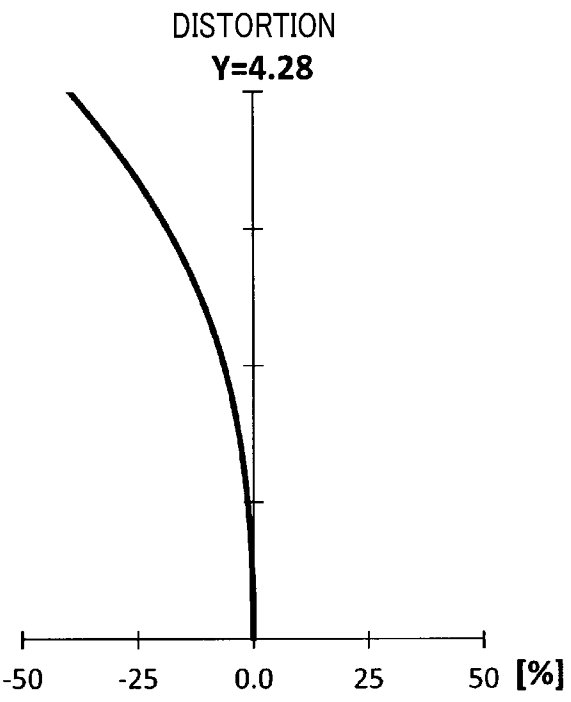
Figure 173:
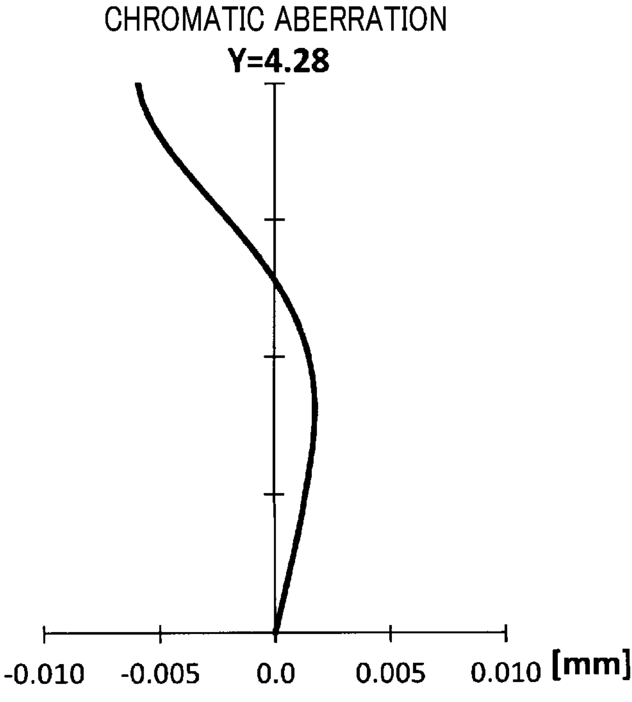
Figure 174:
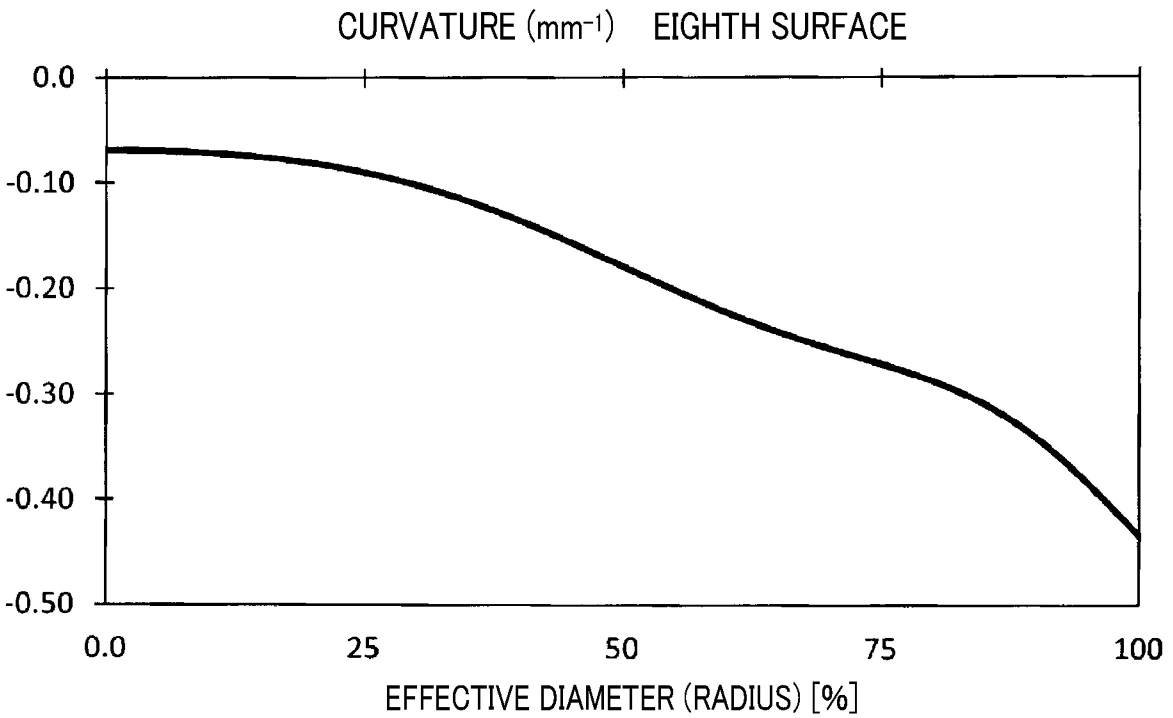
Figure 175:
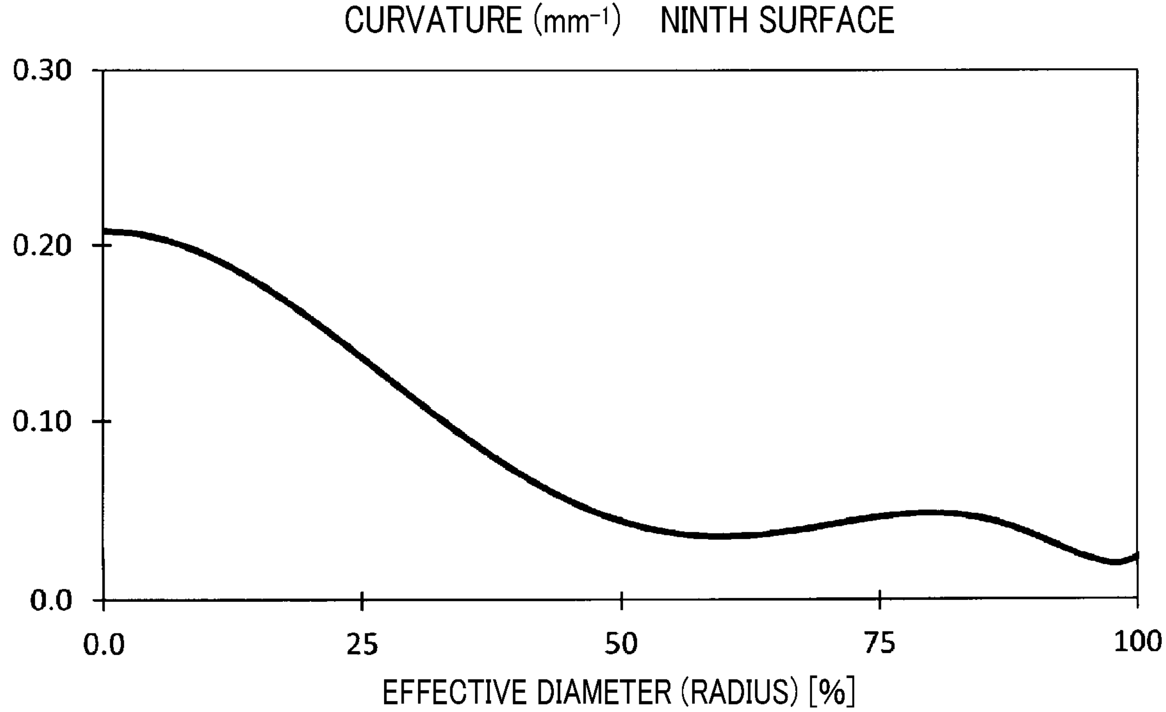
Figure 176:
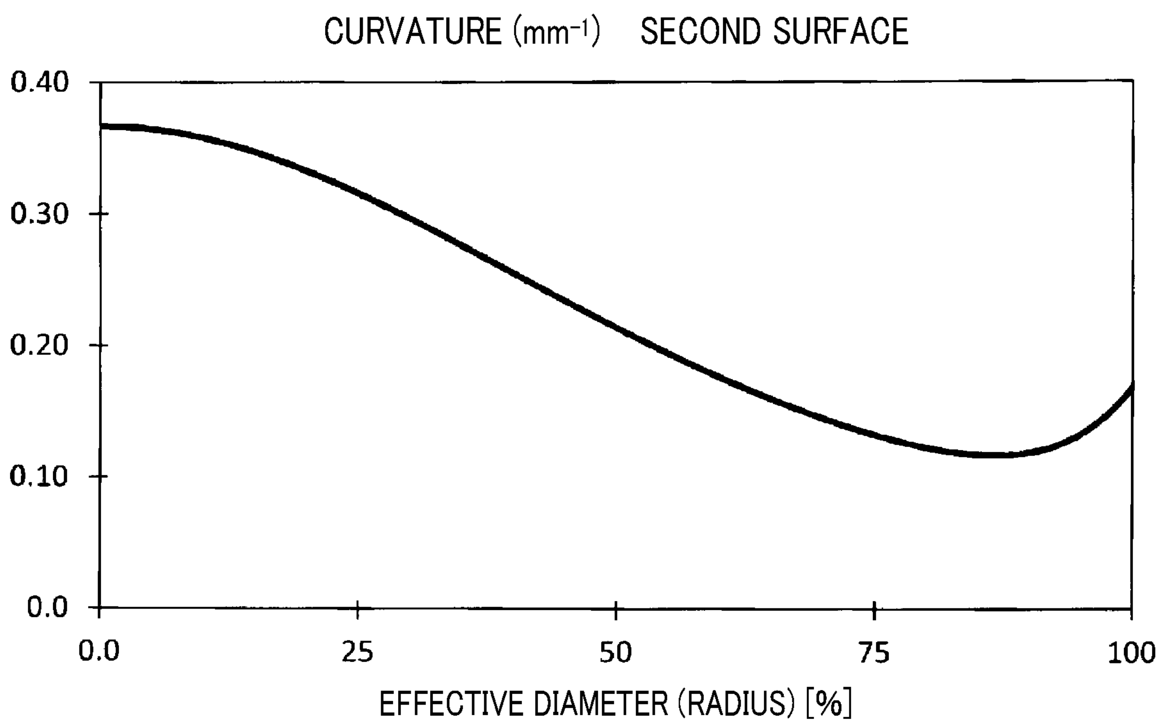

FIG. 131 is a graph illustrating astigmatism in the imaging optical system according to the eleventh embodiment;

FIG. 132 is a graph illustrating distortion in the imaging optical system according to the eleventh embodiment;

FIG. 133 is a graph illustrating chromatic aberration in the imaging optical system according to the eleventh embodiment;

FIG. 134 is a graph illustrating how a curvature is radially changed from a center portion to a periphery of an eighth surface of the imaging optical system according to the eleventh embodiment;

FIG. 135 is a graph illustrating how a curvature is radially changed from a center portion to a periphery of a ninth surface of the imaging optical system according to the eleventh embodiment;

FIG. 136 is a graph illustrating how a curvature is radially changed from a center portion to a periphery of a second surface of the imaging optical system according to the eleventh embodiment;

FIG. 137 is an optical diagram illustrating an imaging optical system according to the twelfth embodiment;

FIG. 138 is a graph illustrating spherical aberration in the imaging optical system according to the twelfth embodiment;

FIG. 139 is a graph illustrating astigmatism in the imaging optical system according to the twelfth embodiment;

FIG. 140 is a graph illustrating distortion in the imaging optical system according to the twelfth embodiment;

FIG. 141 is a graph illustrating chromatic aberration in the imaging optical system according to the twelfth embodiment;

FIG. 142 is a graph illustrating how a curvature is radially changed from a center portion to a periphery of an eighth surface of the imaging optical system according to the twelfth embodiment;

FIG. 143 is a graph illustrating how a curvature is radially changed from a center portion to a periphery of a ninth surface of the imaging optical system according to the twelfth embodiment;

FIG. 144 is a graph illustrating how a curvature is radially changed from a center portion to a periphery of a second surface of the imaging optical system according to the twelfth embodiment;

FIG. 145 is an optical diagram illustrating an imaging optical system according to the thirteenth embodiment;

FIG. 146 is a graph illustrating spherical aberration in the imaging optical system according to the thirteenth embodiment;

FIG. 147 is a graph illustrating astigmatism in the imaging optical system according to the thirteenth embodiment;

FIG. 148 is a graph illustrating distortion in the imaging optical system according to the thirteenth embodiment;

FIG. 149 is a graph illustrating chromatic aberration in the imaging optical system according to the thirteenth embodiment;

FIG. 150 is a graph illustrating how a curvature is radially changed from a center portion to a periphery of an eighth surface of the imaging optical system according to the thirteenth embodiment;

FIG. 151 is a graph illustrating how a curvature is radially changed from a center portion to a periphery of a ninth surface of the imaging optical system according to the thirteenth embodiment;

FIG. 152 is a graph illustrating how a curvature is radially changed from a center portion to a periphery of a second surface of the imaging optical system according to the thirteenth embodiment;

FIG. 153 is an optical diagram illustrating an imaging optical system according to the fourteenth embodiment;

FIG. 154 is a graph illustrating spherical aberration in the imaging optical system according to the fourteenth embodiment;

FIG. 155 is a graph illustrating astigmatism in the imaging optical system according to the fourteenth embodiment;

FIG. 156 is a graph illustrating distortion in the imaging optical system according to the fourteenth embodiment;

FIG. 157 is a graph illustrating chromatic aberration in the imaging optical system according to the fourteenth embodiment;

FIG. 158 is a graph illustrating how a curvature is radially changed from a center portion to a periphery of an eighth surface of the imaging optical system according to the fourteenth embodiment;

FIG. 159 is a graph illustrating how a curvature is radially changed from a center portion to a periphery of a ninth surface of the imaging optical system according to the fourteenth embodiment;

FIG. 160 is a graph illustrating how a curvature is radially changed from a center portion to a periphery of a second surface of the imaging optical system according to the fourteenth embodiment;

FIG. 161 is an optical diagram illustrating an imaging optical system according to the fifteenth embodiment;

FIG. 162 is a graph illustrating spherical aberration in the imaging optical system according to the fifteenth embodiment;

FIG. 163 is a graph illustrating astigmatism in the imaging optical system according to the fifteenth embodiment;

FIG. 164 is a graph illustrating distortion in the imaging optical system according to the fifteenth embodiment;

FIG. 165 is a graph illustrating chromatic aberration in the imaging optical system according to the fifteenth embodiment;

FIG. 166 is a graph illustrating how a curvature is radially changed from a center portion to a periphery of an eighth surface of the imaging optical system according to the fifteenth embodiment;

FIG. 167 is a graph illustrating how a curvature is radially changed from a center portion to a periphery of a ninth surface of the imaging optical system according to the fifteenth embodiment;

FIG. 168 is a graph illustrating how a curvature is radially changed from a center portion to a periphery of a second surface of the imaging optical system according to the fifteenth embodiment;

FIG. 169 is an optical diagram illustrating an imaging optical system according to the sixteenth embodiment;

FIG. 170 is a graph illustrating spherical aberration in the imaging optical system according to the sixteenth embodiment;

FIG. 171 is a graph illustrating astigmatism in the imaging optical system according to the sixteenth embodiment;

FIG. 172 is a graph illustrating distortion in the imaging optical system according to the sixteenth embodiment;

FIG. 173 is a graph illustrating chromatic aberration in the imaging optical system according to the sixteenth embodiment;

FIG. 174 is a graph illustrating how a curvature is radially changed from a center portion to a periphery of an eighth surface of the imaging optical system according to the sixteenth embodiment;

FIG. 175 is a graph illustrating how a curvature is radially changed from a center portion to a periphery of a ninth surface of the imaging optical system according to the sixteenth embodiment; and FIG. 176 is a graph illustrating how a curvature is radially changed from a center portion to a periphery of a second surface of the imaging optical system according to the sixteenth embodiment;

DETAILED DESCRIPTION OF EMBODIMENTS

The following embodiments respectively describe imaging optical systems that include a common configuration. Each of the imaging optical systems of the respective embodiments is configured to focus incident light from an object to thereby form an image. The side closer to the object will be referred to as an object side, and the side closer to the image will be referred to as an image side.

The imaging optical system of each embodiment is comprised of, in a sequential order from the object side to the image side, a first lens, a second lens, a third lens, a fourth lens, and a fifth lens. The first lens has negative refractive power, and the second lens is a meniscus-shaped lens, and has positive refractive power, and a concave surface that faces toward the object side.

The third lens has positive refractive power, and has both convex surfaces toward the respective object and image sides. The fourth lens has negative refractive power, and has a concave surface that faces toward the image side. The fifth lens has positive refractive power, and has both convex surfaces toward the respective object and image sides.

In particular, the fourth lens is configured such that (1) The concave surface, which faces the image side, has an aspherical shape (2) The aspherical concave surface has a center portion through which an optical axis passes, and a periphery thereof (3) The aspherical concave surface has a portion where the negative refractive power gradually becomes weaker from the center portion toward the periphery thereof The following describes how the imaging optical system including the common configuration works to achieve advantageous benefits, and describes additional configurations added to the common configuration of the imaging optical system, and how the imaging optical system including the common configuration and each of the additional configurations added thereto works to achieve advantageous benefits.

The imaging optical system of each embodiment has, for example, a given half angle of view of 60 degrees, and a given F-number that is lower than or equal to 1.63.

Features of Front Group of Lenses (First and Second Lenses)

In order to make wider the angle of view of a retrofocus imaging optical system comprised of first to fifth lenses, the retrofocus imaging optical system is required to have a principal point located to be closer to the image side than a backmost lens (the fifth lens) is to thereby have a short focal length. In order for a retrofocus imaging optical system to have a principal point located to be closer to the image side than the backmost lens (fifth lens) is, the front group of lenses, i.e., the first and second lenses, of the retrofocus imaging optical system have a stronger level of negative refractive power.

From this viewpoint, the imaging optical system based on the common configuration includes the combination of the first lens having a stronger level of negative refractive power, and the second lens, which is a meniscus-shaped lens, having positive refractive power and a concave surface that faces toward the object side. This results in the first lens having a main part of the total negative refractive power of the combination, and the second lens, which has the concave surface that faces toward the object side, covering the remaining part of the total negative refractive power of the combination. This enables the number of lenses in the front group of the imaging optical system based on the common configuration to be minimized. Additionally, the second lens is configured to have a meniscus-shape and positive refractive power. This configuration enables efficient correction of both (i) spherical aberration in the imaging optical system, a level of which has increased due to the larger aperture and (ii) astigmatism in the imaging optical system, a level of which has increased due to the wider angle of view.

Features of Back Group of Lenses (Third to Fifth Lenses)

The more the number of lenses included in the back group increases, the easier it is to satisfy an optical performance required for the imaging optical system based on the common configuration. It is desired, however, that the number of lenses included in the back group is as small as possible in order to minimize the weight of the imaging optical system. For this reason, the back group is comprised of the third lens, the fourth lens, and the fifth lens.

In order for the combination of the third to fifth lenses to have a stronger level of positive refractive power, each of the third and fifth lenses has positive refractive power, and the fourth lens has negative refractive power. This enables aberration, such as spherical aberration and/or chromatic aberration, of the imaging optical system to be efficiently corrected while minimizing the level of refractive power possessed by each of the third to fifth lenses.

Additionally, the fourth lens is configured such that (1) The concave surface, which faces the image side, has an aspherical shape (2) The aspherical concave surface has a center portion through which an optical axis passes, and a periphery thereof (3) The aspherical concave surface has a portion where the negative refractive power becomes gradually weaker from the center portion toward the periphery thereof This configuration enables easy correction of astigmatism in the imaging optical system that has increased due to the wider angle of view.

In addition, the third lens configured to have positive refractive power enables rays of light, which has passed through the fourth lens, to be input on the fourth lens while being separated for their angles of view, making it possible to improve a beneficial effect of correcting the astigmatism in the imaging optical system. Each of the third and fifth lenses configured to have both the convex surfaces toward the respective object and image sides enables spherical aberration generated in each of the third and fifth lenses to be separated into both the object side and image side, making it possible to reduce the total amount of aberration in the imaging optical system.

In particular, the fifth lens configured to have the convex surface that faces toward the image side enables efficient correction of distortion in the imaging optical system.

These beneficial effects achieved by the imaging optical system based on the common configuration enable both a wider angle of view and a larger aperture of the imaging optical system while reducing a level of each type of aberration in the imaging optical system.

Location of Aperture Diaphragm

The imaging optical system based on the common configuration includes an aperture diaphragm preferably located between the second lens and the third lens. If the aperture diaphragm were located at a position closer to the image side than the third lens is, the diameter of the first lens would increase, making it difficult to downsize the imaging optical system. Otherwise, if the aperture diaphragm were located at a position closer to the object side than the second lens is, an increase in the difference between refractive power in front of the aperture diaphragm and refractive power in back of the aperture diaphragm would make it difficult to correct at least one type of aberration, such as distortion.

Preferable Features of Fourth Lens

The fourth lens preferably has an aspherical surface that faces toward the object side, and the aspherical surface of the fourth lens preferably has a portion where the negative refractive power becomes gradually stronger from the center portion toward the periphery thereof. This additional feature of the fourth lens enables more efficient correction of both (i) the spherical aberration in the imaging optical system, the level of which has increased due to the larger aperture and (ii) the astigmatism in the imaging optical system, the level of which has increased due to the wider angle of view. Additionally, each of the aspherical surfaces of the fourth lens, which faces the respective image side and object side, preferably has one or more inflection points within an effective aperture, i.e., an effective diameter, thereof; refractive power at each of the one or more inflection points of each of the aspherical surfaces changes. This improves a beneficial effect of correcting astigmatism in the imaging optical system due to off-axis rays of incident light on the fourth lens.

Preferable Features of First Lens

The first lens is preferably configured to have an aspherical surface that faces toward the image side, the aspherical concave surface has a center portion through which the optical axis passes, and a periphery thereof, and the aspherical concave surface has a portion where the negative refractive power becomes gradually weaker from the center portion toward the periphery thereof. This configuration enables efficient correction of both (i) the spherical aberration in the imaging optical system, the level of which has increased due to the larger aperture and (ii) the astigmatism in the imaging optical system, the level of which has increased due to the wider angle of view.

Conditional Expressions (1) and (2) for First Lens

The first lens is configured to preferably satisfy the following conditional expression (1):

$$1.3<|f1|/f<3.1 \quad (1)$$

where:

f represents a focal distance of the whole of the imaging optical system; and f1 represents a focal distance of the first lens.

The first lens configured to meet the condition of the conditional expression (1) enables the negative refractive power to be within a proper range, making it possible for the lenses of the front group to have a sufficient level of the negative refractive power. This enables only one lens, which constitutes a lens of negative refractive power, to be included in the first group, making it possible for the imaging optical system to have a smaller size.

If the ratio |f1|/f were lower than or equal to the lower limit of 1.3, the negative refractive power of the first lens would be too strong, making it difficult for the imaging optical system to deliver superior optical performance. If the first lens is a resin lens, the ratio, if it were set to be lower than or equal to the lower limit of 1.3, would cause the eccentricity ratio in thickness of the periphery of the first lens to the center portion thereof to become excessively larger, making it difficult to mold the resin first lens with high accuracy.

If the ratio |f1|/f were higher than or equal to the upper limit of 3.1, the negative refractive power of the first lens would be insufficient, resulting in the level of the negative refractive power of the front group of the first and second lenses being insufficient. This would result in a need for an additional lens, which has negative refractive power, being added to the front group, making it difficult for the imaging optical system to have a smaller size and/or a lighter weight.

More preferably, the first lens is configured to satisfy the following conditional expression (2):

$$1.5<|f1|/f<2.0 \quad (2)$$

Conditional Expressions (3) and (4) for Second Lens

The second lens is configured to preferably satisfy the following conditional expression (3):

$$2.9<|f2|/f \quad (3)$$

where f2 represents a focal distance of the second lens.

The second lens configured to meet the condition defined by the conditional expression (3) enables the positive refractive power to be within a proper range, making it possible for the second lens to deliver superior optical performance. This enable both a wider angle of view and a larger aperture of the imaging optical system while maintaining both a small size and a light weight of the imaging optical system.

If the ratio |f2|/f were lower than or equal to the lower limit of 2.9, the positive refractive power of the second lens would be too strong, making it difficult for the front group of the first and second lenses to have a sufficient level of negative refractive power, which is required for a wider angle of view of the imaging optical system. This would result in a need of an additional lens, which has negative refractive power, being added to the front group, making it difficult for the imaging optical system to have a smaller size and/or a lighter weight. In addition, the ratio |f2|/f set to be lower than or equal to the lower limit of 2.9 would result in a larger level of the spherical aberration, making it difficult for the imaging optical system to ensure superior optical performance.

More preferably, the second lens is configured to satisfy the following conditional expression (4):

$$3.7<|f2|/f<5.0 \quad (4)$$

Conditional Expressions (5) and (6) for Fourth Lens

The fourth lens is configured to preferably satisfy the following conditional expression (5):

$$1.0<|f4|/f<2.1 \quad (5)$$

where f4 represents a focal distance of the fourth lens.

The fourth lens configured to meet the condition of the conditional expression (5) enables the negative refractive power to be within a proper range, making it possible for the fourth lens to deliver superior optical performance. This enable both a wider angle of view and a larger aperture of the imaging optical system while maintaining both a small size and a light weight of the imaging optical system.

If the ratio |f4|/f were lower than or equal to the lower limit of 1.0, the negative refractive power of the second lens would be too strong, making it difficult to correct astigmatism and/or field curvature aberration of the imaging optical system. The ratio |f4|/f set to be lower than or equal to the lower limit of 1.0 would make it difficult for the first lens to have a sufficient level of the negative refractive power, resulting in a larger in diameter of the first lens.

Otherwise, if the ratio |f4|/f were higher than or equal to the upper limit of 2.1, the negative refractive power of the fourth lens would be insufficient, making it difficult to correct astigmatism and/or chromatic aberration of the imaging optical system. This would result in the imaging optical system having difficulty in delivering proper optical performance.

More preferably, the fourth lens is configured to satisfy the following conditional expression (6):

$$1.2<|f4|/f<1.5 \quad (6)$$

Convex Meniscus-Shaped Surface of First Lens Toward Object Side

The first lens is preferably configured to have a convex meniscus-shaped surface that faces toward the object side. This enables incident angles of respective off-axis rays of incident light on the first lens to be maintained in a small range, making it possible for the imaging optical system to perform efficient correction of distortion in the imaging optical system, the level of which has increased due to the wider angle of view.

Both Concave Surfaces of Fourth Lens

The fourth lens is preferably configured to have both concave surfaces that face the respective object and image sides. This enables spherical aberration generated in the fourth lens to be separated into both the object side and image side, making it possible to reduce the total amount of aberration in the imaging optical system.

Aspherical Shape of at Least One Surface of Second Lens

At least one surface of the second lens, which faces at least one of the object side and the image side, preferably has an aspherical shape. Because the second lens has the surface closer to the aperture diaphragm, the aspherical shaped surface of the second lens enables efficient correction of both the spherical aberration and coma aberration in the imaging optical system, the level of each of which has increased due to the larger aperture.

Aspherical Shape of at Least One Surface of Third Lens

At least one surface of the third lens, which faces at least one of the object side and the image side, preferably has an aspherical shape. Because the third lens has the surface closer to the aperture diaphragm, the aspherical shaped surface of the third lens enables efficient correction of both the spherical aberration and coma aberration in the imaging optical system, the level of each of which has increased due to the larger aperture.

Temperature Coefficient of Relative Refractive Index of Third Lens

The third lens has a relative refractive index, and has a temperature coefficient $|(dn/dT)_3|$ of the relative refractive index at the d-line of the third lens under an ambient temperature of 20° C. that preferably satisfies the following conditional expression (7):

$$|(dn/dT)_3|<10\times10^{-6}/° \text{ C.} \tag{7}$$

The temperature coefficient of the relative refractive index at the d-line of the third lens, which satisfies the above conditional expression (7), enables the temperature coefficient of the relative refractive index of the third lens to be within a proper range. In this case, each of the first to fourth lenses may be preferably a resin lens, and the fifth lens may be preferably a glass lens. Resin lenses usually have a higher flexibility in shape and a lower cost than glass lenses, but are more susceptible to heat than glass lenses. The third lens configured to satisfy the condition defined by the conditional expression (7) reduces any change in optical performance of the imaging optical system, which uses only one glass lens, even if the ambient temperature changes within the range between −40° C. and +105° C., making it possible to offer an imaging optical system having superior optical performance.

If the temperature coefficient $|(dn/dT)_3|$ of relative refractive index at the d-line of the third lens were higher than or equal to the upper limit of $10\times10^{-6}$/° C., refractive index change of the third lens due to the influence of heat would become excessively large. This would make it difficult for the whole of the imaging optical system to balance changes in focal length of the respective the first to fifth lenses in response to ambient-temperature changes one another, resulting in the focal length of the whole of the imaging optical system being deviated from a designed value. This would make it difficult for the imaging optical system to deliver superior optical performance.

More preferably, the temperature coefficient $|(dn/dT)_3|$ of the relative refractive index at the d-line of the third lens satisfies the following conditional expression (8):

$$|(dn/dT)_3|<6\times10^{-6}/° \text{ C.} \tag{8}$$

Temperature Coefficient of Relative Refractive Index of Fifth Lens

The fifth lens has a relative refractive index, and has a temperature coefficient $|(dn/dT)_5|$ of the relative refractive index at the d-line of the fifth lens under an ambient temperature of 20° C. preferably satisfies the following conditional expression (9):

$$|(dn/dT)_5|<10\times10^{-6}/° \text{ C.} \tag{9}$$

The temperature coefficient of the relative refractive index at the d-line of the third lens, which satisfies the above conditional expression (9), enables the temperature coefficient of the relative refractive index of the fifth lens to be within a proper range. In this case, each of the first to fourth lenses may be preferably a resin lens, and the fifth lens may be preferably a glass lens. Resin lenses usually have a higher flexibility in shape and a lower cost than glass lenses, but are more susceptible to heat than glass lenses. The fifth lens configured to satisfy the condition defined by the conditional expression (9) reduces any change in optical performance of the imaging optical system, which uses only one glass lens, even if the ambient temperature changes within the range between −40° C. and +105° C., making it possible to offer an imaging optical system having superior optical performance.

If the temperature coefficient $|(dn/dT)_5|$ of the relative refractive index at the d-line of the fifth lens were higher than or equal to the upper limit of $10\times10^{-6}$/° C., refractive index change of the fifth lens due to the influence of heat would become excessively large. This would make it difficult for the whole of the imaging optical system to cancel changes in focal length of the respective the first to fifth lenses in response to ambient-temperature changes one another, resulting in the focal length of the whole of the imaging optical system being deviated from a designed value. This would make it difficult for the imaging optical system to deliver superior optical performance.

More preferably, the temperature coefficient $|(dn/dT)_5|$ of the relative refractive index at the d-line of the fifth lens satisfies the following conditional expression (10):

$$|(dn/dT)_5|<6\times10^{-6}/° \text{ C.} \tag{10}$$

First Embodiment

Figure 1:
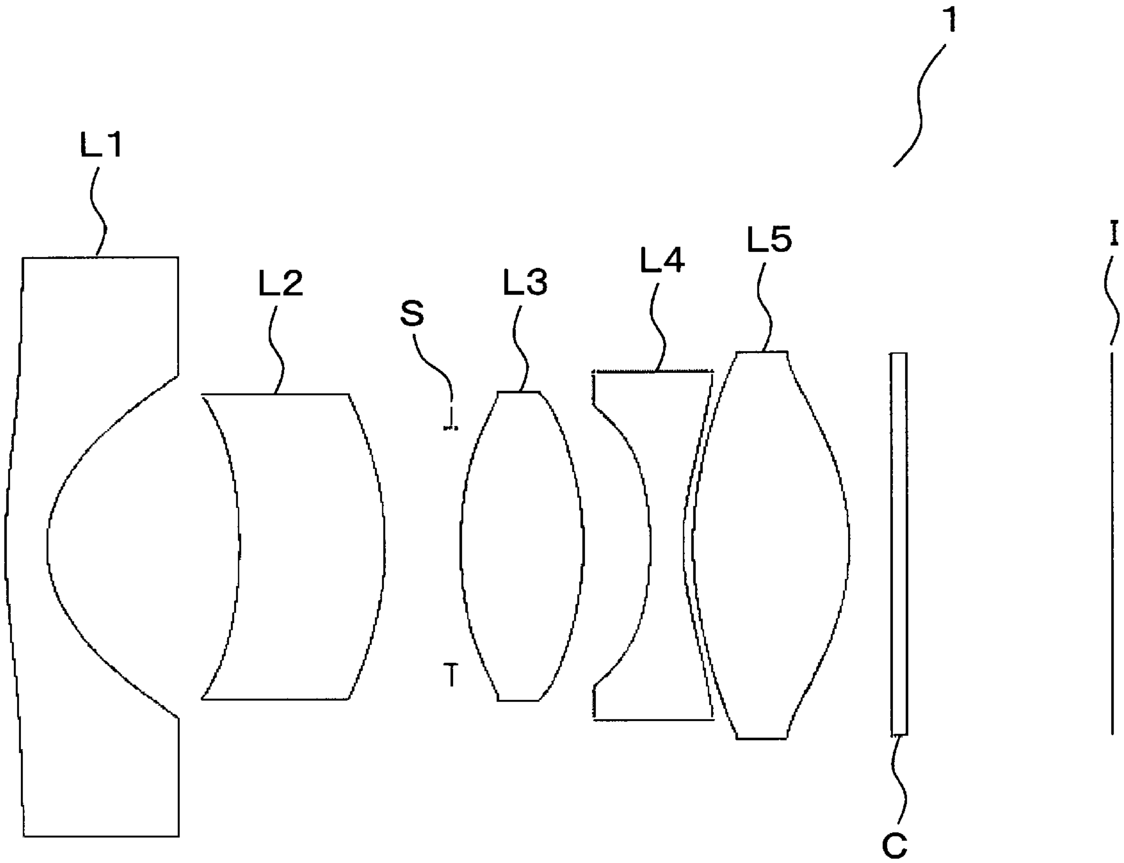
FIG. 1 is an optical diagram illustrating an imaging optical system according to the first embodiment.
Figure 4:
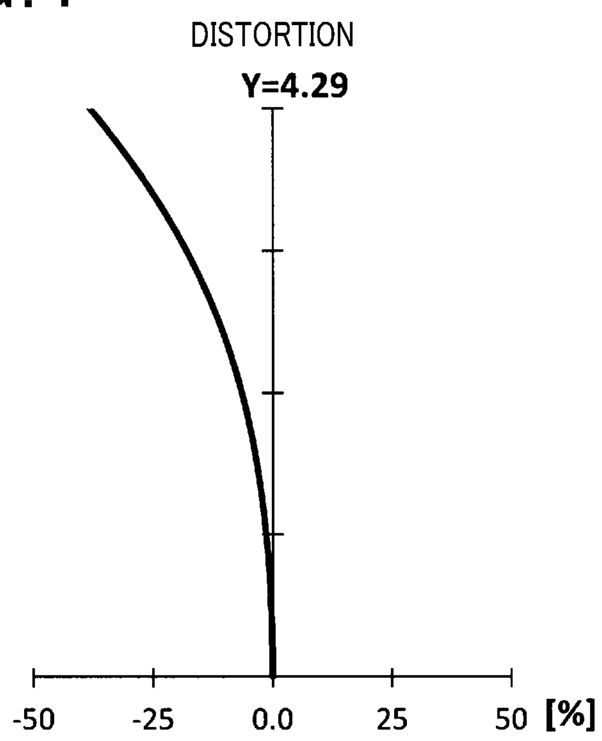
FIG. 4 is a graph illustrating distortion in the imaging optical system according to the first embodiment.
Figure 5:
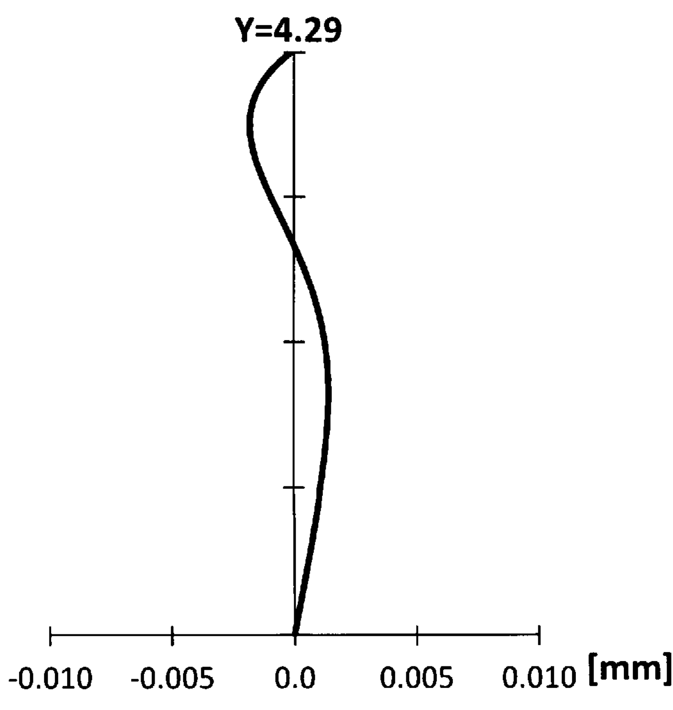
FIG. 5 is a graph illustrating chromatic aberration in the imaging optical system according to the first embodiment.

As illustrated in FIG. 1, an imaging optical system 1 according to the first embodiment is comprised of, in a sequential order from the object side to the image side, a first lens L1, a second lens L2, a third lens L3, a fourth lens L4, and a fifth lens L5. Each of the first to fifth lenses L1 to L5 has a light input surface that faces toward the object side, and a light output surface that faces toward the image side.

The first lens L1 has negative refractive power, and the second lens L2 is a meniscus-shaped lens. The second lens L2 has positive refractive power, and a concave surface as the light input surface.

The third lens L3 has positive refractive power, and has both convex surfaces as the respective light input and output surfaces.

The fourth lens L4 has negative refractive power, and has a concave surface as the light output surface. The fifth lens L5 has positive refractive power, and has both convex surfaces as the respective light input and output surfaces.

In particular, the fourth lens L4 is configured such that (1) The concave surface, which is the light output surface, has an aspherical shape (2) The aspherical concave surface (light output surface) has a center portion through which an optical axis passes, and a periphery thereof.

(3) The aspherical concave surface (light output surface) has a portion where the negative refractive power becomes gradually weaker from the center portion toward the periphery thereof.

The imaging optical system 1 includes an aperture diaphragm S located between the second lens L2 and the third lens L3.

Each of the first to fourth lenses L1 to L4 is made of resin, and the fifth lens L5 is made of glass. The imaging optical system 1 includes an optical block C, which has opposing light input and output surfaces, located between the fifth lens L5 and an image plane I. The optical block C may be comprised of, for example, an optical filter, a phase plate, a crystal low-pass filter, an infrared cutoff filter, a cover glass, and/or one of other optical components.

The imaging optical system 1 additionally includes the following features:

(1) The light input surface of the first lens L1 has a convex meniscus-shape, and the light output surface has an aspherical shape. The light output surface, i.e., the aspherical-shaped surface, of the first lens L1 has a center portion through which the optical axis passes, and a periphery thereof, and the light output surface, i.e., the aspherical-shaped surface, of the first lens L1 has a portion where the negative refractive power becomes gradually weaker from the center portion toward the periphery thereof.

(2) At least one of the light input surface and the light output surface of the second lens L2, which faces at least one of the object side and the image side, has an aspherical shape.

(3) At least one of the light input surface and the light output surface of the third lens L3, which faces at least one of the object side and the image side, has an aspherical shape.

(4) The light input surface of the fourth lens L4 has an aspherical concave shape, and the light input surface, i.e., the aspherical concave surface, of the fourth lens L4 has a portion where the negative refractive power becomes gradually weaker from the center portion toward the periphery thereof.

The imaging optical system 1 has predetermined specifications in which:

(I) A total focal length of the imaging optical system 1 is 4.000 millimeters (mm)

(II) An F-number of the imaging optical system 1 is 1.61

(III) A half angle of view is 60°

(IV) An image height is 4.29 mm (V) A back focus is 6.219 mm (VI) A total length of the imaging optical system 1 is 26.601 mm Next, Table I shows the surface data of the imaging optical system 1 using the following reference symbols:

(1) Sn represents a sequential number of each lens surface (each of the light input and output surfaces of each lens) and the diaphragm 5 of the imaging optical system 1 counted from the object side (for example, Sn equal to 2 represents the light output surface of the first lens L1, Sn equal to 5(D) represents the surface number of the aperture diaphragm S, and Sn equal to 6 represents the light output surface of the third lens L3)

(2) r represents the radius of curvature of each lens surface of the imaging optical system 1

(3) d represents a distance from each lens surface to the next lens surface (4) Nd represents a refractive index at the d-line of each lens (5) Vd represents an Abbe number at the d-line of each lens (6) E represents an effective diameter of each lens surface (7) cc represents infinity (8) "*" (asterisk) assigned to a particular lens surface represents that the corresponding lens surface is aspheric Each of the parameters r, d, and E has a unit of millimeters (mm), and each of the parameters Nd and Vd has no units.

TABLE I

SURFACE DATA

| Sn | r | d | Nd | Vd | E |
|---|---|---|---|---|---|
| 1* | 15.707 | 1.000 | 1.545 | 56.003 | 13.59 |
| 2* | 3.044 | 4.603 | | | 8.05 |
| 3* | −10.542 | 3.502 | 1.640 | 23.529 | 7.18 |
| 4* | −7.129 | 1.574 | | | 7.15 |
| 5 (D) | ∞ | 0.231 | | | |
| 6* | 10.548 | 2.949 | 1.545 | 56.003 | 6.92 |
| 7* | −6.983 | 1.603 | | | 7.24 |
| 8* | −9.438 | 0.798 | 1.661 | 20.373 | 6.59 |
| 9* | 5.821 | 0.238 | | | 8.17 |
| 10* | 8.706 | 3.748 | 1.729 | 54.041 | 8.86 |
| 11* | −6.005 | 1.000 | | | 9.06 |
| 12 | ∞ | 0.400 | 1.517 | 64.167 | 8.94 |
| 13 | ∞ | 4.956 | | | 8.93 |

The focal lengths of the respective first, second, and fourth lenses L1, L2, and L4 will be respectively referred to as f1, f2, and f4. The refractive-index temperature coefficients of the respective third and fifth lenses L3 and L5 will be respectively referred to as $(dn/dT)_3$ and $(dn/dT)_5$. The distance between the first and second lenses L1 and L2 will be referred to as d12.

Note that, in the following descriptions, E+ or E− represents exponential in decimal. For example, E+2 represents $\times 10^{2}$, and E−2 represents $\times 10^{-2}$.

Next, Table II shows the single lens data of the imaging optical system 1.

TABLE II

SINGLE LENS DATA

| | |
|---|---|
| \|f1\|/f | 1.78 |
| \|f2\|/f | 6.14 |
| \|f4\|/f | 1.33 |
| $\|(dn/dT)_3\|$ | 95.97E−06 |
| $\|(dn/dT)_5\|$ | 2.69E−06 |
| d12/f | 1.15 |

The ratio |f1|/f satisfies the conditional expression (2), the ratio |f2|/f satisfies the conditional expression (3), and the |f4|/f satisfies the conditional expression (6). Additionally, the temperature coefficient $|(dn/dT)_3|$ does not satisfy the conditional expression (7), but the temperature coefficient $|(dn/dT)_5|$ satisfies the conditional expression (10).

Next, Table III shows the aspherical data of the imaging optical system 1 using the following symbols:

k represents a conical coefficient;

A4 represents an aspherical coefficient of 4th order;

A6 represents an aspherical coefficient of 6th order;

A8 represents an aspherical coefficient of 8th order;

A10 represents an aspherical coefficient of 10th order; and

A12 represents an aspherical coefficient of 12th order.

Specifically, note that the first to thirteenth surfaces counted from the object side represent that the first surface corresponds to the light input surface of the first lens L1, the second surface corresponds to the light output surface of the first lens L5, . . . , the fifth surface corresponds to the aperture diaphragm S, . . . , the ninth surface corresponds to the light output surface of the fourth lens L4, . . . , and the thirteenth surface represents the light output surface of the optical block C.

TABLE III

ASPHERICAL DATA

First surface k = 0, A4 = −1.1153E−03, A6 = 1.8662E−05, A8 = −1.5608E−07
A10 = 5.7705E−10, A12 = 0

Second surface k = −1.1083, A4 = 1.6804E−03, A6 = −2.0942E−05,
A8 = −6.4190E−07 A10 = −1.5540E−08, A12 = 0

TABLE III-continued

| ASPHERICAL DATA |
|---|
| Third surface |
| k = 0, A4 = −2.4535E−04, A6 = −3.5477E−05, A8 = −5.1714E−06 A10 = 2.4256E−07, A12 = 0 |
| Fourth surface |
| k = 0, A4 = 1.7787E−03, A6 = −1.2103E−04, A8 = 5.3616E−06 A10 = −6.2507E−08, A12 = 0 |
| Sixth surface |
| k = 0, A4 = 2.9194E−03, A6 = −1.9054E−04, A8 = 1.2365E−05 A10 = −5.6600E−07, A12 = 0 |
| Seventh surface |
| k = 0, A4 = 2.6132E−03, A6 = −2.4744E−04, A8 = 1.6245E−05 A10 = −7.1955E−07, A12 = 0 |
| Eighth surface |
| k = 0, A4 = −4.1119E−03, A6 = −1.4316E−04, A8 = 1.1572E−05 A10 = −4.1174E−07, A12 = 0 |
| Ninth surface |
| k = 0, A4 = −6.3071E−03, A6 = 3.3489E−04, A8 = −1.3192E−05 A10 = 1.8510E−07, A12 = 0 |
| Tenth surface |
| k = 0, A4 = −1.6459E−03, A6 = 8.4131E−05, A8 = −2.8533E−06 A10 = 5.1154E−08, A12 = 0 |
| Eleventh surface |
| k = 0, A4 = 6.4017E−04, A6 = 1.3554E−05, A8 = 4.4600E−07 A10 = 4.0801E−08, A12 = 0 |

FIG. 2 to FIG. 5 respectively illustrate the spherical aberration, the astigmatism, the distortion, and the chromatic aberration in the imaging optical system 1. Solid line in FIG. 2 represents the d-line at 587.6 nm wavelength, short dashed line represents the F-line at 486.1 nm wavelength, and long dashed line represents the C-line at 656.3 nm wavelength.

Reference symbol ΔS (solid line) in FIG. 3 represents the astigmatism in the sagittal direction in the imaging optical system 1, and reference symbol ΔM in FIG. 3 represents the astigmatism in the tangential direction in the imaging optical system 1. In each of FIGS. 3 to 5, reference symbol Y represents the image height.

Figure 6:
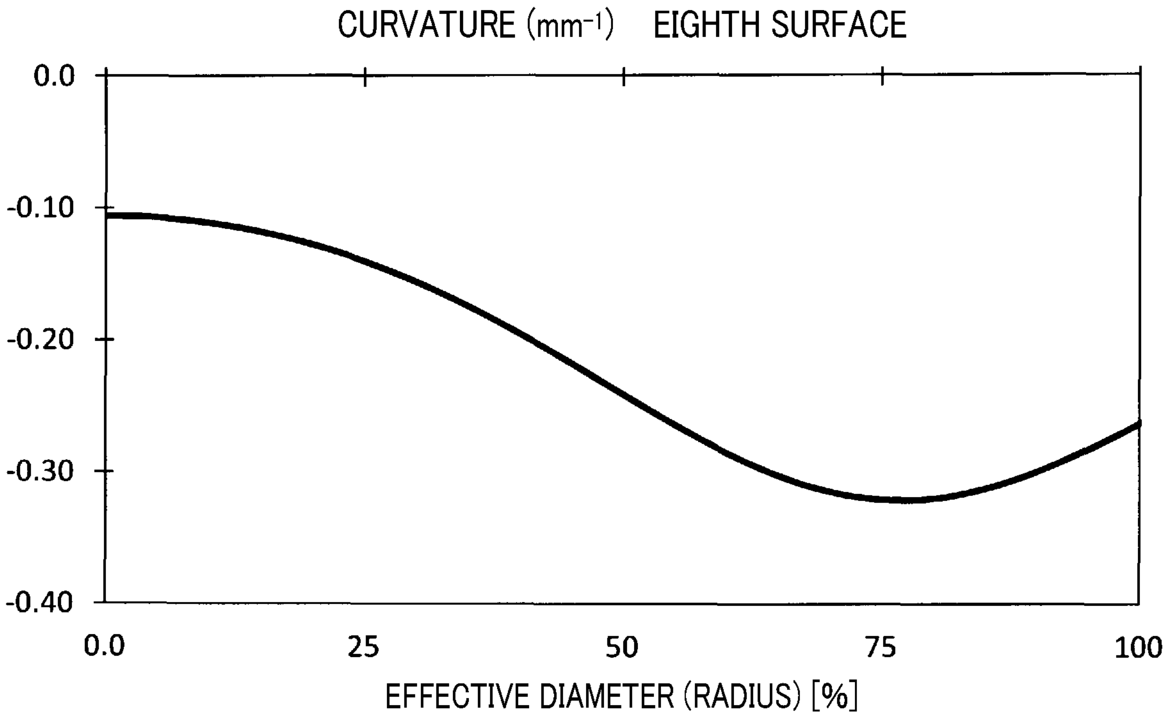
FIG. 6 is a graph illustrating how a curvature is radially changed from a center portion to a periphery of an eighth surface of the imaging optical system according to the first embodiment.
Figure 7:
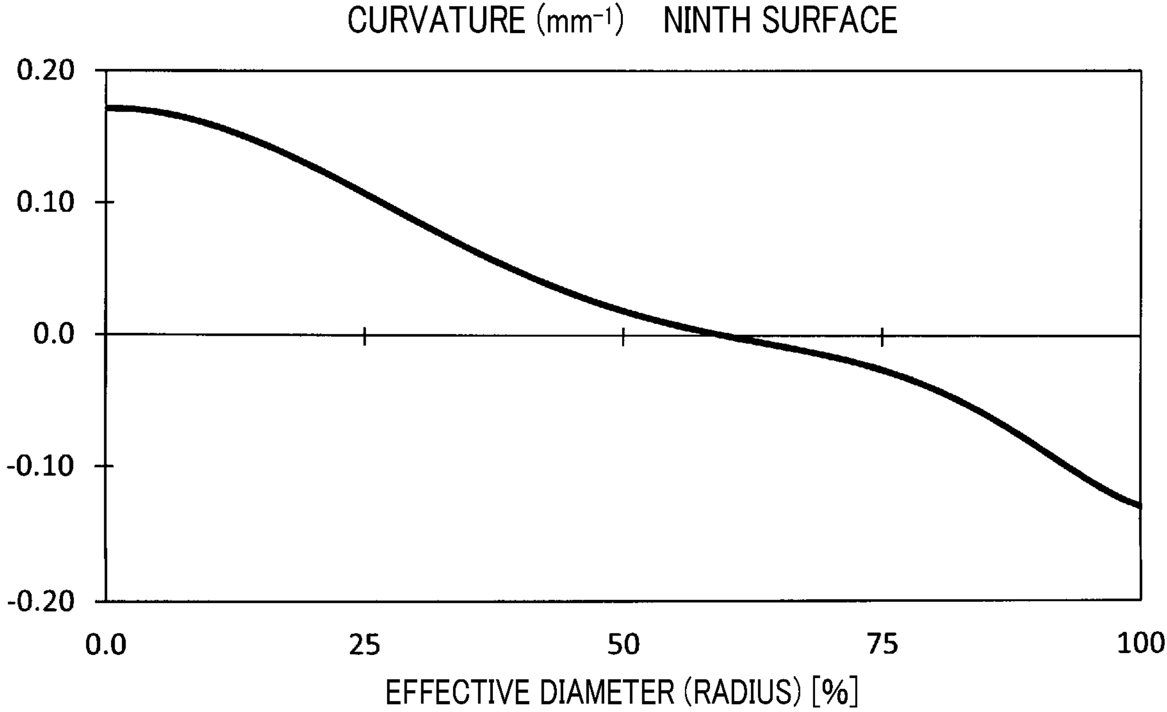
FIG. 7 is a graph illustrating how a curvature is radially changed from a center portion to a periphery of a ninth surface of the imaging optical system according to the first embodiment.
Figure 8:
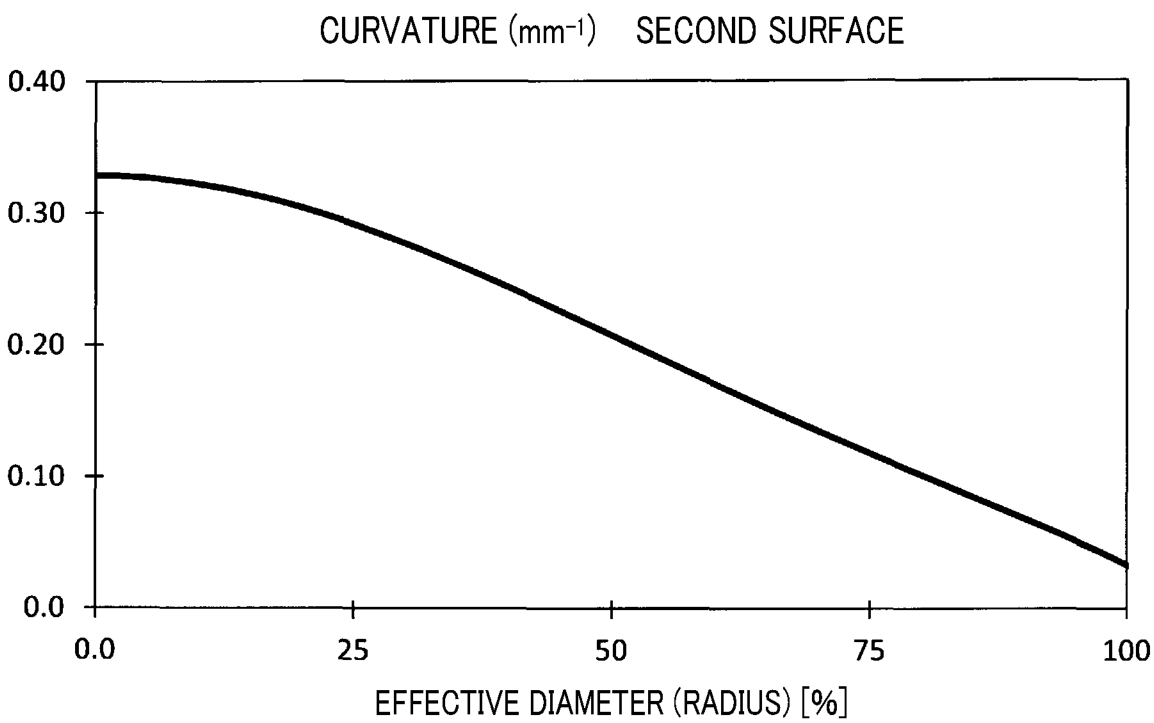
FIG. 8 is a graph illustrating how a curvature is radially changed from a center portion to a periphery of a second surface of the imaging optical system according to the first embodiment.

FIG. 6 illustrates how the curvature is radially changed from the center portion to the periphery of the eighth surface (the light input surface of the fourth lens L4). FIG. 7 illustrates how the curvature is radially changed from the center portion to the periphery of the ninth surface (the light output surface of the fourth lens L4). FIG. 8 illustrates how the curvature is radially changed in from the center portion to the periphery of the ninth surface (the light output surface of the first lens L1). Because the refractive power of a surface of a lens is determined based on the curvature and refractive index of the surface of the lens, each of FIGS. 6 to 8 represents radial change of the curvature as change of the refractive power. In each of FIGS. 6 to 8, the horizontal axis represents effective diameter (radius).

FIGS. 6 and 7 show that the change curve of the curvature of the light input surface of the fourth lens L4 has an inflection point, but the change curve of the curvature of the light output surface of the fourth lens L4 has no inflection points.

Second Embodiment

Figure 9:
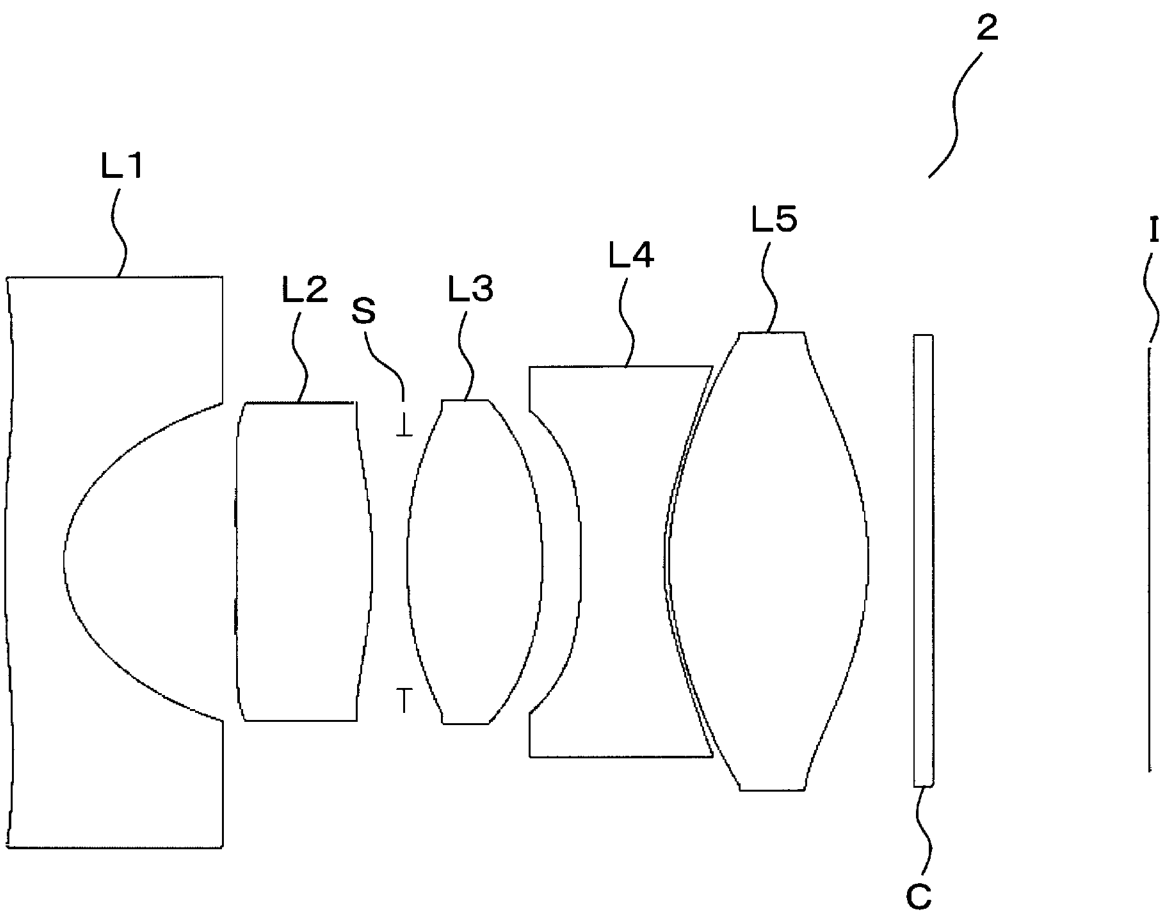
FIG. 9 is an optical diagram illustrating an imaging optical system according to the second embodiment.
Figures 10, 11:
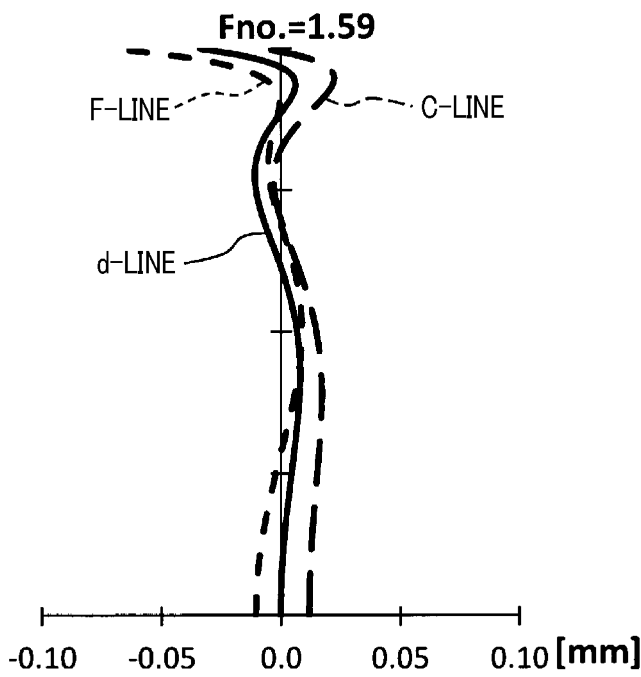
FIG. 10 is a graph illustrating spherical aberration in the imaging optical system according to the second embodiment.
FIG. 11 is a graph illustrating astigmatism in the imaging optical system according to the second embodiment.
Figure 12:
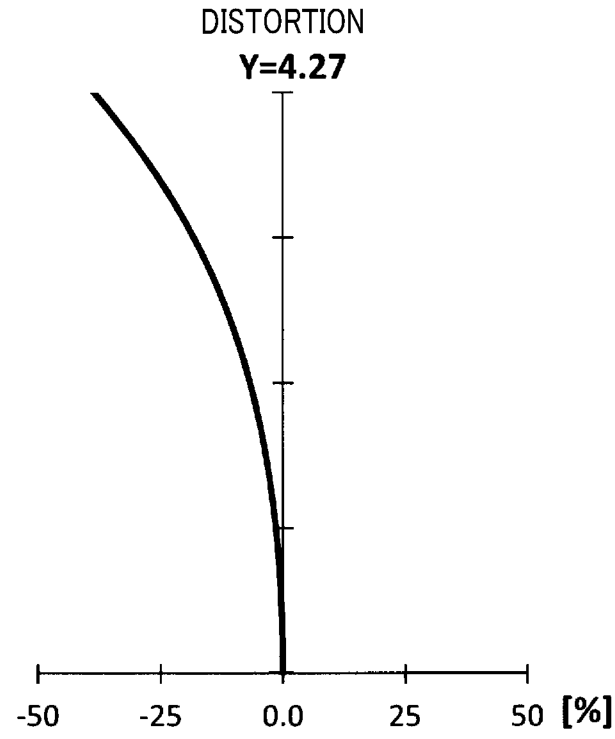
FIG. 12 is a graph illustrating distortion in the imaging optical system according to the second embodiment.
Figure 13:
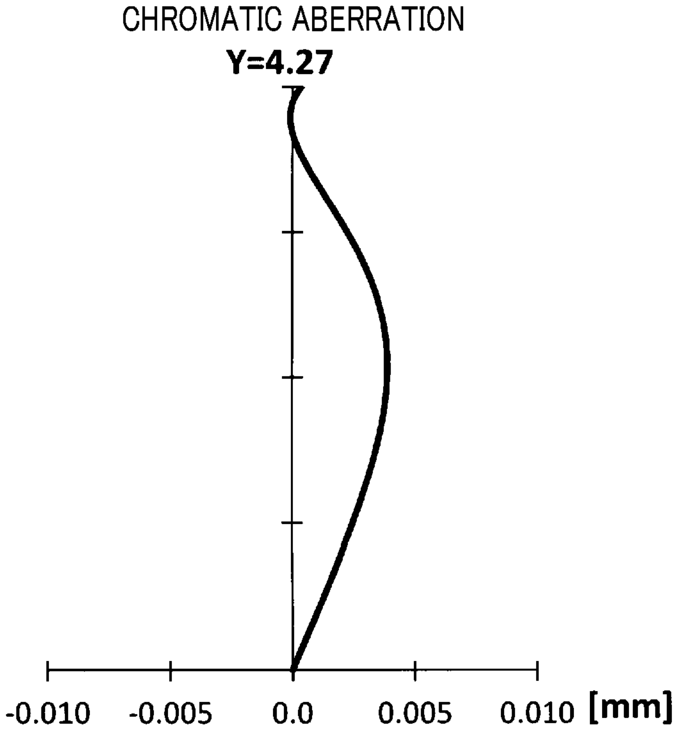
FIG. 13 is a graph illustrating chromatic aberration in the imaging optical system according to the second embodiment.

FIG. 9 illustrates an imaging optical system 2 according to the second embodiment. Like the first embodiment, the imaging optical system 2 is comprised of, in a sequential order from the object side to the image side, a first lens L1, a second lens L2, an aperture diaphragm S, a third lens L3, a fourth lens L4, a fifth lens L5, and an optical block C.

The following embodiments subsequent to the second embodiment is the same as the second embodiment.

The imaging optical system 2 has predetermined specifications in which:

(I) A total focal length of the imaging optical system 2 is 4.000 mm (II) An F-number of the imaging optical system 2 is 1.59

(III) A half angle of view is 60°

(IV) An image height is 4.27 mm (V) A back focus is 6.001 mm (VI) A total length of the imaging optical system 21 is 24.945 mm Next, Table IV shows the surface data of the imaging optical system 2 using the same symbols as those of the first embodiment:

TABLE IV

| SURFACE DATA | | | | | |
|---|---|---|---|---|---|
| Sn | r | d | Nd | Vd | E |
| 1* | 21.248 | 1.297 | 1.545 | 56.003 | 12.11 |
| 2* | 2.471 | 3.755 | | | 6.75 |
| 3* | −300.000 | 2.961 | 1.640 | 23.529 | 6.76 |
| 4* | −9.674 | 0.695 | | | 6.08 |
| 5 (D) | ∞ | 0.063 | | | |
| 6* | 10.309 | 2.935 | 1.545 | 56.003 | 6.52 |
| 7* | −7.855 | 0.849 | | | 6.87 |
| 8* | −14.219 | 1.801 | 1.661 | 20.373 | 6.45 |
| 9* | 5.610 | 0.119 | | | 8.30 |
| 10* | 6.701 | 4.332 | 1.729 | 54.041 | 9.50 |
| 11* | −6.873 | 1.000 | | | 9.70 |
| 12 | ∞ | 0.400 | 1.517 | 64.167 | 9.56 |
| 13 | ∞ | 4.737 | | | 9.54 |

Next, Table V shows the single lens data of the imaging optical system 2.

TABLE V

| SINGLE LENS DATA | |
|---|---|
| $\|f1\|/f$ | 1.32 |
| $\|f2\|/f$ | 3.89 |
| $\|f4\|/f$ | 1.47 |
| $\|(dn/dT)_3\|$ | 95.97E−06 |
| $\|(dn/dT)_5\|$ | 2.69E−06 |
| d12/f | 0.94 |

The ratio |f1|/f satisfies the conditional expression (1), the ratio |f2|/f satisfies the conditional expression (4), and the |f4|/f satisfies the conditional expression (6). Additionally, the temperature coefficient $|(dn/dT)_3|$ does not satisfy the conditional expression (7), but the temperature coefficient $|(dn/dT)_5|$ satisfies the conditional expression (10).

Next, Table VI shows the aspherical data of the imaging optical system 2 using the same symbols as those of the first embodiment:

TABLE VI

| ASPHERICAL DATA |
|---|
| First surface |
| k = 0, A4 = −1.0266E−03, A6 = 1.7830E−05, A8 = −1.8691E−07 A10 = 8.0147E−10, A12 = −1.7266E−13 |

TABLE VI-continued

| ASPHERICAL DATA |
|---|
| Second surface |
| k = −6.0885E−01, A4 = 2.0920E−04, A6 = −2.4521E−05, A8 = −4.1889E−06, A10 = −3.7876E−08, A12 = 7.9668E−09 |
| Third surface |
| k = 0, A4 = 3.9984E−04, A6 = 4.5908E−05, A8 = −6.5752E−06, A10 = 6.5072E−07, A12 = 4.2775E−09 |
| Fourth surface |
| k = 0, A4 = 2.1563E−03, A6 = −1.3960E−04, A8 = 4.8768E−06, A10 = 5.6426E−07, A12 = 5.8054E−09 |
| Sixth surface |
| k = 0, A4 = 2.9131E−03, A6 = −2.4005E−04, A8 = 1.8024E−05, A10 = −7.8710E−07, A12 = 3.0279E−10 |
| Seventh surface |
| k = 0, A4 = −1.4172E−03, A6 = −8.0451E−05, A8 = 1.2960E−05, A10 = −6.6557E−07, A12 = 9.0201E−10 |
| Eighth surface |
| k = 0, A4 = −5.1725E−03, A6 = −7.2652E−05, A8 = 3.5759E−06, A10 = 5.7384E−08, A12 = 2.3549E−09 |
| Ninth surface |
| k = 0, A4 = −3.8068E−03, A6 = 8.6679E−05, A8 = −1.9849E−06, A10 = 1.0863E−08, A12 = 2.1047E−10 |
| Tenth surface |
| k = 0, A4 = −1.6058E−03, A6 = 1.7445E−05, A8 = 3.0821E−07, A10 = −1.0736E−08, A12 = 2.5915E−11 |
| Eleventh surface |
| k = 0, A4 = 6.3988E−04, A6 = 2.1635E−06, A8 = 1.3236E−06, A10 = −1.3540E−08, A12 = −4.9893E−11 |

Figure 14:
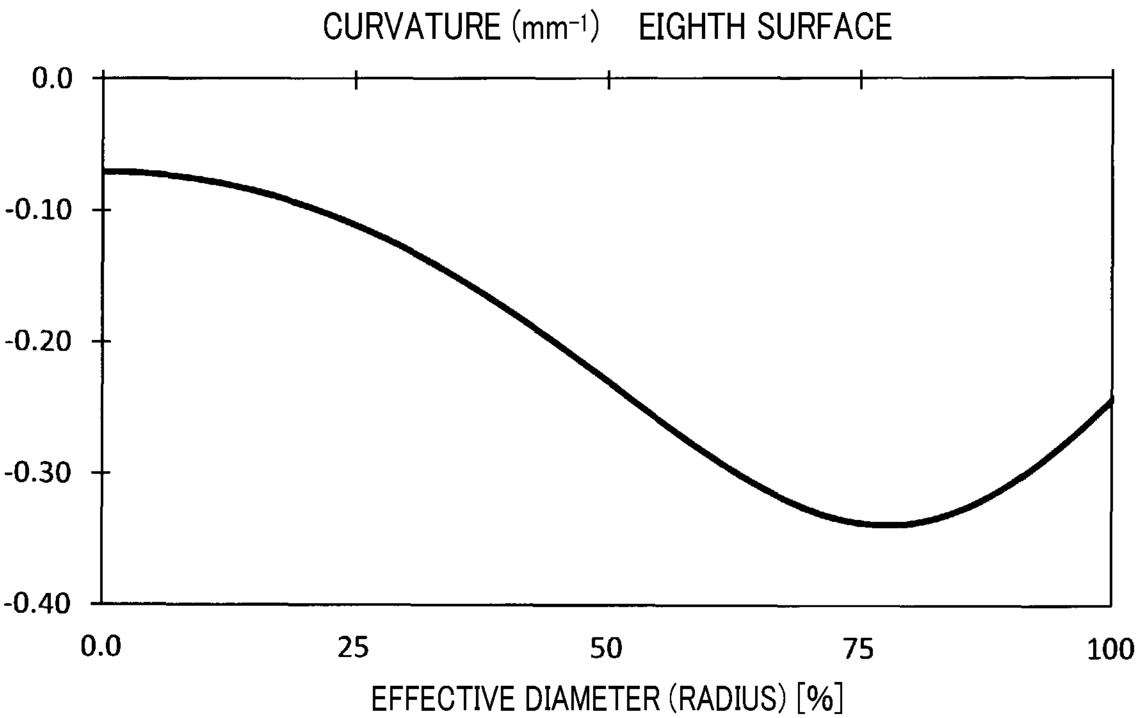
FIG. 14 is a graph illustrating how a curvature is radially changed from a center portion to a periphery of an eighth surface of the imaging optical system according to the second embodiment.
Figure 15:
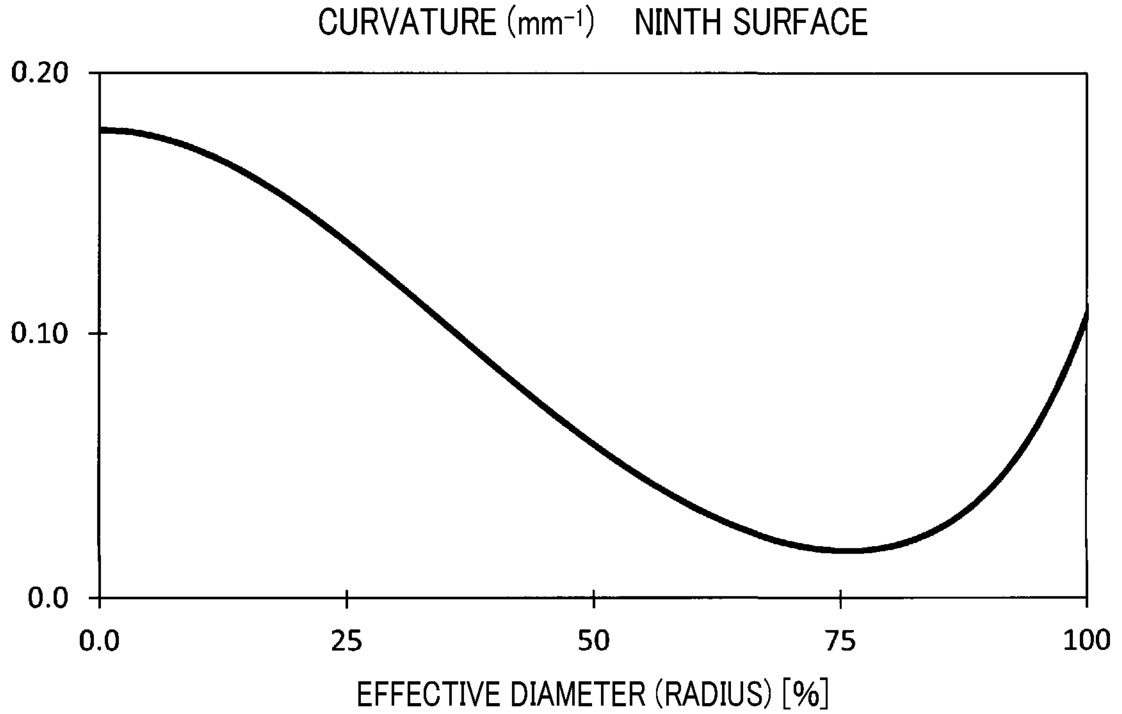
FIG. 15 is a graph illustrating how a curvature is radially changed from a center portion to a periphery of a ninth surface of the imaging optical system according to the second embodiment.
Figure 16:
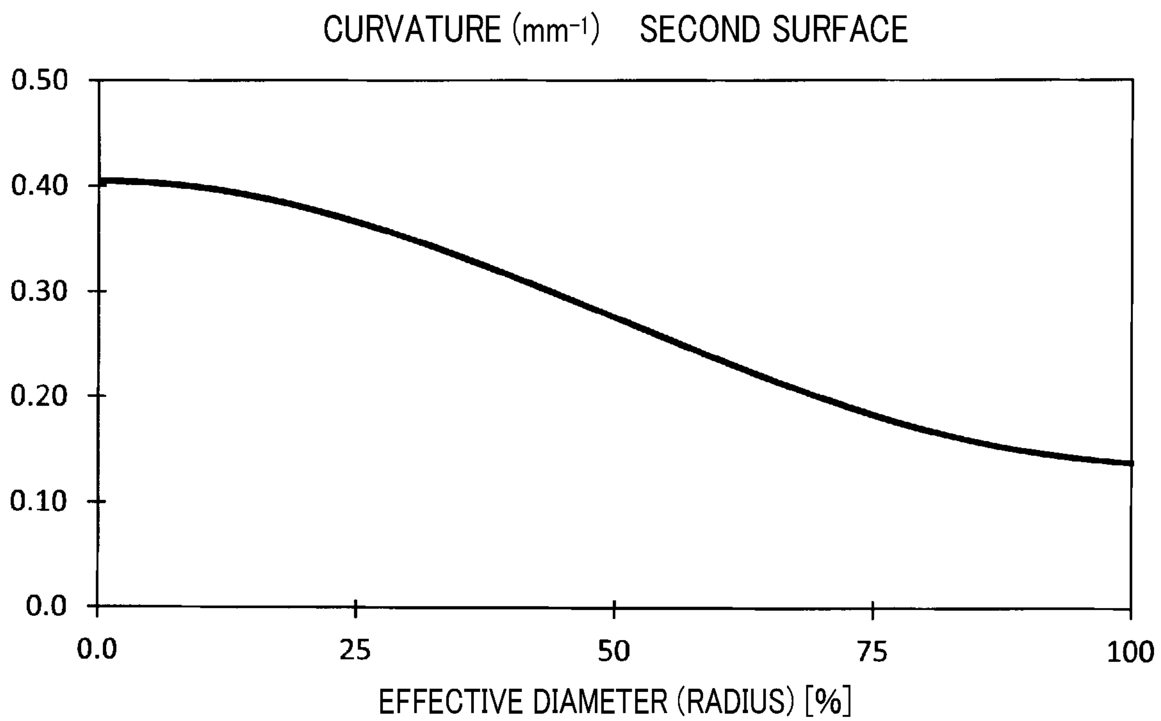
FIG. 16 is a graph illustrating how a curvature is radially changed from a center portion to a periphery of a second surface of the imaging optical system according to the second embodiment.

FIG. 10 to FIG. 13 respectively illustrate the spherical aberration, the astigmatism, the distortion, and the chromatic aberration in the imaging optical system 2. FIG. 14 illustrates how the curvature is radially changed from the center portion to the periphery of the eighth surface (the light input surface of the fourth lens L4). FIG. 15 illustrates how the curvature is radially changed from the center portion to the periphery of the ninth surface (the light output surface of the fourth lens L4). FIG. 16 illustrates how the curvature is radially changed in from the center portion to the periphery of the ninth surface (the light output surface of the first lens L1).

FIGS. 14 and 15 show that the change curve of the curvature of the light input surface of the fourth lens L4 has an inflection point, and the change curve of the curvature of the light output surface of the fourth lens L4 has an inflection point. The features of the second embodiment are substantially the same as those of the first embodiment except that the change curve of the curvature of the light output surface of the fourth lens L4 has an inflection point.

Third Embodiment

Figure 17:
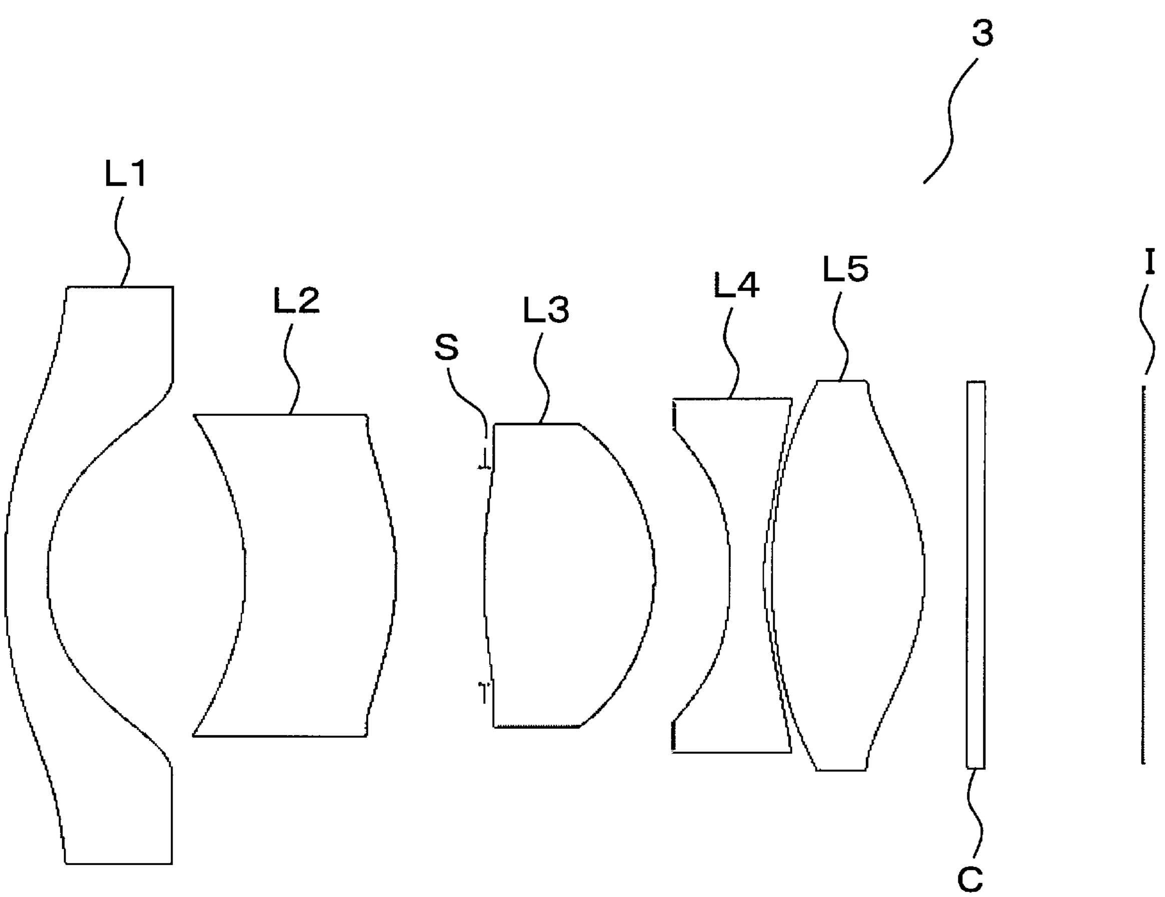
FIG. 17 is an optical diagram illustrating an imaging optical system according to the third embodiment.
Figures 18, 19:
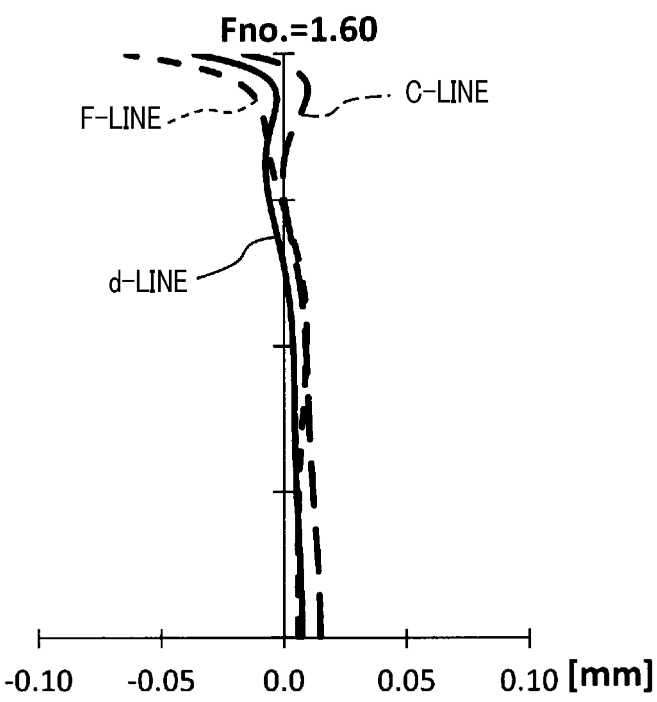
FIG. 18 is a graph illustrating spherical aberration in the imaging optical system according to the third embodiment.
FIG. 19 is a graph illustrating astigmatism in the imaging optical system according to the third embodiment.
Figure 20:
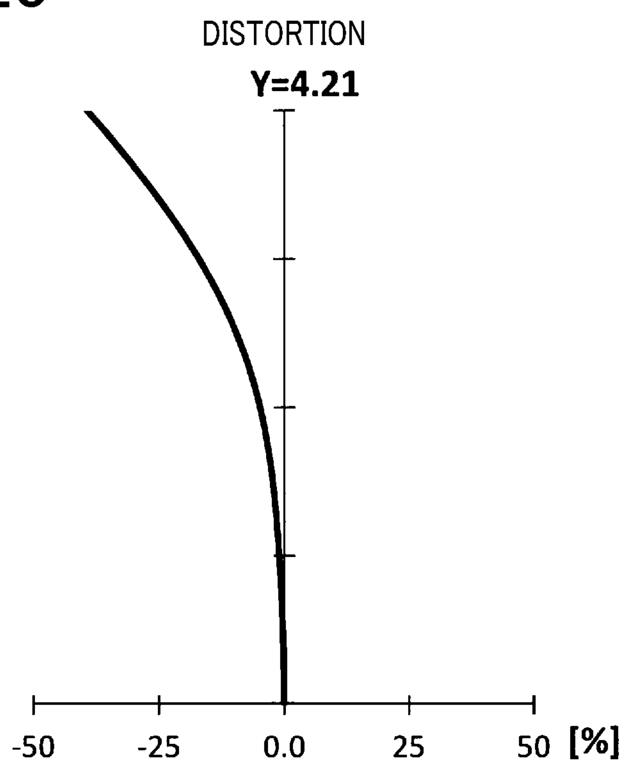
FIG. 20 is a graph illustrating distortion in the imaging optical system according to the third embodiment.
Figure 21:
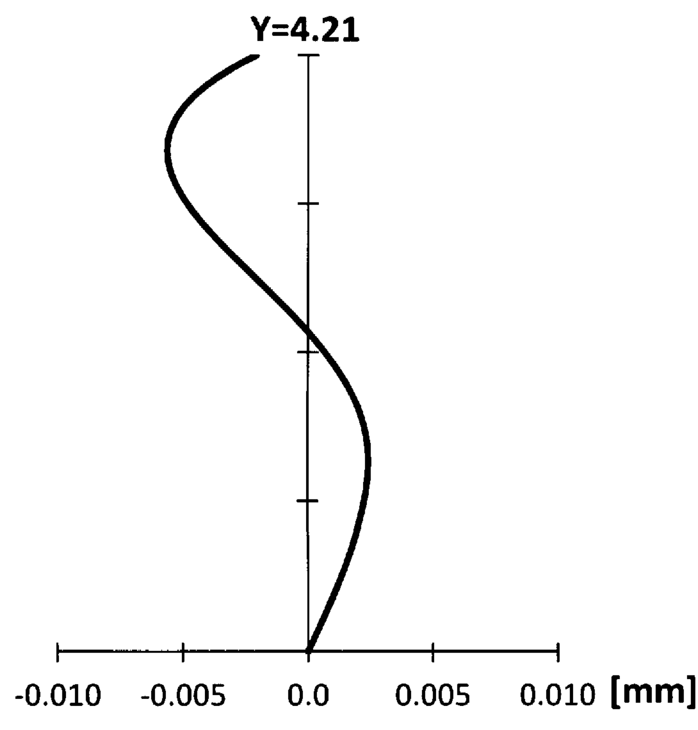
FIG. 21 is a graph illustrating chromatic aberration in the imaging optical system according to the third embodiment.

FIG. 17 illustrates an imaging optical system 3 according to the third embodiment.

The imaging optical system 3 has predetermined specifications in which:

(I) A total focal length of the imaging optical system 3 is 4.000 mm (II) An F-number of the imaging optical system 3 is 1.60

(III) A half angle of view is 60°

(IV) An image height is 4.21 mm (V) A back focus is 4.980 mm (VI) A total length of the imaging optical system 3 is 26.601 mm Next, Table VII shows the surface data of the imaging optical system 3 using the same symbols as those of the first embodiment:

TABLE VII

| SURFACE DATA | | | | | |
|---|---|---|---|---|---|
| Sn | r | d | Nd | Vd | E |
| 1* | 16.391 | 0.990 | 1.545 | 56.003 | 13.14 |
| 2* | 4.567 | 4.663 | | | 8.96 |
| 3* | −5.125 | 3.516 | 1.640 | 23.529 | 7.32 |
| 4* | −5.990 | 2.055 | | | 6.69 |
| 5(D) | ∞ | −0.002 | | | |
| 6* | 17.133 | 3.975 | 1.545 | 56.003 | 5.38 |
| 7* | −4.178 | 1.770 | | | 6.91 |
| 8* | −8.393 | 0.784 | 1.661 | 20.373 | 6.69 |
| 9* | 5.832 | 0.188 | | | 8.10 |
| 10* | 12.438 | 3.575 | 1.729 | 54.041 | 8.72 |
| 11* | −5.278 | 1.000 | | | 8.85 |
| 12 | ∞ | 0.400 | 1.517 | 64.167 | 8.78 |
| 13 | ∞ | 3.717 | | | 8.78 |

Next, Table VIII shows the single lens data of the imaging optical system 3.

TABLE VIII

| SINGLE LENS DATA | |
|---|---|
| $\|f1\|/f$ | 3.00 |
| $\|f2\|/f$ | 20.46 |
| $\|f4\|/f$ | 1.27 |
| $\|(dn/dT)_3\|$ | 95.97E−06 |
| $\|(dn/dT)_5\|$ | 2.69E−06 |
| d12/f | 1.16 |

The ratio $|f\mathbf{1}|/f$ satisfies the conditional expression (1), the ratio $|f\mathbf{2}|/f$ satisfies the conditional expression (3), and the $|f\mathbf{4}|/f$ satisfies the conditional expression (6). Additionally, the temperature coefficient $|(dn/dT)_3|$ does not satisfy the conditional expression (7), but the temperature coefficient $|(dn/dT)_5|$ satisfies the conditional expression (10).

Next, Table IX shows the aspherical data of the imaging optical system 3 using the same symbols as those of the first embodiment:

TABLE IX

| ASPHERICAL DATA |
|---|
| First surface |
| k = 0, A4 = 2.4217E−03, A6 = −1.2219E−04, A8 = 2.0885E−06, A10 = −1.2750E−08, A12 = 0 |
| Second surface |
| k = −1.3559E−01, A4 = 3.6590E−03, A6 = −5.2875E−05, A8= −3.5141E−06, A10 = −2.2795E−07, A12 = 0 |
| Third surface |
| k = 0, A4 = 2.9178E−03, A6 = −4.9982E−05, A8 = −1.7074E−06, A10 = 1.0861E−07, A12 = 0 |
| Fourth surface |
| k = 0, A4 = 3.7242E−03, A6 = −1.4005E−04, A8 = 8.1988E−06, A10 = −1.6045E−07, A12 = 0 |
| Sixth surface |
| k = 0, A4 = 2.1748E−03, A6 = −3.2966E−04, A8 = 1.7408E−05, A10 = −1.8732E−06, A12 = 0 |

TABLE IX-continued

| ASPHERICAL DATA |
|---|
| Seventh surface |
| k = 0, A4 = 3.8064E−03, A6 = −2.7555E−04, A8 = 1.5677E−05, A10 = −3.8524E−07, A12 = 0 |
| Eighth surface |
| k = 0, A4 = −5.5874E−03, A6 = −1.8490E−04, A8 = 5.1744E−05, A10 = −1.9057E−06, A12 = 0 |
| Ninth surface |
| k = 0, A4 = −8.4510E−03, A6 = 5.2828E−04, A8 = −1.7045E−05, A10 = 1.3921E−07, A12 = 0 |
| Tenth surface |
| k = 0, A4 = 1.2219E−04, A6 = 2.7593E−05, A8 = −8.8292E−07, A10 = 4.1273E−09, A12 = 0 |
| Eleventh surface |
| k = 0, A4 = 1.4094E−03, A6 = 5.7965E−05, A8 = −6.6169E−07, A10 = 6.9391E−08, A12 = 0 |

Figure 22:
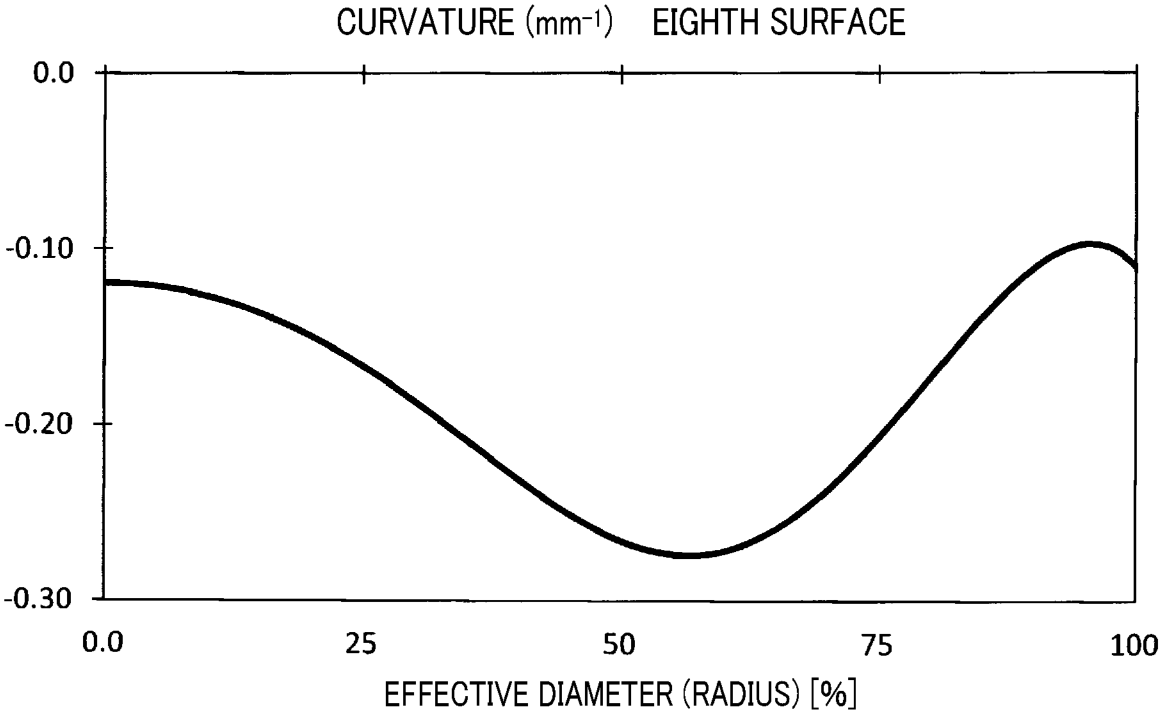
FIG. 22 is a graph illustrating how a curvature is radially changed from a center portion to a periphery of an eighth surface of the imaging optical system according to the third embodiment.
Figure 23:
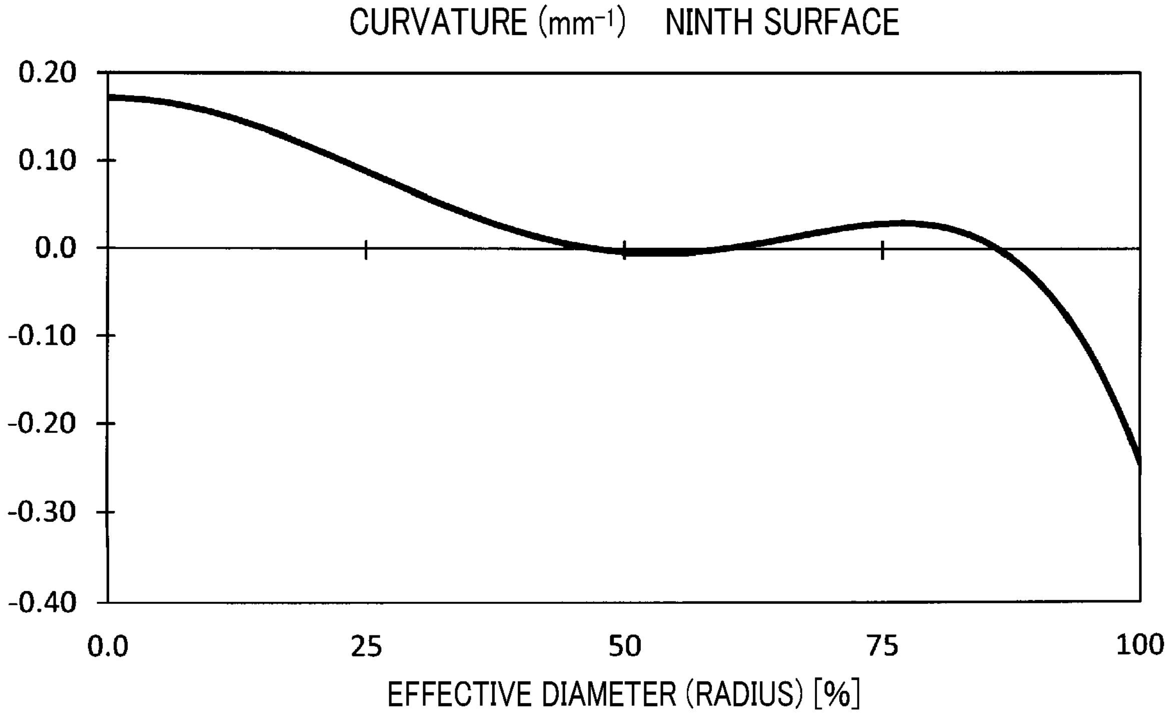
FIG. 23 is a graph illustrating how a curvature is radially changed from a center portion to a periphery of a ninth surface of the imaging optical system according to the third embodiment.
Figure 24:
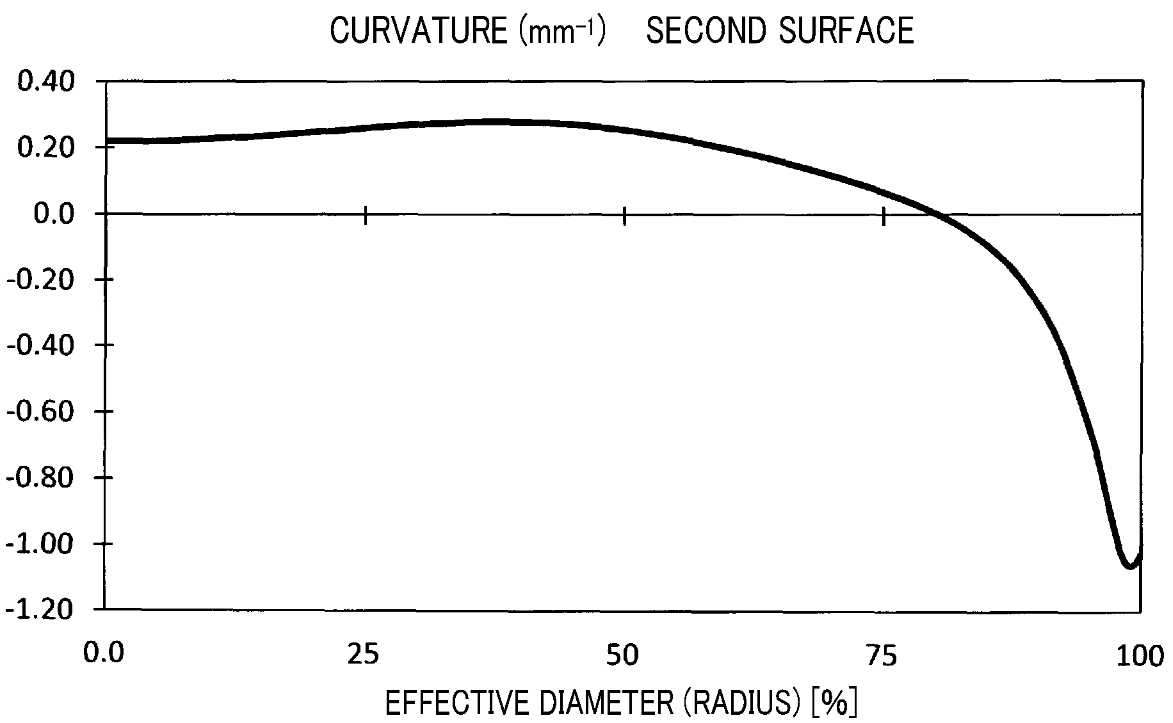
FIG. 24 is a graph illustrating how a curvature is radially changed from a center portion to a periphery of a second surface of the imaging optical system according to the third embodiment.

FIG. 18 to FIG. 21 respectively illustrate the spherical aberration, the astigmatism, the distortion, and the chromatic aberration in the imaging optical system 3. FIG. 22 illustrates how the curvature is radially changed from the center portion to the periphery of the eighth surface (the light input surface of the fourth lens L4). FIG. 23 illustrates how the curvature is radially changed from the center portion to the periphery of the ninth surface (the light output surface of the fourth lens L4). FIG. 24 illustrates how the curvature is radially changed in from the center portion to the periphery of the ninth surface (the light output surface of the first lens L1).

FIGS. 22 and 23 show that the change curve of the curvature of the light input surface of the fourth lens L4 has an inflection point, and the change curve of the curvature of the light output surface of the fourth lens L4 has an inflection point. The features of the third embodiment are substantially the same as those of the second embodiment.

Fourth Embodiment

Figure 25:
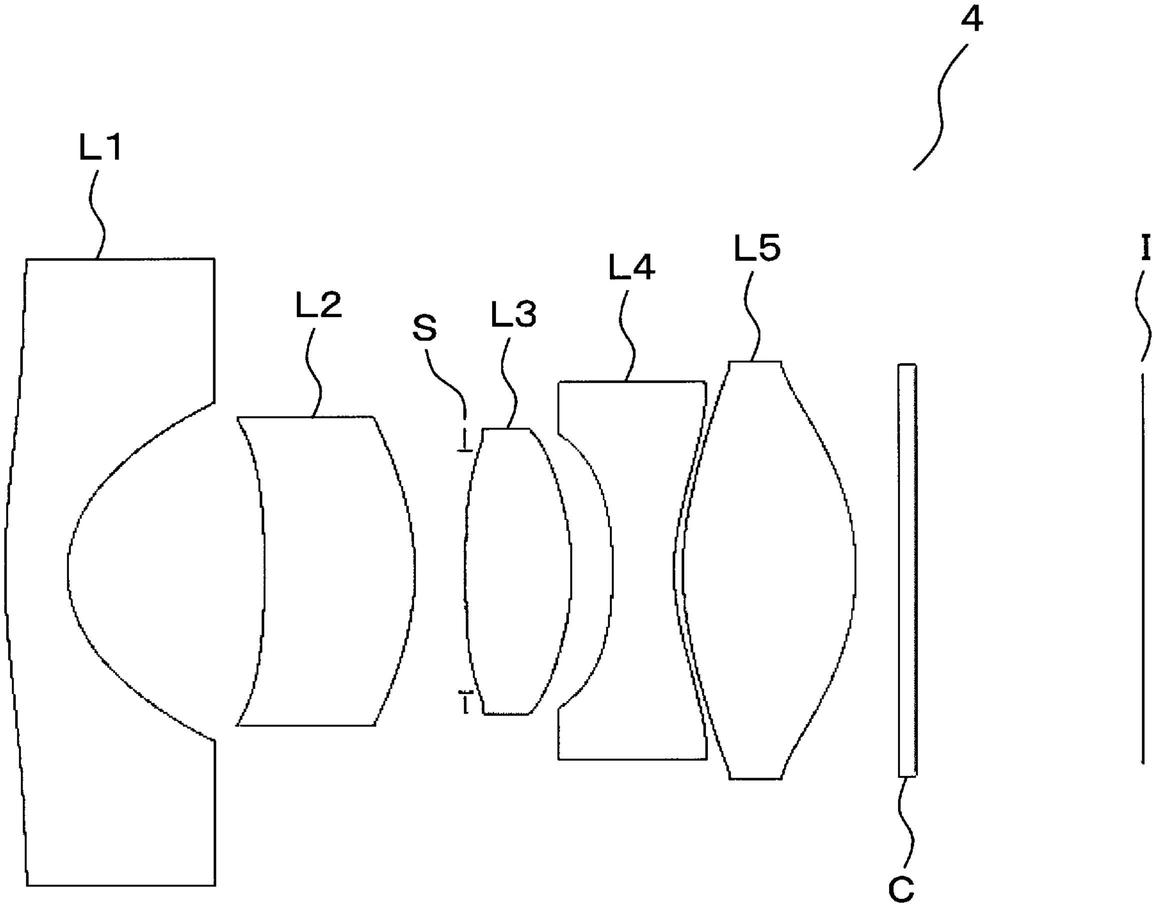
FIG. 25 is an optical diagram illustrating an imaging optical system according to the fourth embodiment.
Figure 26:
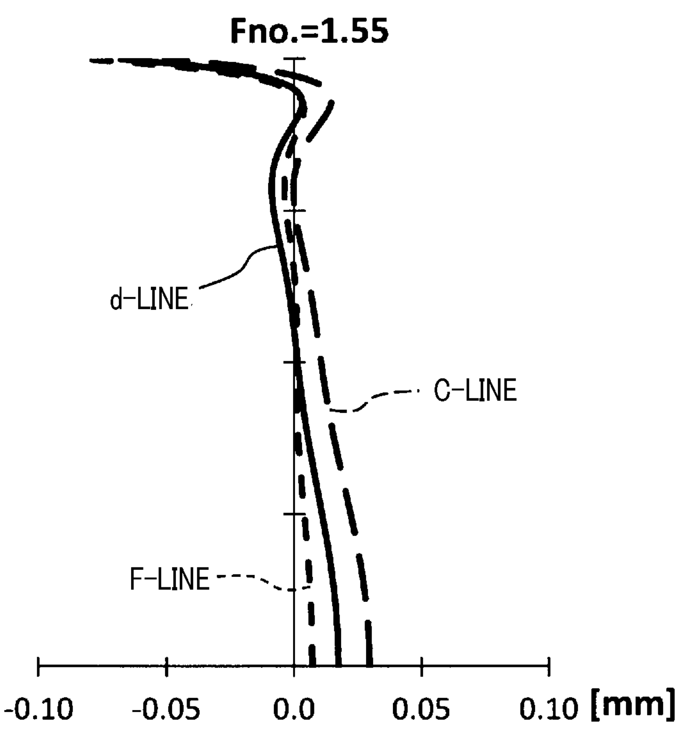
FIG. 26 is a graph illustrating spherical aberration in the imaging optical system according to the fourth embodiment.
Figure 27:
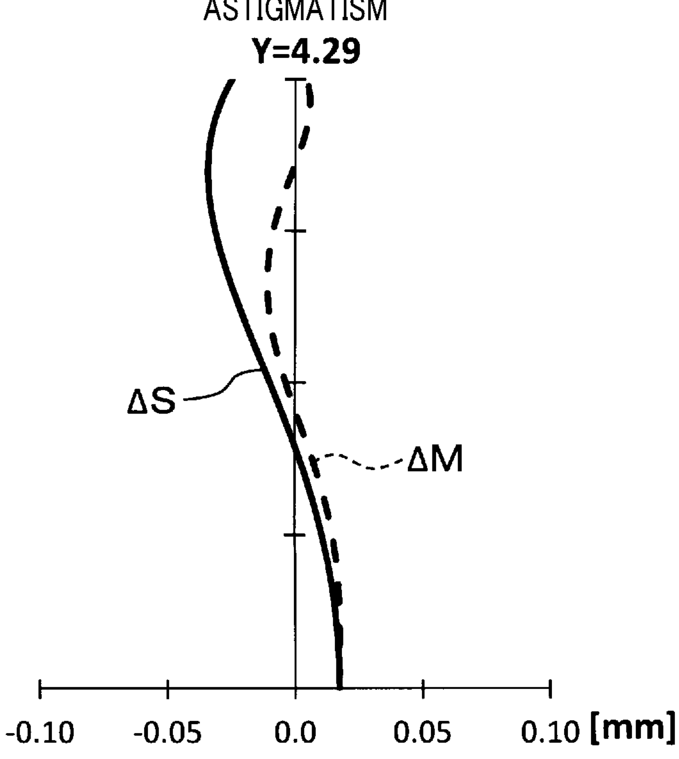
FIG. 27 is a graph illustrating astigmatism in the imaging optical system according to the fourth embodiment.
Figure 28:
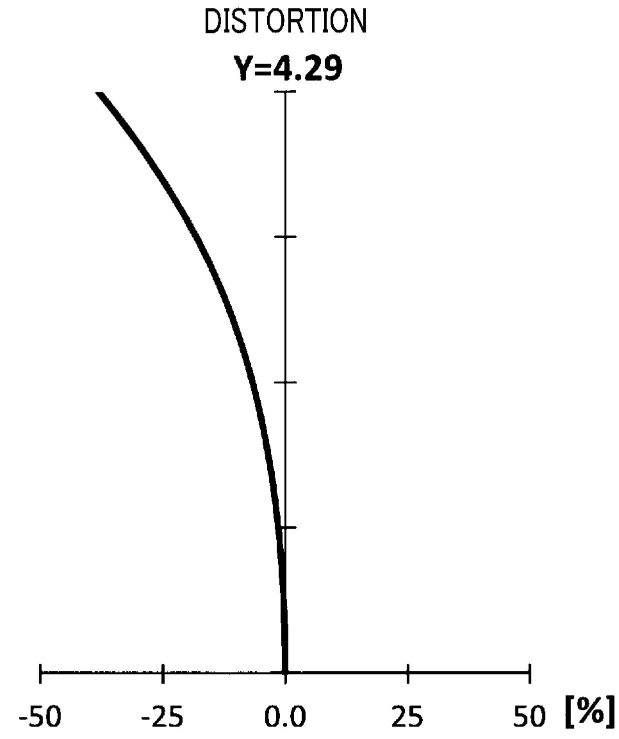
FIG. 28 is a graph illustrating distortion in the imaging optical system according to the fourth embodiment.
Figure 29:
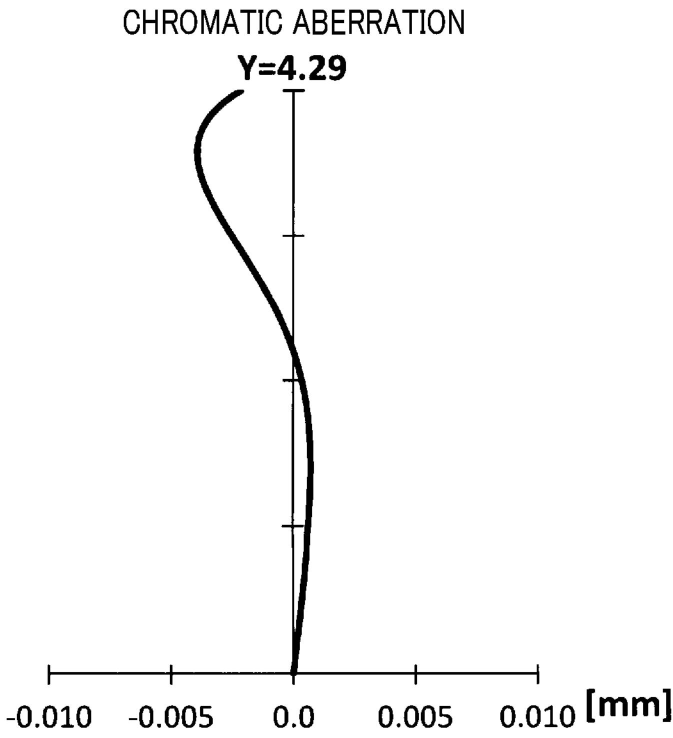
FIG. 29 is a graph illustrating chromatic aberration in the imaging optical system according to the fourth embodiment.

FIG. 25 illustrates an imaging optical system 4 according to the fourth embodiment.

The imaging optical system 4 has predetermined specifications in which:

(I) A total focal length of the imaging optical system 4 is 4.000 mm (II) An F-number of the imaging optical system 4 is 1.55

(III) A half angle of view is 60°

(IV) An image height is 4.29 mm (V) A back focus is 6.570 mm (VI) A total length of the imaging optical system 4 is 26.600 mm Next, Table X shows the surface data of the imaging optical system 4 using the same symbols as those of the first embodiment:

TABLE X

| Sn | r | d | Nd | Vd | E |
|---|---|---|---|---|---|
| 1* | 17.531 | 1.470 | 1.545 | 56.003 | 14.32 |
| 2* | 2.902 | 4.604 | | | 7.76 |
| 3* | −20.141 | 3.503 | 1.640 | 23.529 | 7.06 |
| 4* | −5.936 | 1.186 | | | 7.00 |
| 5(D) | ∞ | −0.001 | | | |
| 6* | 107.502 | 2.486 | 1.545 | 56.003 | 6.09 |
| 7* | −5.937 | 0.950 | | | 6.51 |
| 8* | −9.483 | 1.435 | 1.661 | 20.373 | 6.26 |
| 9* | 5.300 | 0.208 | | | 8.61 |
| 10* | 7.429 | 4.053 | 1.729 | 54.041 | 9.24 |
| 11* | −5.953 | 1.000 | | | 9.52 |
| 12 | ∞ | 0.400 | 1.517 | 64.167 | 9.40 |
| 13 | ∞ | 5.307 | | | 9.39 |

Next, Table XI shows the single lens data of the imaging optical system 4.

TABLE XI

| SINGLE LENS DATA | |
|---|---|
| $\lvert f1\rvert/f\rvert$ | 1.66 |
| $\lvert f2\rvert/f\rvert$ | 3.00 |
| $\lvert f4\rvert/f$ | 1.24 |
| $\lvert(dn/dT)_3\rvert$ | 95.97E−06 |
| $\lvert(dn/dT)_5\rvert$ | 2.69E−06 |
| d12/f | 1.15 |

The ratio |f1|/f satisfies the conditional expression (2), the ratio |f2|/f satisfies the conditional expression (3), and the |f4|/f satisfies the conditional expression (6). Additionally, the temperature coefficient $\lvert(dn/dT)_3\rvert$ does not satisfy the conditional expression (7), but the temperature coefficient $\lvert(dn/dT)_5\rvert$ satisfies the conditional expression (10).

Next, Table XII shows the aspherical data of the imaging optical system 4 using the same symbols as those of the first embodiment:

TABLE XII

| ASPHERICAL DATA |
|---|
| First surface |
| k = 0, A4 = −7.1972E−04, A6 = 7.2123E−06, A8 = −5.4341E−09, A10 = −2.2021E−10, A12 = −8.1849E−14 |
| Second surface |
| k = −5.9088E−01, A4 = −5.4743E−05, A6 = −5.6806E−05, A8 = 7.5118E−07, A10 = −2.3402E−07, A12 = −1.6319E−09 |
| Third surface |
| k = 0, A4 = −6.7849E−04, A6 = −7.5013E−05, A8 = 6.2095E−06, A10 = −1.1085E−06, A12 = 4.8700E−08 |
| Fourth surface |
| k = 0, A4 = 3.5281E−03, A6 = −3.1272E−04, A8 = 2.4340E−05, A10 = −1.3197E−06, A12 = 3.9699E−08 |
| Sixth surface |
| k = 0, A4 = 6.6257E−03, A6 = −5.5385E−04, A8 = 4.2197E−05, A10 = −1.6120E−06, A12 = −1.4487E−08 |
| Seventh surface |
| k = 0, A4 = 4.2247E−03, A6 = −5.0773E−04, A8 = 3.2641E−05, A10 = −3.1223E−07, A12 = −8.3896E−08 |
| Eighth surface |
| k = 0, A4 = −2.6897E−03, A6 = −4.8661E−04, A8 = 5.0925E−05, A10 = −2.9414E−06, A12 = 4.6111E−09 |
| Ninth surface |
| k = 0, A4 = −6.6466E−03, A6 = 3.4710E−04, A8 = −1.6597E−05, A10 = 3.1542E−07, A12 = −2.8996E−09 |

TABLE XII-continued

| ASPHERICAL DATA |
|---|
| Tenth surface |
| k = 0, A4 = −2.4232E−03, A6 = 1.0885E−04, A8 = −4.1876E−06, A10 = 7.3202E−08, A12 = −1.4413E−10 |
| Eleventh surface |
| k = 0, A4 = 6.1849E−04, A6 = 9.8051E−06, A8 = −1.8971E−08, A10 = 5.0329E−08, A12 = −2.0236E−10 |

Figure 30:
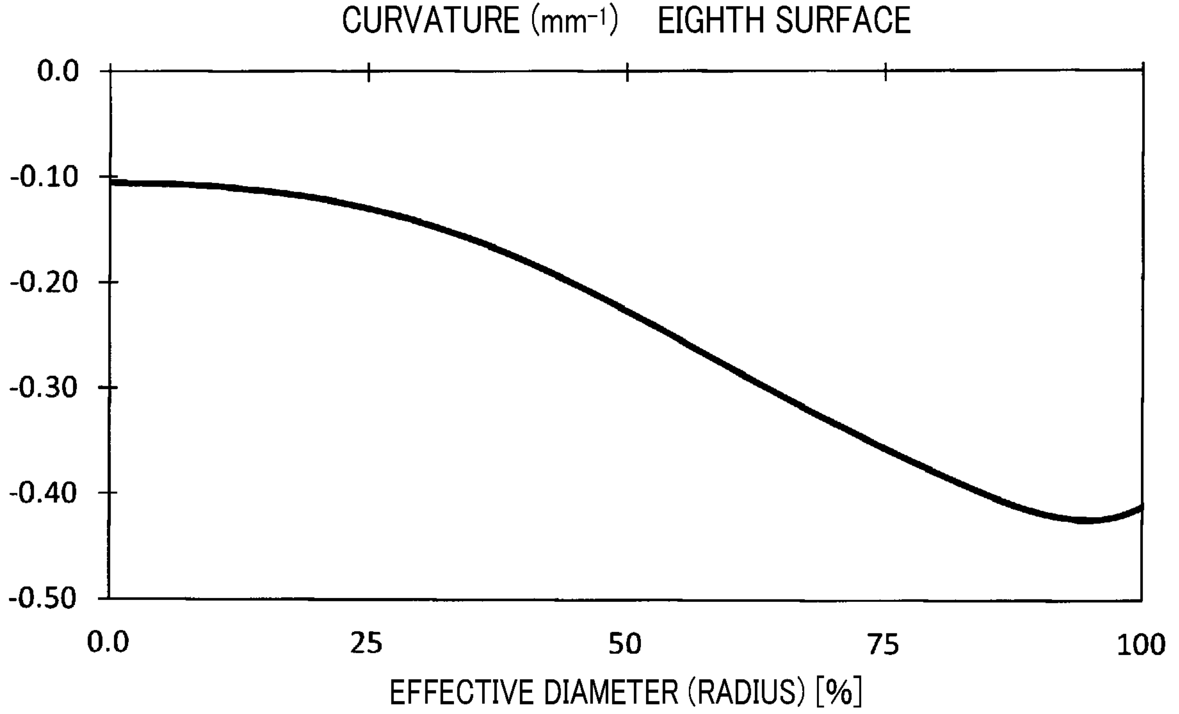
FIG. 30 is a graph illustrating how a curvature is radially changed from a center portion to a periphery of an eighth surface of the imaging optical system according to the fourth embodiment.
Figure 31:
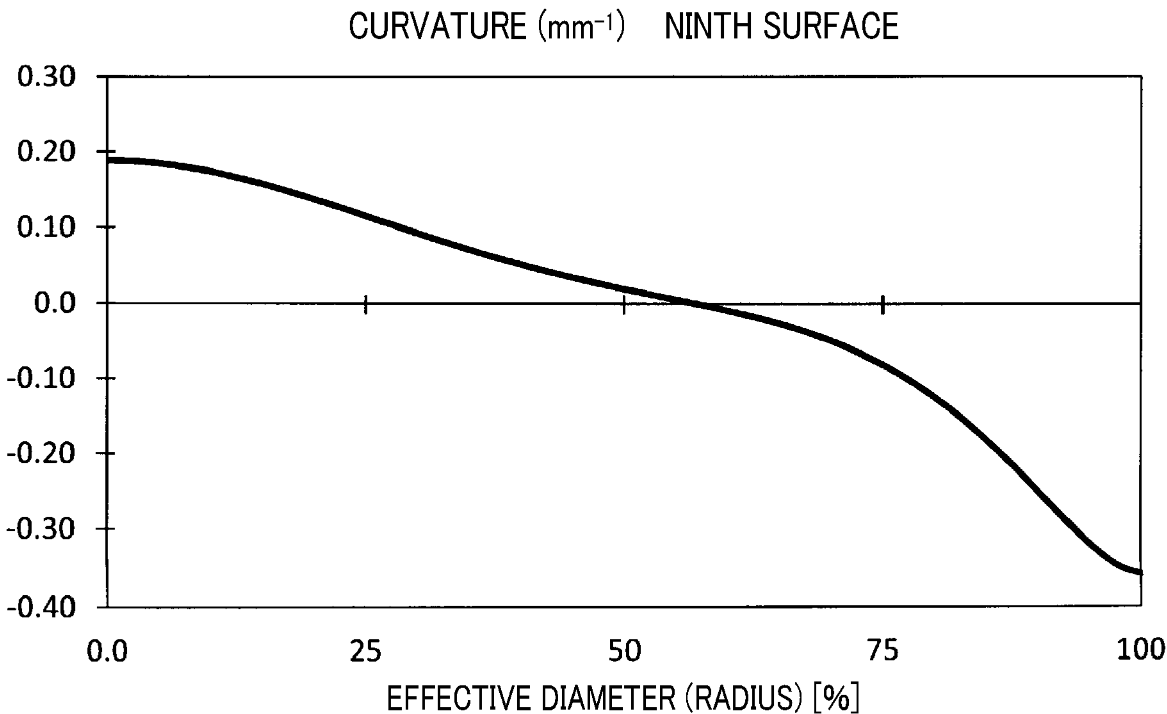
FIG. 31 is a graph illustrating how a curvature is radially changed from a center portion to a periphery of a ninth surface of the imaging optical system according to the fourth embodiment.
Figure 32:
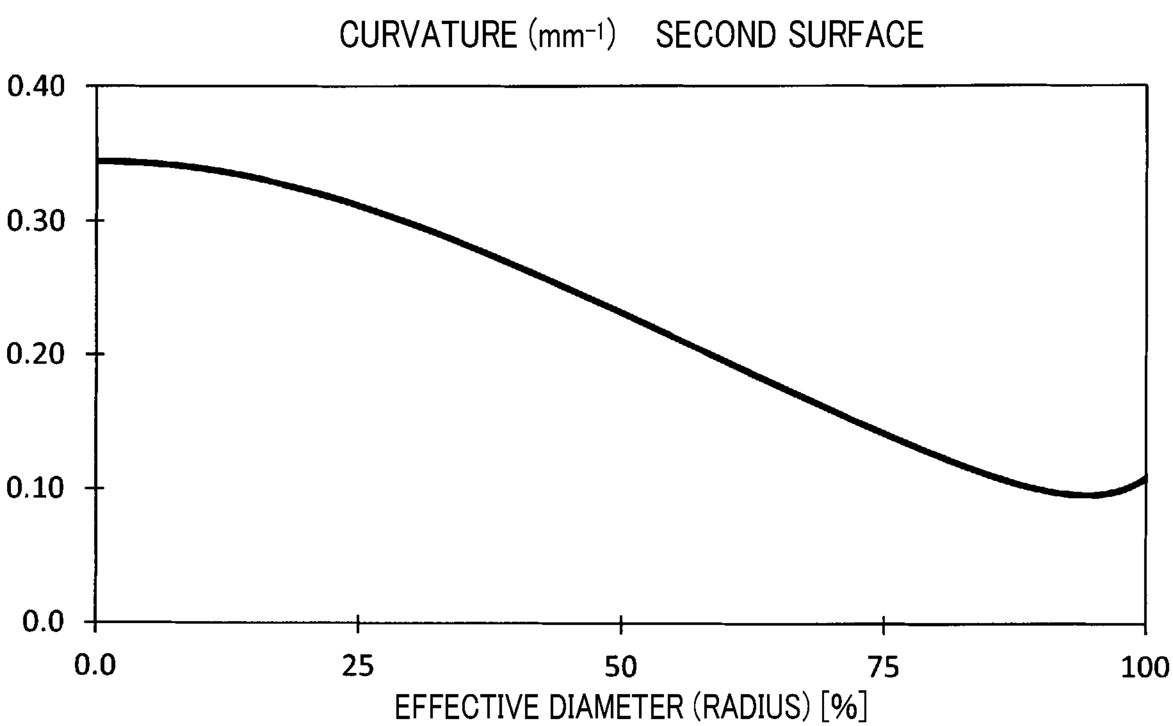
FIG. 32 is a graph illustrating how a curvature is radially changed from a center portion to a periphery of a second surface of the imaging optical system according to the fourth embodiment.

FIG. 26 to FIG. 29 respectively illustrate the spherical aberration, the astigmatism, the distortion, and the chromatic aberration in the imaging optical system 4. FIG. 30 illustrates how the curvature is radially changed from the center portion to the periphery of the eighth surface (the light input surface of the fourth lens L4). FIG. 31 illustrates how the curvature is radially changed from the center portion to the periphery of the ninth surface (the light output surface of the fourth lens L4). FIG. 32 illustrates how the curvature is radially changed in from the center portion to the periphery of the ninth surface (the light output surface of the first lens L1).

The features of the fourth embodiment are substantially the same as those of the first embodiment.

Fifth Embodiment

Figure 33:
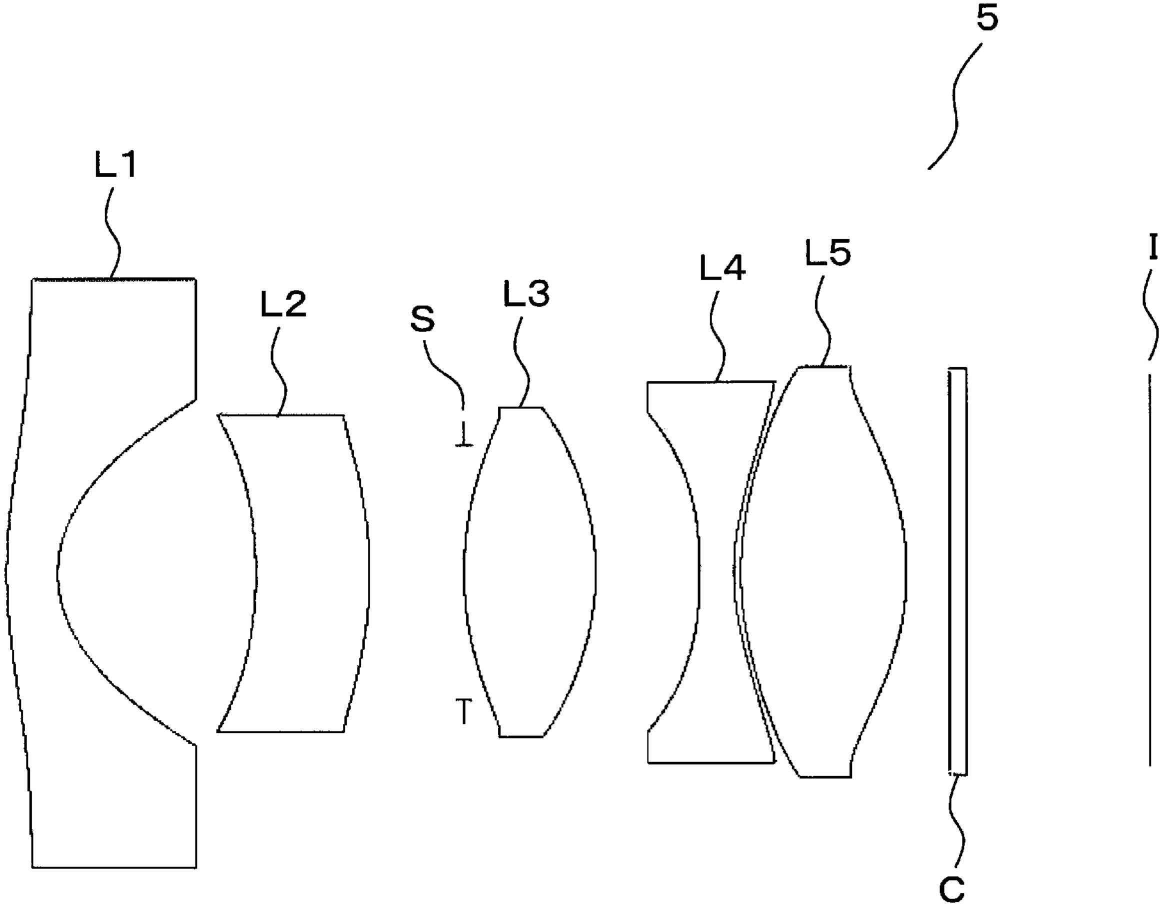
FIG. 33 is an optical diagram illustrating an imaging optical system according to the fifth embodiment.
Figure 34:
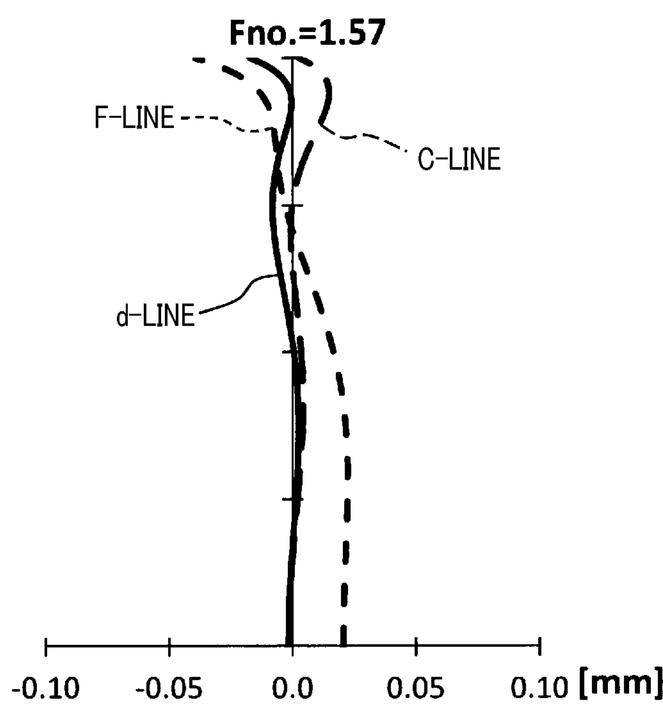
FIG. 34 is a graph illustrating spherical aberration in the imaging optical system according to the fifth embodiment.
Figure 35:
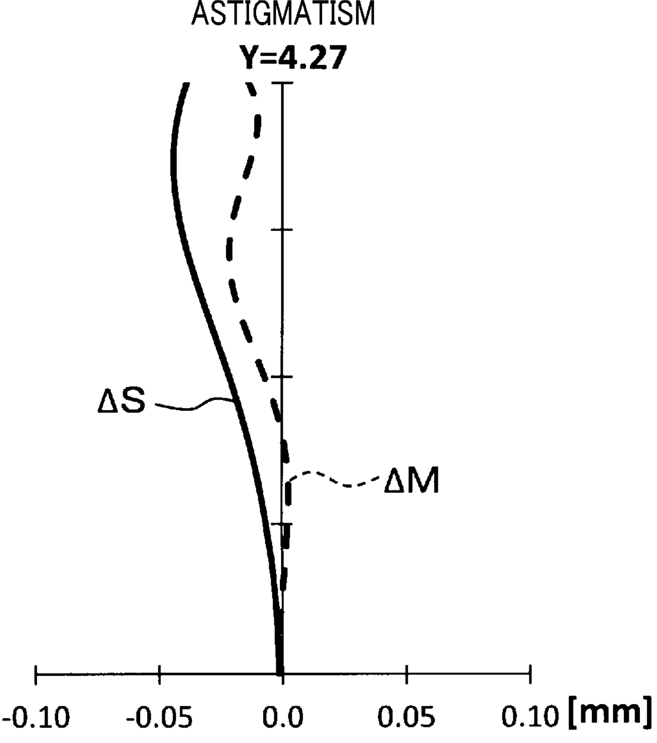
FIG. 35 is a graph illustrating astigmatism in the imaging optical system according to the fifth embodiment.
Figure 36:
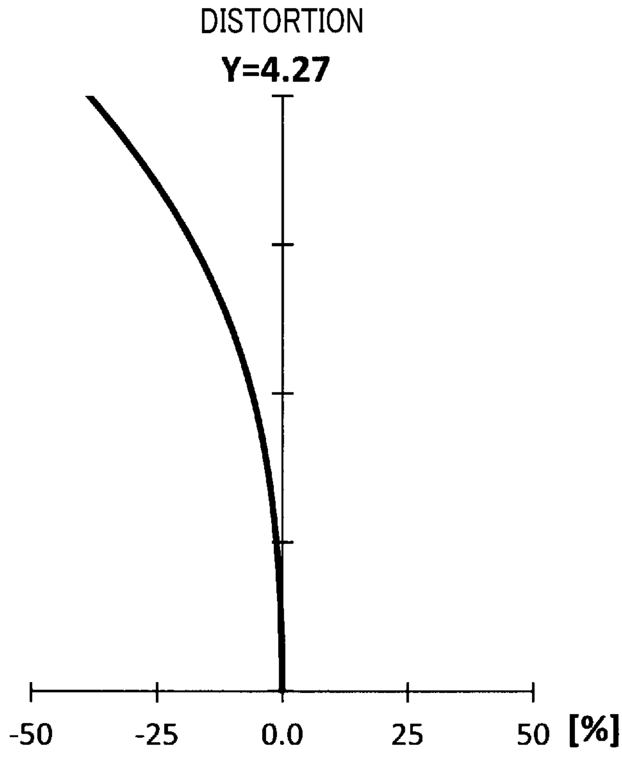
FIG. 36 is a graph illustrating distortion in the imaging optical system according to the fifth embodiment.
Figure 37:
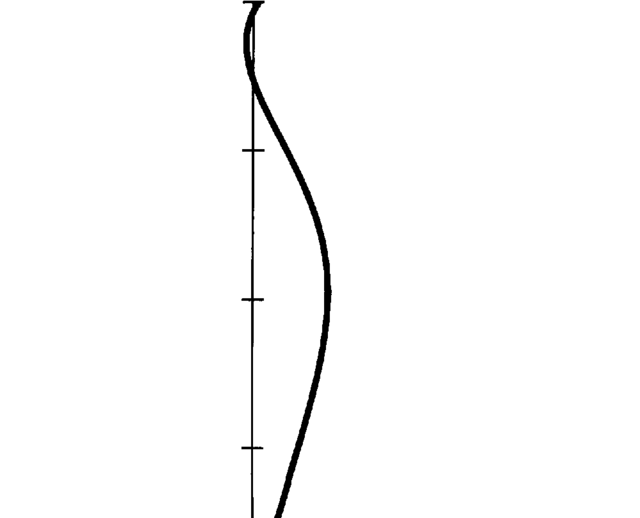
FIG. 37 is a graph illustrating chromatic aberration in the imaging optical system according to the fifth embodiment.

FIG. 33 illustrates an imaging optical system 5 according to the fifth embodiment.

The imaging optical system 5 has predetermined specifications in which:

(I) A total focal length of the imaging optical system 5 is 4.000

(II) An F-number of the imaging optical system 5 is 1.57

(III) A half angle of view is 60°

(IV) An image height is 4.27 mm (V) A back focus is 5.536 mm (VI) A total length of the imaging optical system 5 is 26.601 mm Next, Table XIII shows the surface data of the imaging optical system 5 using the same symbols as those of the first embodiment:

TABLE XIII

SURFACE DATA

| Sn | r | d | Nd | Vd | E |
|---|---|---|---|---|---|
| 1* | 12.119 | 1.198 | 1.545 | 56.003 | 13.34 |
| 2* | 2.888 | 4.615 | | | 7.89 |
| 3* | −9.328 | 2.637 | 1.640 | 23.529 | 7.19 |
| 4* | −10.063 | 2.193 | | | 6.99 |
| 5(D) | ∞ | −0.006 | | | |
| 6* | 7.887 | 3.065 | 1.545 | 56.003 | 7.01 |
| 7* | −6.236 | 2.422 | | | 7.47 |
| 8* | −9.409 | 0.789 | 1.661 | 20.373 | 7.23 |
| 9* | 6.021 | 0.157 | | | 8.65 |
| 10* | 7.454 | 3.860 | 1.729 | 54.041 | 9.29 |
| 11* | −6.451 | 1.000 | | | 9.28 |
| 12 | ∞ | 0.400 | 1.517 | 64.167 | 9.20 |
| 13 | ∞ | 4.272 | | | 9.19 |

Next, Table XIV shows the single lens data of the imaging optical system 5.

TABLE XIV

SINGLE LENS DATA

| | |
|---|---|
| $\|f1\|/f$ | 1.82 |
| $\|f2\|/f$ | 125.00 |
| $\|f4\|/f$ | 1.36 |
| $\|(dn/dT)_3\|$ | 95.97E−06 |
| $\|(dn/dT)_5\|$ | 2.69E−06 |
| d12/f | 1.15 |

The ratio $|f\mathbf{1}|/f$ satisfies the conditional expression (2), the ratio $|f\mathbf{2}|/f$ satisfies the conditional expression (3), and the $|f\mathbf{4}|/f$ satisfies the conditional expression (6). Additionally, the temperature coefficient $|(dn/dT)_3|$ does not satisfy the conditional expression (7), but the temperature coefficient $|(dn/dT)_5|$ satisfies the conditional expression (10).

Next, Table XV shows the aspherical data of the imaging optical system 4 using the same symbols as those of the first embodiment:

TABLE XV

| ASPHERICAL DATA |
|---|
| First surface |
| k = 0, A4 = −1.1605E−03, A6 = 1.1821E−05, A8 = −2.4216E−08, A10 = 3.3157E−10, A12 = 0 |
| Second surface |
| k = −9.0450E−01, A4 = 9.8009E−04, A6 = −1.0511E−05, A8 = −1.4143E−06, A10 = −1.9577E−08, A12 = 0 |
| Third surface |
| k = 0, A4 = 2.3980E−05, A6 = −5.0522E−05, A8 = −5.6059E−07, A10 = 1.1529E−07, A12 = 0 |
| Fourth surface |
| k = 0, A4 = 3.8575E−04, A6 = −1.9209E−05, A8 = 1.0948E−06, A10 = 1.1478E−07, A12 = 0 |
| Sixth surface |
| k = 0, A4 = −1.0303E−04, A6 = −1.7412E−05, A8 = 2.1128E−08, A10 = −7.0331E−08, A12 = 0 |
| Seventh surface |
| k = 0, A4 = 1.2290E−03, A6 = −5.8818E−05, A8 = 3.5350E−06, A10 = −1.5570E−07, A12 = 0 |
| Eighth surface |
| k = 0, A4 = −1.7750E−03, A6 = −1.0180E−04, A8 = 6.2256E−06, A10 = −9.0509E−09, A12 = 0 |
| Ninth surface |
| k = 0, A4 = −3.7805E−03, A6 = 1.1691E−04, A8 = −2.9175E−06, A10 = 5.3348E−10, A12 = 0 |
| Tenth surface |
| k = 0, A4 = −1.9411E−03, A6 = 8.2049E−05, A8 = −2.3007E−06, A10 = 3.6289E−08, A12 = 0 |
| Eleventh surface |
| k = 0, A4 = 7.1855E−04, A6 = 2.6276E−06, A8 = 6.8134E−07, A10 = 3.5227E−08, A12 = 0 |

Figure 38:
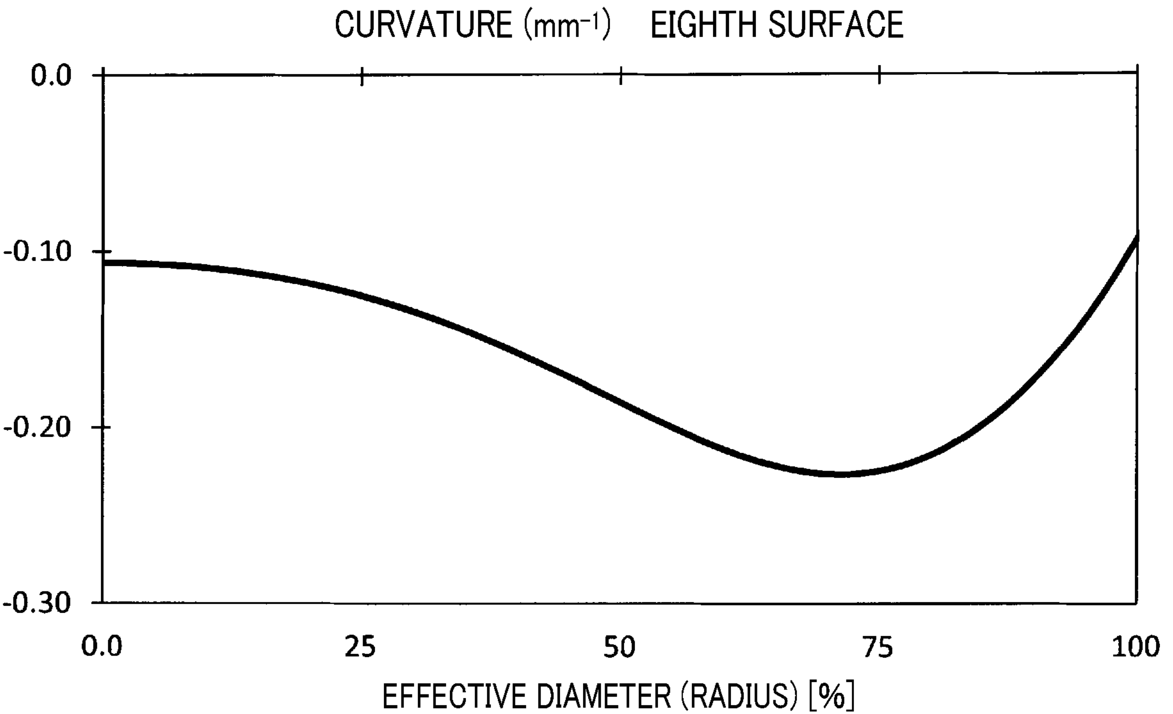
FIG. 38 is a graph illustrating how a curvature is radially changed from a center portion to a periphery of an eighth surface of the imaging optical system according to the fifth embodiment.
Figure 39:
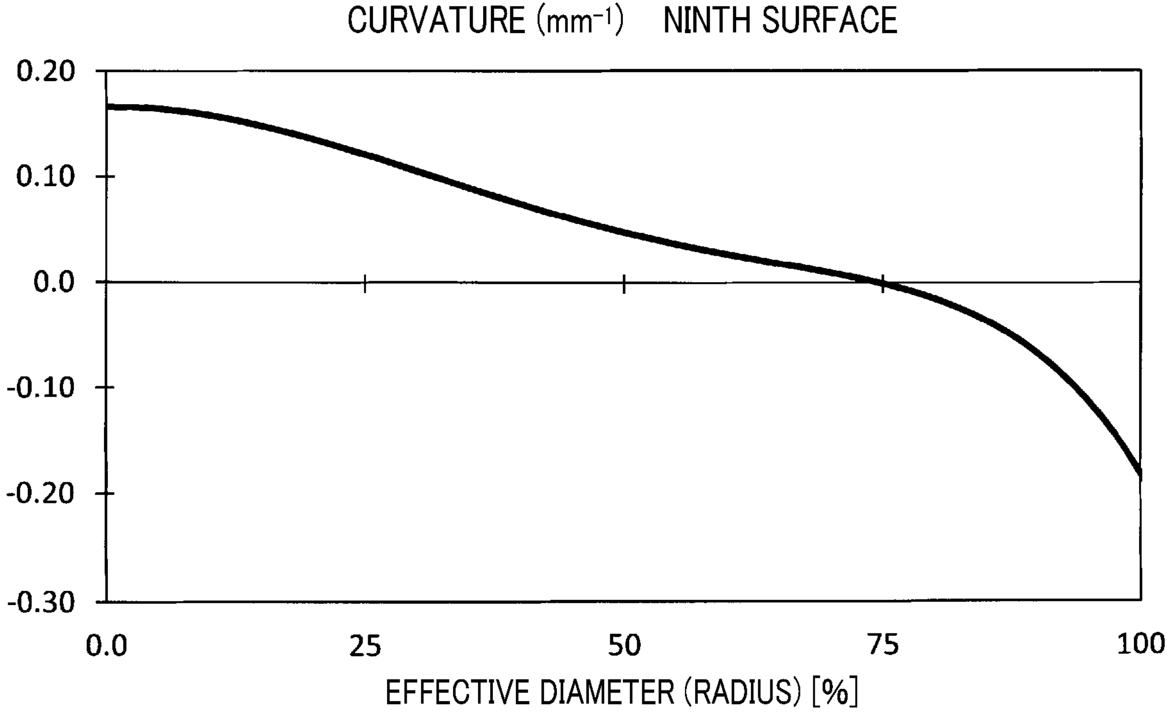
FIG. 39 is a graph illustrating how a curvature is radially changed from a center portion to a periphery of a ninth surface of the imaging optical system according to the fifth embodiment.
Figure 40:
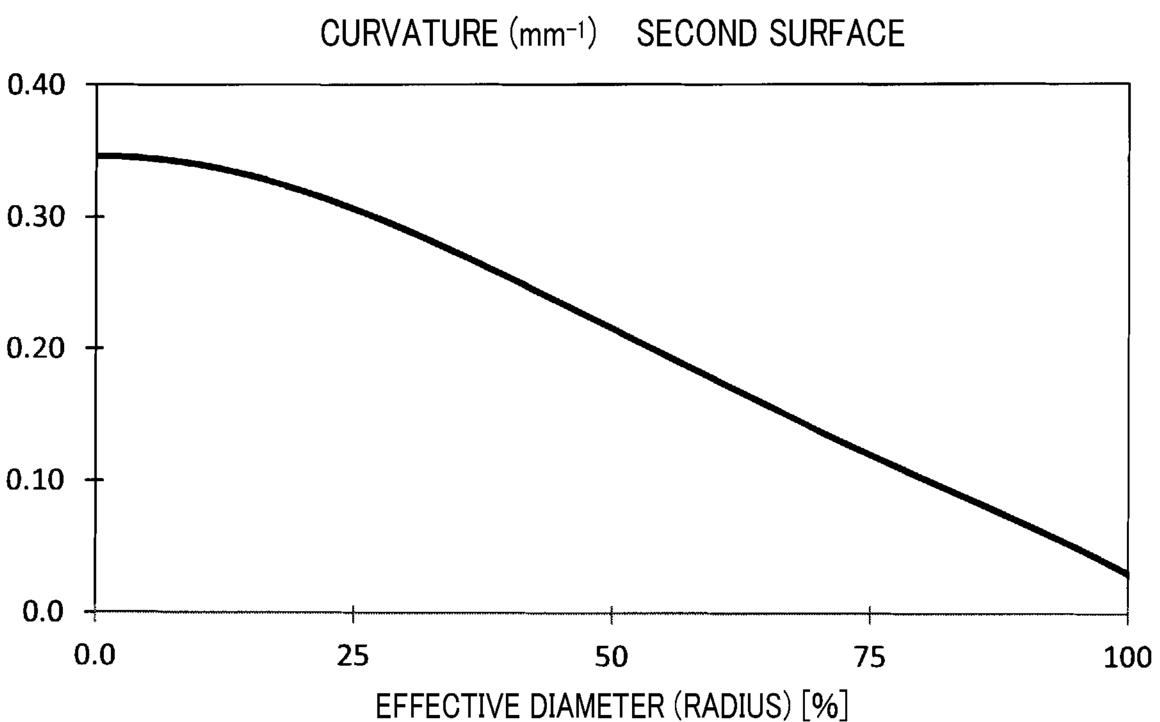
FIG. 40 is a graph illustrating how a curvature is radially changed from a center portion to a periphery of a second surface of the imaging optical system according to the fifth embodiment.

FIG. 34 to FIG. 37 respectively illustrate the spherical aberration, the astigmatism, the distortion, and the chromatic aberration in the imaging optical system 5. FIG. 38 illustrates how the curvature is radially changed from the center portion to the periphery of the eighth surface (the light input surface of the fourth lens L4). FIG. 39 illustrates how the curvature is radially changed from the center portion to the periphery of the ninth surface (the light output surface of the fourth lens L4). FIG. 40 illustrates how the curvature is radially changed in from the center portion to the periphery of the ninth surface (the light output surface of the first lens L1).

The features of the fifth embodiment are substantially the same as those of the first embodiment.

Sixth Embodiment

Figure 41:
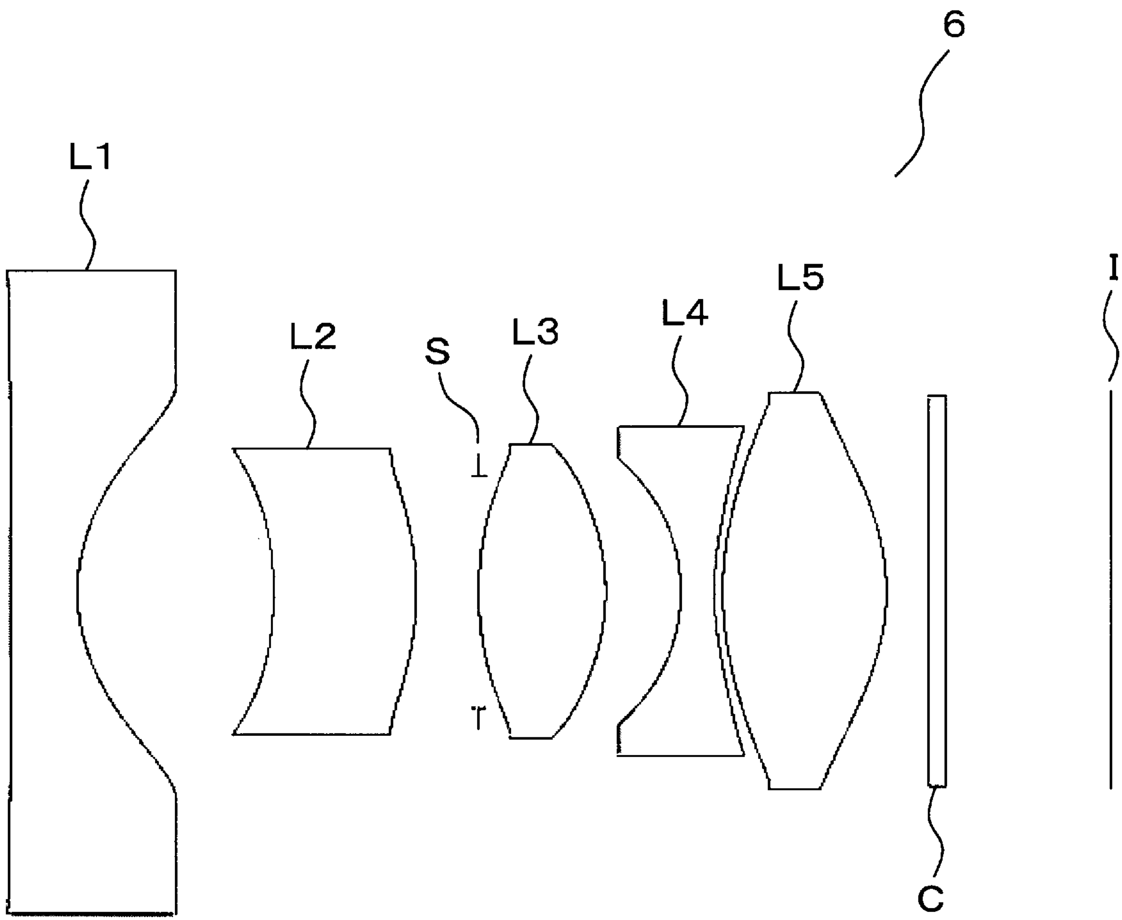
FIG. 41 is an optical diagram illustrating an imaging optical system according to the sixth embodiment.
Figures 42, 43:
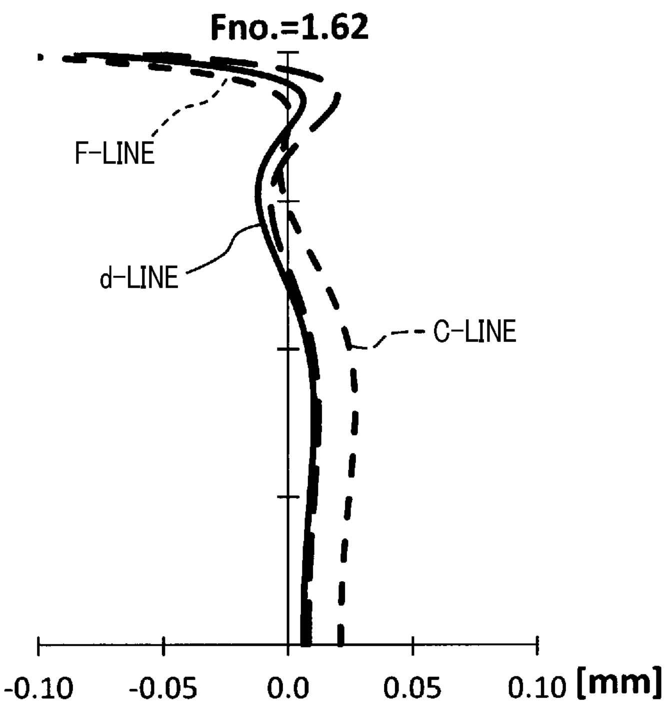
FIG. 42 is a graph illustrating spherical aberration in the imaging optical system according to the sixth embodiment.
FIG. 43 is a graph illustrating astigmatism in the imaging optical system according to the sixth embodiment.
Figure 44:
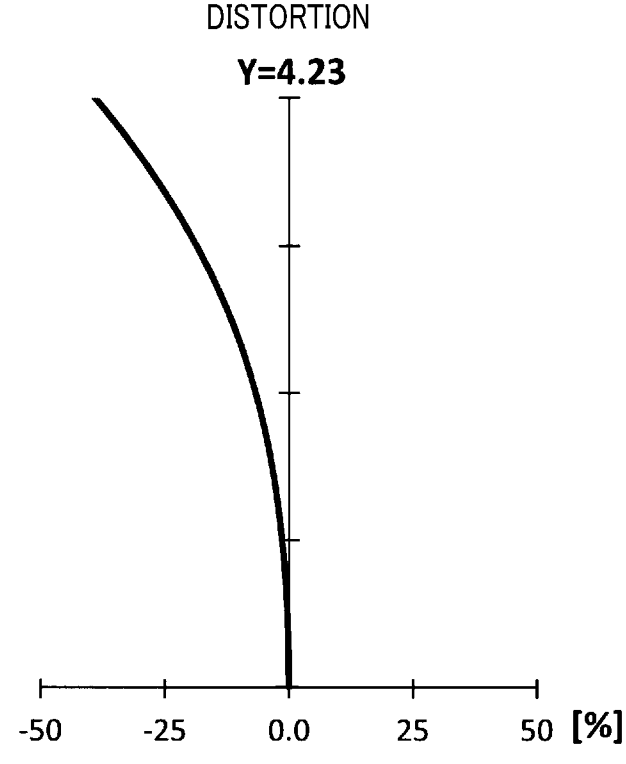
FIG. 44 is a graph illustrating distortion in the imaging optical system according to the sixth embodiment.
Figure 45:
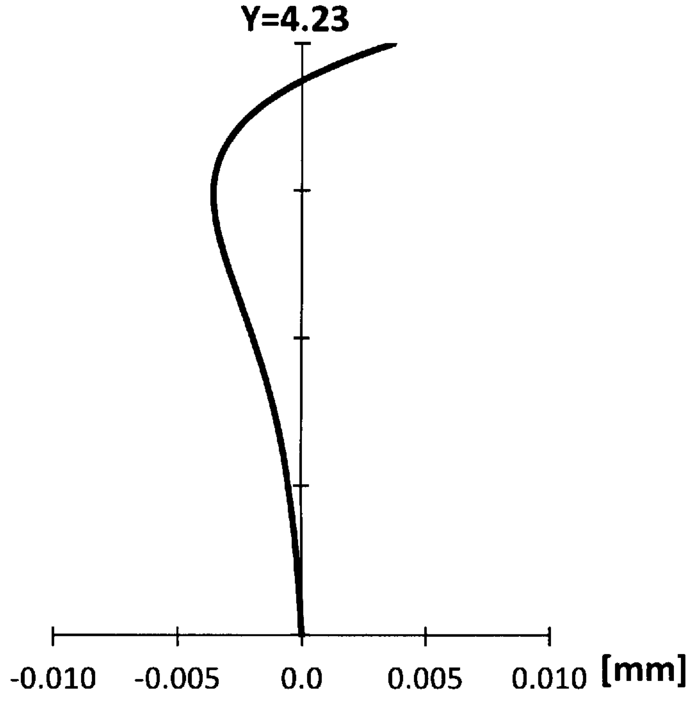
FIG. 45 is a graph illustrating chromatic aberration in the imaging optical system according to the sixth embodiment.

FIG. 41 illustrates an imaging optical system 6 according to the sixth embodiment.

The imaging optical system 6 has predetermined specifications in which:

(I) A total focal length of the imaging optical system 6 is 4.000 mm (II) An F-number of the imaging optical system 6 is 1.62

(III) A half angle of view is 60°

(IV) An image height is 4.23 mm (V) A back focus is 5.140 mm (VI) A total length of the imaging optical system 6 is 26.601 mm Next, Table XVI shows the surface data of the imaging optical system 6 using the same symbols as those of the first embodiment:

TABLE XVI

SURFACE DATA

| Sn | r | d | Nd | Vd | E |
|---|---|---|---|---|---|
| 1* | 280.266 | 1.588 | 1.545 | 56.003 | 14.79 |
| 2* | 4.449 | 4.625 | | | 9.30 |
| 3* | −8.235 | 3.351 | 1.640 | 23.529 | 6.57 |
| 4* | −7.042 | 1.469 | | | 6.25 |
| 5(D) | ∞ | −0.006 | | | |
| 6* | 8.420 | 2.982 | 1.545 | 56.003 | 6.30 |
| 7* | −5.395 | 1.776 | | | 6.73 |
| 8* | −4.387 | 0.786 | 1.661 | 20.373 | 6.09 |
| 9* | 7.531 | 0.192 | | | 7.57 |
| 10* | 7.509 | 3.864 | 1.729 | 54.041 | 8.62 |
| 11* | −5.340 | 1.000 | | | 9.08 |
| 12 | ∞ | 0.400 | 1.517 | 64.167 | 8.95 |
| 13 | ∞ | 3.876 | | | 8.93 |

Next, Table XVII shows the single lens data of the imaging optical system 6.

TABLE XVII

| SINGLE LENS DATA | |
|---|---|
| $|f1|/f|$ | 2.08 |
| $|f2|/f|$ | 9.06 |
| $|f4|/f$ | 1.02 |
| $|(dn/dT)_3|$ | 95.97E−06 |
| $|(dn/dT)_5|$ | 2.69E−06 |
| d12/f | 1.16 |

The ratio $|f\mathbf{1}|/f$ satisfies the conditional expression (1), the ratio $|f\mathbf{2}|/f$ satisfies the conditional expression (3), and the $|f\mathbf{4}|/f$ satisfies the conditional expression (5). Additionally, the temperature coefficient $|(dn/dT)_3|$ does not satisfy the conditional expression (7), but the temperature coefficient $|(dn/dT)_5|$ satisfies the conditional expression (10).

Next, Table XVIII shows the aspherical data of the imaging optical system 6 using the same symbols as those of the first embodiment:

TABLE XVIII

| ASPHERICAL DATA |
|---|
| First surface |
| k = 0, A4 = −8.1862E−05, A6 = −1.8806E−07, A8 = 2.9186E−08, A10 = −2.5925E−10, A12 = 0 |
| Second surface |
| k = −8.4715E−01, A4 = 1.2814E−04, A6 = −8.0778E−06, A8 = −3.7053E−07, A10 = −4.5501E−08, A12 = 0 |
| Third surface |
| k = 0, A4 = −1.6365E−03, A6 = −2.4681E−05, A8 = 3.7055E−06, A10 = 9.0557E−10, A12 = 0 |
| Fourth surface |
| k = 0, A4 = 1.0714E−03, A6 = 2.2496E−05, A8 = −1.5676E−06, A10 = 5.5122E−07, A12 = 0 |
| Sixth surface |
| k = 0, A4 = 1.3421E−03, A6 = −4.8782E−05, A8 = 3.6941E−06, A10 = −7.1523E−07, A12 = 0 |
| Seventh surface |
| k = 0, A4 = 1.4254E−03, A6 = −7.7108E−05, A8 = 9.8131E−06, A10 = −8.3758E−07, A12 = 0 |
| Eighth data |
| k = 0, A4 = −9.3875E−04, A6 = −1.0546E−04, A8 = 1.8100E−05, A10 = −4.7672E−07, A12 = 0 |
| Ninth surface |
| k = 0, A4 = −2.9962E−03, A6 = 7.1188E−05, A8 = 2.9040E−06, A10 = −1.4151E−07, A12 = 0 |
| Tenth surface |
| k = 0, A4 = −1.6684E−03, A6 = 4.1794E−05, A8 = 5.1532E−07, A10 = −4.9204E−08, A12 = 0 |
| Eleventh surface |
| k = 0, A4 = 1.6534E−03, A6 = 1.3840E−05, A8 = 1.9147E−06, A10 = −2.7194E−08, A12 = 0 |

Figure 46:
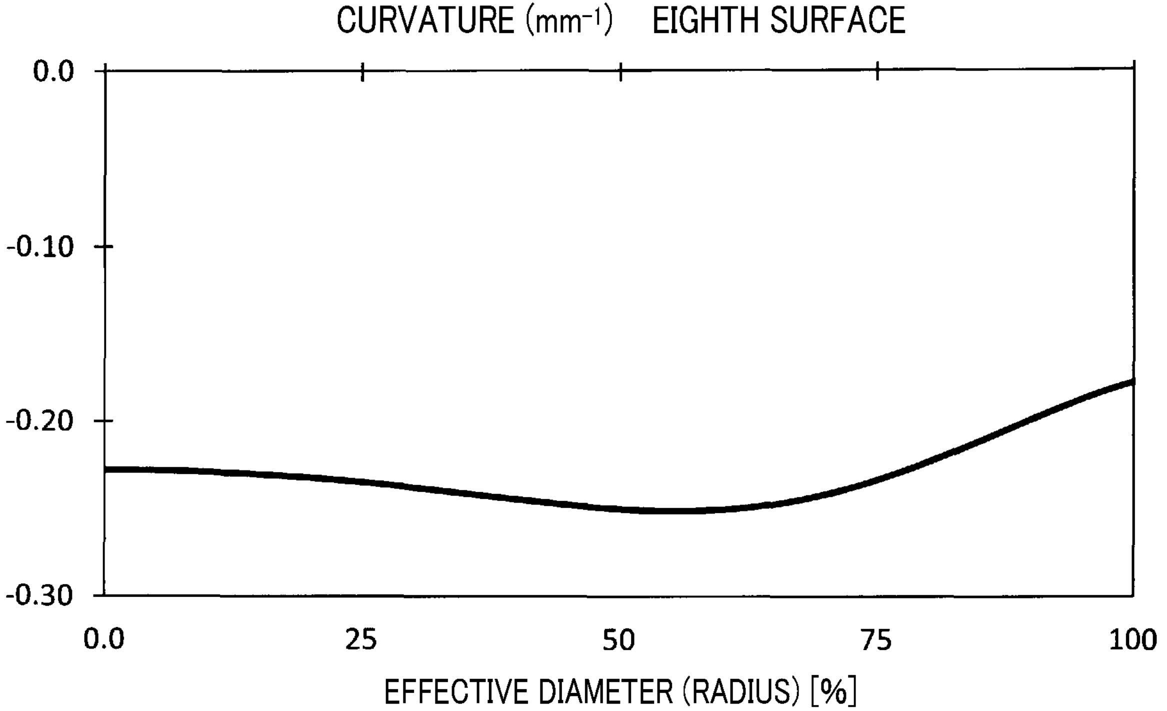
FIG. 46 is a graph illustrating how a curvature is radially changed from a center portion to a periphery of an eighth surface of the imaging optical system according to the sixth embodiment.
Figure 47:
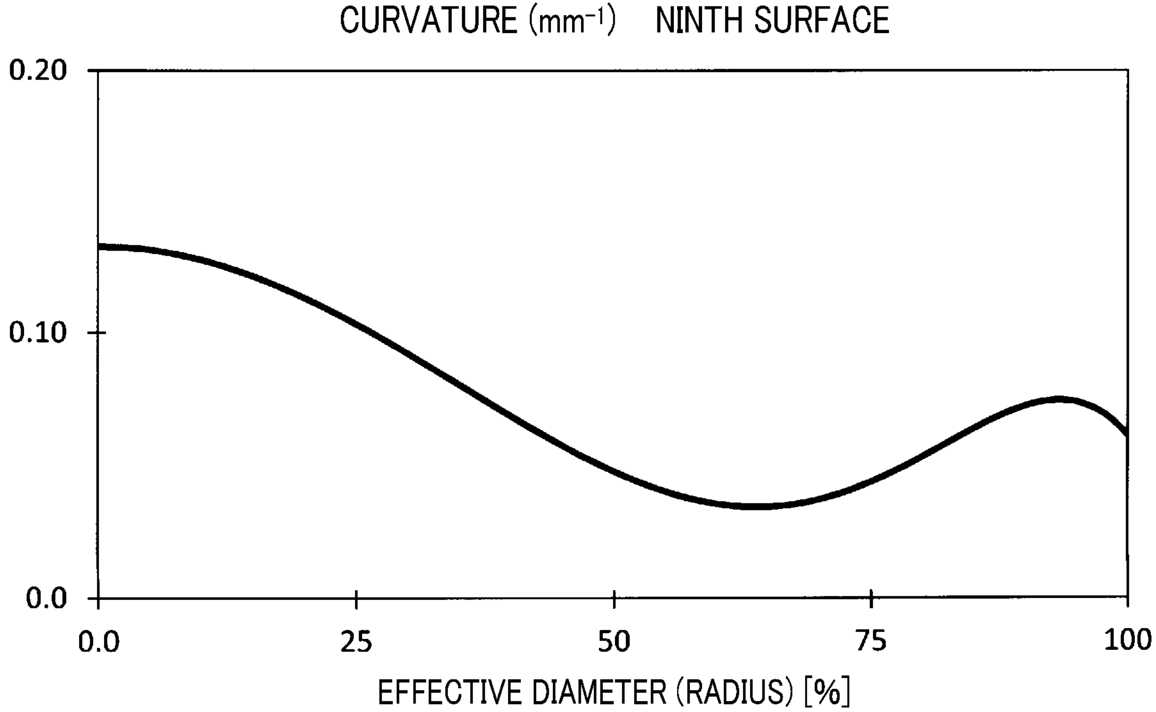
FIG. 47 is a graph illustrating how a curvature is radially changed from a center portion to a periphery of a ninth surface of the imaging optical system according to the sixth embodiment.
Figure 48:
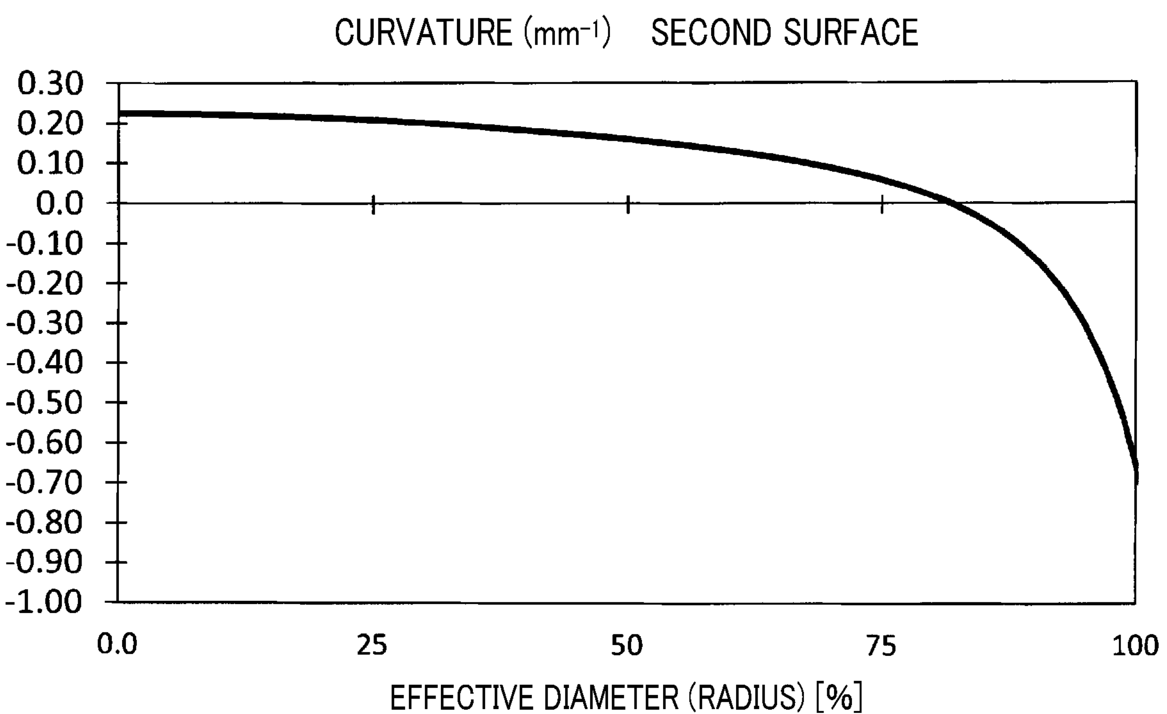
FIG. 48 is a graph illustrating how a curvature is radially changed from a center portion to a periphery of a second surface of the imaging optical system according to the sixth embodiment.

FIG. 42 to FIG. 45 respectively illustrate the spherical aberration, the astigmatism, the distortion, and the chromatic aberration in the imaging optical system 6. FIG. 46 illustrates how the curvature is radially changed from the center portion to the periphery of the eighth surface (the light input surface of the fourth lens L4). FIG. 47 illustrates how the curvature is radially changed from the center portion to the periphery of the ninth surface (the light output surface of the fourth lens L4). FIG. 48 illustrates how the curvature is radially changed in from the center portion to the periphery of the ninth surface (the light output surface of the first lens L1).

The features of the sixth embodiment are substantially the same as those of the second embodiment.

Seventh Embodiment

Figure 49:
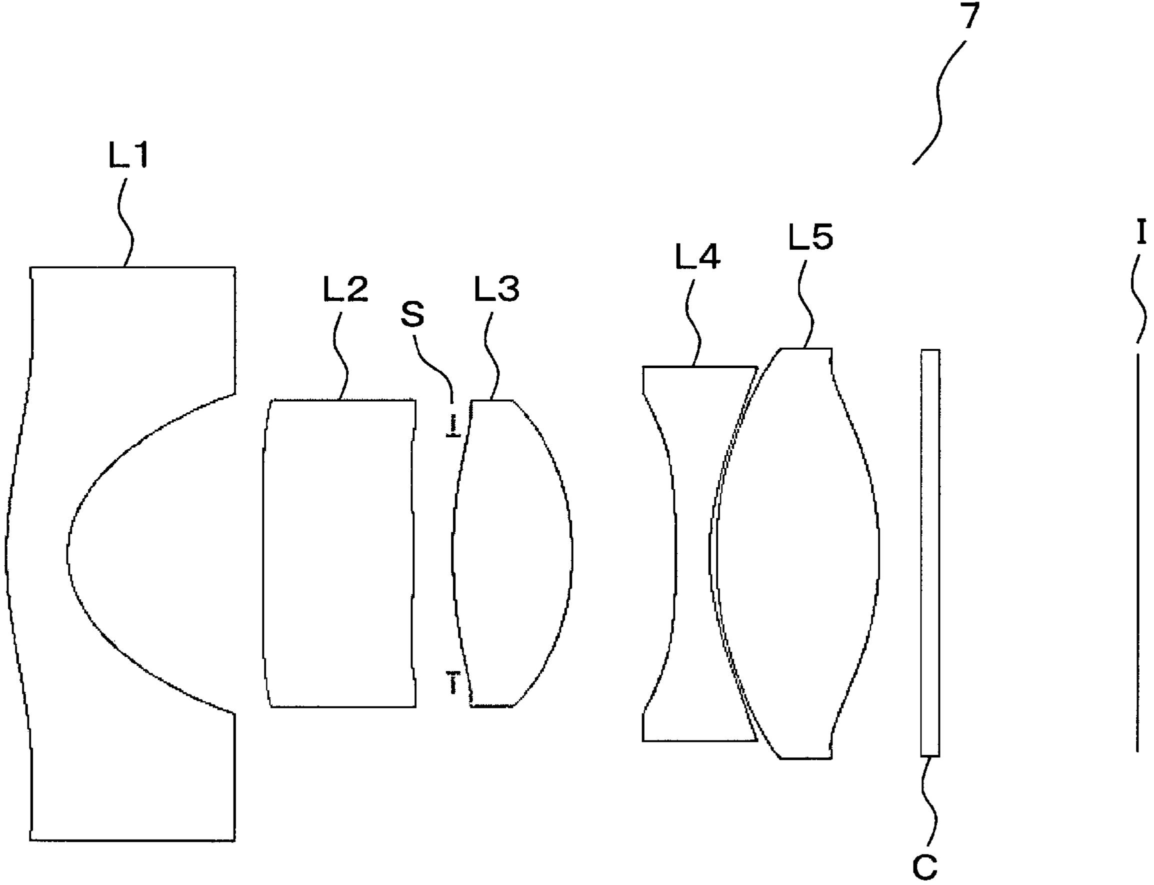
FIG. 49 is an optical diagram illustrating an imaging optical system according to the seventh embodiment.
Figure 50:
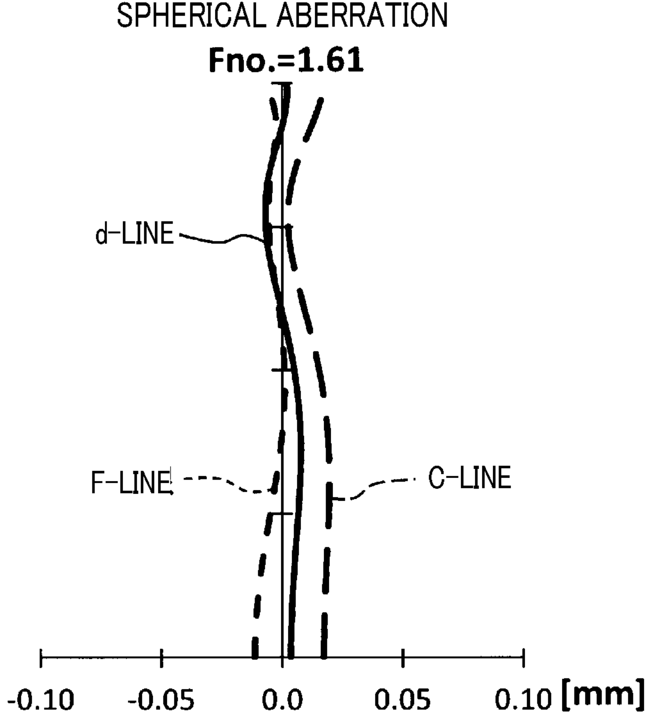
FIG. 50 is a graph illustrating spherical aberration in the imaging optical system according to the seventh embodiment.
Figure 51:
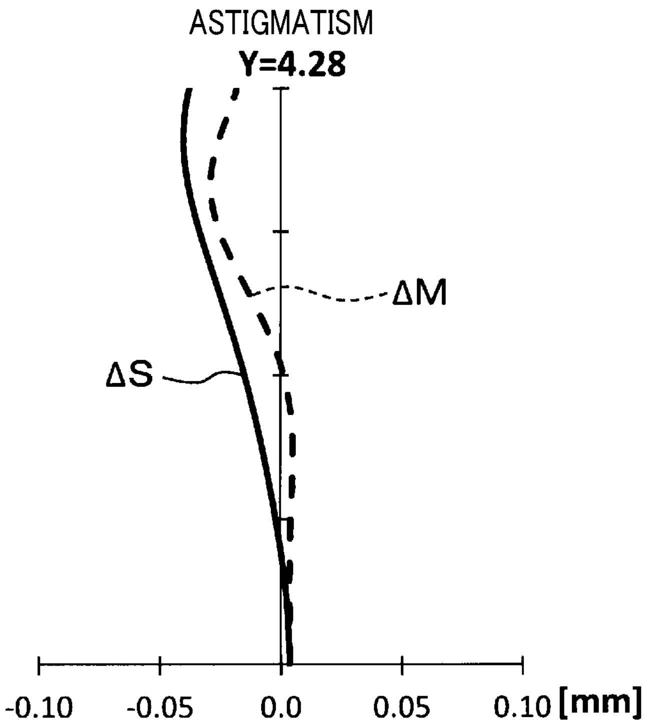
FIG. 51 is a graph illustrating astigmatism in the imaging optical system according to the seventh embodiment.
Figures 52, 53:
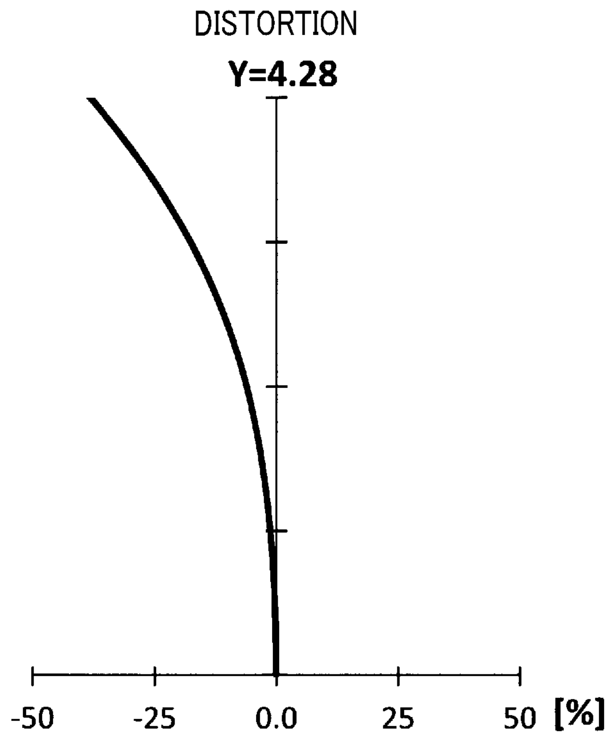
FIG. 52 is a graph illustrating distortion in the imaging optical system according to the seventh embodiment.
FIG. 53 is a graph illustrating chromatic aberration in the imaging optical system according to the seventh embodiment.

FIG. 49 illustrates an imaging optical system 7 according to the seventh embodiment.

The imaging optical system 7 has predetermined specifications in which:

(I) A total focal length of the imaging optical system 7 is 4.000

(II) An F-number of the imaging optical system 7 is 1.61

(III) A half angle of view is 60°

(IV) An image height is 4.28 mm (V) A back focus is 5.955 mm (VI) A total length of the imaging optical system 7 is 26.602 mm Next, Table XIX shows the surface data of the imaging optical system 7 using the same symbols as those of the first embodiment:

TABLE XIX

| SURFACE DATA | | | | | |
|---|---|---|---|---|---|
| Sn | r | d | Nd | Vd | E |
| 1* | 9.370 | 1.448 | 1.545 | 56.003 | 13.18 |
| 2* | 2.369 | 4.603 | | | 7.34 |
| 3* | −60.000 | 3.512 | 1.640 | 23.529 | 7.06 |
| 4* | −22.000 | 0.929 | | | 5.89 |
| 5(D) | ∞ | −0.006 | | | |
| 6* | 12.590 | 2.800 | 1.545 | 56.003 | 6.24 |
| 7* | −5.598 | 2.448 | | | 6.99 |
| 8* | −34.515 | 0.792 | 1.661 | 20.373 | 7.41 |
| 9* | 6.294 | 0.147 | | | 8.53 |
| 10* | 9.120 | 3.836 | 1.729 | 54.041 | 9.39 |
| 11* | −7.260 | 1.000 | | | 9.28 |
| 12 | ∞ | 0.400 | 1.517 | 64.167 | 9.29 |
| 13 | ∞ | 4.691 | | | 9.29 |

Next, Table XX shows the single lens data of the imaging optical system 7.

TABLE XX

| SINGLE LENS DATA | |
|---|---|
| $\|f1\|/f\|$ | 1.57 |
| $\|f2\|/f\|$ | 13.10 |
| $\|f4\|/f$ | 2.00 |
| $\|(dn/dT)_3\|$ | 95.97E−06 |
| $\|(dn/dT)_5\|$ | 2.69E−06 |
| d12/f | 1.15 |

The ratio $|f\mathbf{1}|/f$ satisfies the conditional expression (2), the ratio $|f\mathbf{2}|/f$ satisfies the conditional expression (3), and the $|f\mathbf{4}|/f$ satisfies the conditional expression (5). Additionally, the temperature coefficient $|(dn/dT)_3|$ does not satisfy the conditional expression (7), but the temperature coefficient $|(dn/dT)_5|$ satisfies the conditional expression (10).

Next, Table XXI shows the aspherical data of the imaging optical system 7 using the same symbols as those of the first embodiment:

TABLE XXI

| ASPHERICAL DATA |
|---|
| First surface |
| k = 0, A4 = −1.8043E−03, A6 = 2.3151E−05, A8 = −1.9047E−07, A10 = 4.5682E−10, A12 = 0 |
| Second surface |
| k = −7.0900E−01, A4 = −2.7150E−04, A6 = −2.9852E−05, A8 = −3.4408E−06, A10 = −2.6081E−08, A12 = 0 |
| Third surface |
| k = 0, A4 = 1.6657E−03, A6 = −2.6535E−05, A8 = 1.1765E−06, A10 = 3.4390E−08, A12 = 0 |
| Fourth surface |
| k = 0, A4 = 2.9131E−03, A6 = −9.1908E−05, A8 = 3.7752E−06, A10 = 4.9204E−07, A12 = 0 |
| Sixth surface |
| k = 0, A4 = 1.3008E−03, A6 = −1.8359E−04, A8 = 7.5199E−06, A10 = −2.3657E−07, A12 = 0 |
| Seventh surface |
| k = 0, A4 = 3.1346E−05, A6 = −5.6377E−05, A8 = 3.0739E−06, A10 = −1.9322E−07, A12 = 0 |

TABLE XXI-continued

| ASPHERICAL DATA |
|---|
| Eighth surface |
| k = 0, A4 = −4.0814E−03, A6 = 1.3562E−04, A8 = −5.7036E−06, A10 = 2.5546E−07, A12 = 0 |
| Ninth surface |
| k = 0, A4 = −2.3397E−03, A6 = 6.4467E−05, A8 = −3.5648E−06, A10 = 7.2680E−08, A12 = 0 |
| Tenth surface |
| k = 0, A4 = 8.1335E−04, A6 = −9.5359E−05, A8 = 3.3771E−06, A10 = −2.5693E−08, A12 = 0 |
| Eleventh surface |
| k = 0, A4 = 4.0549E−04, A6 = 1.1118E−05, A8 = −2.8848E−07, A10 = 6.2968E−08, A12 = 0 |

Figure 54:
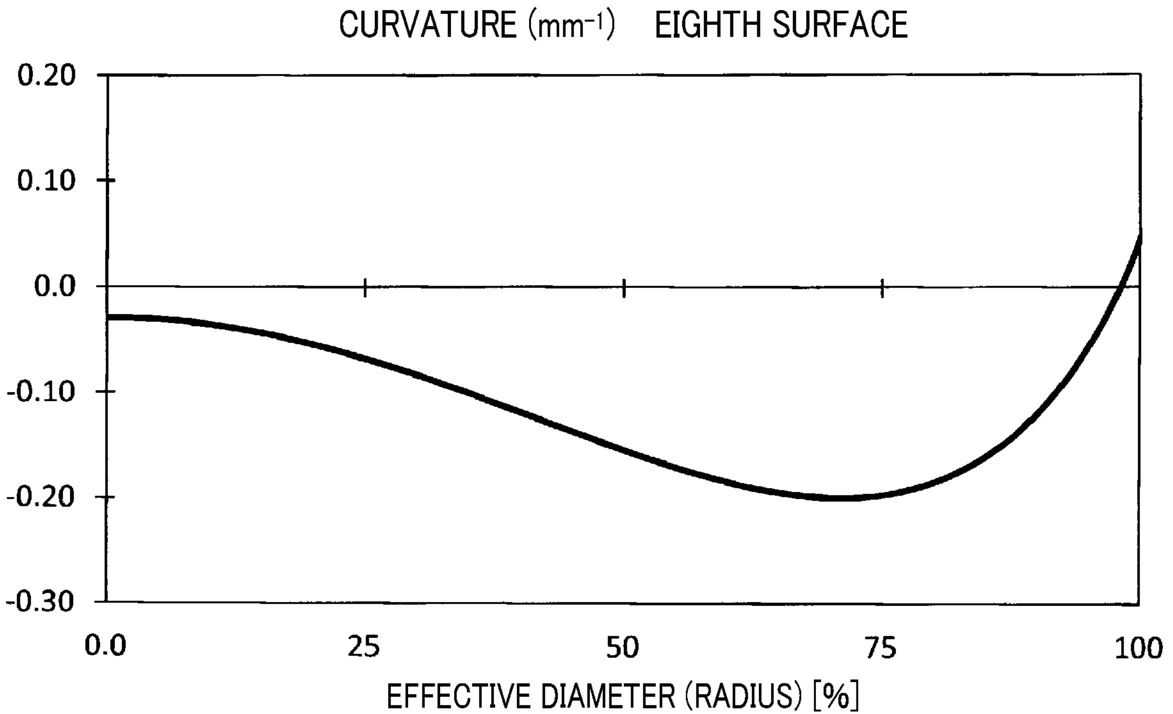
FIG. 54 is a graph illustrating how a curvature is radially changed from a center portion to a periphery of an eighth surface of the imaging optical system according to the seventh embodiment.
Figure 55:
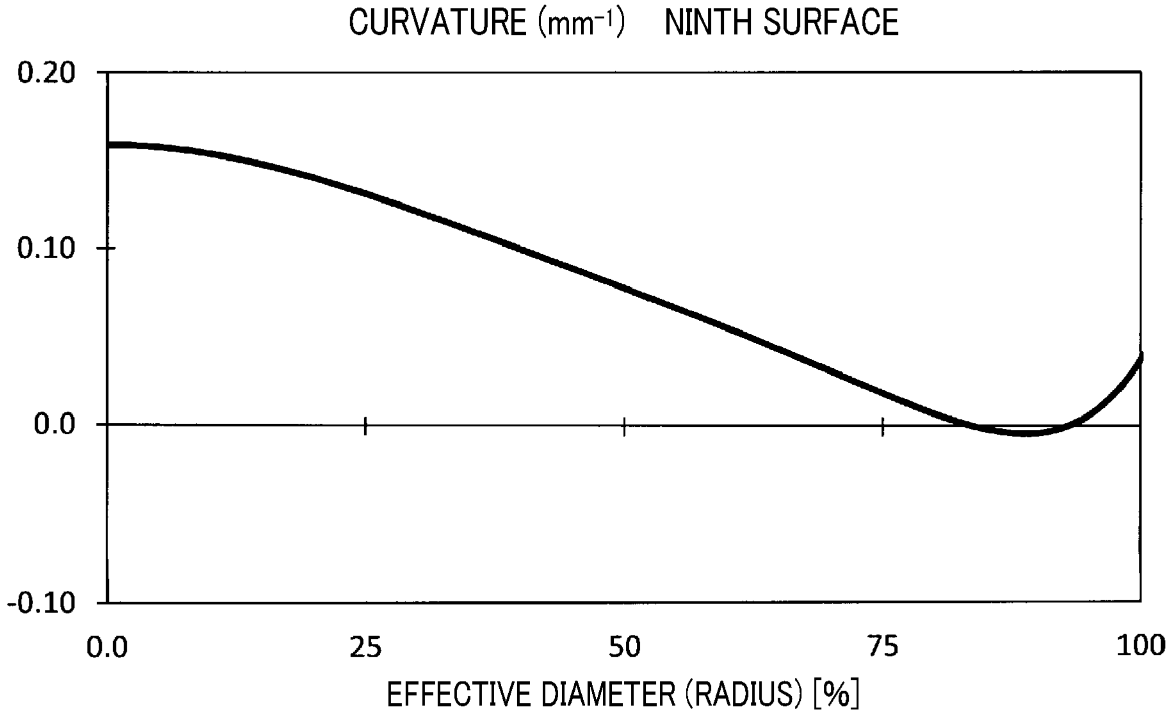
FIG. 55 is a graph illustrating how a curvature is radially changed from a center portion to a periphery of a ninth surface of the imaging optical system according to the seventh embodiment.
Figure 56:
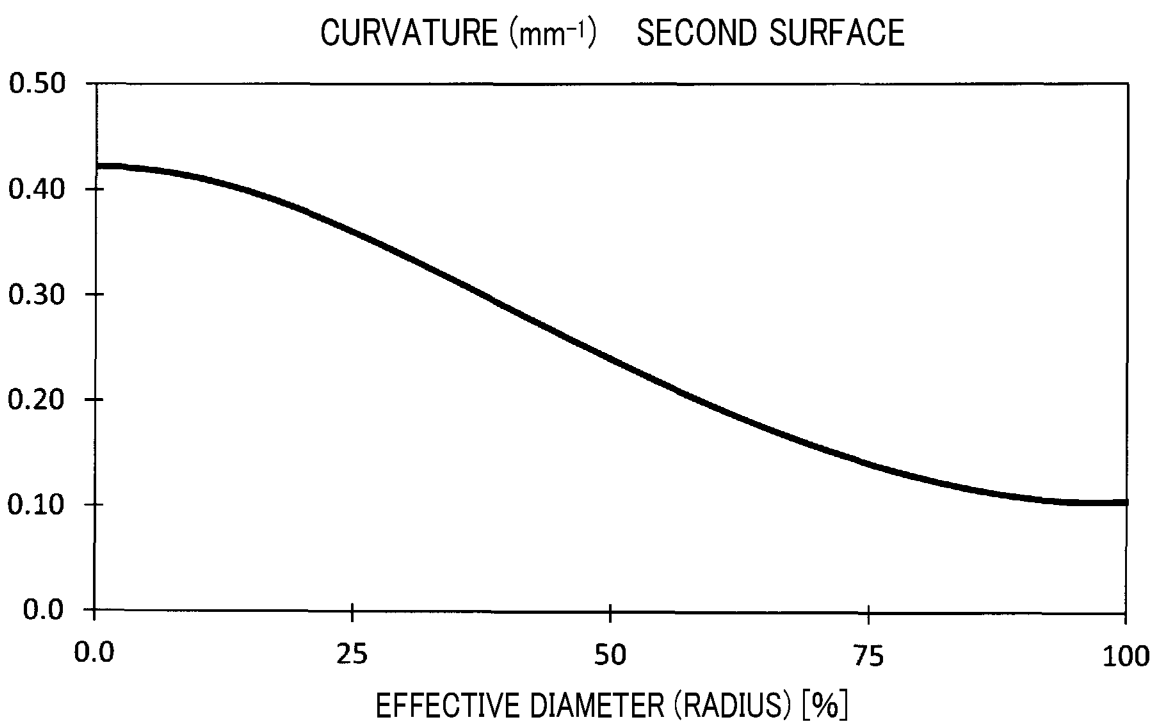
FIG. 56 is a graph illustrating how a curvature is radially changed from a center portion to a periphery of a second surface of the imaging optical system according to the seventh embodiment.

FIG. 50 to FIG. 53 respectively illustrate the spherical aberration, the astigmatism, the distortion, and the chromatic aberration in the imaging optical system 7. FIG. 54 illustrates how the curvature is radially changed from the center portion to the periphery of the eighth surface (the light input surface of the fourth lens L4). FIG. 55 illustrates how the curvature is radially changed from the center portion to the periphery of the ninth surface (the light output surface of the fourth lens L4). FIG. 56 illustrates how the curvature is radially changed in from the center portion to the periphery of the ninth surface (the light output surface of the first lens L1).

The features of the seventh embodiment are substantially the same as those of the second embodiment.

Eighth Embodiment

Figure 57:
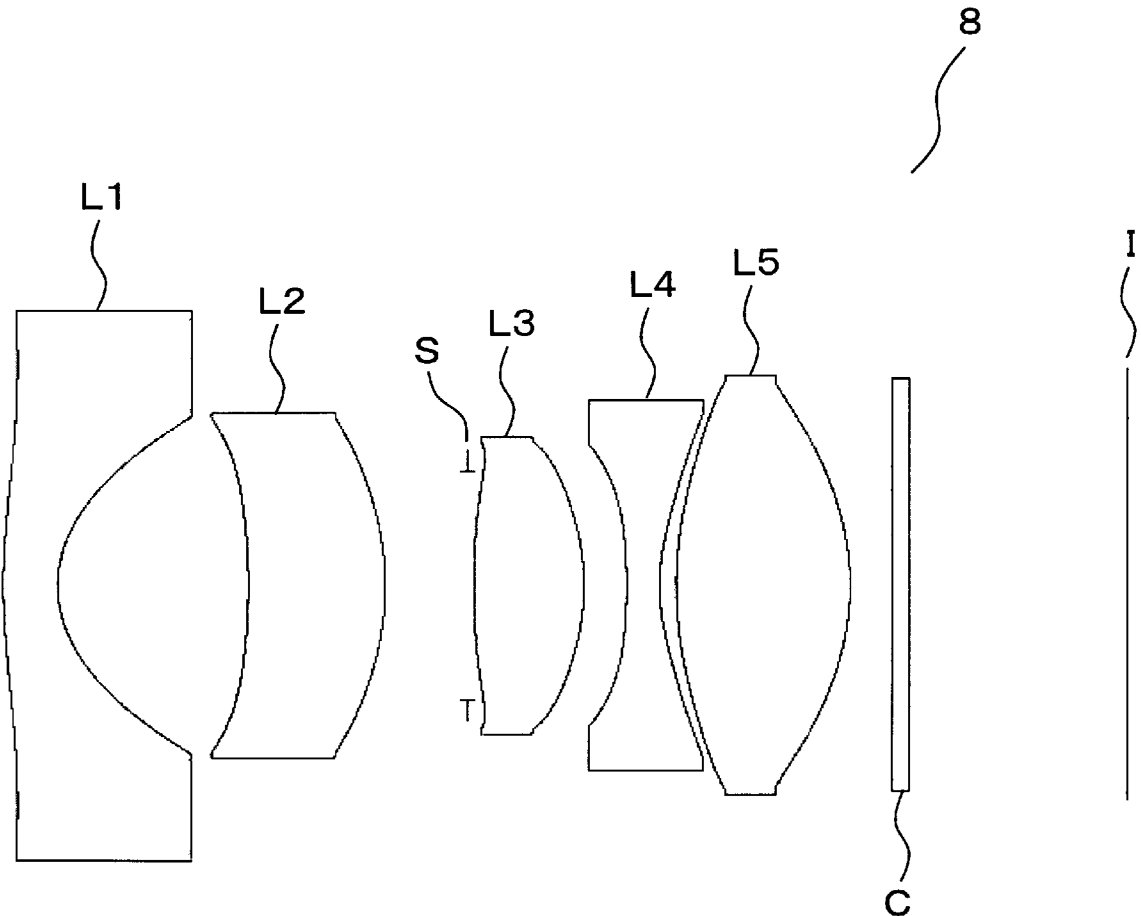
FIG. 57 is an optical diagram illustrating an imaging optical system according to the eighth embodiment.
Figures 58, 59:
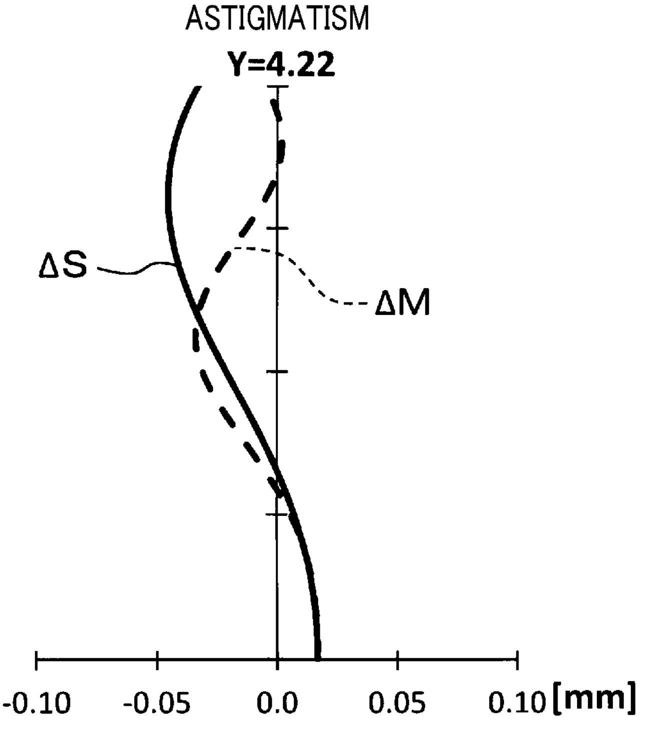
FIG. 58 is a graph illustrating spherical aberration in the imaging optical system according to the eighth embodiment.
FIG. 59 is a graph illustrating astigmatism in the imaging optical system according to the eighth embodiment.
Figure 60:
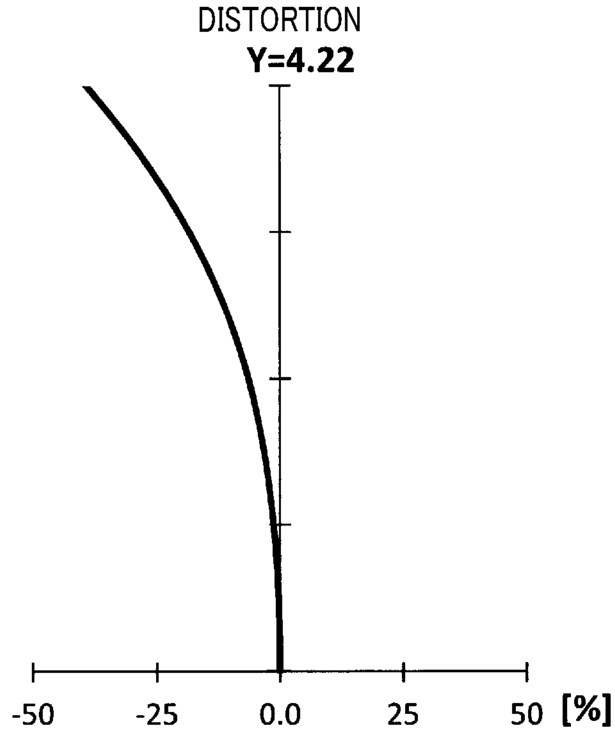
FIG. 60 is a graph illustrating distortion in the imaging optical system according to the eighth embodiment.
Figure 61:
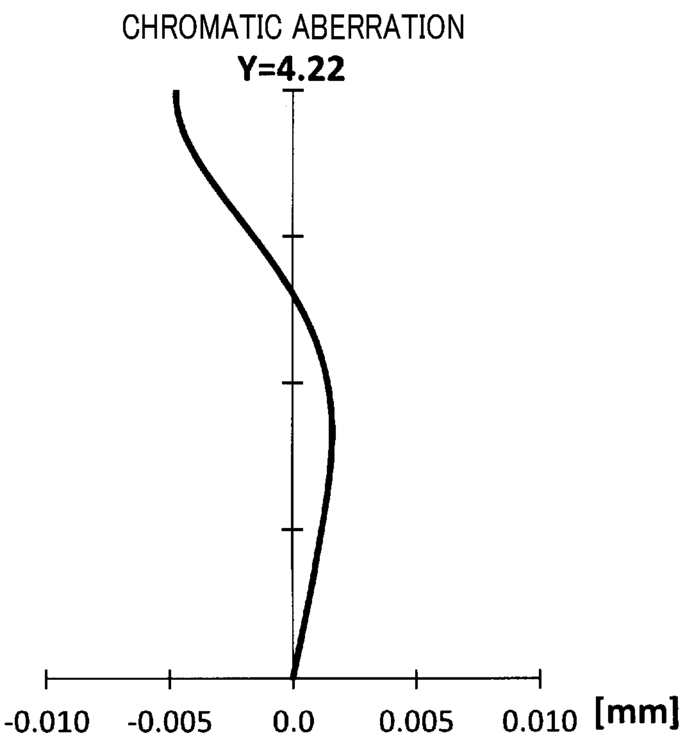
FIG. 61 is a graph illustrating chromatic aberration in the imaging optical system according to the eighth embodiment.
Figure 62:
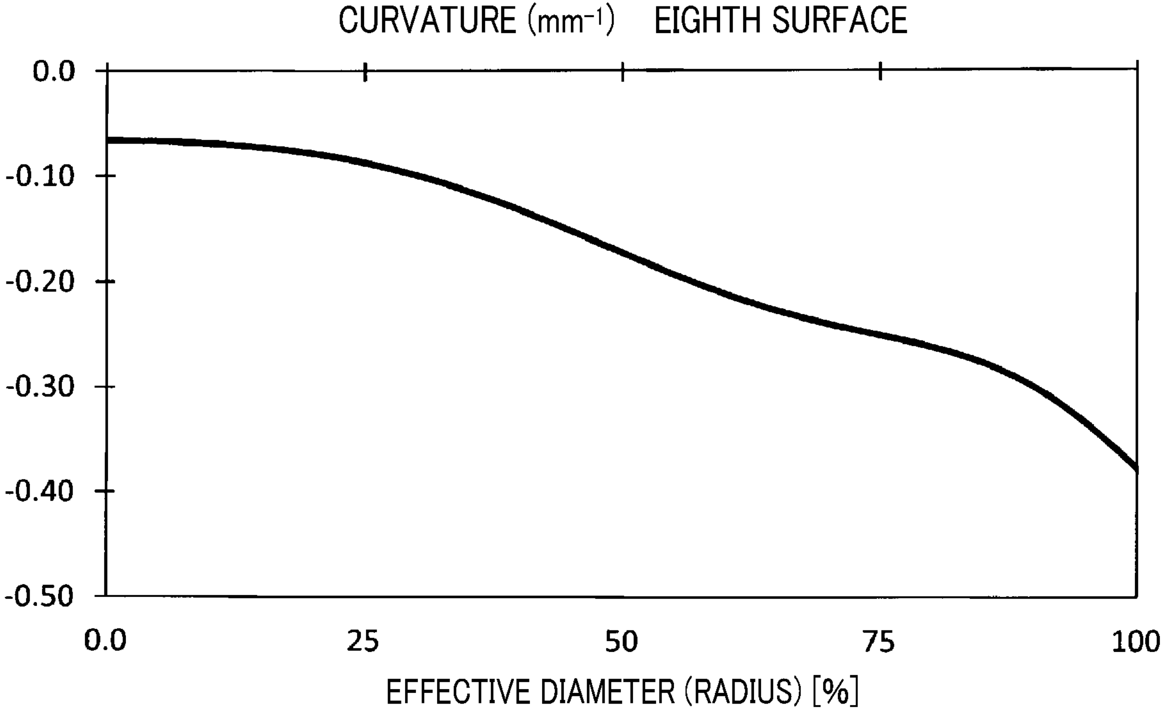
FIG. 62 is a graph illustrating how a curvature is radially changed from a center portion to a periphery of an eighth surface of the imaging optical system according to the eighth embodiment.
Figure 63:
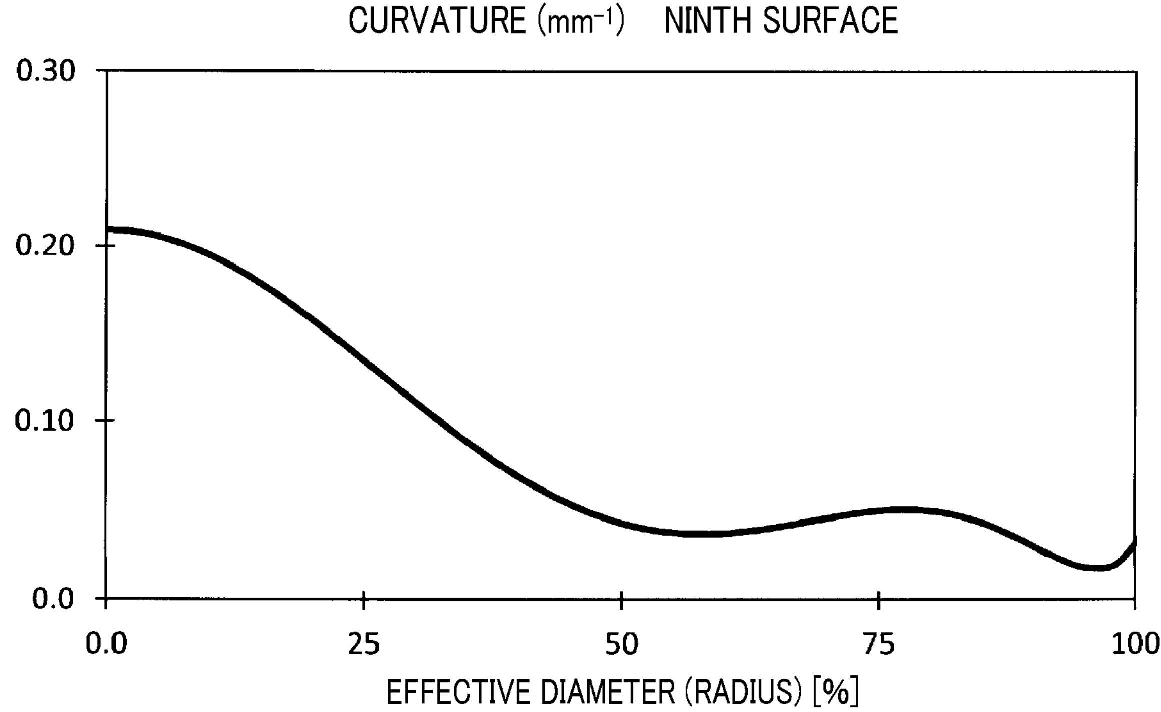
FIG. 63 is a graph illustrating how a curvature is radially changed from a center portion to a periphery of a ninth surface of the imaging optical system according to the eighth embodiment.

FIG. 57 illustrates an imaging optical system 8 according to the eighth embodiment.

The imaging optical system 8 has predetermined specifications in which:

(I) A total focal length of the imaging optical system 8 is 4.013 mm (II) An F-number of the imaging optical system 8 is 1.61

(III) A half angle of view is 60°

(IV) An image height is 4.22 mm (V) A back focus is 6.444 mm (VI) A total length of the imaging optical system 8 is 26.620 mm Next, Table XXII shows the surface data of the imaging optical system 8 using the same symbols as those of the first embodiment:

TABLE XXII

| Sn | r | d | Nd | Vd | E |
|---|---|---|---|---|---|
| 1* | 15.215 | 1.287 | 1.545 | 56.003 | 12.35 |
| 2* | 2.866 | 4.507 | | | 7.60 |
| 3* | −16.229 | 3.234 | 1.640 | 23.529 | 7.60 |
| 4* | −6.896 | 1.946 | | | 7.60 |
| 5(D) | ∞ | 0.151 | | | |
| 6* | 22.456 | 2.611 | 1.545 | 56.003 | 6.46 |
| 7* | −5.268 | 1.000 | | | 6.46 |
| 8* | −15.084 | 0.783 | 1.661 | 20.373 | 6.27 |
| 9* | 4.775 | 0.399 | | | 7.79 |
| 10* | 8.820 | 4.118 | 1.729 | 54.041 | 8.55 |
| 11* | −6.462 | 1.000 | | | 9.12 |
| 12 | ∞ | 0.400 | 1.517 | 64.167 | 9.50 |
| 13 | ∞ | 5.181 | | | 9.50 |

Next, Table XXIII shows the single lens data of the imaging optical system 8.

TABLE XXIII

| SINGLE LENS DATA | |
|---|---|
| \|f1\|/f\| | 1.68 |
| \|f2\|/f\| | 4.11 |
| \|f4\|/f | 1.35 |
| $\|(dn/dT)_3\|$ | 95.97E−06 |
| $\|(dn/dT)_5\|$ | 2.69E−06 |
| d12/f | 1.12 |

The ratio |f1|/f satisfies the conditional expression (2), the ratio |f2|/f satisfies the conditional expression (4), and the |f4|/f satisfies the conditional expression (6). Additionally, the temperature coefficient $|(dn/dT)_3|$ does not satisfy the conditional expression (7), but the temperature coefficient $|(dn/dT)_5|$ satisfies the conditional expression (10).

Next, Table XXIV shows the aspherical data of the imaging optical system 8 using the same symbols as those of the first embodiment:

TABLE XXIV

| ASPHERICAL DATA |
|---|
| First surface |
| k = 0, A4 = −1.2572E−03, A6 = 2.3537E−05, A8 = −2.9856E−07, A10 = 2.3939E−09, A12 = −8.1881E−12 |
| Second surface |
| k = −6.4715E−01, A4 = −6.6347E−04, A6 = −7.1704E−05, A8 = 3.0129E−07, A10 = −2.9675E−08, A12 = −6.5526E−09 |
| Third surface |
| k = 0, A4 = −1.2434E−04, A6 = −1.3208E−04, A8 = 1.5144E−05, A10 = −1.4119E−06, A12 = 4.4618E−08 |
| Fourth surface |
| k = 0, A4 = 1.3377E−03, A6 = −1.0639E−04, A8 = 7.3776E−06, A10 = −4.4391E−07, A12 = 1.3519E−08 |
| Sixth surface |
| k = 0, A4 = 2.2496E−03, A6 = −8.7137E−05, A8 = −2.1379E−05, A10 = 3.1947E−06, A12 = −2.0226E−07 |
| Seventh surface |
| k = 0, A4 = 5.3452E−03, A6 = −6.4185E−04, A8 = 4.3158E−05, A10 = −1.3533E−06, A12 = −2.9104E−08 |
| Eighth surface |
| k = 0, A4 = −2.1869E−03, A6 = −5.6179E−04, A8 = 8.4609E−05, A10 = −5.1024E−06, A12 = 8.9514E−08 |
| Ninth surface |
| k = 0, A4 = −8.0786E−03, A6 = 4.0900E−04, A8 = −1.0957E−05, A10 = −1.6979E−07, A12 = 5.2316E−09 |
| Tenth surface |
| k = 0, A4 = −1.1686E−03, A6 = 2.9919E−05, A8 = −5.9265E−07, A10 = 1.6249E−10, A12 = 4.9586E−10 |
| Eleventh surface |
| k = 0, A4 = 6.6352E−04, A6 = −8.7906E−06, A8 = 1.8748E−06, A10 = −1.3134E−07, A12 = 3.4329E−09 |

Figure 64:
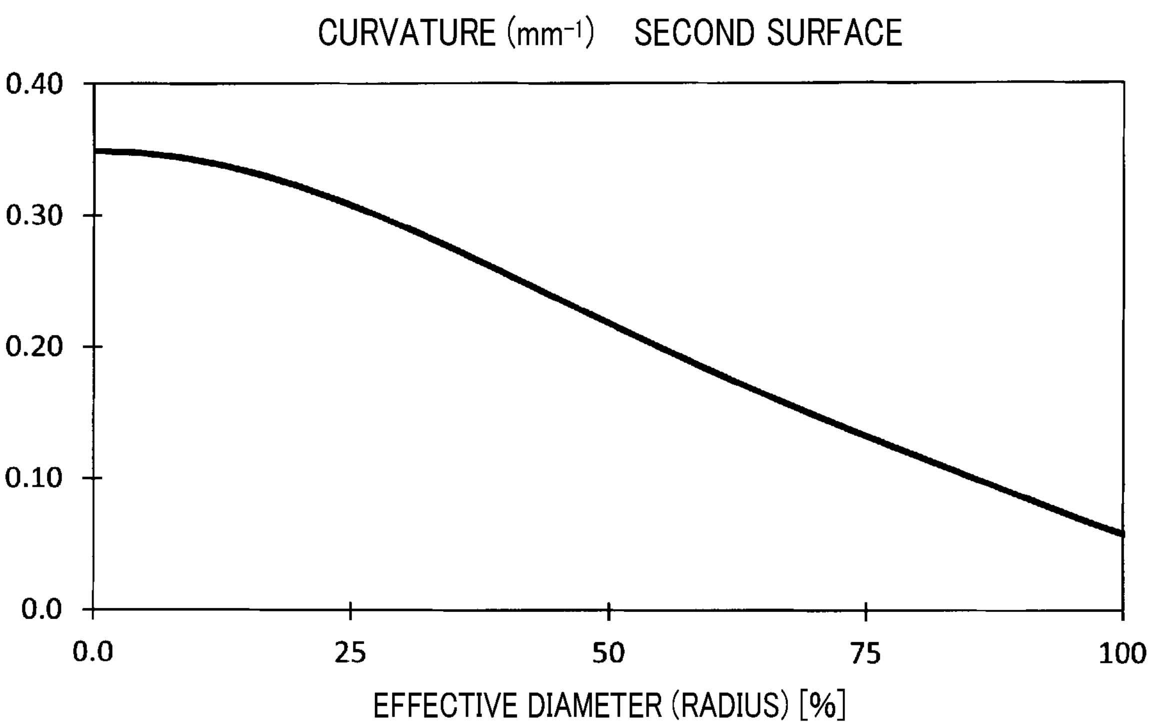
FIG. 64 is a graph illustrating how a curvature is radially changed from a center portion to a periphery of a second surface of the imaging optical system according to the eighth embodiment.
Figure 65:
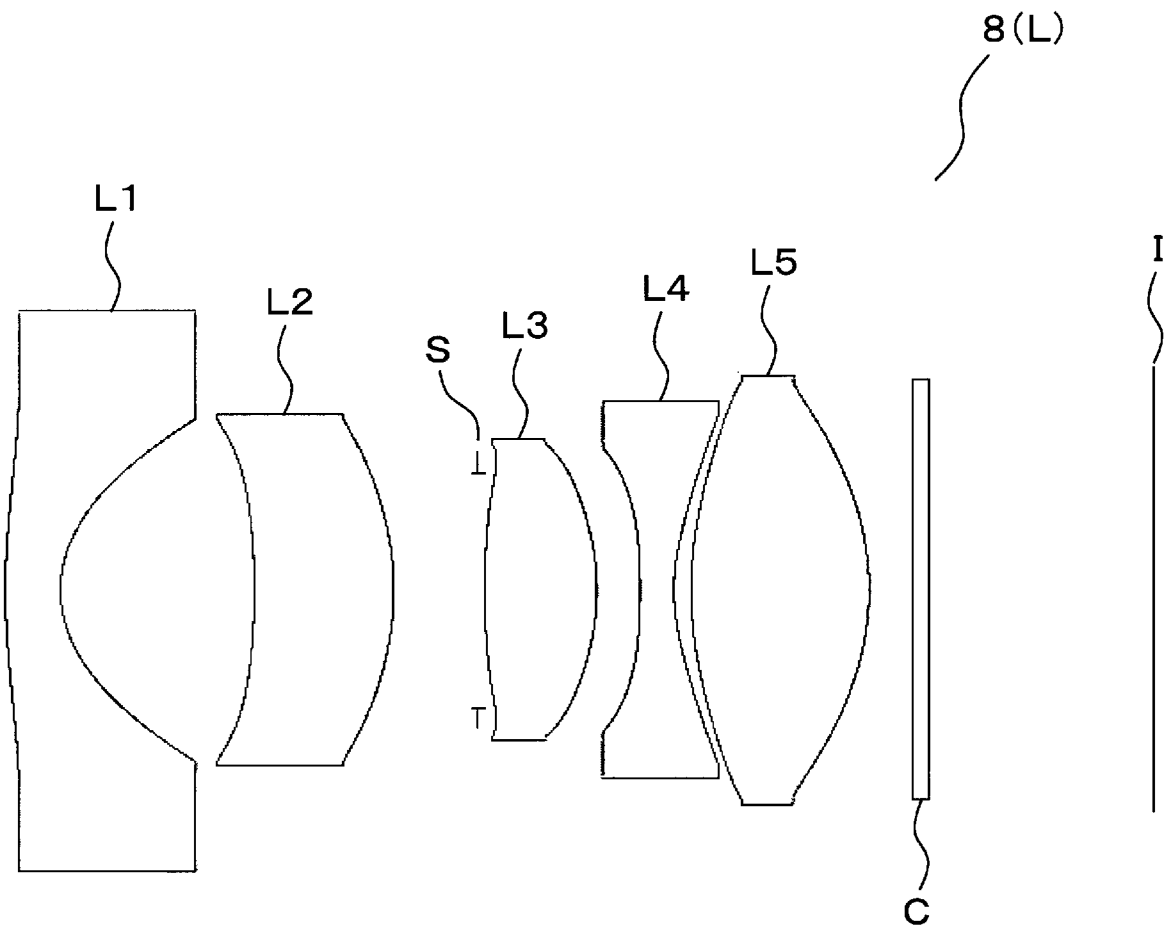
FIG. 65 is an optical diagram illustrating an imaging optical system according to a first modification of the eighth embodiment.
Figure 66:
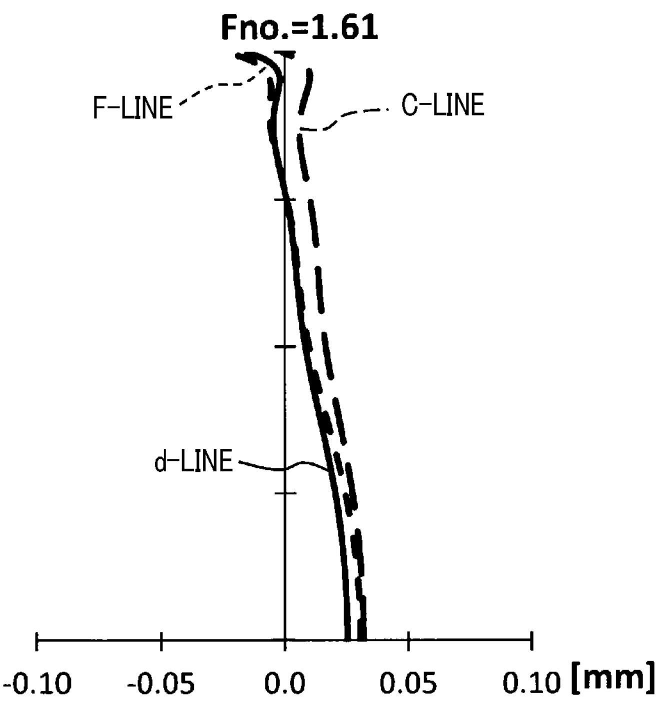
FIG. 66 is a graph illustrating spherical aberration in the imaging optical system according to the first modification of the eighth embodiment.
Figure 67:
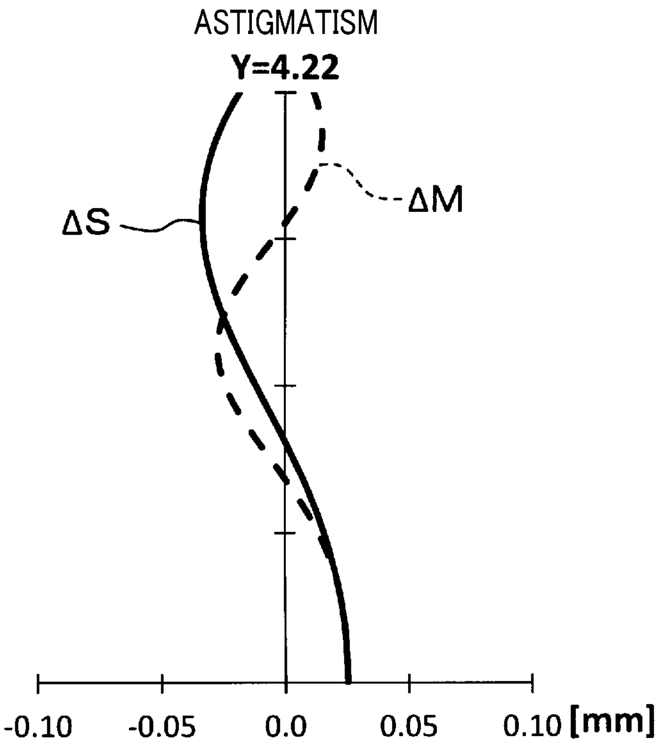
FIG. 67 is a graph illustrating astigmatism in the imaging optical system according to the first modification of the eighth embodiment.
Figure 68:
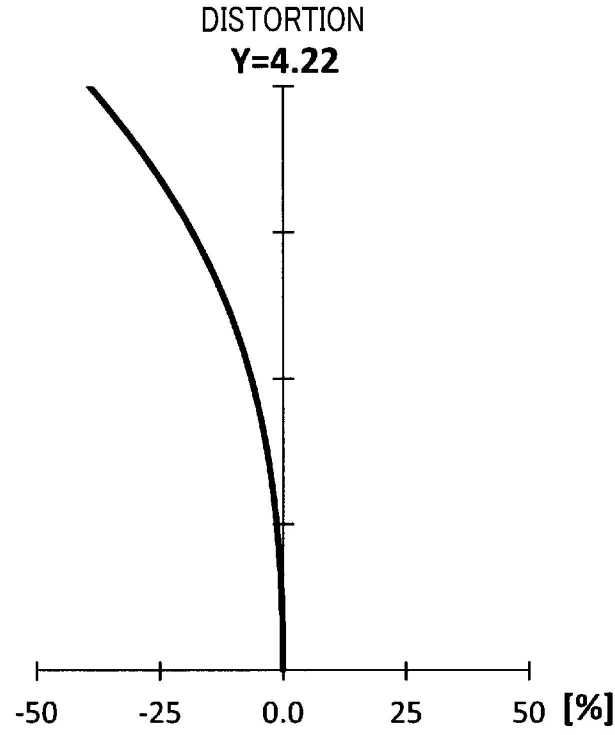
FIG. 68 is a graph illustrating distortion in the imaging optical system according to the first modification of the eighth embodiment.
Figure 69:
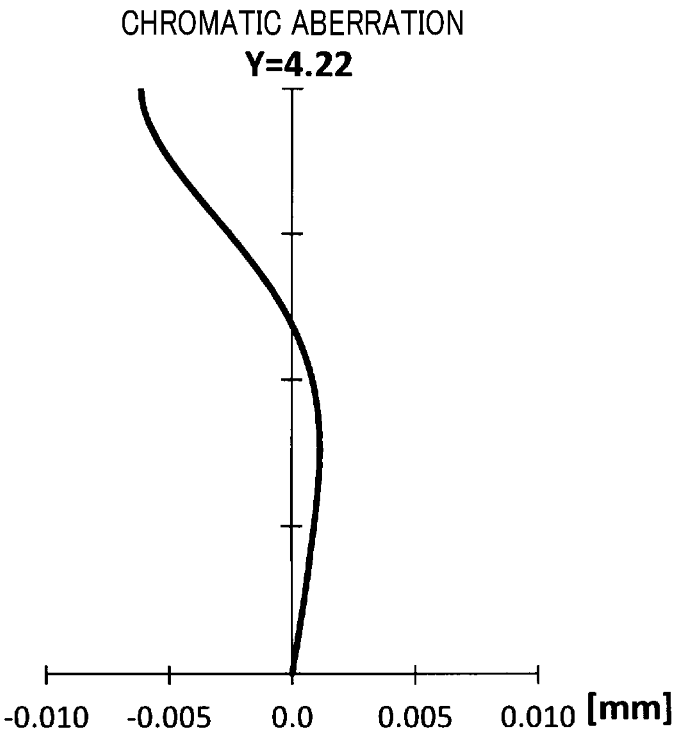
FIG. 69 is a graph illustrating chromatic aberration in the imaging optical system according to the first modification of the eighth embodiment.

FIG. 58 to FIG. 61 respectively illustrate the spherical aberration, the astigmatism, the distortion, and the chromatic aberration in the imaging optical system 8. FIG. 64 illustrates how the curvature is radially changed from the center portion to the periphery of the eighth surface (the light input surface of the fourth lens L4). FIG. 65 illustrates how the curvature is radially changed from the center portion to the periphery of the ninth surface (the light output surface of the fourth lens L4). FIG. 66 illustrates how the curvature is radially changed in from the center portion to the periphery of the ninth surface (the light output surface of the first lens L1).

The features of the eighth embodiment are substantially the same as those of the second embodiment.

First Modification Of Eighth Embodiment

FIG. 65 illustrates an imaging optical system 8L according to a first modification of the eighth embodiment. The imaging optical system 8L has the same configuration as that of the imaging optical system 8 except that the imaging optical system 8L is used under the ambient temperature of −40° C.

The imaging optical system 8L has predetermined specifications in which:

(I) A total focal length of the imaging optical system 8L is 4.012 mm
(II) An F-number of the imaging optical system 8L is 1.61
(III) A half angle of view is 60°
(IV) An image height is 4.22 mm
(V) A back focus is 6.436 mm
(VI) A total length of the imaging optical system 8L is 26.559 mm Next, Table XXV shows the surface data of the imaging optical system 8L using the same symbols as those of the first embodiment:

TABLE XXV

| SURFACE DATA | | | | | |
|---|---|---|---|---|---|
| Sn | r | d | Nd | Vd | E |
| 1* | 15.158 | 1.282 | 1.545 | 56.003 | 12.30 |
| 2* | 2.855 | 4.492 | | | 7.57 |
| 3* | −16.160 | 3.220 | 1.640 | 23.529 | 7.57 |
| 4* | −6.866 | 1.951 | | | 7.57 |
| 5(D) | ∞ | 0.151 | | | |
| 6* | 22.373 | 2.601 | 1.545 | 56.003 | 6.44 |
| 7* | −5.248 | 0.999 | | | 6.44 |
| 8* | −15.020 | 0.780 | 1.661 | 20.373 | 6.24 |
| 9* | 4.755 | 0.395 | | | 7.76 |
| 10* | 8.817 | 4.117 | 1.729 | 54.041 | 8.55 |
| 11* | −6.460 | 0.998 | | | 9.12 |
| 12 | ∞ | 0.400 | 1.517 | 64.167 | 9.50 |
| 13 | ∞ | 5.175 | | | 9.50 |

Next, Table XXVI shows the single lens data of the imaging optical system 8L.

TABLE XXVI

| SINGLE LENS DATA | |
|---|---|
| \|f1\|/f\| | 1.66 |
| \|f2\|/f\| | 4.05 |
| \|f4\|/f | 1.33 |
| $\|(dn/dT)_3\|$ | 95.97E−06 |
| $\|(dn/dT)_5\|$ | 2.69E−06 |
| d12/f | 1.12 |

The ratio |f1|/f satisfies the conditional expression (2), the ratio |f2|/f satisfies the conditional expression (4), and the |f4|/f satisfies the conditional expression (6). Additionally, the temperature coefficient $|(dn/dT)_3|$ does not satisfy the conditional expression (7), but the temperature coefficient $|(dn/dT)_5|$ satisfies the conditional expression (10).

Next, Table XXVII shows the aspherical data of the imaging optical system 8L using the same symbols as those of the first embodiment:

TABLE XXVII

| ASPHERICAL DATA |
|---|
| First surface |
| k = 0, A4 = −1.2713E−03, A6 = 2.3979E−05, A8 = −3.0645E−07, A10 = 2.4756E−09, A12 = −8.5308E−12 |
| Second surface |
| k = −6.4715E−01, A4 = −6.7093E−04, A6 = −7.3053E−05, A8 = 3.0925E−07, A10 = −3.0688E−08, A12 = −6.8268E−09 |
| Third surface |
| k = 0, A4 = −1.2594E−04, A6 = −1.3493E−04, A8 = 1.5603E−05, A10 = −1.4672E−06, A12 = 4.6763E−08 |
| Fourth surface |
| k = 0, A4 = 1.3549E−03, A6 = −1.0868E−04, A8 = 7.6014E−06, A10 = −4.6129E−07, A12 = 1.4169E−08 |
| Sixth surface |
| k = 0, A4 = 2.2749E−03, A6 = −8.8776E−05, A8 = −2.1944E−05, A10 = 3.3037E−06, A12 = −2.1072E−07 |
| Seventh surface |
| k = 0, A4 = 5.4053E−03, A6 = −6.5392E−04, A8 = 4.4299E−05, A10 = −1.3994E−06, A12 = −3.0322E−08 |
| Eighth surface |
| k = 0, A4 = −2.2151E−03, A6 = −5.7391E−04, A8 = 8.7175E−05, A10 = −5.3023E−06, A12 = 9.3817E−08 |
| Ninth surface |
| k = 0, A4 = −8.1827E−03, A6 = 4.1782E−04, A8 = −1.1289E−05, A10 = −1.7644E−07, A12 = 5.4831E−09 |
| Tenth surface |
| k = 0, A4 = −1.1698E−03, A6 = 2.9974E−05, A8 = −5.9417E−07, A10 = 1.6302E−10, A12 = 4.9787E−10 |
| Eleventh surface |
| k = 0, A4 = 6.6425E−04, A6 = −8.8067E−06, A8 = 1.8796E−06, A10 = −1.3177E−07, A12 = 3.4468E−09 |

Figure 70:
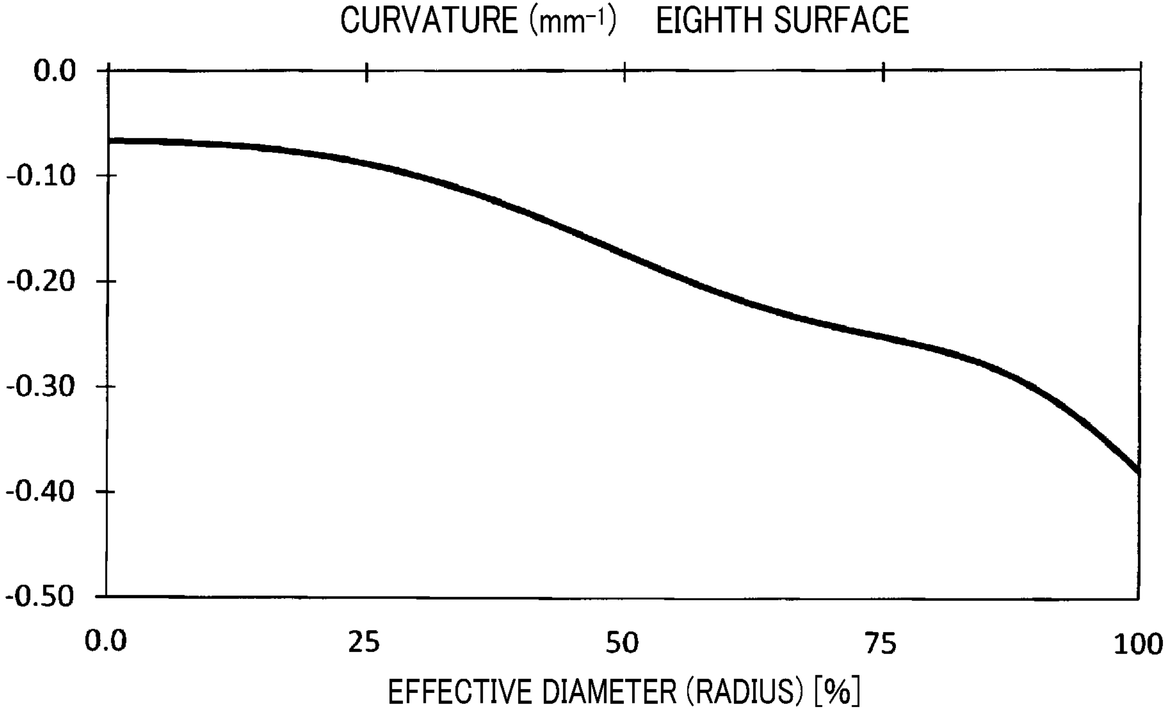
FIG. 70 is a graph illustrating how a curvature is radially changed from a center portion to a periphery of an eighth surface of the imaging optical system according to the first modification of the eighth embodiment.
Figure 71:
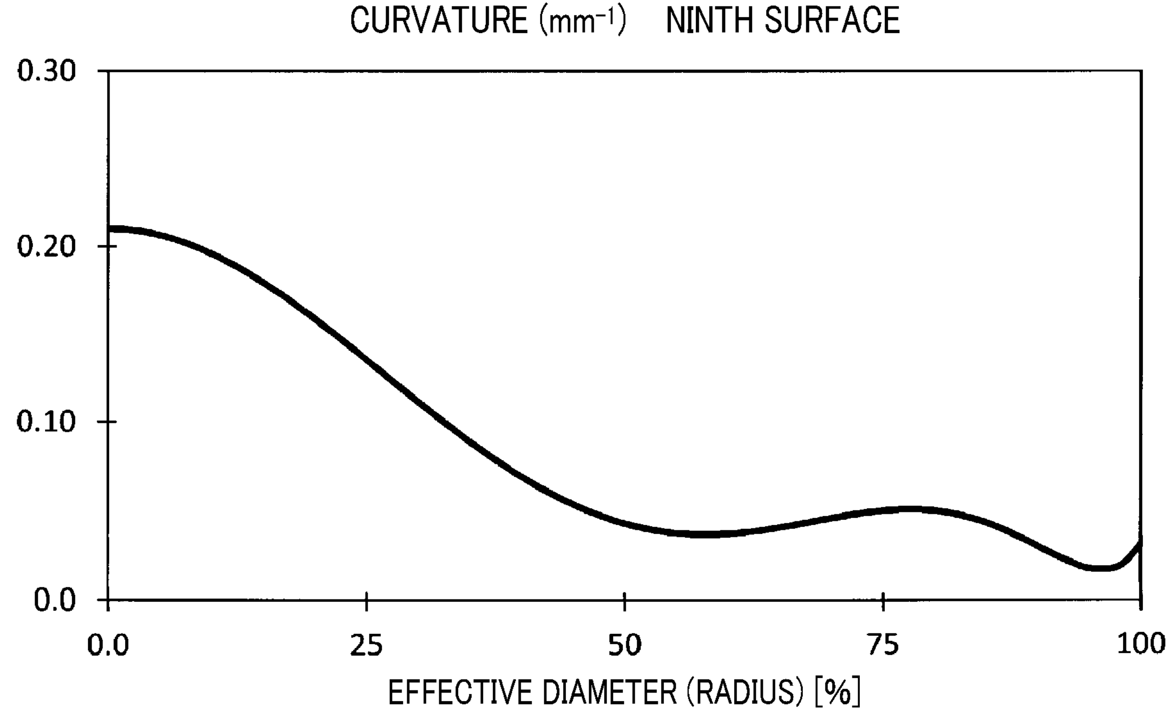
FIG. 71 is a graph illustrating how a curvature is radially changed from a center portion to a periphery of a ninth surface of the imaging optical system according to the first modification of the eighth embodiment.
Figure 72:
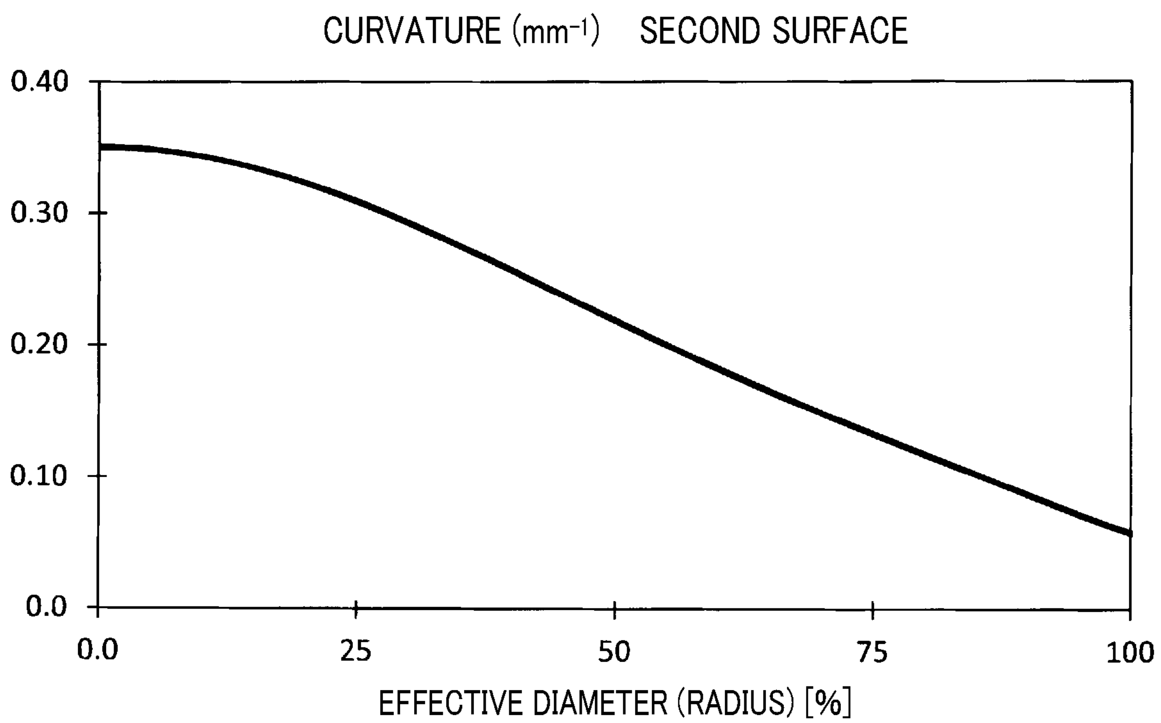
FIG. 72 is a graph illustrating how a curvature is radially changed from a center portion to a periphery of a second surface of the imaging optical system according to the first modification of the eighth embodiment.

FIG. 66 to FIG. 69 respectively illustrate the spherical aberration, the astigmatism, the distortion, and the chromatic aberration in the imaging optical system 8L. FIG. 70 illustrates how the curvature is radially changed from the center portion to the periphery of the eighth surface (the light input surface of the fourth lens L4). FIG. 71 illustrates how the curvature is radially changed from the center portion to the periphery of the ninth surface (the light output surface of the fourth lens L4). FIG. 72 illustrates how the curvature is radially changed in from the center portion to the periphery of the ninth surface (the light output surface of the first lens L1).

Second Modification of Eighth Embodiment

Figure 73:
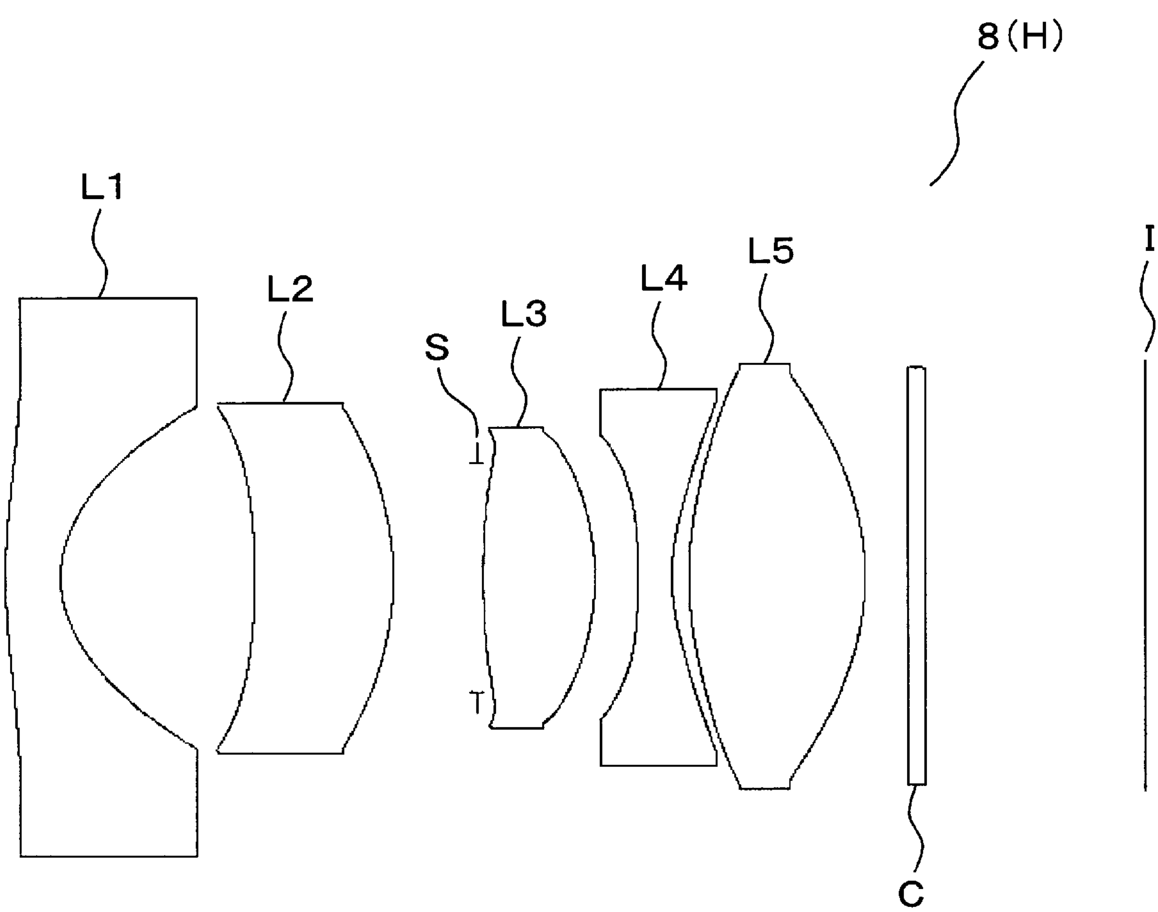
FIG. 73 is an optical diagram illustrating an imaging optical system according to a second modification of the eighth embodiment.
Figures 74, 75:
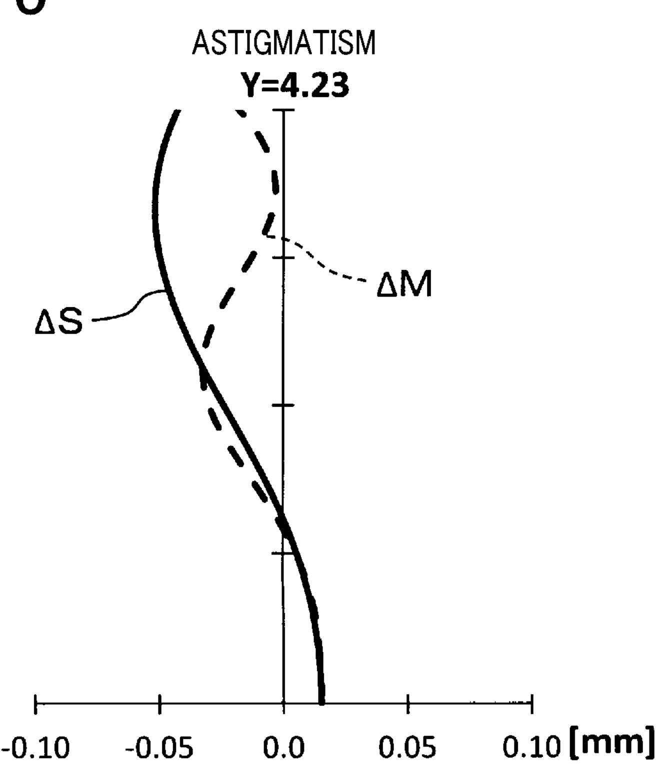
FIG. 74 is a graph illustrating spherical aberration in the imaging optical system according to the second modification of the eighth embodiment.
FIG. 75 is a graph illustrating astigmatism in the imaging optical system according to the second modification of the eighth embodiment.
Figure 76:
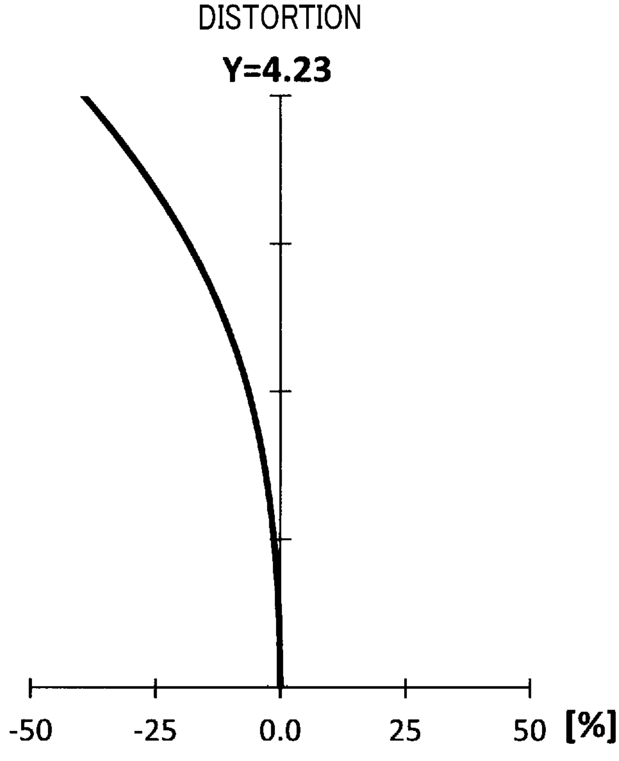
FIG. 76 is a graph illustrating distortion in the imaging optical system according to the second modification of the eighth embodiment.
Figure 77:
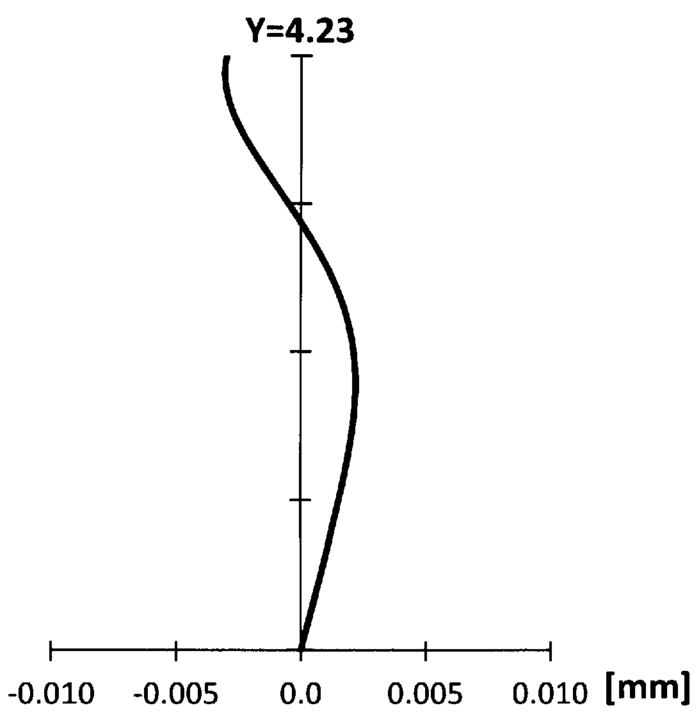
FIG. 77 is a graph illustrating chromatic aberration in the imaging optical system according to the second modification of the eighth embodiment.

FIG. 73 illustrates an imaging optical system 8H according to a second modification of the eighth embodiment. The imaging optical system 8H has the same configuration as that of the imaging optical system 8 except that the imaging optical system 8H is used under the ambient temperature of 105° C.

The imaging optical system 8H has predetermined specifications in which:

(I) A total focal length of the imaging optical system 8H is 4.021

(II) An F-number of the imaging optical system 8H is 1.61

(III) A half angle of view is 60°

(IV) An image height is 4.23 mm (V) A back focus is 6.456 mm (VI) A total length of the imaging optical system 8H is 26.706

Next, Table XXVIII shows the surface data of the imaging optical system 8H using the same symbols as those of the first embodiment:

TABLE XXVIII

SURFACE DATA

| Sn | r | d | Nd | Vd | E |
|---|---|---|---|---|---|
| 1* | 15.295 | 1.294 | 1.545 | 56.003 | 12.42 |
| 2* | 2.881 | 4.530 | | | 7.64 |
| 3* | −16.327 | 3.253 | 1.640 | 23.529 | 7.65 |
| 4* | −6.937 | 1.947 | | | 7.65 |
| 5(D) | ∞ | 0.151 | | | |
| 6* | 22.575 | 2.625 | 1.545 | 56.003 | 6.49 |
| 7* | −5.295 | 1.001 | | | 6.49 |
| 8* | −15.175 | 0.788 | 1.661 | 20.373 | 6.31 |
| 9* | 4.804 | 0.406 | | | 7.84 |
| 10* | 8.825 | 4.120 | 1.729 | 54.041 | 8.55 |
| 11* | −6.466 | 1.003 | | | 9.12 |
| 12 | ∞ | 0.400 | 1.517 | 64.167 | 9.51 |
| 13 | ∞ | 5.189 | | | 9.51 |

Next, Table XXIX shows the single lens data of the imaging optical system 8H.

TABLE XXIX

SINGLE LENS DATA

| | |
|---|---|
| \|f1\|/f\| | 1.71 |
| \|f2\|/f\| | 4.20 |
| \|f4\|/f | 1.37 |
| \|(dn/dT)3\| | 95.97E−06 |
| \|(dn/dT)5\| | 2.69E−06 |
| d12/f | 1.13 |

The ratio |f1|/f satisfies the conditional expression (2), the ratio |f2|/f satisfies the conditional expression (4), and the |f4|/f satisfies the conditional expression (6). Additionally, the temperature coefficient $|(dn/dT)_3|$ does not satisfy the conditional expression (7), but the temperature coefficient $|(dn/dT)_5|$ satisfies the conditional expression (10).

Next, Table XXX shows the aspherical data of the imaging optical system 8L using the same symbols as those of the first embodiment:

TABLE XXX

| ASPHERICAL DATA |
|---|
| First surface |
| k = 0, A4= −1.2375E−03, A6 = 2.2926E−05, A8 = −2.8777E−07, A10 = 2.2833E−09, A12 = −7.7281E−12 |
| Second surface |
| k = −6.4715E−01, A4 = −6.5309E−04, A6 = −6.9844E−05, A8 = 2.9041E−07, A10 = −2.8304E−08, A12 = −6.1845E−09 |
| Third surface |
| k = 0, A4 = −1.2212E−04, A6 = −1.2817E−04, A8 = 1.4519E−05, A10 = −1.3375E−06, A12 = 4.1760E−08 |
| Fourth surface |
| k = 0, A4 = 1.3137E−03, A6 = −1.0324E−04, A8 = 7.0733E−06, A10 = −4.2051E−07, A12 = 1.2653E−08 |

TABLE XXX-continued

| ASPHERICAL DATA |
|---|
| Sixth surface |
| k = 0, A4 = 2.2144E−03, A6 = −8.4877E−05, A8 = −2.0607E−05, A10 = 3.0471E−06, A12 = −1.9090E−07 |
| Seventh surface |
| k = 0, A4 = 5.2616E−03, A6 = −6.2520E−04, A8 = 4.1599E−05, A10 = −1.2907E−06, A12 = −2.7469E−08 |
| Eighth surface |
| k = 0, A4 = −2.1478E−03, A6 = −5.4514E−04, A8 = 8.1119E−05, A10 = −4.8335E−06, A12 = 8.3781E−08 |
| Ninth surface |
| k = 0, A4 = −7.9341E−03, A6 = 3.9688E−04, A8 = −1.0505E−05, A10 = −1.6084E−07, A12 = 4.8966E−09 |
| Tenth surface |
| k = 0, A4 = −1.1667E−03, A6 = 2.9842E−05, A8 = −5.9050E−07, A10 = 1.6173E−10, A12 = 4.9304E−10 |
| Eleventh surface |
| k = 0, A4 = 6.6249E−04, A6 = −8.7679E−06, A8 = 1.8680E−06, A10 = −1.3073E−07, A12 = 3.4134E−09 |

Figure 78:
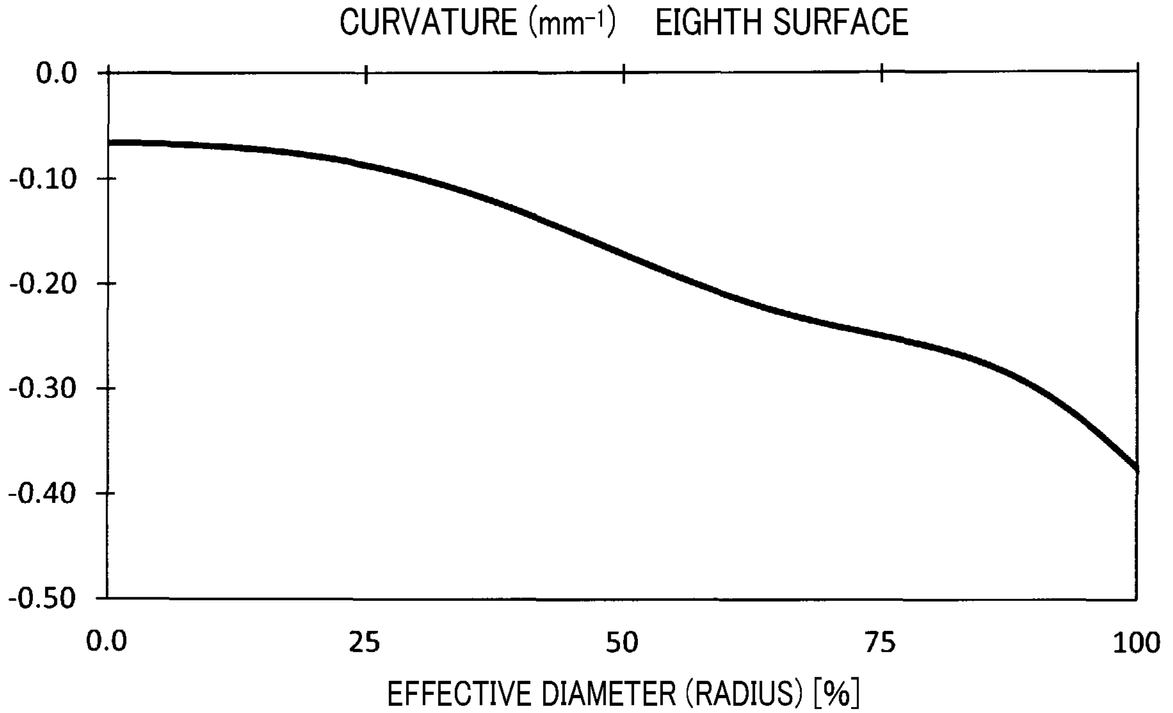
FIG. 78 is a graph illustrating how a curvature is radially changed from a center portion to a periphery of an eighth surface of the imaging optical system according to the second modification of the eighth embodiment.
Figure 79:
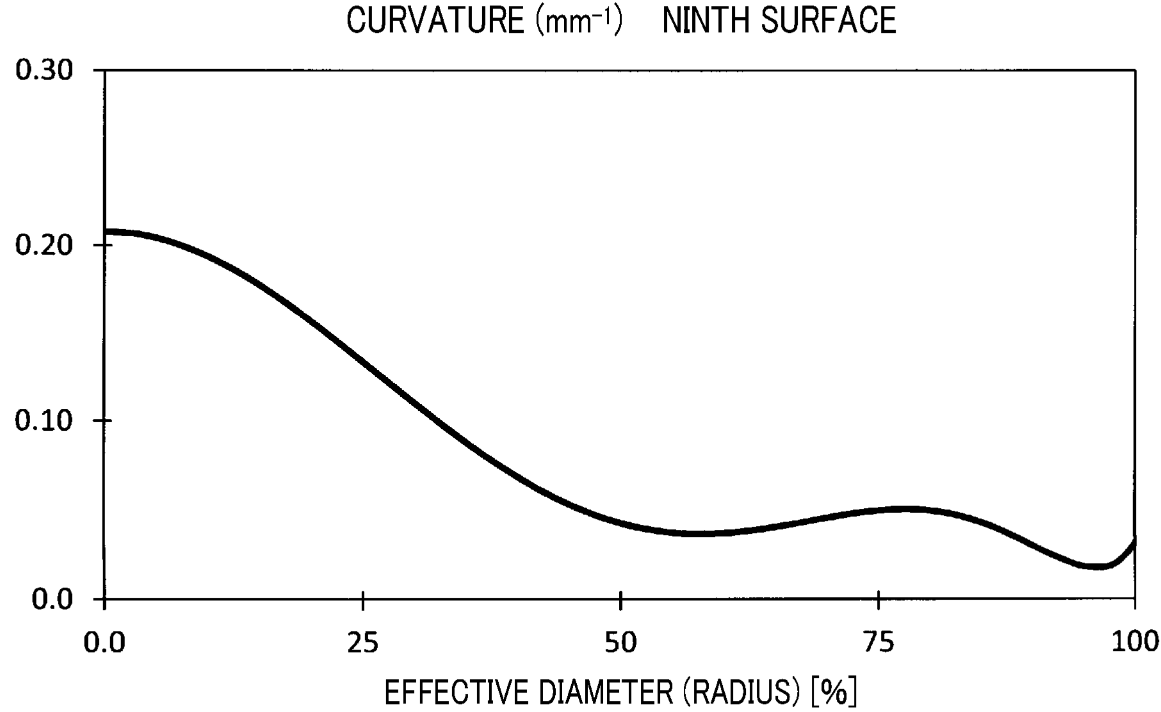
FIG. 79 is a graph illustrating how a curvature is radially changed from a center portion to a periphery of a ninth surface of the imaging optical system according to the second modification of the eighth embodiment.
Figure 80:
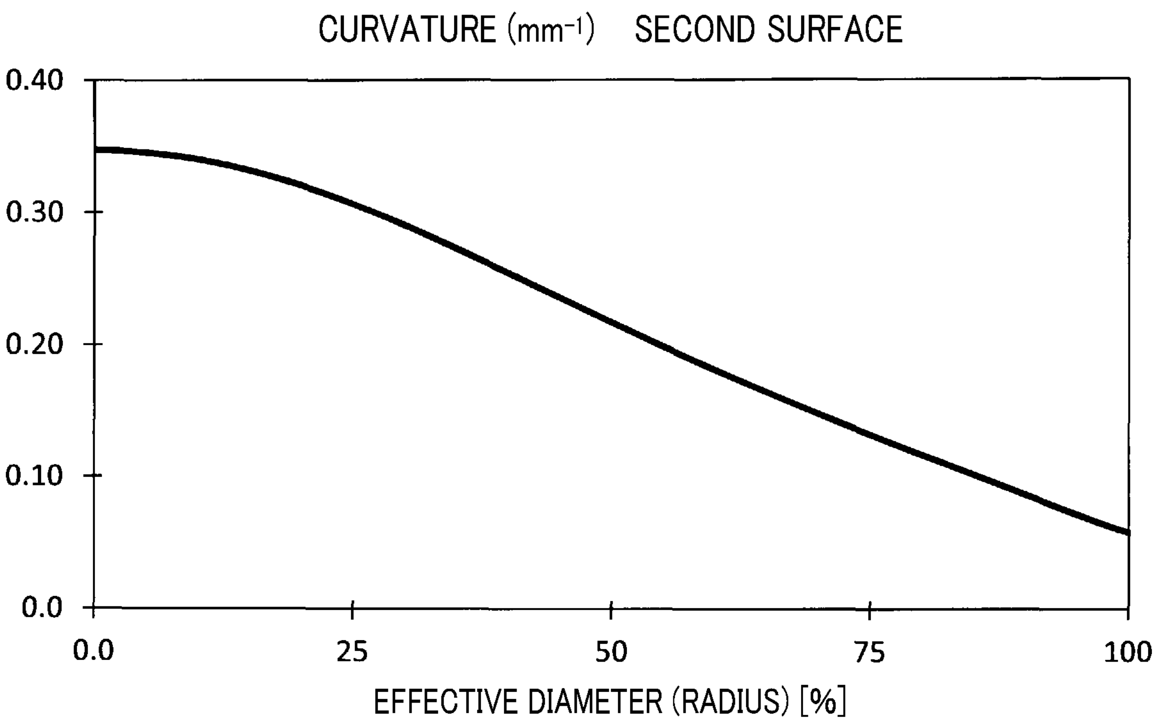
FIG. 80 is a graph illustrating how a curvature is radially changed from a center portion to a periphery of a second surface of the imaging optical system according to the second modification of the eighth embodiment.

FIG. 74 to FIG. 77 respectively illustrate the spherical aberration, the astigmatism, the distortion, and the chromatic aberration in the imaging optical system 8H. FIG. 78 illustrates how the curvature is radially changed from the center portion to the periphery of the eighth surface (the light input surface of the fourth lens L4). FIG. 79 illustrates how the curvature is radially changed from the center portion to the periphery of the ninth surface (the light output surface of the fourth lens L4). FIG. 80 illustrates how the curvature is radially changed in from the center portion to the periphery of the ninth surface (the light output surface of the first lens L1).

As described above, each of the imaging optical systems 8, 8L, and 8H, which is configured such that only one glass lens is used and the temperature coefficient $|(dn/dT)_5|$ of the fifth lens L5 at least satisfies the conditional expression (10), enables little change of its optical performance even if the ambient temperature changes between −40° C. to +105° C., making it possible to deliver superior temperature characteristics.

Ninth Embodiment

Figure 81:
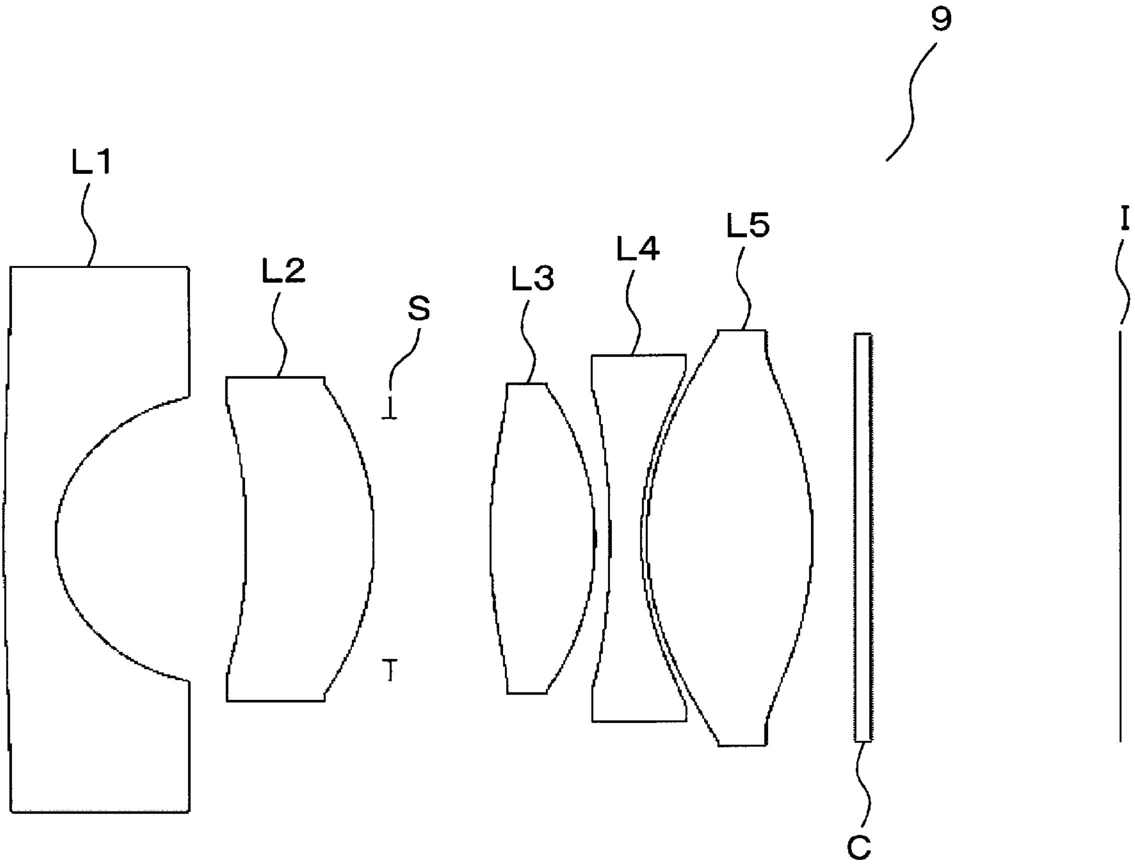
FIG. 81 is an optical diagram illustrating an imaging optical system according to the ninth embodiment.
Figures 82, 83:
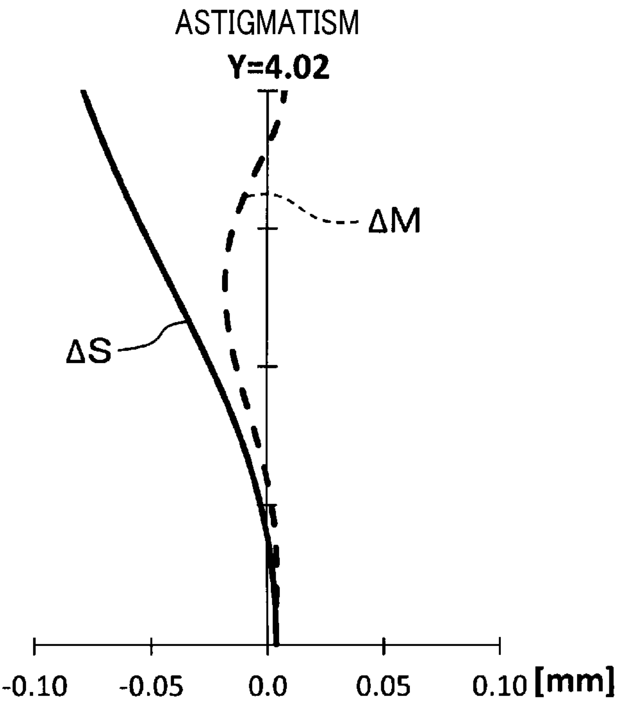
FIG. 82 is a graph illustrating spherical aberration in the imaging optical system according to the ninth embodiment.
FIG. 83 is a graph illustrating astigmatism in the imaging optical system according to the ninth embodiment.
Figure 84:
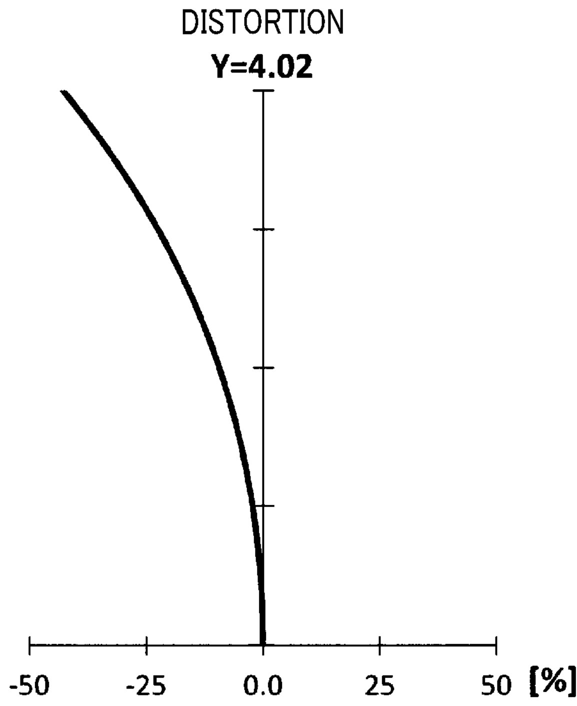
FIG. 84 is a graph illustrating distortion in the imaging optical system according to the ninth embodiment.
Figure 85:
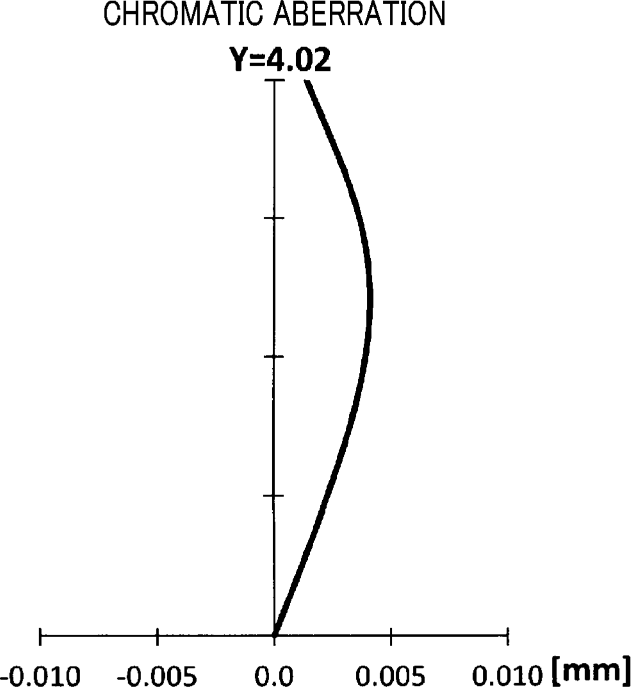
FIG. 85 is a graph illustrating chromatic aberration in the imaging optical system according to the ninth embodiment.

FIG. 81 illustrates an imaging optical system 9 according to the ninth embodiment.

The imaging optical system 9 has predetermined specifications in which:

(I) A total focal length of the imaging optical system 9 is 4.056 mm (II) An F-number of the imaging optical system 9 is 1.60

(III) A half angle of view is 60°

(IV) An image height is 4.02 mm (V) A back focus is 7.217 mm (VI) A total length of the imaging optical system 9 is 26.669 mm Next, Table XXXI shows the surface data of the imaging optical system 9 using the same symbols as those of the first embodiment:

TABLE XXXI

SURFACE DATA

| Sn | r | d | Nd | Vd | E |
|---|---|---|---|---|---|
| 1* | 62.790 | 1.234 | 1.545 | 56.003 | 12.35 |
| 2* | 3.044 | 4.570 | | | 6.46 |
| 3* | −14.213 | 3.057 | 1.640 | 23.529 | 6.65 |
| 4* | −6.786 | 0.366 | | | 7.03 |
| 5(D) | ∞ | 2.389 | | | |
| 6* | 12.691 | 2.498 | 1.545 | 56.003 | 6.84 |
| 7* | −6.343 | 0.363 | | | 6.84 |
| 8* | −18.158 | 0.741 | 1.661 | 20.373 | 6.84 |
| 9* | 7.465 | 0.126 | | | 7.79 |
| 10* | 6.826 | 3.970 | 1.729 | 54.041 | 8.55 |
| 11* | −8.111 | 1.000 | | | 8.55 |
| 12 | ∞ | 0.400 | 1.517 | 64.167 | 9.50 |
| 13 | ∞ | 5.953 | | | 9.50 |

Next, Table XXXI shows the single lens data of the imaging optical system 9.

TABLE XXXII

| SINGLE LENS DATA | |
|---|---|
| $\lvert f1\rvert/\lvert f\rvert$ | 1.46 |
| $\lvert f2\rvert/\lvert f\rvert$ | 4.31 |
| $\lvert f4\rvert/f$ | 1.95 |
| $\lvert(dn/dT)_3\rvert$ | 3.37E−06 |
| $\lvert(dn/dT)_5\rvert$ | 95.97E−06 |
| d12/f | 1.13 |

The ratio $|f\mathbf{1}|/f$ satisfies the conditional expression (1), the ratio $|f\mathbf{2}|/f$ satisfies the conditional expression (4), and the $|f\mathbf{4}|/f$ satisfies the conditional expression (5). Additionally, the temperature coefficient $|(dn/dT)_3|$ satisfies the conditional expression (7), but the temperature coefficient $|(dn/dT)_5|$ does not satisfy the conditional expression (9).

Next, Table XXXIII shows the aspherical data of the imaging optical system 9 using the same symbols as those of the first embodiment:

TABLE XXXIII

| ASPHERICAL DATA |
|---|
| First surface |
| k = 0, A4 = −2.3460E−05, A6 = −7.2892E−06, A8 = 2.4714E−07, A10 = −3.4696E−09, A12 = 1.6649E−11 |
| Second surface |
| k = −2.7937E−01, A4 = 6.2627E−05, A6 = −5.6284E−05, A8 = 6.9258E−06, A10 = −1.1017E−06, A12 = 3.5792E−08 |
| Third surface |
| k = 0, A4 = −8.6192E−04, A6 = −3.7998E−05, A8 = 1.1386E−05, A10 = −1.2583E−06, A12 = 7.3999E−08 |
| Fourth surface |
| k = 0, A4 = −1.0240E−04, A6 = −2.6869E−05, A8 = 4.3624E−06, A10 = −3.0724E−07, A12 = 1.0837E−08 |
| Sixth surface |
| k = 0, A4 = −2.5954E−04, A6 = −1.0938E−05, A8 = −4.0320E−07, A10 = −2.7673E−08, A12 = −4.6972E−09 |
| Seventh surface |
| k = 0, A4 = 4.8869E−04, A6 = 5.4095E−06, A8 = −5.9860E−07, A10 = −4.9166E−08, A12 = −2.3986E−09 |
| Eighth surface |
| k = 0, A4 = −1.1122E−04, A6 = −4.6616E−06, A8 = −2.8878E−07, A10 = −2.3409E−08, A12 = 1.0840E−09 |

TABLE XXXIII-continued

| ASPHERICAL DATA |
|---|
| Ninth surface |
| k = −4.7424E−01, A4 = 1.5236E−05, A6= −1.5664E−05, A8 = −1.1597E−07, A10 = −4.0332E−09, A12 = −1.6574E−09 |
| Tenth surface |
| k = 0, A4 = −5.4181E−04, A6 = −1.6143E−05, A8 = 2.0435E−06, A10 = −1.1142E−07, A12 = 1.6845E−09 |
| Eleventh surface |
| k = 0, A4 = 3.2078E−04, A6 = 5.7416E−07, A8 = 3.5488E−07, A10 = 1.8972E−08, A12 = 1.9940E−10 |

Figure 86:
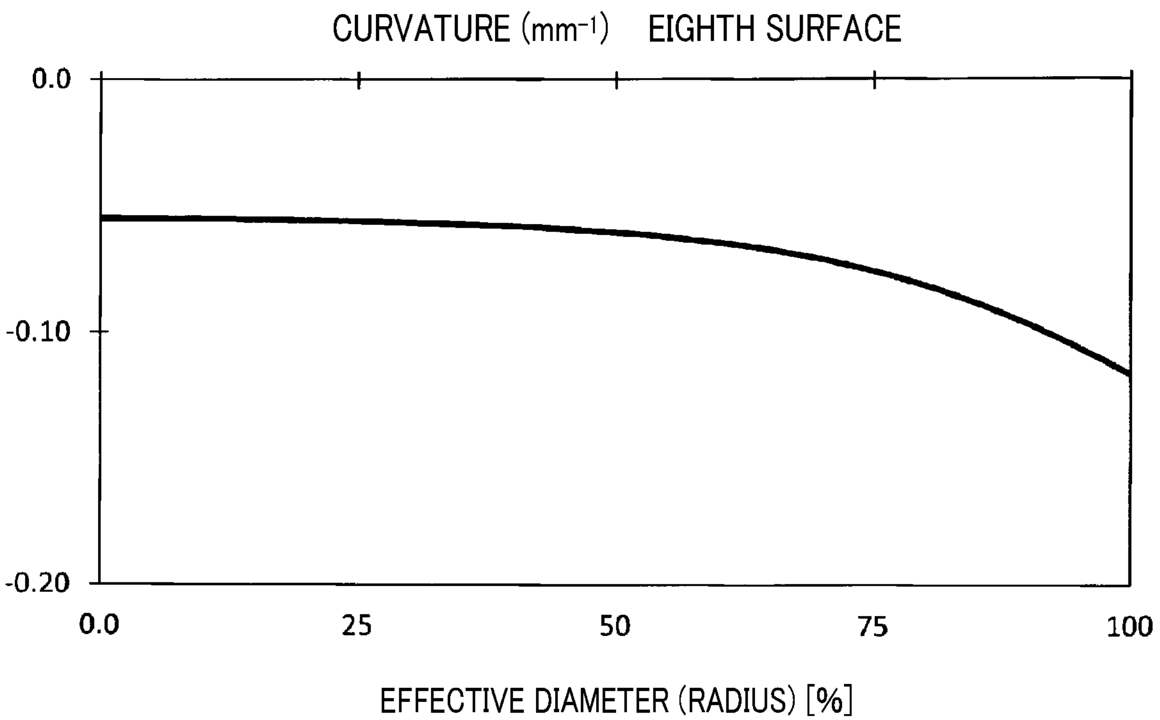
FIG. 86 is a graph illustrating how a curvature is radially changed from a center portion to a periphery of an eighth surface of the imaging optical system according to the ninth embodiment.
Figure 87:
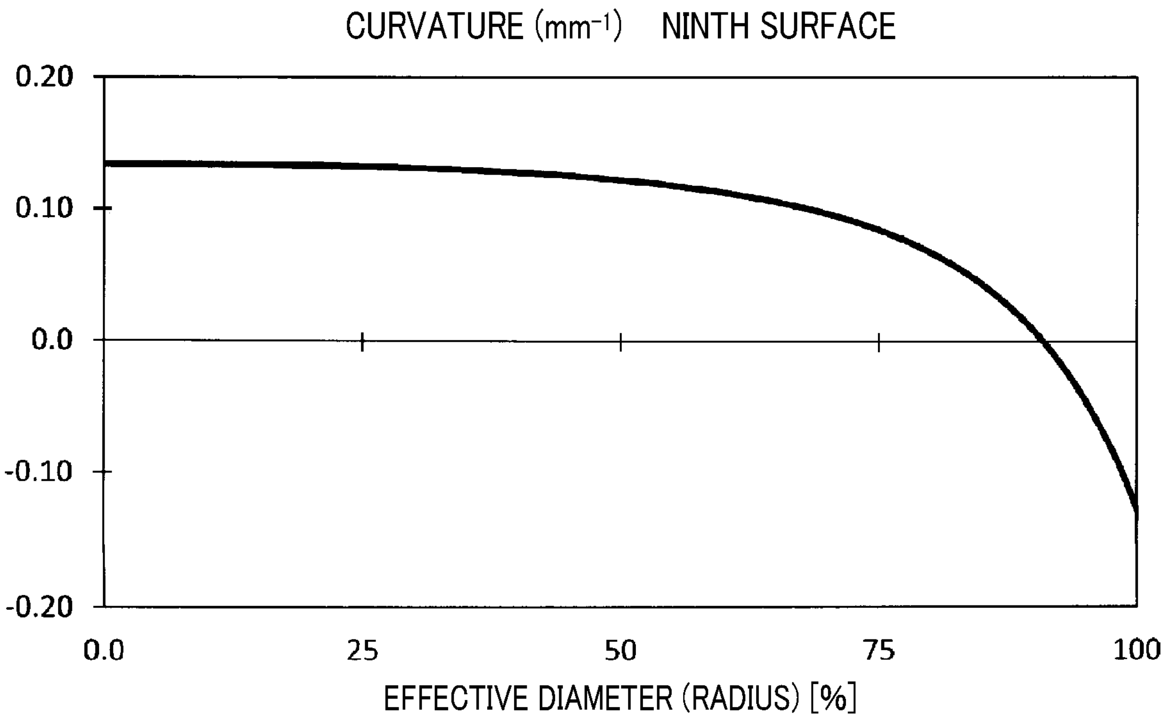
FIG. 87 is a graph illustrating how a curvature is radially changed from a center portion to a periphery of a ninth surface of the imaging optical system according to the ninth embodiment.
Figure 88:
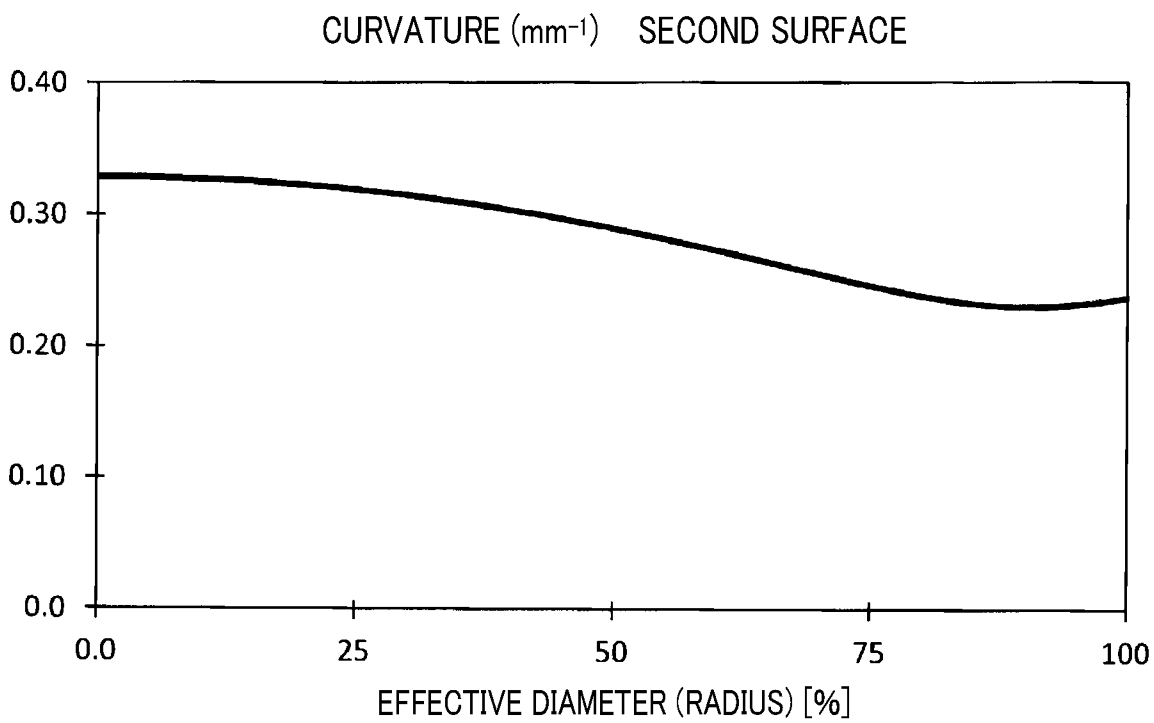
FIG. 88 is a graph illustrating how a curvature is radially changed from a center portion to a periphery of a second surface of the imaging optical system according to the ninth embodiment.

FIG. 82 to FIG. 85 respectively illustrate the spherical aberration, the astigmatism, the distortion, and the chromatic aberration in the imaging optical system 9. FIG. 86 illustrates how the curvature is radially changed from the center portion to the periphery of the eighth surface (the light input surface of the fourth lens L4). FIG. 87 illustrates how the curvature is radially changed from the center portion to the periphery of the ninth surface (the light output surface of the fourth lens L4). FIG. 88 illustrates how the curvature is radially changed in from the center portion to the periphery of the ninth surface (the light output surface of the first lens L1).

The features of the ninth embodiment are substantially the same as those of the eighth embodiment except that (1) The change curve of the curvature of the light output surface of the fourth lens L4 has no inflection points (2) The temperature coefficient $|(dn/dT)_3|$ satisfies the conditional expression (8)

(3) The temperature coefficient $|(dn/dT)_5|$ does not satisfy the conditional expression (9).

First Modification of Ninth Embodiment

Figure 89:
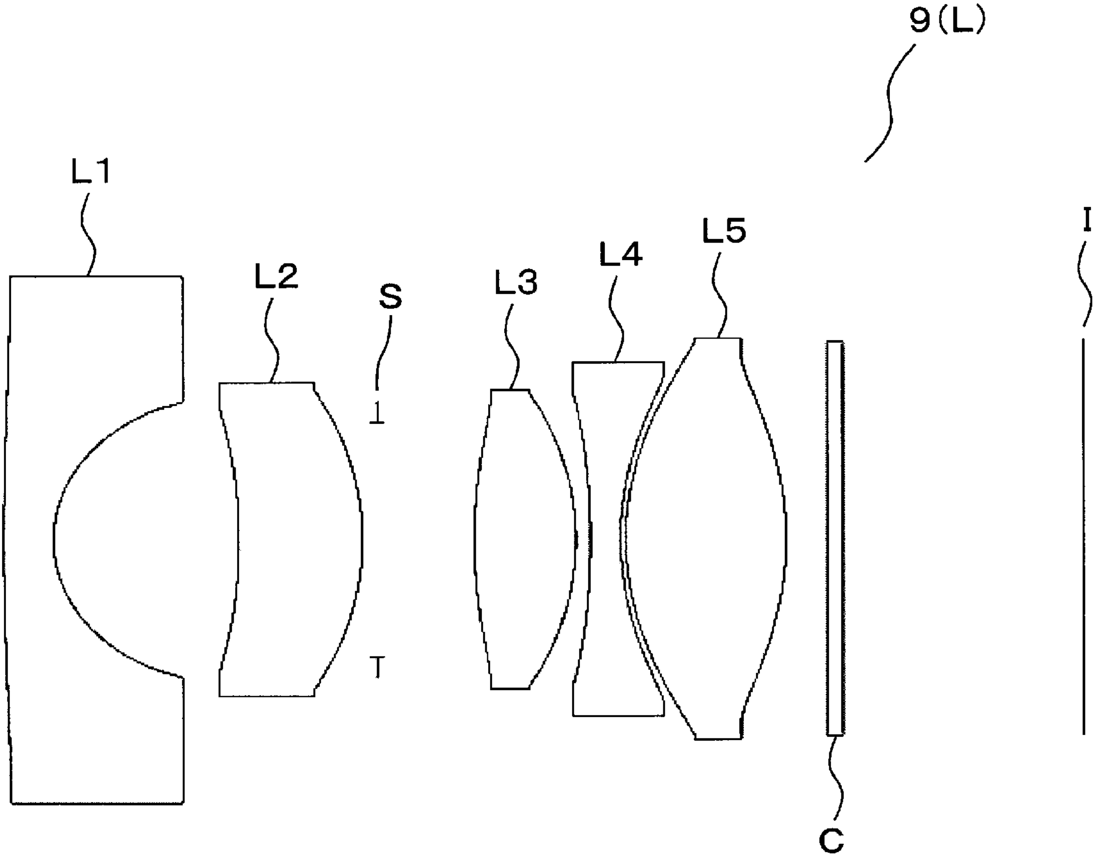
FIG. 89 is an optical diagram illustrating an imaging optical system according to a first modification of the ninth embodiment.
Figure 90:
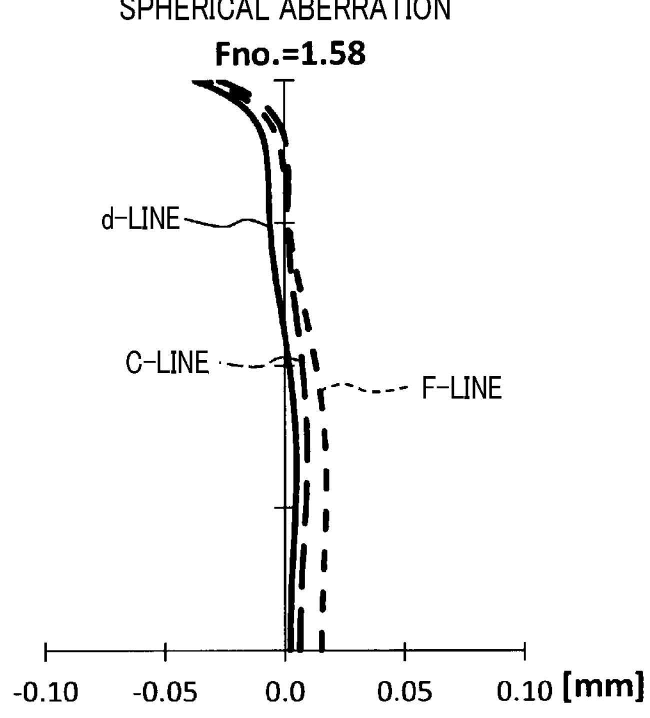
FIG. 90 is a graph illustrating spherical aberration in the imaging optical system according to the first modification of the ninth embodiment.
Figure 91:
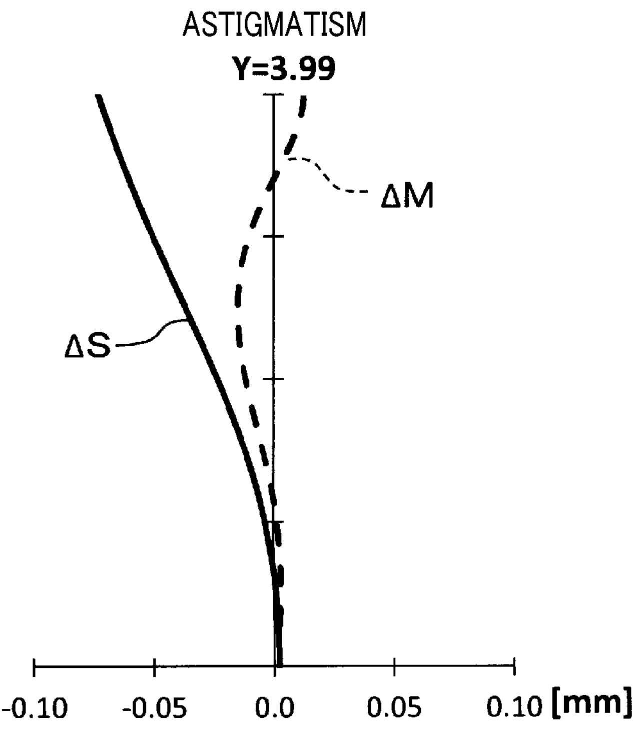
FIG. 91 is a graph illustrating astigmatism in the imaging optical system according to the first modification of the ninth embodiment.
Figure 92:
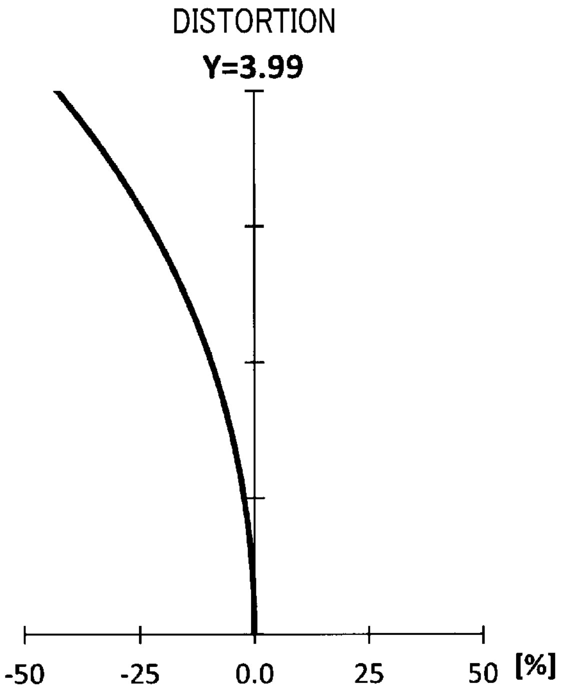
FIG. 92 is a graph illustrating distortion in the imaging optical system according to the first modification of the ninth embodiment.
Figure 93:
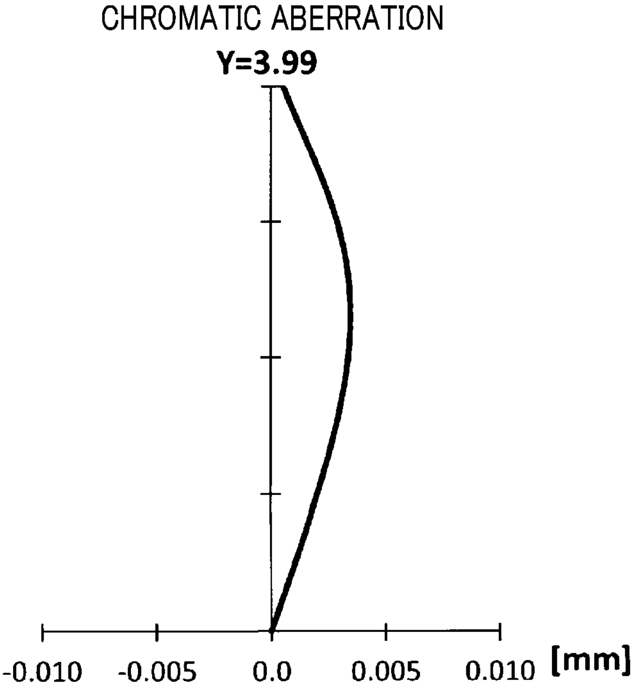
FIG. 93 is a graph illustrating chromatic aberration in the imaging optical system according to the first modification of the ninth embodiment.

FIG. 89 illustrates an imaging optical system 9L according to a first modification of the ninth embodiment. The imaging optical system 9L has the same configuration as that of the imaging optical system 9 except that the imaging optical system 9L is used under the ambient temperature of −40° C.

The imaging optical system 9L has predetermined specifications in which:

(I) A total focal length of the imaging optical system 9L is 4.020 mm (II) An F-number of the imaging optical system 9L is 1.58

(III) A half angle of view is 60°

(IV) An image height is 3.99 mm (V) A back focus is 7.212 mm (VI) A total length of the imaging optical system 9L is 26.611 mm Next, Table XXXIV shows the surface data of the imaging optical system 9L using the same symbols as those of the first embodiment:

TABLE XXXIV

SURFACE DATA

| Sn | r | d | Nd | Vd | E |
|---|---|---|---|---|---|
| 1* | 62.556 | 1.230 | 1.545 | 56.003 | 12.30 |
| 2* | 3.033 | 4.556 | | | 6.44 |
| 3* | −14.152 | 3.044 | 1.640 | 23.529 | 6.62 |
| 4* | −6.757 | 0.369 | | | 7.00 |
| 5(D) | ∞ | 2.387 | | | |
| 6* | 12.684 | 2.497 | 1.545 | 56.003 | 6.84 |
| 7* | −6.340 | 0.361 | | | 6.84 |
| 8* | −18.081 | 0.738 | 1.661 | 20.373 | 6.81 |
| 9* | 7.433 | 0.127 | | | 7.76 |
| 10* | 6.801 | 3.955 | 1.729 | 54.041 | 8.52 |
| 11* | −8.081 | 1.002 | | | 8.52 |
| 12 | ∞ | 0.400 | 1.517 | 64.167 | 9.50 |
| 13 | ∞ | 5.947 | | | 9.50 |

Next, Table XXXII shows the single lens data of the imaging optical system 9L.

TABLE XXXV

| SINGLE LENS DATA | |
|---|---|
| \|f1\|/f\| | 1.45 |
| \|f2\|/f\| | 4.29 |
| \|f4\|/f | 1.94 |
| \|(dn/dT)3\| | 3.3E−06 |
| \|(dn/dT)5\| | 95.97E−06 |
| d12/f | 1.13 |

The ratio |f1|/f satisfies the conditional expression (1), the ratio |f2|/f satisfies the conditional expression (4), and the |f4|/f satisfies the conditional expression (5). Additionally, the temperature coefficient $|(dn/dT)_3|$ satisfies the conditional expression (8), but the temperature coefficient $|(dn/dT)_5|$ does not satisfy the conditional expression (9).

Next, Table XXXVI shows the aspherical data of the imaging optical system 9L using the same symbols as those of the first embodiment:

TABLE XXXVI

| ASPHERICAL DATA |
|---|
| First surface |
| k = 0, A4 = −2.3724E−05, A6 = −7.4263E−06, A8 = 2.5367E−07, A10 = −3.5879E−09, A12 = 1.7346E−11 |
| Second surface |
| k = −2.7937E−01, A4 = 6.3332E−05, A6 = −5.7342E−05, A8 = 7.1088E−06, A10 = −1.1393E−06, A12 = 3.7290E−08 |
| Third surface |
| k = 0, A4 = −8.7303E−04, A6 = −3.8817E−05, A8 = 1.1731E−05, A10 = −1.3076E−06, A12 = 7.7556E−08 |
| Fourth surface |
| k = 0, A4 = −1.0372E−04, A6 = −2.7449E−05, A8 = 4.4948E−06, A10 = −3.1927E−07, A12 = 1.1358E−08 |
| Sixth surface |
| k = 0, A4 = −2.5995E−04, A6 = −1.0967E−05, A8 = −4.0471E−07, A10 = −2.7806E−08, A12 = −4.7249E−09 |
| Seventh surface |
| k = 0, A4 = 4.8948E−04, A6 = 5.4239E−06, A8 = −6.0084E−07, A10 = −4.9402E−08, A12 = −2.4127E−09 |
| Eighth surface |
| k = 0, A4 = −1.1265E−04, A6 = −4.7622E−06, A8 = −2.9754E−07, A10 = −2.4326E−08, A12 = 1.1361E−09 |
| Ninth surface |
| k = −4.7424E−01, A4 = 1.5433E−05, A6 = −1.6002E−05, A8 = −1.1949E−07, A10 = −4.1912E−09, A12 = −1.7371E−09 |

TABLE XXXVI-continued

| ASPHERICAL DATA |
|---|
| Tenth surface |
| k = 0, A4 = −5.4790E−04, A6 = −1.6447E−05, A8 = 2.0975E−06, A10= −1.1522E−07, A12 = 1.7549E−09 |
| Eleventh surface |
| k = 0, A4 = 3.2439E−04, A6 = 5.8496E−07, A8 = 3.6426E−07, A10 = 1.9619E−08, A12 = 2.0775E−10 |

Figure 94:
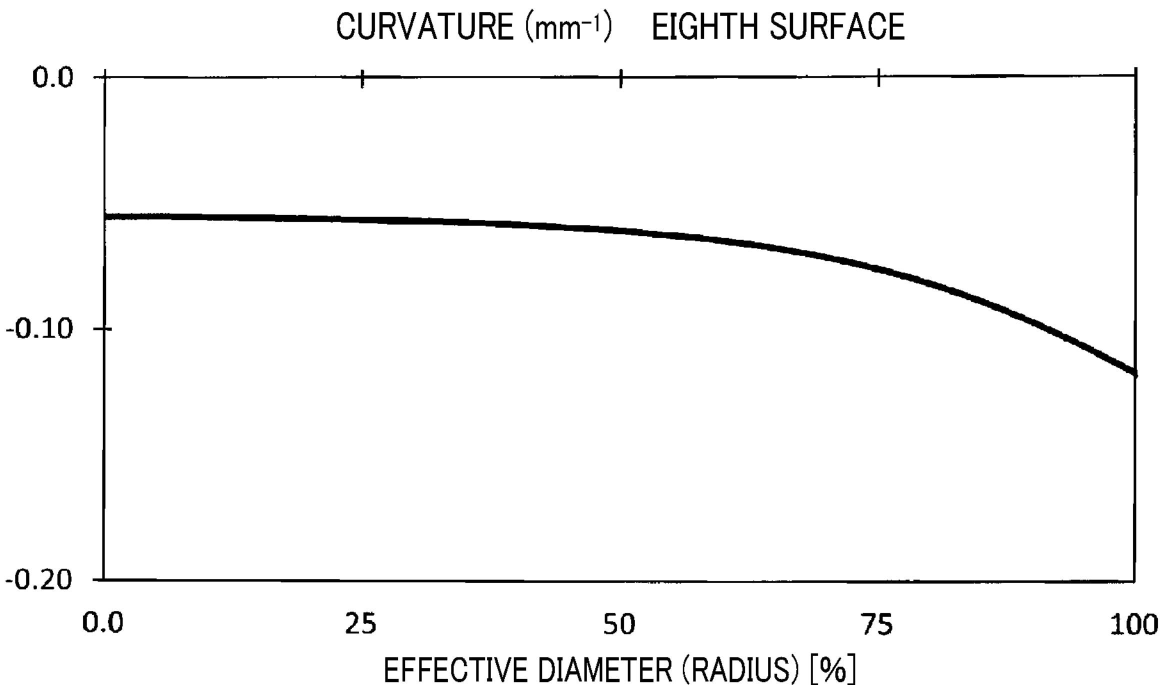
FIG. 94 is a graph illustrating how a curvature is radially changed from a center portion to a periphery of an eighth surface of the imaging optical system according to the first modification of the ninth embodiment.
Figure 95:
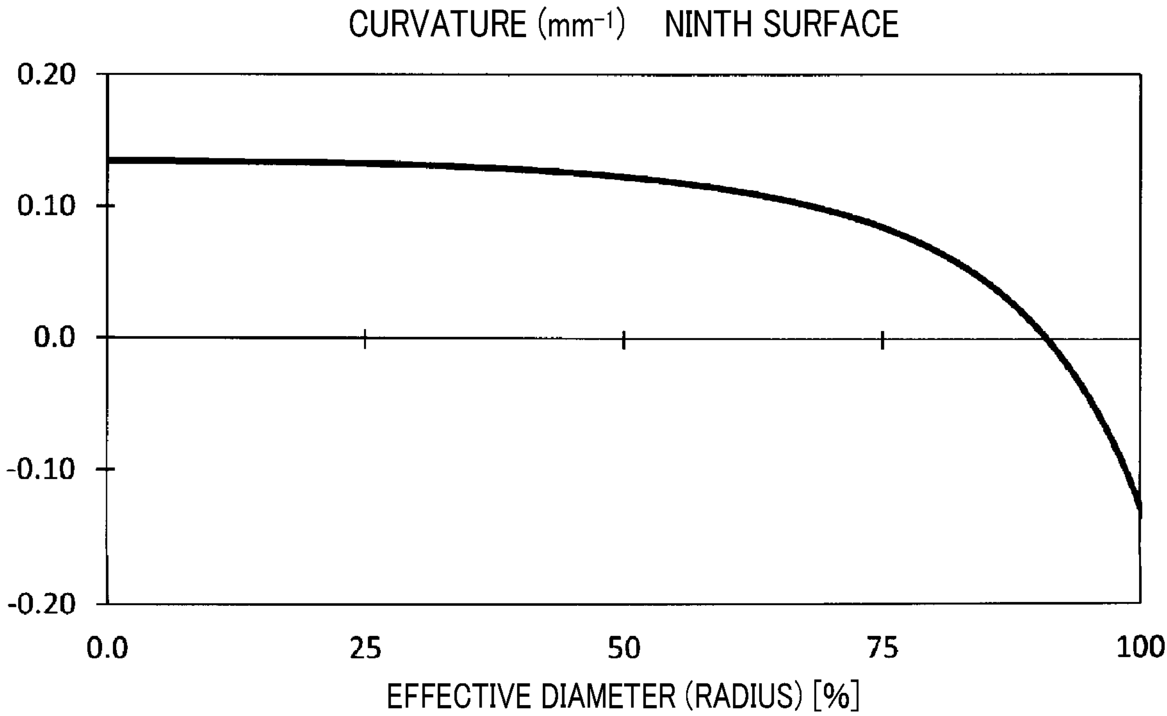
FIG. 95 is a graph illustrating how a curvature is radially changed from a center portion to a periphery of a ninth surface of the imaging optical system according to the first modification of the ninth embodiment.
Figure 96:
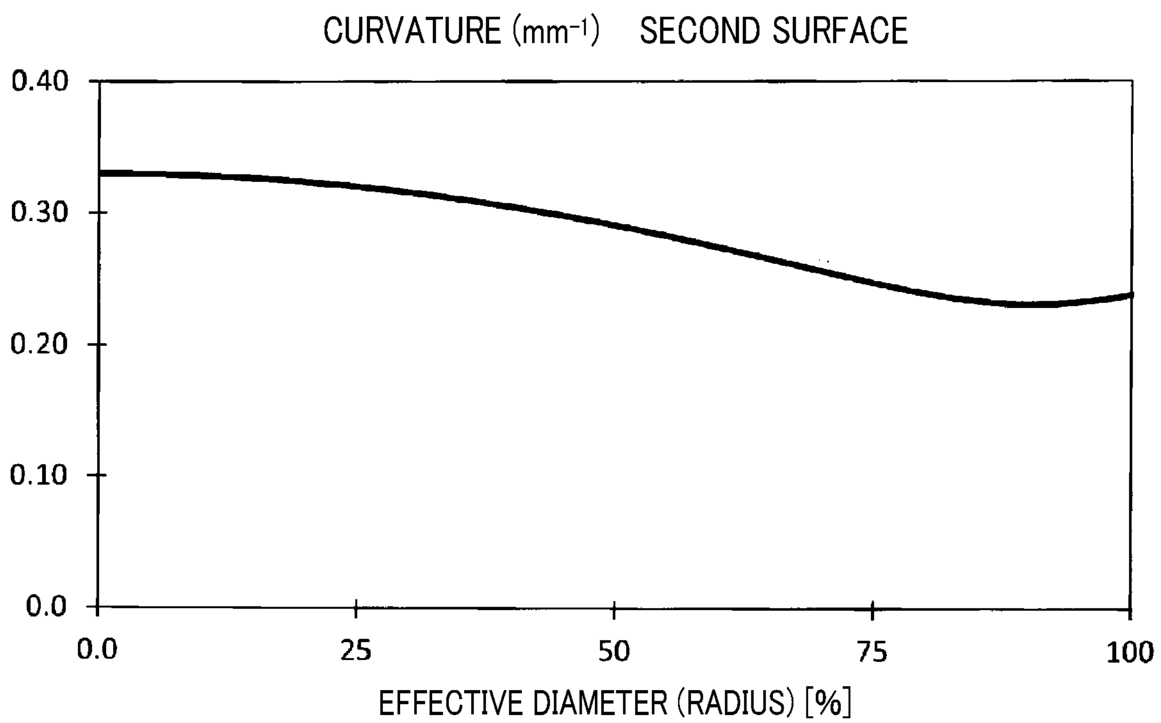
FIG. 96 is a graph illustrating how a curvature is radially changed from a center portion to a periphery of a second surface of the imaging optical system according to the first modification of the ninth embodiment.

FIG. 90 to FIG. 93 respectively illustrate the spherical aberration, the astigmatism, the distortion, and the chromatic aberration in the imaging optical system 9L. FIG. 94 illustrates how the curvature is radially changed from the center portion to the periphery of the eighth surface (the light input surface of the fourth lens L4). FIG. 95 illustrates how the curvature is radially changed from the center portion to the periphery of the ninth surface (the light output surface of the fourth lens L4). FIG. 96 illustrates how the curvature is radially changed in from the center portion to the periphery of the ninth surface (the light output surface of the first lens L1).

Second Modification Of Ninth Embodiment

Figure 97:
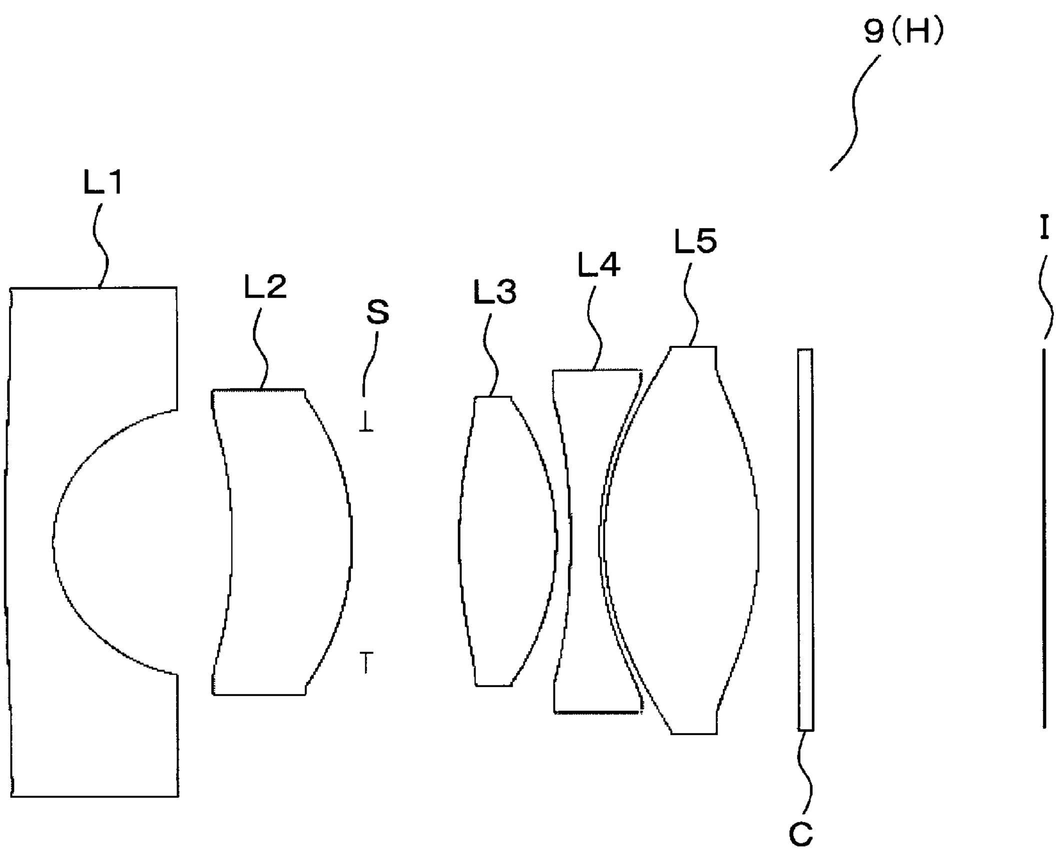
FIG. 97 is an optical diagram illustrating an imaging optical system according to a second modification of the ninth embodiment.
Figure 98:
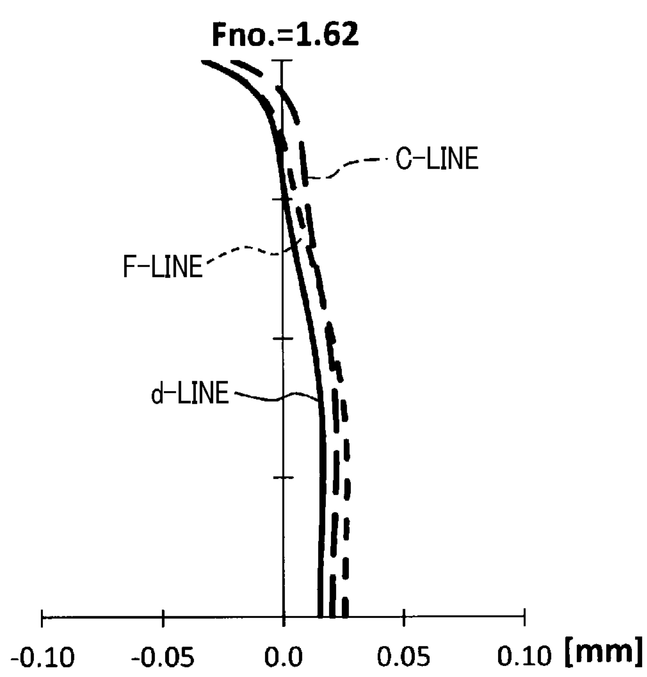
FIG. 98 is a graph illustrating spherical aberration in the imaging optical system according to the second modification of the ninth embodiment.
Figure 99:
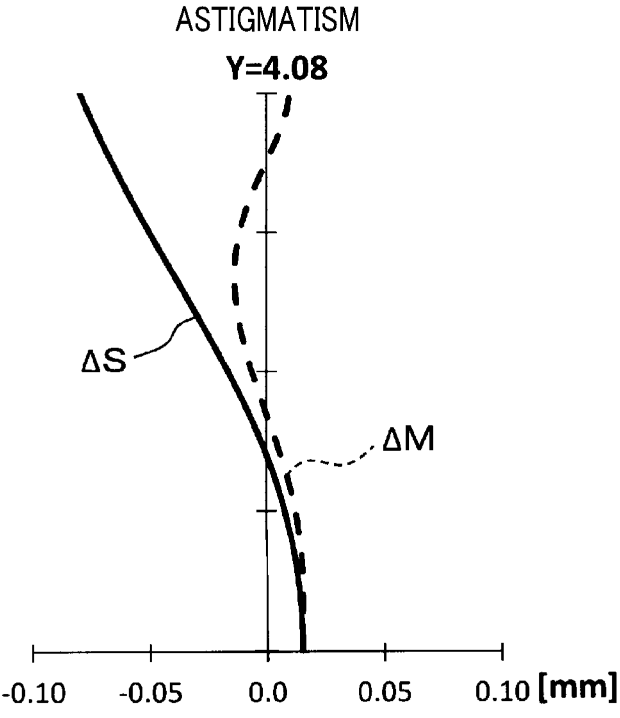
FIG. 99 is a graph illustrating astigmatism in the imaging optical system according to the second modification of the ninth embodiment.
Figure 100:
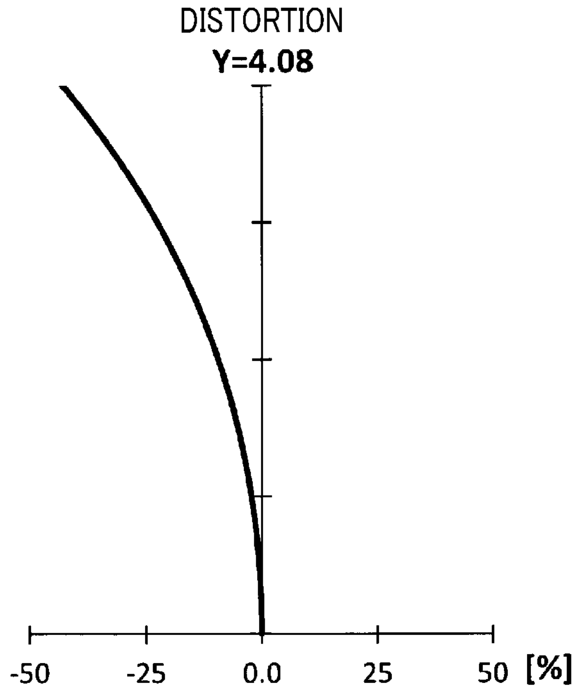
FIG. 100 is a graph illustrating distortion in the imaging optical system according to the second modification of the ninth embodiment.
Figure 101:
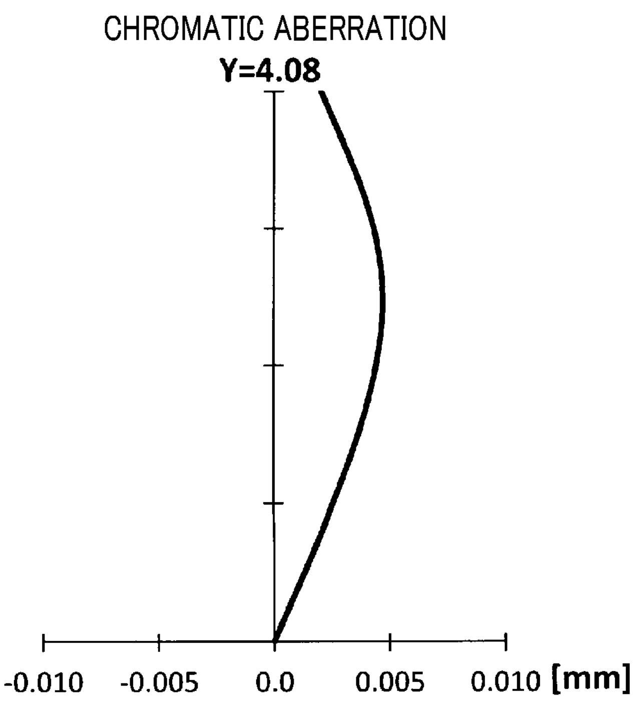
FIG. 101 is a graph illustrating chromatic aberration in the imaging optical system according to the second modification of the ninth embodiment.
Figure 102:
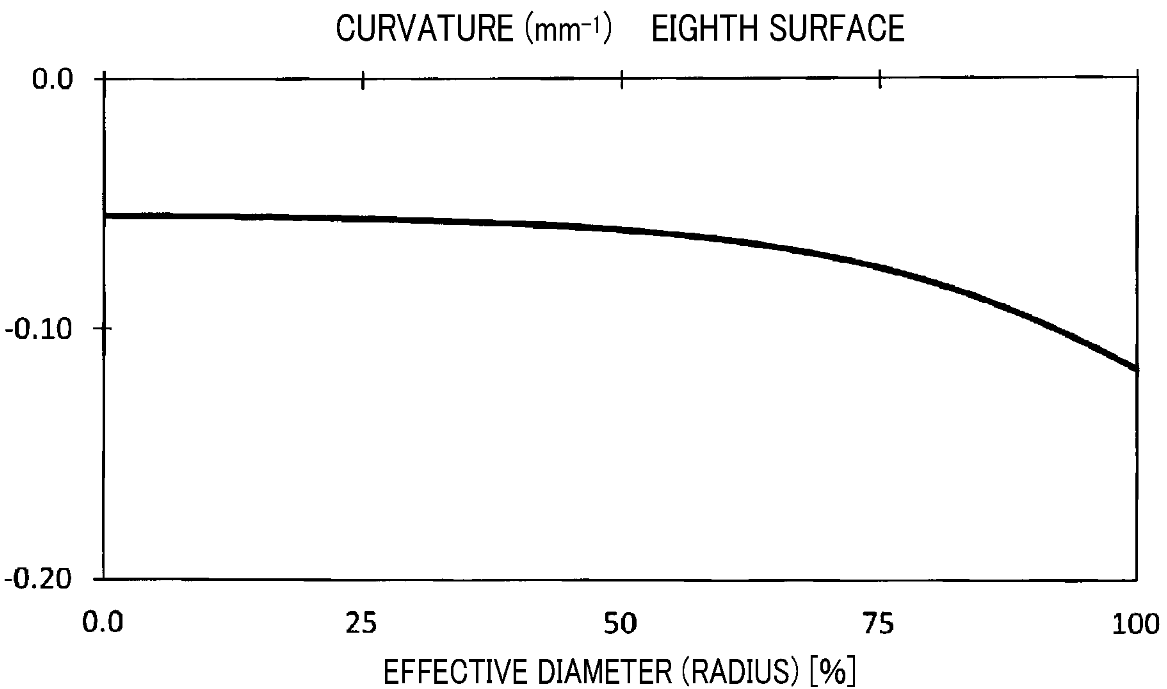
FIG. 102 is a graph illustrating how a curvature is radially changed from a center portion to a periphery of an eighth surface of the imaging optical system according to the second modification of the ninth embodiment.
Figure 103:
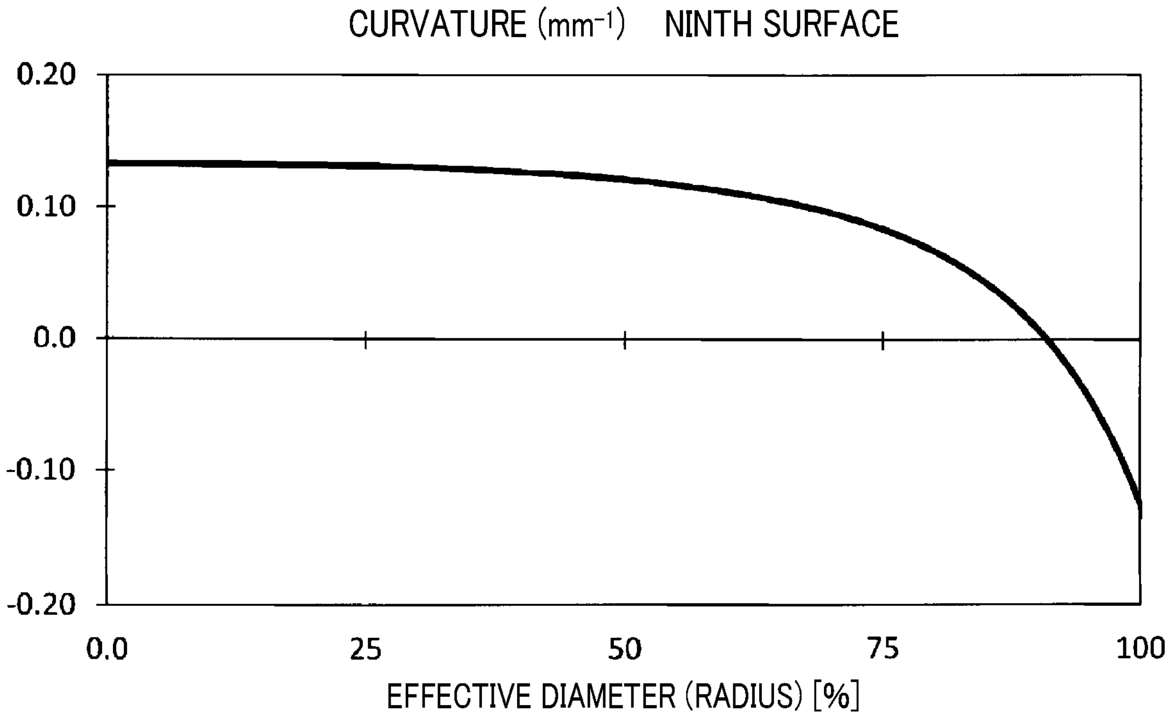
FIG. 103 is a graph illustrating how a curvature is radially changed from a center portion to a periphery of a ninth surface of the imaging optical system according to the second modification of the ninth embodiment.
Figure 104:
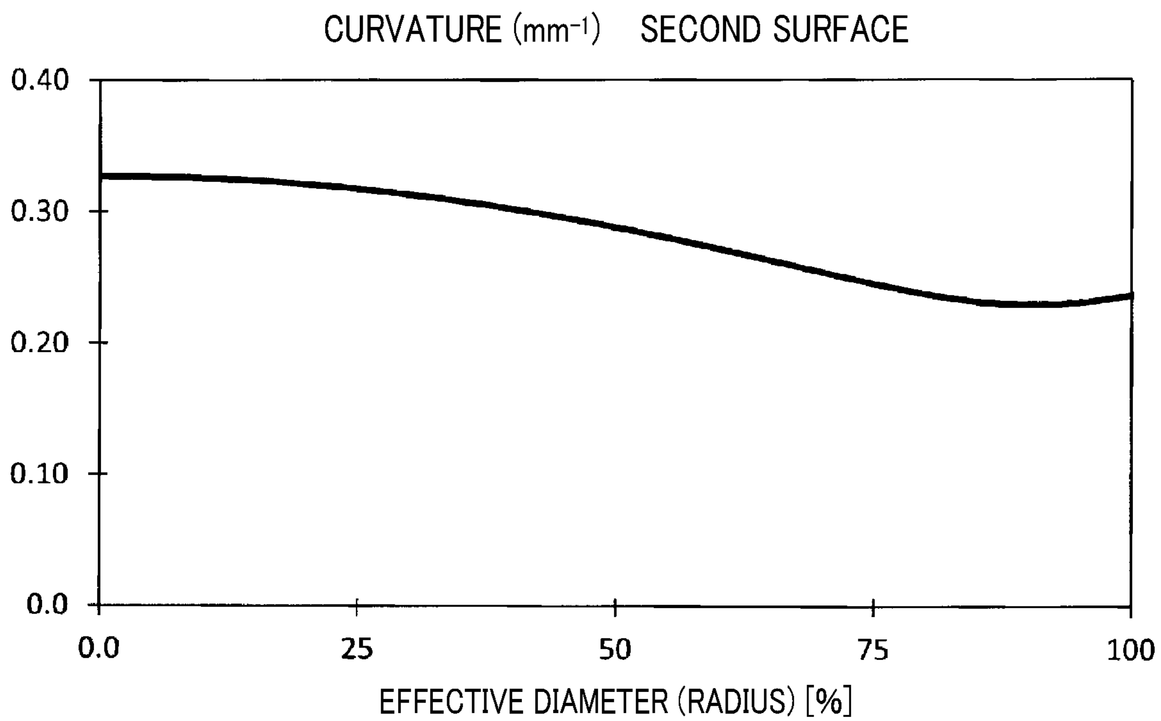
FIG. 104 is a graph illustrating how a curvature is radially changed from a center portion to a periphery of a second surface of the imaging optical system according to the second modification of the ninth embodiment.

FIG. 97 illustrates an imaging optical system 9H according to a second modification of the ninth embodiment. The imaging optical system 9H has the same configuration as that of the imaging optical system 9 except that the imaging optical system 9H is used under the ambient temperature of +105° C.

The imaging optical system 9H has predetermined specifications in which:

(I) A total focal length of the imaging optical system 9H is 4.116 mm.

(II) An F-number of the imaging optical system 9H is 1.62

(III) A half angle of view is 60°

(IV) An image height is 4.08 mm (V) A back focus is 7.224 mm (VI) A total length of the imaging optical system 9H is 26.750 mm Next, Table XXXVII shows the surface data of the imaging optical system 9H using the same symbols as those of the first embodiment:

TABLE XXXVII

| SURFACE DATA | | | | | |
|---|---|---|---|---|---|
| Sn | r | d | Nd | Vd | E |
| 1* | 63.120 | 1.241 | 1.545 | 56.003 | 12.42 |
| 2* | 3.060 | 4.591 | | | 6.49 |
| 3* | −14.298 | 3.075 | 1.640 | 23.529 | 6.69 |
| 4* | −6.827 | 0.361 | | | 7.07 |
| 5(D) | ∞ | 2.393 | | | |
| 6* | 12.701 | 2.500 | 1.545 | 56.003 | 6.85 |
| 7* | −6.348 | 0.367 | | | 6.85 |
| 8* | −18.268 | 0.745 | 1.661 | 20.373 | 6.88 |
| 9* | 7.510 | 0.125 | | | 7.84 |
| 10* | 6.862 | 3.991 | 1.729 | 54.041 | 8.60 |
| 11* | −8.154 | 0.997 | | | 8.60 |
| 12 | ∞ | 0.400 | 1.517 | 64.167 | 9.51 |
| 13 | ∞ | 5.962 | | | 9.51 |

Next, Table XXXVIII shows the single lens data of the imaging optical system 9H.

TABLE XXXVIII

| SINGLE LENS DATA | |
|---|---|
| $\lvert f1\rvert/f$ | 1.47 |
| $\lvert f2\rvert/f$ | 4.34 |
| $\lvert f4\rvert/f$ | 1.96 |
| $\lvert(dn/dT)_3\rvert$ | 3.3E−06 |
| $\lvert(dn/dT)_5\rvert$ | 95.97E−06 |
| d12/f | 1.12 |

The ratio I fll/f satisfies the conditional expression (1), the ratio |f2|/f satisfies the conditional expression (4), and the |f4|/f satisfies the conditional expression (5). Additionally, the temperature coefficient $\lvert(dn/dT)_3\rvert$ satisfies the conditional expression (8), but the temperature coefficient $\lvert(dn/dT)_5\rvert$ does not satisfy the conditional expression (9).

Next, Table XXXIX shows the aspherical data of the imaging optical system 9H using the same symbols as those of the first embodiment:

TABLE XXXIX

| ASPHERICAL DATA |
|---|
| First surface |
| k = 0, A4 = −2.3093E−05, A6 = −7.1001E−06, A8 = 2.3821E−07, A10 = −3.3092E−09, A12 = 1.5714E−11 |
| Second surface |
| k = −2.7937E−01, A4 = 6.1648E−05, A6 = −5.4824E−05, A8 = 6.6756E−06, A10 = −1.0508E−06, A12 = 3.3781E−08 |
| Third surface |
| k = 0, A4 = −8.4650E−04, A6 = −3.6871E−05, A8 = 1.0916E−05, A10 = −1.1920E−06, A12 = 6.9259E−08 |
| Fourth surface |
| k = 0, A4 = −1.0057E−04, A6 = −2.6073E−05, A8 = 4.1825E−06, A10 = −2.9104E−07, A12 = 1.0143E−08 |
| Sixth surface |
| k = 0, A4 = −2.5895E−04, A6 = −1.0896E−05, A8 = −4.0107E−07, A10 = −2.7485E−08, A12 = −4.6583E−09 |
| Seventh surface |
| k = 0, A4 = 4.8759E−04, A6 = 5.3891E−06, A8 = −5.9544E−07, A10 = −4.8832E−08, A12 = −2.3787E−09 |
| Eighth surface |
| k = 0, A4 = −1.0923E−04, A6 = −4.5235E−06, A8 = −2.7687E−07, A10 = −2.2175E−08, A12 = 1.0146E−09 |
| Ninth surface |
| k = −4.7424E−01, A4 = 1.4964E−05, A6 = −1.5200E−05, A8 = −1.1119E−07, A10 = −3.8206E−09, A12 = −1.5513E−09 |
| Tenth surface |
| k = 0, A4 = −5.3333E−04, A6 = −1.5725E−05, A8 = 1.9697E−06, A10 = −1.0627E−07, A12 = 1.5898E−09 |
| Eleventh surface |
| k = 0, A4 = 3.1576E−04, A6 = 5.5927E−07, A8 = 3.4206E−07, A10 = 1.8096E−08, A12 = 1.8820E−10 |

Figure 105:
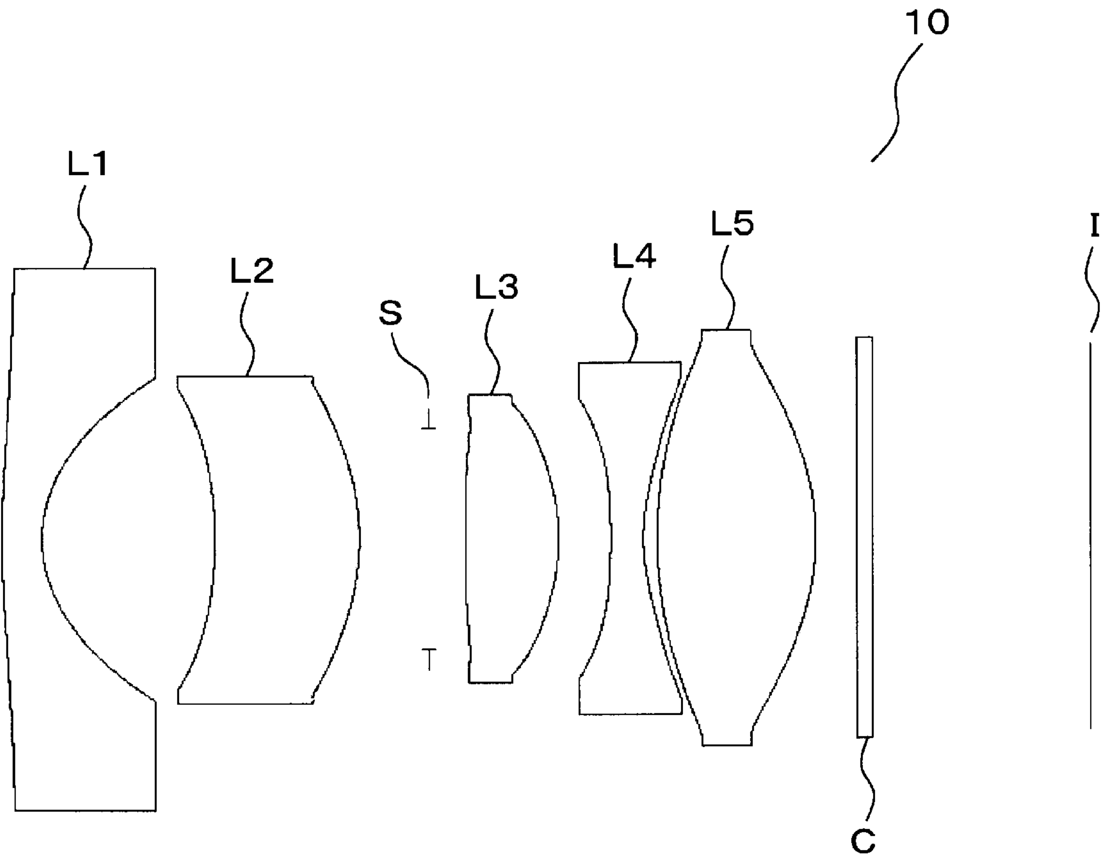
FIG. 105 is an optical diagram illustrating an imaging optical system according to the tenth embodiment.
Figure 106:
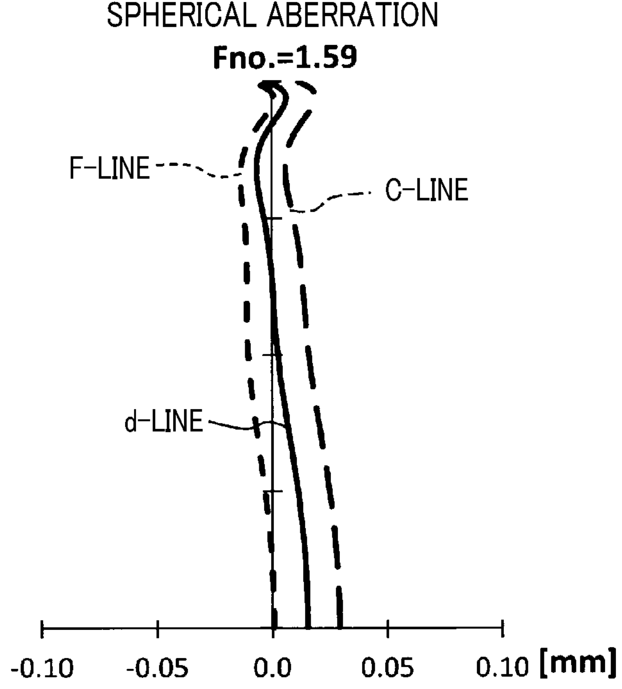
FIG. 106 is a graph illustrating spherical aberration in the imaging optical system according to the tenth embodiment.
Figure 107:
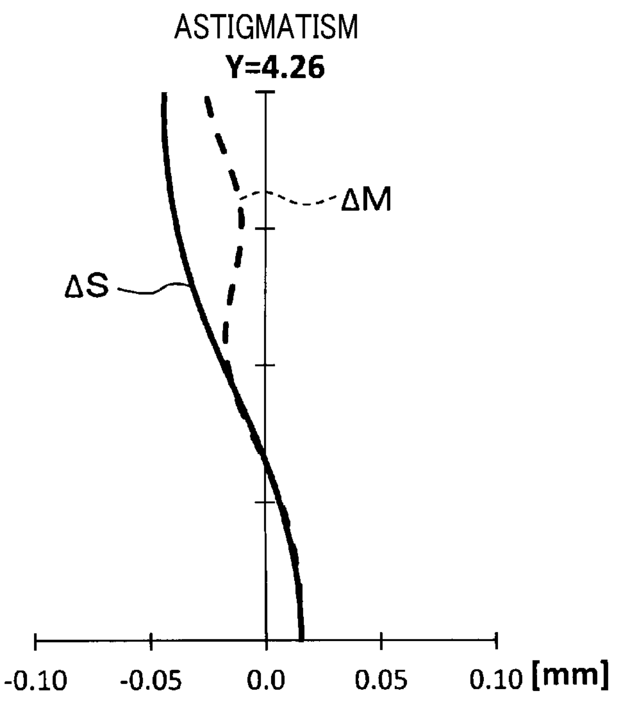
FIG. 107 is a graph illustrating astigmatism in the imaging optical system according to the tenth embodiment.
Figure 108:
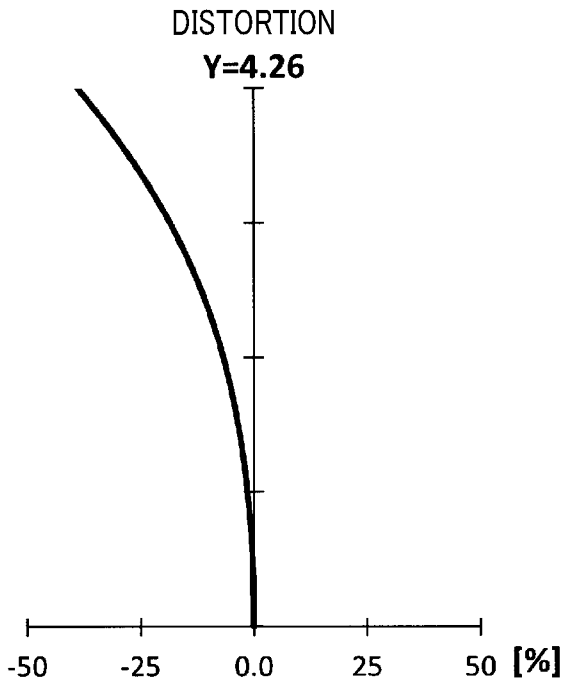
FIG. 108 is a graph illustrating distortion in the imaging optical system according to the tenth embodiment.
Figure 109:
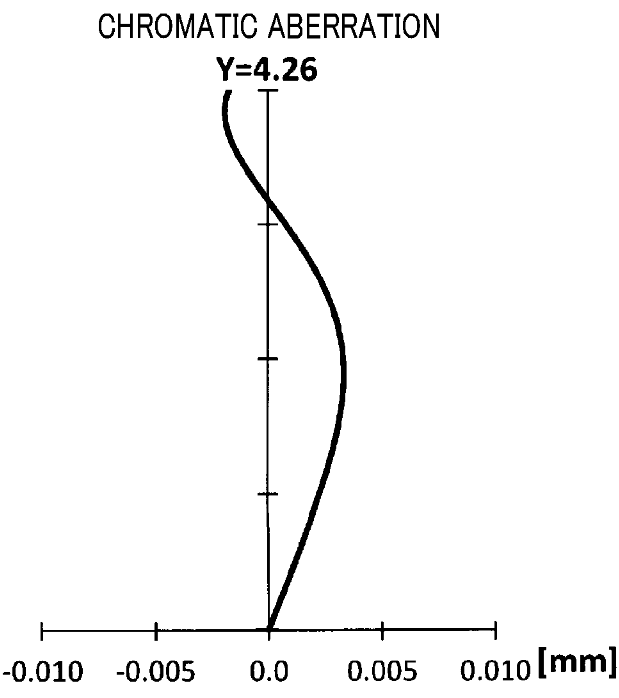
FIG. 109 is a graph illustrating chromatic aberration in the imaging optical system according to the tenth embodiment.

FIG. 98 to FIG. 101 respectively illustrate the spherical aberration, the astigmatism, the distortion, and the chromatic aberration in the imaging optical system 9H. FIG. 105 illustrates how the curvature is radially changed from the center portion to the periphery of the eighth surface (the light input surface of the fourth lens L4). FIG. 106 illustrates how the curvature is radially changed from the center portion to the periphery of the ninth surface (the light output surface of the fourth lens L4). FIG. 107 illustrates how the curvature is radially changed in from the center portion to the periphery of the ninth surface (the light output surface of the first lens L1).

As described above, each of the imaging optical systems 9, 9L, and 9H, which is configured such that only one glass lens is used and the temperature coefficient $|(dn/dT)_3|$ of the third lens L3 at least satisfies the conditional expression (8), enables little change of its optical performance even if the ambient temperature changes between −40° C. to +105° C., making it possible to deliver superior temperature characteristics.

Tenth Embodiment

FIG. 105 illustrates an imaging optical system 10 according to the tenth embodiment.

The imaging optical system 10 has predetermined specifications in which:

(I) A total focal length of the imaging optical system 10 is 4.011 mm (II) An F-number of the imaging optical system 10 is 1.59

(III) A half angle of view is 60°

(IV) An image height is 4.26 mm (V) A back focus is 6.558 mm (VI) A total length of the imaging optical system 10 is 26.496 mm.

Next, Table XL shows the surface data of the imaging optical system 10 using the same symbols as those of the first embodiment:

TABLE XL

| SURFACE DATA | | | | | |
|---|---|---|---|---|---|
| Sn | r | d | Nd | Vd | E |
| 1* | 23.463 | 0.979 | 1.545 | 56.003 | 11.78 |
| 2* | 3.340 | 4.200 | | | 7.33 |
| 3* | −10.363 | 3.517 | 1.640 | 23.529 | 6.84 |
| 4* | −6.164 | 1.689 | | | 7.03 |
| 5(D) | ∞ | 0.876 | | | |
| 6* | 70.245 | 2.278 | 1.545 | 56.003 | 5.70 |
| 7* | −5.105 | 1.257 | | | 6.08 |
| 8* | −20.432 | 0.808 | 1.661 | 20.373 | 6.27 |
| 9* | 5.143 | 0.328 | | | 7.41 |
| 10* | 10.272 | 3.869 | 1.729 | 54.041 | 8.36 |
| 11* | −6.424 | 1.000 | | | 8.93 |
| 12 | ∞ | 0.400 | 1.517 | 64.167 | 9.50 |
| 13 | ∞ | 5.295 | | | 9.50 |

Next, Table XLI shows the single lens data of the imaging optical system 10.

TABLE XLI

| SINGLE LENS DATA | |
|---|---|
| $\|f1\|/f\|$ | 1.81 |
| $\|f2\|/f\|$ | 4.47 |
| $\|f4\|/f$ | 1.53 |
| $\|(dn/dT)_3\|$ | 95.97E−06 |
| $\|(dn/dT)_5\|$ | 2.69E−06 |
| d12/f | 1.05 |

The ratio $|f\mathbf{1}|/f$ satisfies the conditional expression (2), the ratio $|f\mathbf{2}|/f$ satisfies the conditional expression (4), and the $|f\mathbf{4}|/f$ satisfies the conditional expression (5). Additionally, the temperature coefficient $|(dn/dT)_3|$ does not satisfy the conditional expression (7), but the temperature coefficient $|(dn/dT)_5|$ satisfies the conditional expression (10).

Next, Table XLII shows the aspherical data of the imaging optical system 10 using the same symbols as those of the first embodiment:

TABLE XLII

| ASPHERICAL DATA |
|---|
| First surface |
| k = 0, A4 = −7.5578E−04, A6 = 1.6377E−05, A8 = −2.2919E−07, A10 = 2.0019E−09, A12 = −6.2166E−12 |
| Second surface |
| k = −5.4675E−01, A4 = −5.4637E−04, A6 = −4.2836E−05, A8 = 8.1495E−07, A10 = −4.6487E−08, A12 = −2.1647E−09 |
| Third surface |
| k = 0, A4 = −4.7217E−04, A6 = −6.4210E−05, A8 = 8.0495E−06, A10 = −7.5142E−07, A12 = 2.4517E−08 |
| Fourth surface |
| k = 0, A4 = 1.5042E−03, A6 = −7.0447E−05, A8 = 6.1523E−06, A10 = −3.7593E−07, A12 = 1.1078E−08 |
| Sixth surface |
| k = 0, A4 = 2.5719E−03, A6 = −1.2333E−04, A8 = −2.1866E−05, A10 = 3.2237E−06, A12 = −2.0878E−07 |
| Seventh surface |
| k = 0, A4 = 4.8175E−03, A6 = −4.5757E−04, A8 = 1.7513E−05, A10 = 4.1502E−07, A12 = −7.6825E−08 |
| Eighth surface |
| k = 0, A4 = −3.2566E−03, A6 = −3.0174E−04, A8 = 5.1529E−05, A10 = −2.1662E−06, A12 = 4.1519E−09 |
| Ninth surface |
| k = 0, A4 = −7.7576E−03, A6 = 4.2145E−04, A8 = −1.3074E−05, A10 = 3.0713E−07, A12 = −1.2634E−08 |
| Tenth surface |
| k = 0, A4 = −5.0593E−04, A6 = 1.3262E−05, A8 = −3.2298E−07, A10 = 6.5001E−08, A12 = −2.4534E−09 |
| Eleventh surface |
| k = 0, A4 = 7.9328E−04, A6 = 1.7344E−06, A8 = 1.6985E−06, A10 = −1.4924E−07, A12 = 4.3821E−09 |

Figure 110:
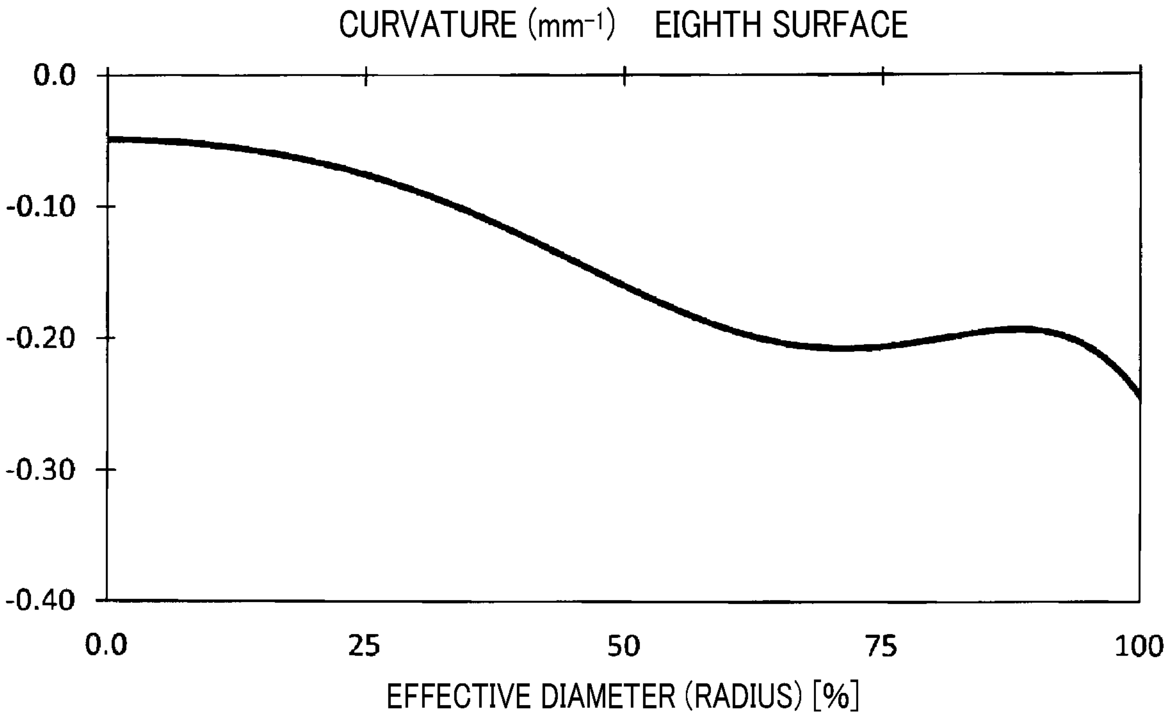
FIG. 110 is a graph illustrating how a curvature is radially changed from a center portion to a periphery of an eighth surface of the imaging optical system according to the tenth embodiment.
Figure 111:
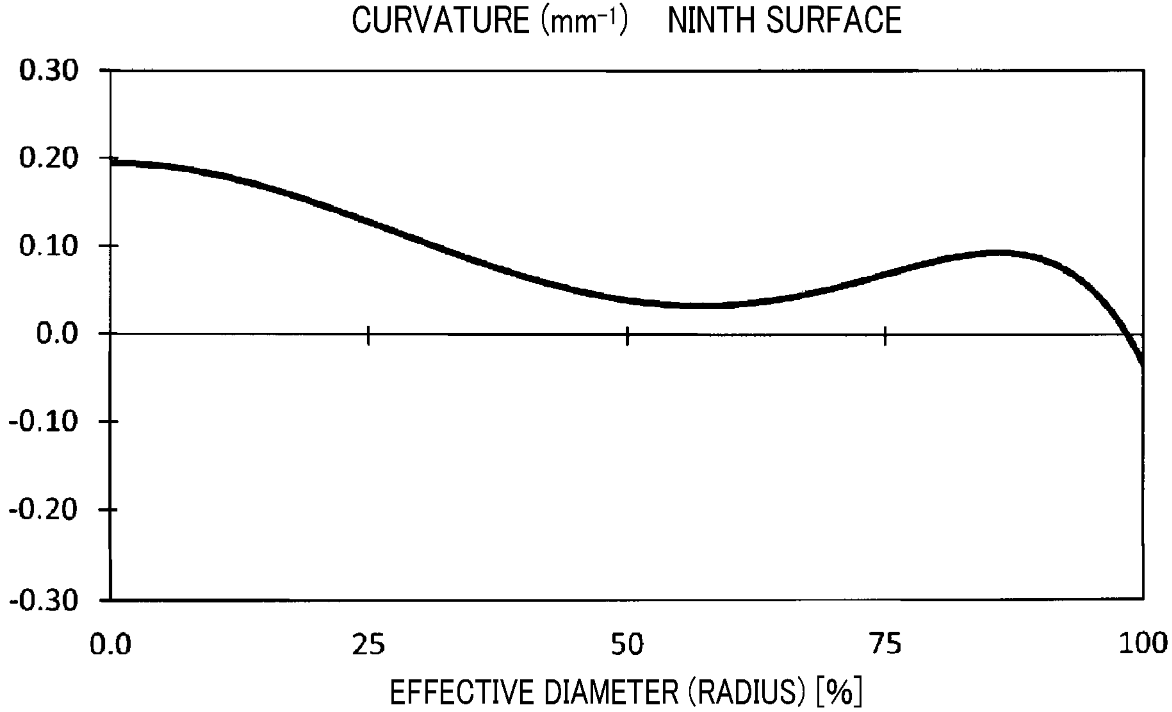
FIG. 111 is a graph illustrating how a curvature is radially changed from a center portion to a periphery of a ninth surface of the imaging optical system according to the tenth embodiment.
Figure 112:
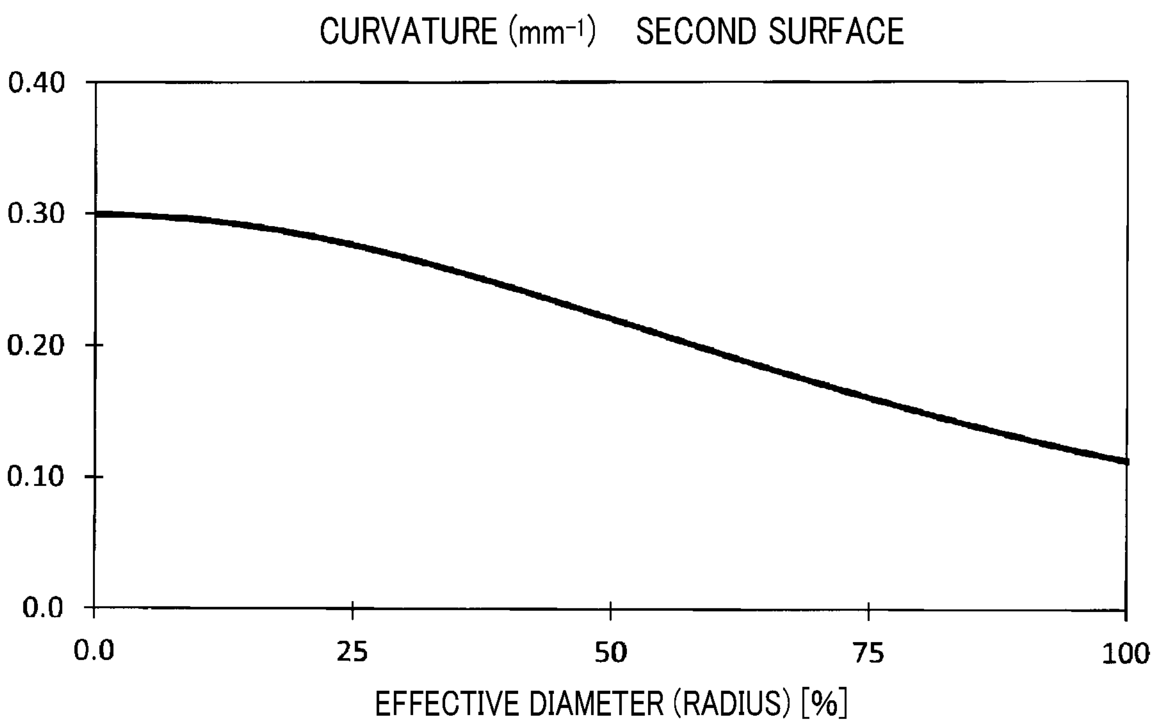
FIG. 112 is a graph illustrating how a curvature is radially changed from a center portion to a periphery of a second surface of the imaging optical system according to the tenth embodiment.

FIG. 106 to FIG. 109 respectively illustrate the spherical aberration, the astigmatism, the distortion, and the chromatic aberration in the imaging optical system 10. FIG. 110 illustrates how the curvature is radially changed from the center portion to the periphery of the eighth surface (the light input surface of the fourth lens L4). FIG. 111 illustrates how the curvature is radially changed from the center portion to the periphery of the ninth surface (the light output surface of the fourth lens L4). FIG. 112 illustrates how the curvature is radially changed in from the center portion to the periphery of the ninth surface (the light output surface of the first lens L1).

The features of the tenth embodiment are substantially the same as those of the second embodiment.

First Modification Of Tenth Embodiment

Figure 113:
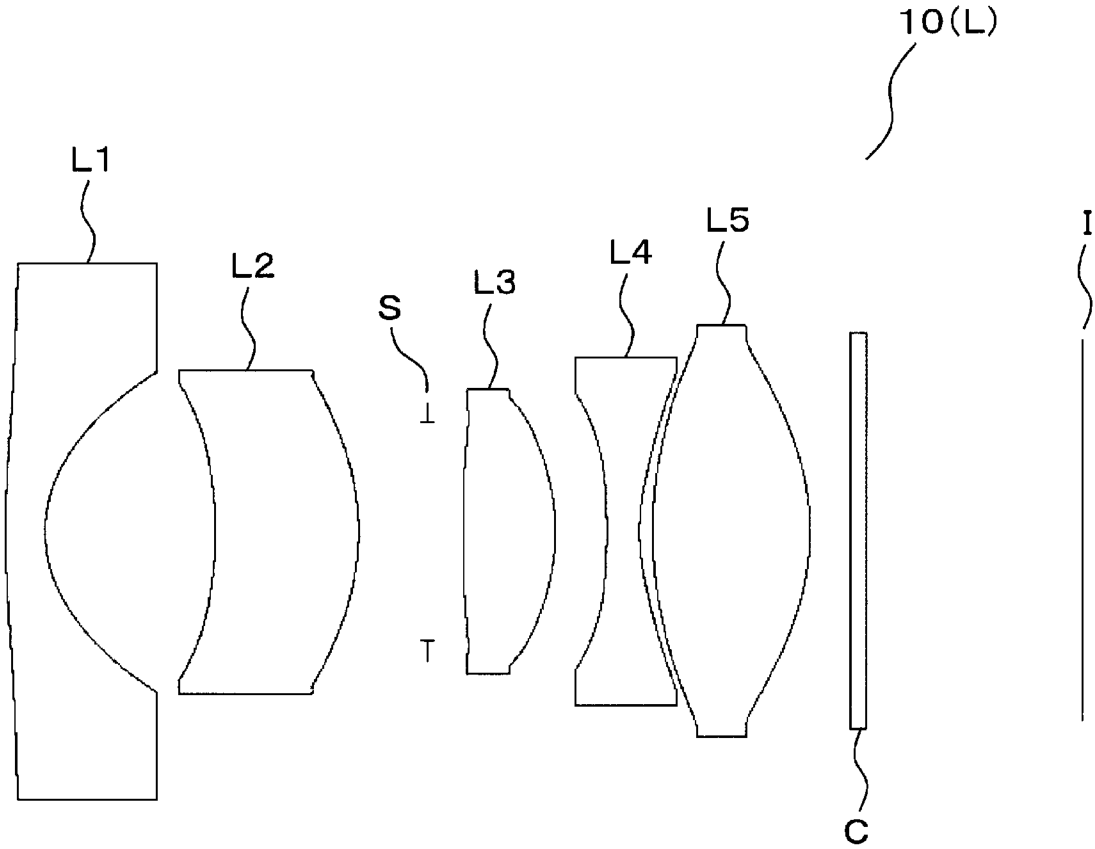
FIG. 113 is an optical diagram illustrating an imaging optical system according to a first modification of the tenth embodiment.
Figure 114:
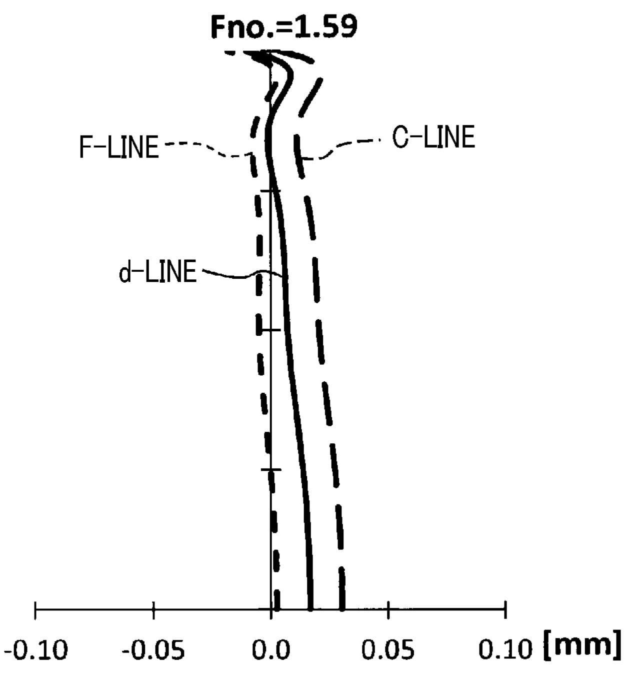
FIG. 114 is a graph illustrating spherical aberration in the imaging optical system according to the first modification of the tenth embodiment.
Figure 115:
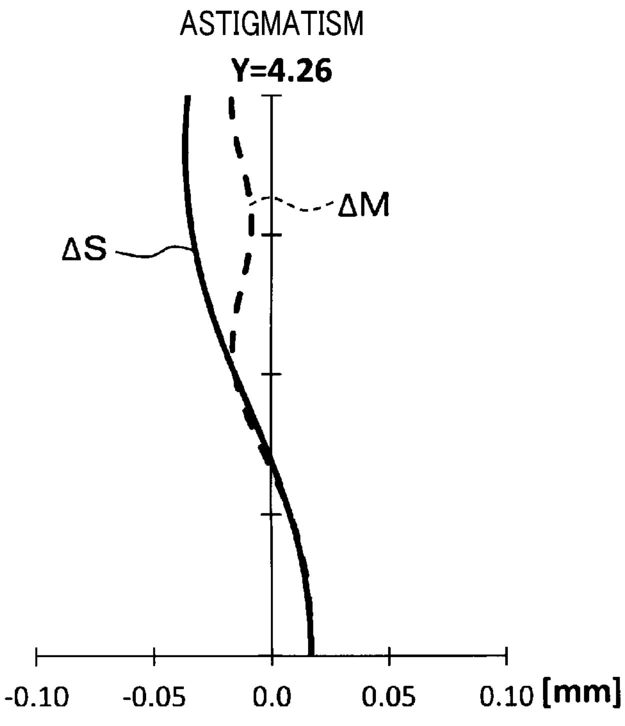
FIG. 115 is a graph illustrating astigmatism in the imaging optical system according to the first modification of the tenth embodiment.
Figure 116:
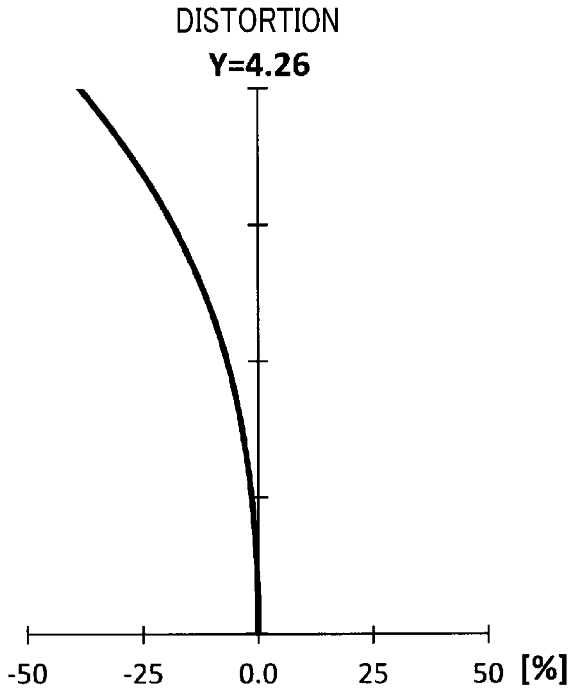
FIG. 116 is a graph illustrating distortion in the imaging optical system according to the first modification of the tenth embodiment.
Figure 117:
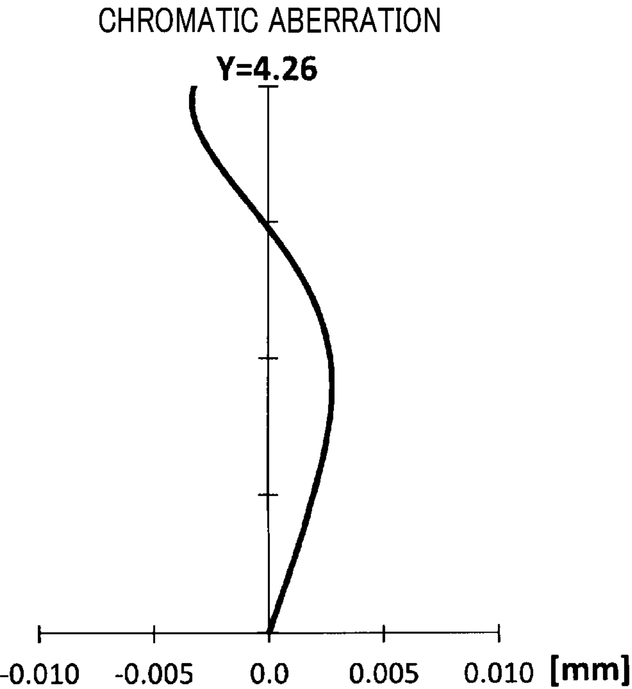
FIG. 117 is a graph illustrating chromatic aberration in the imaging optical system according to the first modification of the tenth embodiment.

FIG. 113 illustrates an imaging optical system 10L according to a first modification of the tenth embodiment. The imaging optical system 10L has the same configuration as that of the imaging optical system 10 except that the imaging optical system 10L is used under the ambient temperature of −40° C.

The imaging optical system 10L has predetermined specifications in which:

(I) A total focal length of the imaging optical system 10L is 4.008 mm.

(II) An F-number of the imaging optical system 10L is 1.59

(III) A half angle of view is 60°

(IV) An image height is 4.26 mm (V) A back focus is 6.550 mm (VI) A total length of the imaging optical system 10L is 26.437

Next, Table XLIII shows the surface data of the imaging optical system 10L using the same symbols as those of the first embodiment:

TABLE XLIII

SURFACE DATA

| Sn | r | d | Nd | Vd | E |
|---|---|---|---|---|---|
| 1* | 23.376 | 0.975 | 1.545 | 56.003 | 11.74 |
| 2* | 3.328 | 4.185 | | | 7.31 |
| 3* | −10.319 | 3.502 | 1.640 | 23.529 | 6.81 |
| 4* | −6.138 | 1.691 | | | 7.00 |
| 5(D) | ∞ | 0.875 | | | |
| 6* | 69.984 | 2.270 | 1.545 | 56.003 | 5.68 |
| 7* | −5.086 | 1.256 | | | 6.06 |
| 8* | −20.345 | 0.805 | 1.661 | 20.373 | 6.24 |
| 9* | 5.121 | 0.324 | | | 7.38 |
| 10* | 10.268 | 3.868 | 1.729 | 54.041 | 8.36 |
| 11* | −6.422 | 0.998 | | | 8.93 |
| 12 | ∞ | 0.400 | 1.517 | 64.167 | 9.50 |
| 13 | ∞ | 5.289 | | | 9.50 |

Next, Table XLIV shows the single lens data of the imaging optical system 10L.

TABLE XLIV

SINGLE LENS DATA

| | |
|---|---|
| $\lvert f1\rvert/f$ | 1.79 |
| $\lvert f2\rvert/f$ | 4.40 |
| $\lvert f4\rvert/f$ | 1.51 |
| $\lvert(dn/dT)_3\rvert$ | 95.97E−06 |
| $\lvert(dn/dT)_5\rvert$ | 2.69E−06 |
| d12/f | 1.04 |

The ratio $\lvert f\mathbf{1}\rvert/f$ satisfies the conditional expression (2), the ratio $\lvert f\mathbf{2}\rvert/f$ satisfies the conditional expression (4), and the $\lvert f\mathbf{4}\rvert/f$ satisfies the conditional expression (5). Additionally, the temperature coefficient $\lvert(dn/dT)_3\rvert$ does not satisfy the conditional expression (8), but the temperature coefficient $\lvert(dn/dT)_5\rvert$ satisfies the conditional expression (9).

Next, Table XLV shows the aspherical data of the imaging optical system 10L using the same symbols as those of the first embodiment:

TABLE XLV

| ASPHERICAL DATA |
|---|
| First surface |
| k = 0, A4 = −7.6427E−04, A6 = 1.6685E−05, A8 = −2.3525E−07, A10 = 2.0702E−09, A12 = −6.4768E−12 |
| Second surface |
| k = −5.4675E−01, A4 = −5.5251E−04, A6 = −4.3642E−05, A8 = 8.3649E−07, A10 = −4.8073E−08, A12 = −2.2553E−09 |
| Third surface |
| k = 0, A4 = −4.7826E−04, A6 = −6.5595E−05, A8 = 8.2937E−06, A10 = −7.8086E−07, A12 = 2.5695E−08 |
| Fourth surface |
| k = 0, A4 = 1.5236E−03, A6 = −7.1967E−05, A8 = 6.3389E−06, A10 = −3.9065E−07, A12 = 1.1611E−08 |
| Sixth surface |
| k = 0, A4 = 2.6008E−03, A6 = −1.2565E−04, A8 = −2.2444E−05, A10 = 3.3336E−06, A12 = −2.1751E−07 |
| Seventh surface |
| k = 0, A4 = 4.8717E−03, A6 = −4.6617E−04, A8 = 1.7976E−05, A10 = 4.2918E−07, A12 = −8.0040E−08 |
| Eighth surface |
| k = 0, A4 = −3.2985E−03, A6 = −3.0825E−04, A8 = 5.3092E−05, A10 = −2.2510E−06, A12 = 4.3515E−09 |
| Ninth surface |
| k = 0, A4 = −7.8576E−03, A6 = 4.3054E−04, A8 = −1.3470E−05, A10 = 3.1916E−07, A12 = −1.3242E−08 |
| Tenth surface |
| k = 0, A4 = −5.0648E−04, A6 = 1.3286E−05, A8 = −3.2381E−07, A10 = 6.5215E−08, A12 = −2.4633E−09 |
| Eleventh surface |
| k = 0, A4 = 7.9415E−04, A6 = 1.7376E−06, A8 = 1.7029E−06, A10 = −1.4974E−07, A12 = 4.3998E−09 |

Figure 118:
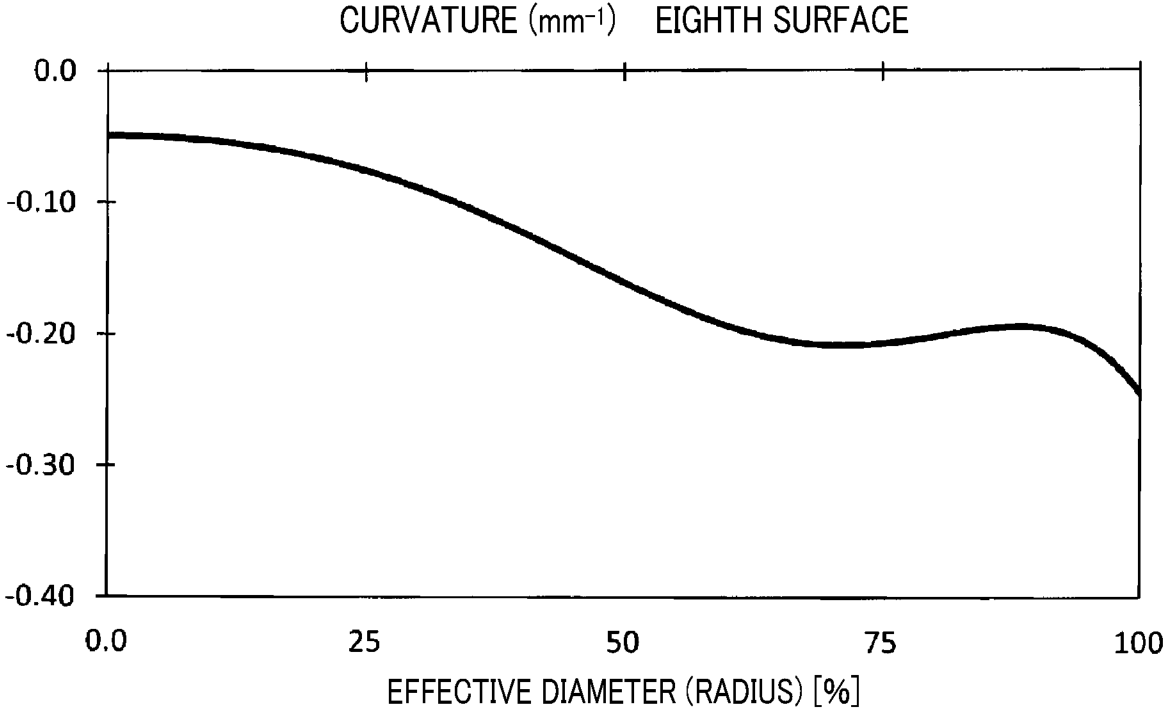
FIG. 118 is a graph illustrating how a curvature is radially changed from a center portion to a periphery of an eighth surface of the imaging optical system according to the first modification of the tenth embodiment.
Figure 119:
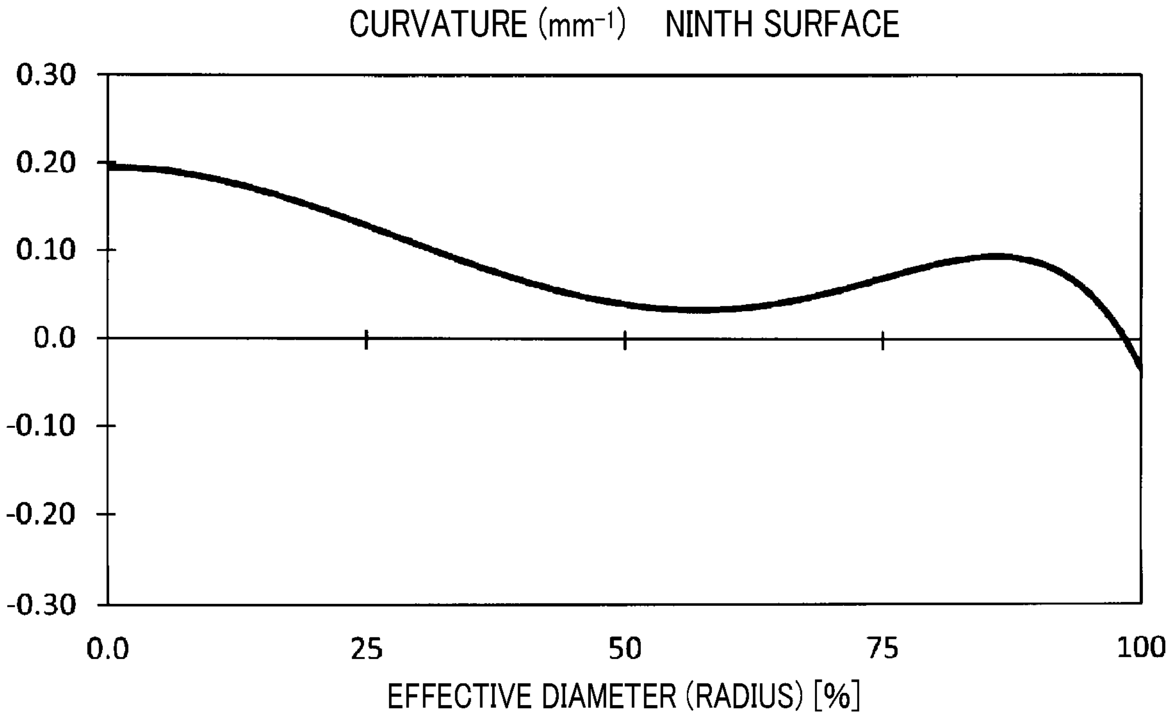
Figure 120:
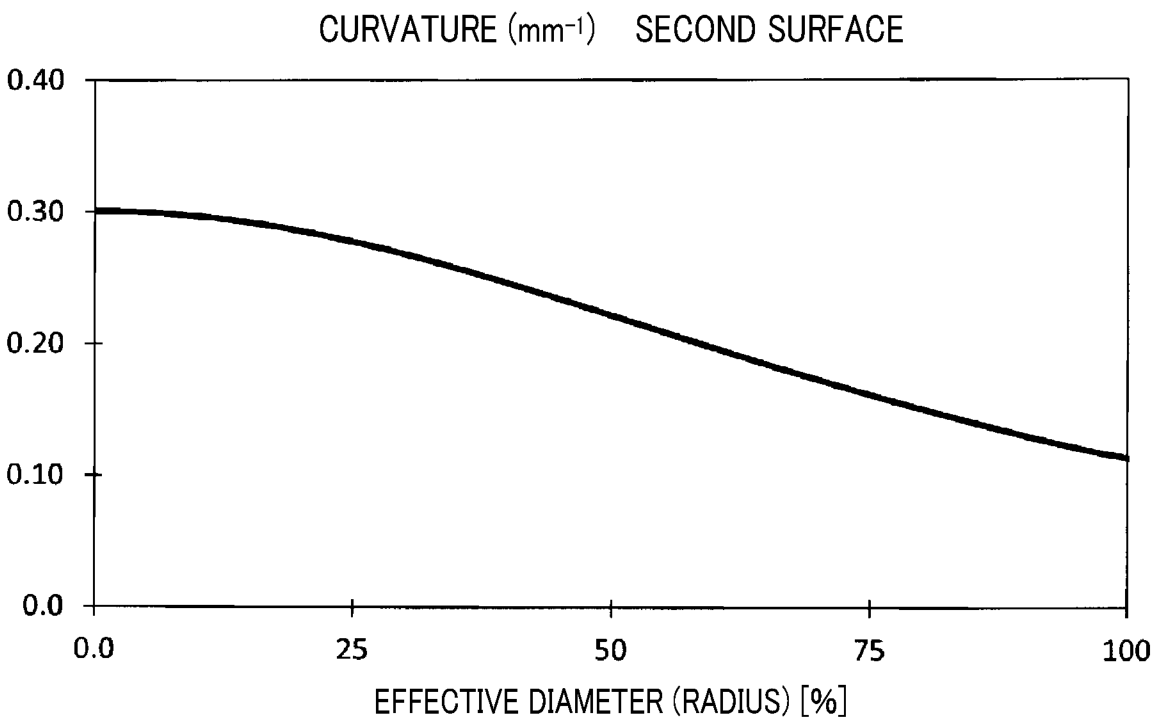

FIG. 114 to FIG. 117 respectively illustrate the spherical aberration, the astigmatism, the distortion, and the chromatic aberration in the imaging optical system 9L. FIG. 118 illustrates how the curvature is radially changed from the center portion to the periphery of the eighth surface (the light input surface of the fourth lens L4). FIG. 119 illustrates how the curvature is radially changed from the center portion to the periphery of the ninth surface (the light output surface of the fourth lens L4). FIG. 120 illustrates how the curvature is radially changed in from the center portion to the periphery of the ninth surface (the light output surface of the first lens L1).

Second Modification of Tenth Embodiment

Figure 121:
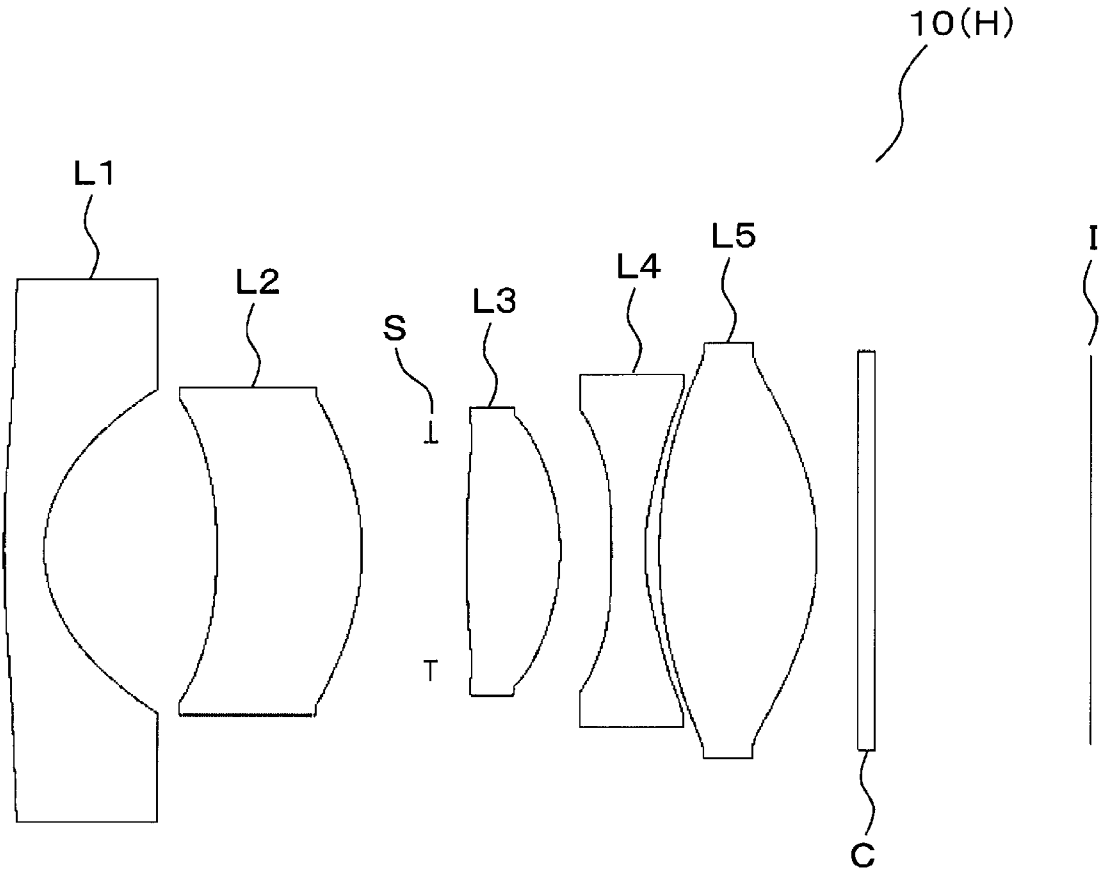
Figure 122:
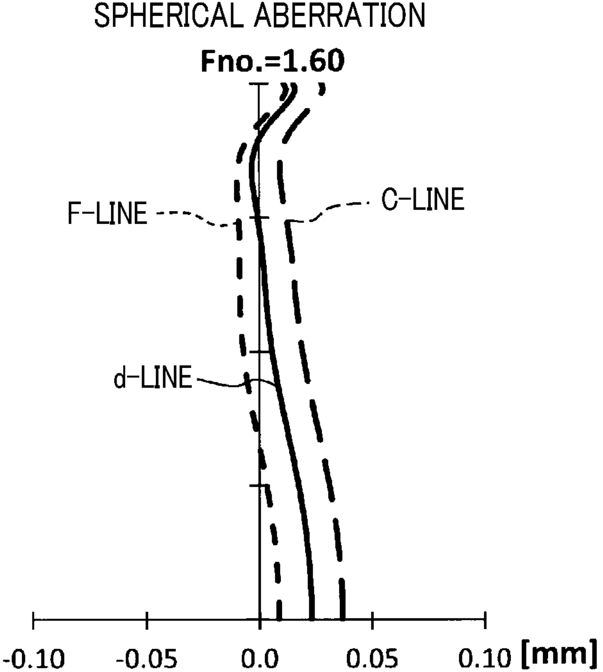
Figure 123:
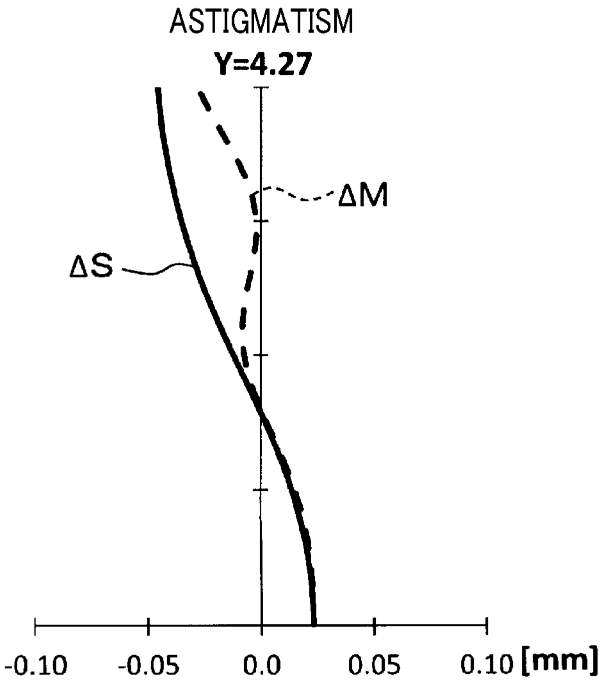
Figure 124:
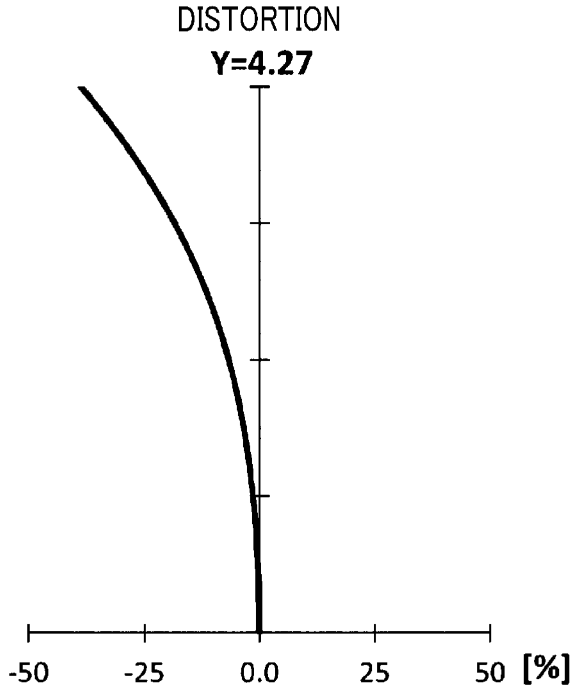
Figure 125:
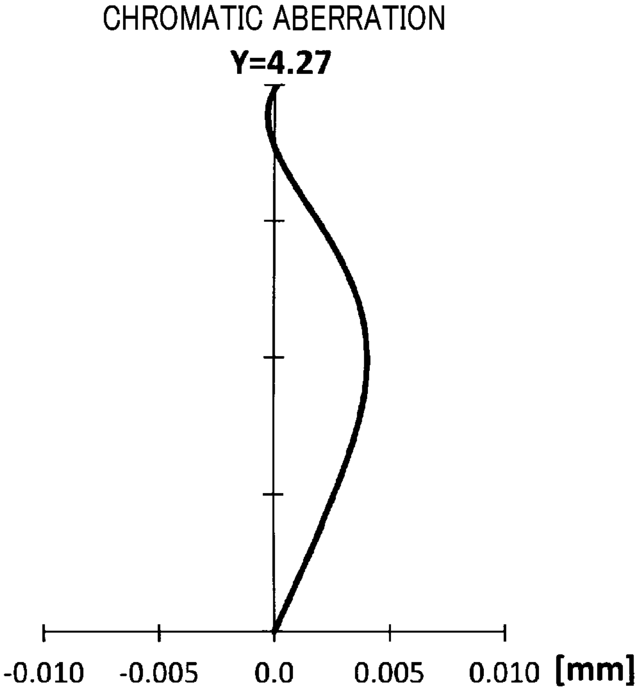

FIG. 121 illustrates an imaging optical system 10H according to a second modification of the tenth embodiment. The imaging optical system 10H has the same configuration as that of the imaging optical system 10 except that the imaging optical system 10H is used under the ambient temperature of +105° C.

The imaging optical system 10H has predetermined specifications in which:

(I) A total focal length of the imaging optical system 10H is 4.022 mm (II) An F-number of the imaging optical system 10H is 1.60

(III) A half angle of view is 60°

(IV) An image height is 4.27 mm (V) A back focus is 6.570 mm (VI) A total length of the imaging optical system 10H is 26.578 mm.

Next, Table XLVI shows the surface data of the imaging optical system 10H using the same symbols as those of the first embodiment:

TABLE XLVI

| SURFACE DATA | | | | | |
|---|---|---|---|---|---|
| Sn | r | d | Nd | Vd | E |
| 1* | 23.587 | 0.984 | 1.545 | 56.003 | 11.84 |
| 2* | 3.358 | 4.221 | | | 7.37 |
| 3* | −10.426 | 3.538 | 1.640 | 23.529 | 6.88 |
| 4* | −6.201 | 1.686 | | | 7.07 |
| 5(D) | ∞ | 0.877 | | | |
| 6* | 70.615 | 2.290 | 1.545 | 56.003 | 5.73 |
| 7* | −5.132 | 1.258 | | | 6.11 |
| 8* | −20.555 | 0.813 | 1.661 | 20.373 | 6.31 |
| 9* | 5.174 | 0.334 | | | 7.45 |
| 10* | 10.277 | 3.871 | 1.729 | 54.041 | 8.36 |
| 11* | −6.427 | 1.003 | | | 8.93 |
| 12 | ∞ | 0.400 | 1.517 | 64.167 | 9.51 |
| 13 | ∞ | 5.303 | | | 9.51 |

Next, Table XLVII shows the single lens data of the imaging optical system 10H.

TABLE XLVII

| SINGLE LENS DATA | |
|---|---|
| $\|f1\|/f$ | 1.85 |
| $\|f2\|/f$ | 4.56 |
| $\|f4\|/f$ | 1.56 |
| $\|(dn/dT)_3\|$ | 95.97E−06 |
| $\|(dn/dT)_5\|$ | 2.69E−06 |
| d12/f | 1.05 |

The ratio $|f\mathbf{1}|/f$ satisfies the conditional expression (2), the ratio $|f\mathbf{2}|/f$ satisfies the conditional expression (4), and the $|f\mathbf{4}|/f$ satisfies the conditional expression (5). Additionally, the temperature coefficient $|(dn/dT)_3|$ does not satisfy the conditional expression (8), but the temperature coefficient $|(dn/dT)_5|$ satisfies the conditional expression (9).

Next, Table XLVIII shows the aspherical data of the imaging optical system 9H using the same symbols as those of the first embodiment:

TABLE XLVIII

| ASPHERICAL DATA |
|---|
| First surface |
| k = 0, A4 = −7.4395E−04, A6 = 1.5952E−05, A8 = −2.2091E−07, A10 = 1.9094E−09, A12 = −5.8674E−12 |
| Second surface |
| k = −5.4675E−01, A4 = −5.3782E−04, A6 = −4.1725E−05, A8 = 7.8551E−07, A10 = −4.4339E−08, A12 = −2.0431E−09 |
| Third surface |
| k = 0, A4 = −4.6372E−04, A6 = −6.2307E−05, A8 = 7.7175E−06, A10 = −7.1181E−07, A12 = 2.2947E−08 |
| Fourth surface |
| k = 0, A4 = 1.4773E−03, A6 = −6.8359E−05, A8 = 5.8986E−06, A10 = −3.5611E−07, A12 = 1.0369E−08 |
| Sixth surface |
| k = 0, A4 = 2.5317E−03, A6 = −1.2014E−04, A8 = −2.1077E−05, A10 = 3.0747E−06, A12 = −1.9705E−07 |
| Seventh surface |
| k = 0, A4 = 4.7421E−03, A6 = −4.4570E−04, A8 = 1.6880E−05, A10 = 3.9584E−07, A12 = −7.2509E−08 |
| Eighth surface |
| k = 0, A4 = −3.1983E−03, A6 = −2.9279E−04, A8 = 4.9403E−05, A10 = −2.0520E−06, A12 = 3.8860E−09 |

TABLE XLVIII-continued

| ASPHERICAL DATA |
|---|
| Ninth surface |
| k = 0, A4 = −7.6189E−03, A6 = 4.0896E−04, A8 = −1.2535E−05, A10 = 2.9094E−07, A12 = −1.1825E−08 |
| Tenth surface |
| k = 0, A4 = 0−5.0514E−04, A6 = 1.3228E−05, A8 = −3.2181E−07, A10 = 6.4698E−08, A12 = −2.4394E−09 |
| Eleventh surface |
| k = 0, A4 = 7.9205E−04, A6 = 1.7299E−06, A8 = 1.6924E−06, A10 = −1.4855E−07, A12 = 4.3572E−09 |

Figure 126:
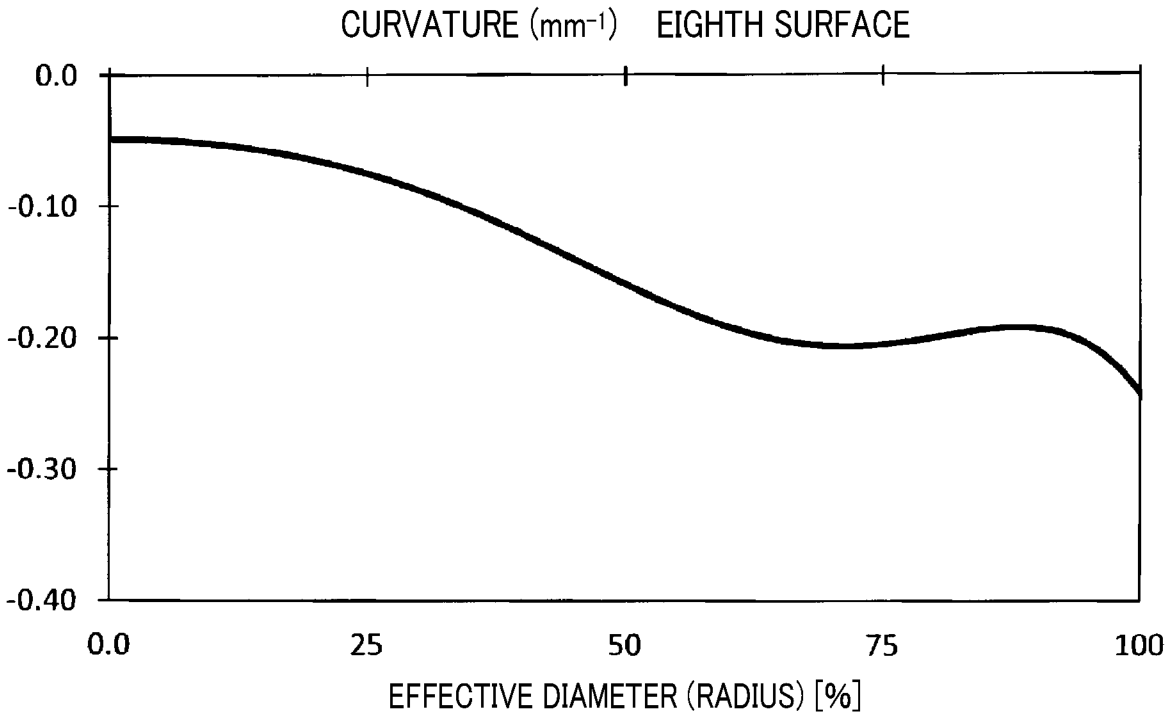
Figure 127:
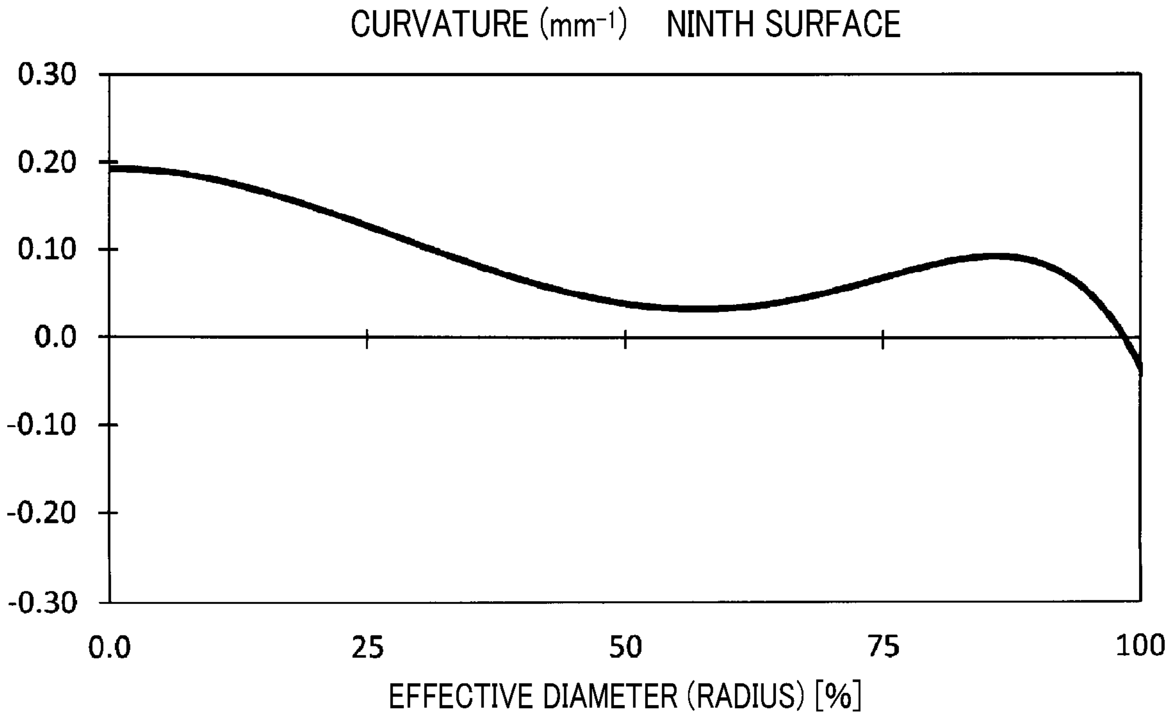
Figure 128:
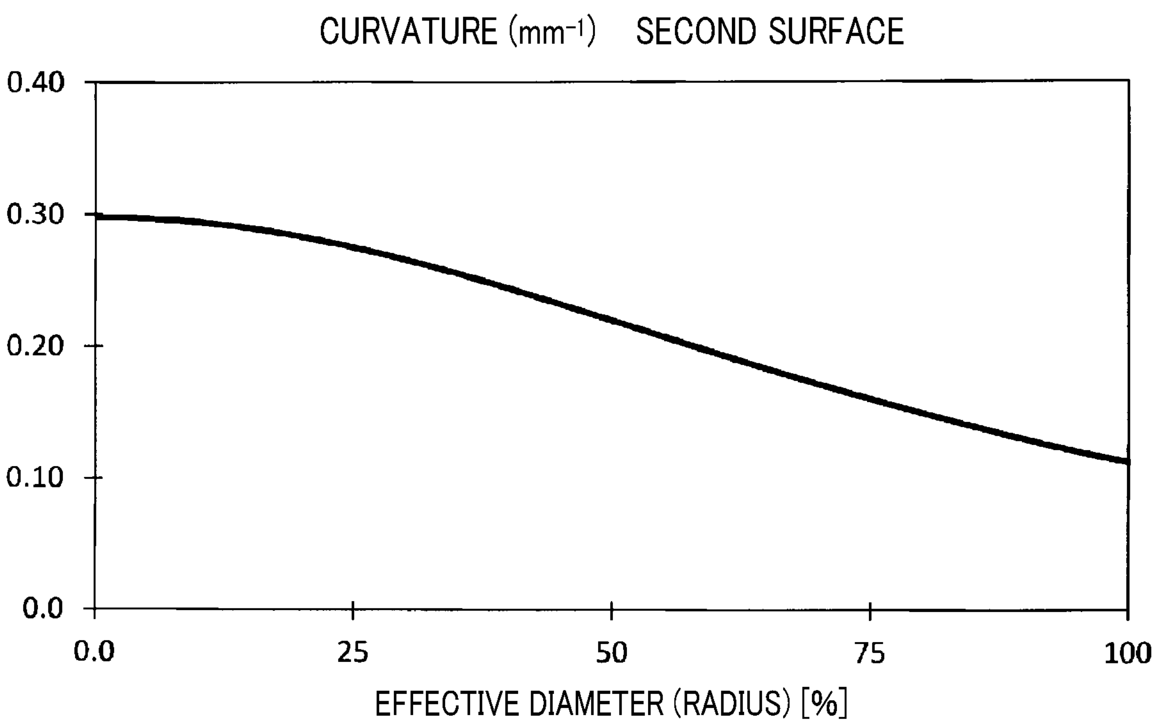

FIG. 122 to FIG. 125 respectively illustrate the spherical aberration, the astigmatism, the distortion, and the chromatic aberration in the imaging optical system 10H. FIG. 126 illustrates how the curvature is radially changed from the center portion to the periphery of the eighth surface (the light input surface of the fourth lens L4). FIG. 127 illustrates how the curvature is radially changed from the center portion to the periphery of the ninth surface (the light output surface of the fourth lens L4). FIG. 128 illustrates how the curvature is radially changed in from the center portion to the periphery of the ninth surface (the light output surface of the first lens L1).

As described above, each of the imaging optical systems 10, 10L, and 10H, which is configured such that only one glass lens is used and the temperature coefficient $|(dn/dT)_5|$ of the fifth lens L5 at least satisfies the conditional expression (10), enables little change of its optical performance even if the ambient temperature changes between −40° C. to +105° C., making it possible to deliver superior temperature characteristics.

Eleventh Embodiment

Figure 129:
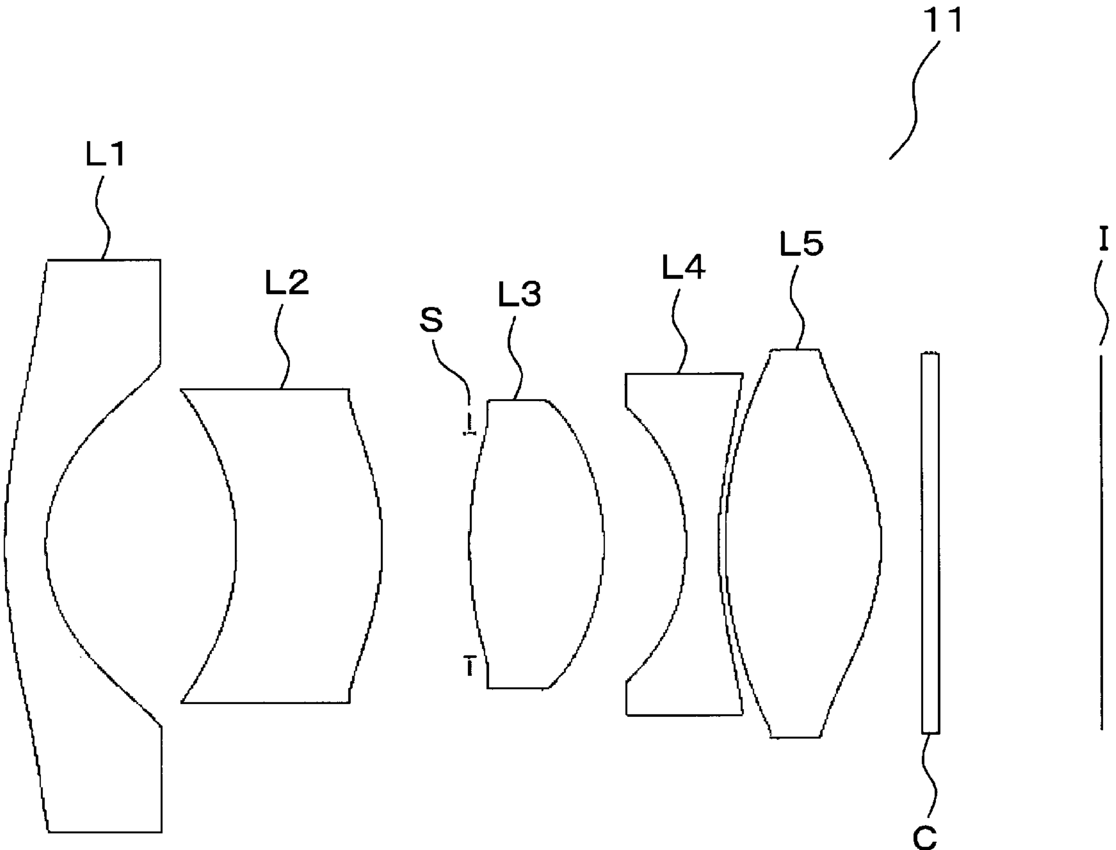

FIG. 129 illustrates an imaging optical system 11 according to the eleventh embodiment.

The imaging optical system 11 has predetermined specifications in which:

(I) A total focal length of the imaging optical system 11 is 4.000 mm.

(II) An F-number of the imaging optical system 11 is 1.60

(III) A half angle of view is 60°

(IV) An image height is 4.22 mm (V) A back focus is 5.221 mm (VI) A total length of the imaging optical system 11 is 26.601

Next, Table XLIX shows the surface data of the imaging optical system 11 using the same symbols as those of the first embodiment:

TABLE XLIX

| SURFACE DATA | | | | | |
|---|---|---|---|---|---|
| Sn | r | d | Nd | Vd | E |
| 1* | 13.391 | 0.994 | 1.545 | 56.003 | 13.56 |
| 2* | 3.844 | 4.642 | | | 8.67 |
| 3* | −5.403 | 3.521 | 1.640 | 23.529 | 7.43 |
| 4* | −5.890 | 2.119 | | | 6.95 |
| 5(D) | ∞ | −0.003 | | | |
| 6* | 11.633 | 3.248 | 1.545 | 56.003 | 5.97 |
| 7* | −5.314 | 1.989 | | | 6.83 |
| 8* | −5.615 | 0.784 | 1.661 | 20.373 | 6.48 |
| 9* | 8.661 | 0.167 | | | 8.07 |

TABLE XLIX-continued

| SURFACE DATA | | | | | |
|---|---|---|---|---|---|
| Sn | r | d | Nd | Vd | E |
| 10* | 10.218 | 3.781 | 1.729 | 54.041 | 8.91 |
| 11* | −5.323 | 1.000 | | | 9.16 |
| 12 | ∞ | 0.400 | 1.517 | 64.167 | 9.00 |
| 13 | ∞ | 3.957 | | | 8.98 |

Next, Table L shows the single lens data of the imaging optical system 11.

TABLE L

| SINGLE LENS DATA | |
|---|---|
| \|f1\|/f\| | 2.57 |
| \|f2\|/f\| | 14.03 |
| \|f4\|/f | 1.26 |
| $|(dn/dT)_3|$ | 95.97E−06 |
| $|(dn/dT)_5|$ | 2.69E−06 |
| d12/f | 1.16 |

The ratio |f1|/f satisfies the conditional expression (1), the ratio |f2|/f satisfies the conditional expression (3), and the |f4|/f satisfies the conditional expression (6). Additionally, the temperature coefficient $|(dn/dT)_3|$ does not satisfy the conditional expression (8), but the temperature coefficient $|(dn/dT)_5|$ satisfies the conditional expression (10).

Next, Table LI shows the aspherical data of the imaging optical system 11 using the same symbols as those of the first embodiment:

TABLE LI

| ASPHERICAL DATA |
|---|
| First surface |
| k = 0, A4 = −2.0364E−04, A6 = −1.4801E−05, A8 = 3.0121E−07, A10 = −1.6181E−09, A12 = 0 |
| Second surface |
| k = −1.0146, A4 = 1.5204E−03, A6 = −3.3430E−05, A8 = 3.1156E−06, A10 = −2.0854E−07, A12 = 0 |
| Third surface |
| k = 0, A4 = 1.3710E−03, A6 = 1.3879E−05, A8 = −3.7506E−06, A10 = 1.8475E−07, A12 = 0 |
| Fourth surface |
| k = 0, A4 = 2.8105E−03, A6 = −6.3837E−05, A8 = 2.9521E−06, A10 = 6.7144E−08, A12 = 0 |
| Sixth surface |
| k = 0, A4 = 2.2465E−03, A6 = −2.2388E−04, A8 = 1.3371E−05, A10 = −1.1517E−06, A12 = 0 |
| Seventh surface |
| k = 0, A4 = 2.0515E−03, A6 = −1.7756E−04, A8 = 1.1770E−05, A10 = −7.4248E−07, A12 = 0 |
| Eighth surface |
| k = 0, A4 = −2.4590E−03, A6 = −1.3426E−04, A8 = 2.6215E−05, A10 = −9.9455E−07, A12 = 0 |
| Ninth surface |
| k = 0, A4 = −2.5190E−03, A6 = 5.1974E−05, A8 = 2.5403E−06, A10 = −1.4870E−07, A12 = 0 |
| Tenth surface |
| k = 0, A4 = 4.2435E−04, A6 = −7.784E−05, A8 = 4.7380E−06, A10 = −1.0075E−07, A12 = 0 |

TABLE LI-continued

| ASPHERICAL DATA |
|---|
| Eleventh surface |
| k = 0, A4 = 1.5972E−03, A6 = 2.3391E−05, A8 = 1.1978E−06, A10 = 1.0802E−08, A12 = 0 |

FIG. 130 to FIG. 133 respectively illustrate the spherical aberration, the astigmatism, the distortion, and the chromatic aberration in the imaging optical system 11. FIG. 134 illustrates how the curvature is radially changed from the center portion to the periphery of the eighth surface (the light input surface of the fourth lens L4). FIG. 135 illustrates how the curvature is radially changed from the center portion to the periphery of the ninth surface (the light output surface of the fourth lens L4). FIG. 136 illustrates how the curvature is radially changed in from the center portion to the periphery of the ninth surface (the light output surface of the first lens L1).

The features of the eleventh embodiment are substantially the same as those of the first embodiment.

Twelfth Embodiment

FIG. 137 illustrates an imaging optical system 12 according to the twelfth embodiment.

The imaging optical system 12 has predetermined specifications in which:

(I) A total focal length of the imaging optical system 12 is 4.000 mm (II) An F-number of the imaging optical system 12 is 1.62

(III) A half angle of view is 60°

(IV) An image height is 4.28 mm (V) A back focus is 5.573 mm (VI) A total length of the imaging optical system 12 is 26.601 mm Next, Table LII shows the surface data of the imaging optical system 12 using the same symbols as those of the first embodiment:

TABLE LII

| SURFACE DATA | | | | | |
|---|---|---|---|---|---|
| Sn | r | d | Nd | Vd | E |
| 1* | 8.520 | 0.999 | 1.545 | 56.003 | 13.15 |
| 2* | 2.703 | 4.606 | | | 7.99 |
| 3* | −8.335 | 3.504 | 1.640 | 23.529 | 7.02 |
| 4* | −8.972 | 1.659 | | | 6.69 |
| 5(D) | ∞ | −0.035 | | | |
| 6* | 8.886 | 2.945 | 1.545 | 56.003 | 6.86 |
| 7* | −6.067 | 2.327 | | | 7.23 |
| 8* | −9.780 | 0.792 | 1.661 | 20.373 | 7.00 |
| 9* | 5.752 | 0.189 | | | 8.45 |
| 10* | 7.906 | 3.837 | 1.729 | 54.041 | 9.17 |
| 11* | −6.283 | 1.000 | | | 9.21 |
| 12 | ∞ | 0.400 | 1.517 | 64.167 | 9.17 |
| 13 | ∞ | 4.309 | | | 9.16 |

Next, Table LIII shows the single lens data of the imaging optical system 12.

TABLE LIII

| SINGLE LENS DATA | |
|---|---|
| \|f1\|/f\| | 1.94 |
| \|f2\|/f\| | 40.00 |
| \|f4\|/f | 1.34 |
| $|(dn/dT)_3|$ | 95.97E−06 |

TABLE LIII-continued

| SINGLE LENS DATA | |
|---|---|
| $\|(dn/dT)_5\|$ | 2.69E−06 |
| d12/f | 1.15 |

The ratio |f1|/f satisfies the conditional expression (2), the ratio |f2|/f satisfies the conditional expression (3), and the |f4|/f satisfies the conditional expression (6). Additionally, the temperature coefficient $|(dn/dT)_3|$ does not satisfy the conditional expression (8), but the temperature coefficient $|(dn/dT)_5|$ satisfies the conditional expression (10).

Next, Table LIV shows the aspherical data of the imaging optical system 11 using the same symbols as those of the first embodiment:

TABLE LIV

| ASPHERICAL DATA |
|---|
| First surface |
| k = 0, A4 = −1.9911E−03, A6 = 2.5043E−05, A8 = −1.4566E−07, A10 = −3.9788E−10, A12 = 0 |
| Second surface |
| k = −8.5205E−01, A4 = −2.7985E−05, A6 = −4.3222E−05, A8 = −2.0288E−06, A10 = −4.2061E−08, A12 = 0 |
| Third surface |
| k = 0, A4 = 7.7615E−05, A6 = −7.1664E−05, A8 = −4.1464E−06, A10 = 3.4915E−07, A12 = 0 |
| Fourth surface |
| k = 0, A4 = 1.2105E−03, A6 = −7.5522E−05, A8 = 3.7186E−06, A10 = 1.1521E−07, A12 = 0 |
| Sixth surface |
| k = 0, A4 = 9.9396E−04, A6 = −8.9076E−05, A8 = 3.4556E−06, A10 = −8.8549E−08, A12 = 0 |
| Seventh surface |
| k = 0, A4 = 1.5813E−03, A6 = −8.5910E−05, A8 = 4.5166E−06, A10 = −1.0933E−07, A12 = 0 |
| Eighth surface |
| k = 0, A4 = −3.2487E−03, A6 = −2.5918E−05, A8 = 3.2929E−06, A10 = 9.5913E−08, A12 = 0 |
| Ninth surface |
| k = 0, A4 = −5.1713E−03, A6 = 2.4754E−04, A8 = −9.6841E−06, A10 = 1.3018E−07, A12 = 0 |
| Tenth surface |
| k = 0, A4 = −1.6997E−03, A6 = 8.0808E−05, A8 = −2.7519E−06, A10 = 5.2223E−08, A12 = 0 |
| Eleventh surface |
| k = 0, A4 = 7.0744E−04, A6 = 1.0281E−05, A8 = 1.3869E−07, A10 = 5.1146E−08, A12 = 0 |

FIG. 138 to FIG. 141 respectively illustrate the spherical aberration, the astigmatism, the distortion, and the chromatic aberration in the imaging optical system 12. FIG. 142 illustrates how the curvature is radially changed from the center portion to the periphery of the eighth surface (the light input surface of the fourth lens L4). FIG. 143 illustrates how the curvature is radially changed from the center portion to the periphery of the ninth surface (the light output surface of the fourth lens L4). FIG. 144 illustrates how the curvature is radially changed in from the center portion to the periphery of the ninth surface (the light output surface of the first lens L1).

The features of the twelfth embodiment are substantially the same as those of the first embodiment.

Thirteenth Embodiment

FIG. 145 illustrates an imaging optical system 13 according to the thirteenth embodiment.

The imaging optical system 13 has predetermined specifications in which:

(I) A total focal length of the imaging optical system 13 is 4.000 mm.

(II) An F-number of the imaging optical system 13 is 1.63

(III) A half angle of view is 60°

(IV) An image height is 4.28 mm (V) A back focus is 6.306 mm (VI) A total length of the imaging optical system 13 is 26.601 mm.

Next, Table LV shows the surface data of the imaging optical system 13 using the same symbols as those of the first embodiment:

TABLE LV

SURFACE DATA

| Sn | r | d | Nd | Vd | E |
|---|---|---|---|---|---|
| 1* | 17.613 | 0.998 | 1.545 | 56.003 | 12.72 |
| 2* | 2.824 | 4.409 | | | 7.38 |
| 3* | −11.045 | 3.504 | 1.640 | 23.529 | 6.84 |
| 4* | −6.187 | 1.443 | | | 6.85 |
| 5(D) | ∞ | 0.166 | | | |
| 6* | 21.129 | 2.838 | 1.545 | 56.003 | 6.72 |
| 7* | −5.491 | 1.333 | | | 7.11 |
| 8* | −14.148 | 0.799 | 1.661 | 20.373 | 6.60 |
| 9* | 4.948 | 0.261 | | | 8.01 |
| 10* | 6.365 | 4.410 | 1.729 | 54.041 | 9.02 |
| 11* | −5.052 | 1.000 | | | 9.13 |
| 12 | ∞ | 0.400 | 1.517 | 64.167 | 8.96 |
| 13 | ∞ | 5.042 | | | 8.94 |

Next, Table LIII shows the single lens data of the imaging optical system 13.

TABLE LVI

| SINGLE LENS DATA | |
|---|---|
| \|f1\|/f\| | 1.58 |
| \|f2\|/f\| | 4.29 |
| \|f4\|/f | 1.36 |
| $\|(dn/dT)_3\|$ | 95.97E−06 |
| $\|(dn/dT)_5\|$ | 95.97E−06 |
| d12/f | 1.10 |

The ratio |f1|/f satisfies the conditional expression (2), the ratio |f2|/f satisfies the conditional expression (4), and the |f4|/f satisfies the conditional expression (6). Additionally, the temperature coefficient $|(dn/dT)_3|$ does not satisfy the conditional expression (8), and the temperature coefficient $|(dn/dT)_5|$ does not satisfy the conditional expression (9).

Next, Table LVII shows the aspherical data of the imaging optical system 12 using the same symbols as those of the first embodiment:

TABLE LVII

| ASPHERICAL DATA |
|---|
| First surface |
| k = 0, A4 = −8.3838E−04, A6 = 3.2607E−06, A8 = 2.2447E−07, A10 = −3.6947E−09, A12 = 1.6175E−11 |
| Second surface |
| k = −7.2673E−01, A4 = 1.2227E−03, A6 = −1.0139E−04, A8 = 1.7585E−05, A10 = −1.7393E−06, A12 = 5.3131E−08 |
| Third surface |
| k = 0, A4 = 8.4256E−04, A6 = −1.0556E−04, A8 = 1.1226E−05, A10 = −1.4883E−06, A12 = 5.4163E−08 |
| Fourth surface |
| k = 0, A4 = 3.6781E−03, A6 = −2.4066E−04, A8 = 1.8681E−05, A10 = −1.2555E−06, A12 = 4.2501E−08 |
| Sixth surface |
| k = 0, A4 = 5.1508E−03, A6 = −3.7338E−04, A8 = 1.9616E−05, A10 = −4.1381E−07, A12 = −1.9392E−08 |
| Seventh surface |
| k = 0, A4 = 4.2571E−03, A6 = −3.6967E−04, A8 = 2.3435E−05, A10 = −4.7810E−07, A12 = −2.3381E−08 |
| Eighth surface |
| k = 0, A4 = −3.4275E−03, A6 = −3.8372E−04, A8 = 4.9792E−05, A10 = −2.8647E−06, A12 = 5.0934E−08 |
| Ninth surface |
| k = 0, A4 = −6.8328E−03, A6 = 2.5202E−04, A8 = −7.5313E−06, A10 = −6.1159E−08, A12 = 1.7371E−09 |
| Tenth surface |
| k = 0, A4 = −1.6865E−03, A6 = 7.1979E−06, A8 = 9.7606E−07, A10 = 4.8534E−09, A12 = −9.0040E−10 |
| Eleventh surface |
| k = 0, A4 = 1.2190E−03, A6 = 2.0765E−06, A8 = −1.0991E−07, A12 = 5.4291E−09 |

FIG. 146 to FIG. 149 respectively illustrate the spherical aberration, the astigmatism, the distortion, and the chromatic aberration in the imaging optical system 13. FIG. 150 illustrates how the curvature is radially changed from the center portion to the periphery of the eighth surface (the light input surface of the fourth lens L4). FIG. 151 illustrates how the curvature is radially changed from the center portion to the periphery of the ninth surface (the light output surface of the fourth lens L4). FIG. 152 illustrates how the curvature is radially changed in from the center portion to the periphery of the ninth surface (the light output surface of the first lens L1).

The features of the thirteenth embodiment are substantially the same as those of the ninth embodiment except that the temperature coefficient $|(dn/dT)_3|$ does not satisfy the conditional expression (8)

Fourteenth Embodiment

FIG. 153 illustrates an imaging optical system 14 according to the fourteenth embodiment.

The imaging optical system 14 has predetermined specifications in which:

(I) A total focal length of the imaging optical system 14 is 4.000 mm.

(II) An F-number of the imaging optical system 14 is 1.63

(III) A half angle of view is 60°

(IV) An image height is 4.29 mm (V) A back focus is 6.074 mm (VI) A total length of the imaging optical system 14 is 26.603 mm.

Next, Table LV shows the surface data of the imaging optical system 14 using the same symbols as those of the first embodiment:

TABLE LVIII

| SURFACE DATA | | | | | |
|---|---|---|---|---|---|
| Sn | r | d | Nd | Vd | E |
| 1* | 12.160 | 2.000 | 1.545 | 56.003 | 14.66 |
| 2* | 2.776 | 4.602 | | | 7.68 |
| 3* | −11.011 | 3.409 | 1.640 | 23.529 | 6.83 |
| 4* | −6.565 | 1.295 | | | 6.55 |
| 5(D) | ∞ | −0.001 | | | |
| 6* | 14.530 | 2.582 | 1.545 | 56.003 | 6.12 |
| 7* | −6.264 | 1.617 | | | 6.53 |
| 8* | −7.604 | 0.798 | 1.661 | 20.373 | 6.19 |
| 9* | 6.275 | 0.209 | | | 8.05 |
| 10* | 8.192 | 3.882 | 1.729 | 54.041 | 8.89 |
| 11* | −5.688 | 1.000 | | | 9.17 |
| 12 | ∞ | 0.400 | 1.517 | 64.167 | 9.12 |
| 13 | ∞ | 4.811 | | | 9.12 |

Next, Table LIX shows the single lens data of the imaging optical system 14.

TABLE LIX

| SINGLE LENS DATA | |
|---|---|
| $\|f1\|/f$ | 1.79 |
| $\|f2\|/f$ | 4.89 |
| $\|f4\|/f$ | 1.27 |
| $\|(dn/dT)_3\|$ | 95.97E−06 |
| $\|(dn/dT)_5\|$ | 2.69E−06 |
| d12/f | 1.15 |

The ratio $|f\mathbf{1}|/f$ satisfies the conditional expression (2), the ratio $|f\mathbf{2}|/f$ satisfies the conditional expression (4), and the $|f\mathbf{4}|/f$ satisfies the conditional expression (6). Additionally, the temperature coefficient $|(dn/dT)_3|$ does not satisfy the conditional expression (8), but the temperature coefficient $|(dn/dT)_5|$ satisfies the conditional expression (10).

Next, Table LX shows the aspherical data of the imaging optical system 14 using the same symbols as those of the first embodiment:

TABLE LX

| ASPHERICAL DATA |
|---|
| First surface |
| k = 0, A4 = −7.8538E−04, A6 = 3.2251E−06, A8 = 5.1701E−08, A10 = −5.9570E−10, A12 = 1.3686E−12 |
| Second surface |
| k = −7.5991E−01, A4 = 6.6902E−04, A6 = −1.7739E−05, A8 = −7.1431E−07, A10 = 2.7785E−08, A12 = −1.2613E−08 |
| Third surface |
| k = 0, A4 = −2.1448E−04, A6 = −9.2040E−05, A8 = 8.1656E−06, A10 = −1.2509E−06, A12 = 5.6016E−08 |
| Fourth surface |
| k = 0, A4 = 3.0711E−03, A6 = −2.6750E−04, A8 = 2.5751E−05, A10 = −1.7076E−06, A12 = 6.1230E−08 |
| Sixth surface |
| k = 0, A4 = 4.4518E−03, A6 = −3.3867E−04, A8 = 2.1018E−05, A10 = −5.8729E−07, A12 = −3.5338E−08 |

TABLE LX-continued

| ASPHERICAL DATA |
|---|
| Seventh surface |
| k = 0, A4 = 2.1534E−03, A6 = −1.5365E−04, A8 = −3.1885E−06, A10 = 1.5403E−06, A12 = −1.1264E−07 |
| Eighth surface |
| k = 0, A4 = −3.9649E−03, A6 = −2.5175E−04, A8 = 1.7111E−05, A10 = −3.0490E−07, A12 = −3.7490E−08 |
| Ninth surface |
| k = 0, A4 = −5.2181E−03, A6 = 1.8670E−04, A8 = −2.5013E−06, A10 = −2.5037E−07, A12 = 7.6119E−09 |
| Tenth surface |
| k = 0, A4 = −1.6835E−03, A6 = 3.8022E−05, A8 = 7.0669E−07, A10 = −7.0081E−08, A12 = 1.4787E−09 |
| Eleventh surface |
| k = 0, A4 = 6.8691E−04, A6 = 1.2615E−05, A8 = 8.9320E−07, A10 = 3.4675E−08, A12 = −5.8098E−11 |

FIG. 154 to FIG. 157 respectively illustrate the spherical aberration, the astigmatism, the distortion, and the chromatic aberration in the imaging optical system 14. FIG. 158 illustrates how the curvature is radially changed from the center portion to the periphery of the eighth surface (the light input surface of the fourth lens L4). FIG. 159 illustrates how the curvature is radially changed from the center portion to the periphery of the ninth surface (the light output surface of the fourth lens L4). FIG. 160 illustrates how the curvature is radially changed in from the center portion to the periphery of the ninth surface (the light output surface of the first lens L1).

The features of the fourteenth embodiment are substantially the same as those of the first embodiment.

Fifteenth Embodiment

FIG. 161 illustrates an imaging optical system 15 according to the fifteenth embodiment.

The imaging optical system 15 has predetermined specifications in which:

(I) A total focal length of the imaging optical system 15 is 4.013 mm.

(II) An F-number of the imaging optical system 15 is 1.59

(III) A half angle of view is 60°

(IV) An image height is 4.26 mm (V) A back focus is 6.570 mm (VI) A total length of the imaging optical system 15 is 26.638 mm Next, Table LXI shows the surface data of the imaging optical system 15 using the same symbols as those of the first embodiment:

TABLE LXI

SURFACE DATA

| Sn | r | d | Nd | Vd | E |
|---|---|---|---|---|---|
| 1* | 14.405 | 1.600 | 1.545 | 56.003 | 11.78 |
| 2* | 2.973 | 4.183 | | | 6.65 |
| 3* | −9.378 | 3.178 | 1.640 | 23.529 | 6.84 |
| 4* | −5.194 | 1.836 | | | 7.03 |
| 5(D) | ∞ | 0.859 | | | |
| 6* | 52.577 | 2.275 | 1.545 | 56.003 | 5.70 |
| 7* | −5.025 | 1.037 | | | 6.08 |
| 8* | −20.531 | 0.921 | 1.661 | 20.373 | 6.27 |
| 9* | 5.194 | 0.263 | | | 7.41 |
| 10* | 10.001 | 3.778 | 1.729 | 54.041 | 8.36 |
| 11* | −6.550 | 1.000 | | | 8.93 |
| 12 | ∞ | 0.400 | 1.517 | 64.167 | 9.50 |
| 13 | ∞ | 5.306 | | | 9.50 |

Next, Table LXII shows the single lens data of the imaging optical system 15.

TABLE LXII

| SINGLE LENS DATA | |
|---|---|
| $\lvert f1\rvert/\lvert f\rvert$ | 1.80 |
| $\lvert f2\rvert/\lvert f\rvert$ | 4.59 |
| $\lvert f4\rvert/f$ | 1.54 |
| $\lvert(dn/dT)_3\rvert$ | 95.97E−06 |
| $\lvert(dn/dT)_5\rvert$ | 2.69E−06 |
| d12/f | 1.04 |

The ratio |f1|/f satisfies the conditional expression (2), the ratio |f2|/f satisfies the conditional expression (4), and the |f4|/f satisfies the conditional expression (5). Additionally, the temperature coefficient $\lvert(dn/dT)_3\rvert$ does not satisfy the conditional expression (8), but the temperature coefficient $\lvert(dn/dT)_5\rvert$ satisfies the conditional expression (10).

Next, Table LXIII shows the aspherical data of the imaging optical system 15 using the same symbols as those of the first embodiment:

TABLE LXIII

| ASPHERICAL DATA |
|---|
| First surface |
| k = 0, A4 = −9.1310E−04, A6 = 1.5575E−05, A8 = −2.1267E−07, A10 = 1.8413E−09, A12 = −4.7115E−12 |
| Second surface |
| k = −5.5612E−01, A4 = −5.6946E−04, A6 = −5.5500E−05, A8 = 2.6525E−06, A10 = −1.2818E−07, A12 = −7.5606E−09 |
| Third surface |
| k = 0, A4 = −1.5201E−04, A6 = −7.0349E−05, A8 = 9.7179E−06, A10 = −1.0208E−06, A12 = 3.4492E−08 |
| Fourth surface |
| k = 0, A4 = 1.5636E−03, A6 = −8.0716E−05, A8 = 6.5525E−06, A10 = −3.5469E−07, A12 = 8.5197E−09 |
| Sixth surface |
| k = 0, A4 = 2.2326E−03, A6 = −1.4167E−04, A8 = −2.3008E−05, A10 = 3.1454E−06, A12 = −2.3320E−07 |
| Seventh surface |
| k = 0, A4 = 4.5029E−03, A6 = −5.0139E−04, A8 = 1.8129E−05, A10 = 5.8683E−07, A12 = −9.3296E−08 |
| Eighth surface |
| k = 0, A4 = −3.5474E−03, A6 = −3.2555E−04, A8 = 5.4347E−05, A10 = −2.0154E−06, A12 = 2.2175E−09 |
| Ninth surface |
| k = 0, A4 = −7.6849E−03, A6 = 4.1844E−04, A8 = −1.2868E−05, A10 = 3.3632E−07, A12 = −1.3435E−08 |
| Tenth surface |
| k = 0, A4 = −5.1940E−04, A6 = 1.5002E−05, A8 = −1.5218E−07, A10 = 4.7850E−08, A12 = −2.0602E−09 |

TABLE LXIII-continued

| ASPHERICAL DATA |
|---|
| Eleventh surface |
| k = 0, A4 = 7.2079E−04, A6 = 2.7872E−06, A8 = 2.2846E−06, A10 = −1.9385E−07, A12 = 5.4784E−09 |

FIG. 162 to FIG. 165 respectively illustrate the spherical aberration, the astigmatism, the distortion, and the chromatic aberration in the imaging optical system 15. FIG. 166 illustrates how the curvature is radially changed from the center portion to the periphery of the eighth surface (the light input surface of the fourth lens L4). FIG. 167 illustrates how the curvature is radially changed from the center portion to the periphery of the ninth surface (the light output surface of the fourth lens L4). FIG. 168 illustrates how the curvature is radially changed in from the center portion to the periphery of the ninth surface (the light output surface of the first lens L1).

The features of the fifteenth embodiment are substantially the same as those of the second embodiment.

Sixteenth Embodiment

FIG. 169 illustrates an imaging optical system 16 according to the sixteenth embodiment.

The imaging optical system 16 has predetermined specifications in which:

(I) A total focal length of the imaging optical system 16 is 4.000 mm.
(II) An F-number of the imaging optical system 16 is 1.62
(III) A half angle of view is 60°
(IV) An image height is 4.28 mm
(V) A back focus is 5.573 mm
(VI) A total length of the imaging optical system 15 is 26.601 mm.

Next, Table LXIV shows the surface data of the imaging optical system 16 using the same symbols as those of the first embodiment:

TABLE LXIV

| SURFACE DATA | | | | | |
|---|---|---|---|---|---|
| Sn | r | d | Nd | Vd | E |
| 1* | 15.141 | 1.800 | 1.545 | 56.003 | 12.35 |
| 2* | 2.728 | 4.677 | | | 7.60 |
| 3* | −18.714 | 2.452 | 1.640 | 23.529 | 7.60 |
| 4* | −6.716 | 2.100 | | | 7.60 |
| 5(D) | ∞ | 0.096 | | | |
| 6* | 25.802 | 2.397 | 1.545 | 56.003 | 6.46 |
| 7* | −5.121 | 0.806 | | | 6.46 |
| 8* | −14.525 | 1.400 | 1.661 | 20.373 | 6.27 |
| 9* | 4.803 | 0.364 | | | 7.79 |
| 10* | 8.551 | 4.127 | 1.729 | 54.041 | 8.55 |
| 11* | −6.250 | 1.000 | | | 9.12 |
| 12 | ∞ | 0.400 | 1.517 | 64.167 | 9.50 |
| 13 | ∞ | 5.022 | | | 9.50 |

Next, Table LXV shows the single lens data of the imaging optical system 16.

TABLE LXV

| SINGLE LENS DATA | |
|---|---|
| $\lvert f1\rvert/f\rvert$ | 1.94 |
| $\lvert f2\rvert/f\rvert$ | 40.00 |
| $\lvert f4\rvert/f$ | 1.34 |
| $\lvert(dn/dT)_3\rvert$ | 95.97E−06 |
| $\lvert(dn/dT)_5\rvert$ | 2.69E−06 |
| d12/f | 1.17 |

The ratio |f1|/f satisfies the conditional expression (2), the ratio |f2|/f satisfies the conditional expression (3), and the |f4|/f satisfies the conditional expression (6). Additionally, the temperature coefficient $\lvert(dn/dT)_3\rvert$ does not satisfy the conditional expression (8), but the temperature coefficient $\lvert(dn/dT)_5\rvert$ satisfies the conditional expression (10).

Next, Table LXVI shows the aspherical data of the imaging optical system 16 using the same symbols as those of the first embodiment:

TABLE LXVI

| ASPHERICAL DATA |
|---|
| First surface |
| k = 0, A4 = −1.3072E−03, A6 = 2.4054E−05, A8 = −2.8995E−07, A10 = 2.2629E−09, A12 = −8.8582E−12 |
| Second surface |
| k = −6.1489E−01, A4 = −1.4560E−03, A6 = −9.1503E−05, A8 = 6.6094E−08, A10 = −1.3367E−07, A12 = −2.5024E−09 |
| Third surface |
| k = 0, A4 = −3.0391E−04, A6 = −1.3450E−04, A8 = 1.4469E−05, A10 = −1.4935E−06, A12 = 5.6869E−08 |
| Fourth surface |
| k = 0, A4 = 1.2399E−03, A6 = −1.1482E−04, A8 = 6.8717E−06, A10 = −4.2771E−07, A12 = 1.5630E−08 |
| Sixth surface |
| k = 0, A4 = 2.8904E−03, A6 = −1.3985E−04, A8 = −2.0376E−05, A10 = 3.9556E−06, A12 = −2.8834E−07 |
| Seventh surface |
| k = 0, A4 = 5.4371E−03, A6 = −6.7644E−04, A8 = 4.6280E−05, A10 = −1.0829E−06, A12 = −7.9675E−08 |
| Eighth surface |
| k = 0, A4 = −2.1287E−03, A6 = −5.9422E−04, A8 = 8.3319E−05, A10 = −4.7445E−06, A12 = 6.1969E−08 |
| Ninth surface |
| k = 0, A4 = −7.7556E−03, A6 = 3.8551E−04, A8 = −1.2204E−05, A10 = 3.5204E−08, A12 = −4.0171E−10 |
| Tenth surface |
| k = 0, A4 = −1.3624E−03, A6 = 4.0768E−05, A8 = −5.2027E−07, A10 = −2.0569E−08, A12 = 9.5401E−10 |
| Eleventh surface |
| k = 0, A4 = 8.3463E−04, A6 = −7.1186E−06, A8 = 1.8566E−06, A10 = −1.3376E−07, A12 = 3.6716E−09 |

FIG. 170 to FIG. 173 respectively illustrate the spherical aberration, the astigmatism, the distortion, and the chromatic aberration in the imaging optical system 16. FIG. 174 illustrates how the curvature is radially changed from the center portion to the periphery of the eighth surface (the light input surface of the fourth lens L4). FIG. 175 illustrates how the curvature is radially changed from the center portion to the periphery of the ninth surface (the light output surface of the fourth lens L4). FIG. 176 illustrates how the curvature is radially changed in from the center portion to the periphery of the ninth surface (the light output surface of the first lens L1).

The features of the sixteenth embodiment are substantially the same as those of the eighth embodiment.

Modifications

The aperture diaphragm S is not limited to be located between the second lens L2 and the third lens L3.

Each of the imaging optical system 1 to 16 can be configured not to satisfy all the conditional expressions (1) to (10) or to satisfy at least one of the conditional expressions (1) to (10).

Each of the imaging optical system 1 to 16 can be configured such that all the light input/output surfaces of the lenses L1 to L5 except for the light output surface of the lens L4 has a spherical shape. Each of the imaging optical system 1 to 16 can be configured such that all of the lenses are made of resin or glass, or such that at least one of the lenses is made of resin, and each of the remaining lenses is made of glass.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An imaging optical system comprising, in a sequential order from an object side to an image side:

a first lens having negative refractive power;

a second lens having a meniscus-shape, positive refractive power, and a light input surface that faces toward the object side, the light input surface having a concave shape;

a third lens having positive refractive power, a light input surface that faces toward the object side, and a light output surface that faces toward the image side, each of the light input and output surfaces having a convex shape toward a corresponding one of the object side and image side;

a fourth lens having negative refractive power, a light input surface that faces toward the object side, and a light output surface that faces toward the image side, the fourth lens being configured such that the light output surface has an aspherical concave shape;

the light output surface has a center portion through which an optical axis passes, and a periphery thereof; and the light output surface has a portion where the negative refractive power becomes gradually weaker from the center portion toward the periphery thereof; and a fifth lens having positive refractive power, a light input surface that faces toward the object side, and a light output surface that faces toward the image side, each of the light input and output surfaces having a convex shape toward a corresponding one of the object side and image side, wherein:

the light input surface on the object side of the fourth lens has an aspherical shape;

the aspherical-shaped light input surface of the fourth lens has a center portion through which an optical axis passes, and a periphery thereof;

the aspherical-shaped light input surface of the fourth lens has a portion where the negative refractive power becomes gradually stronger from the center portion toward the periphery thereof;

the aspherical-shaped light input surface of the fourth lens has one or more inflection points, wherein a level of the negative refractive power at each of the one or more inflection points of the aspherical-shaped light input surface changes;

a change of a curvature of the light input surface on the object side of the fourth lens has an inflection point; and a change of a curvature of the light output surface on the image side of the fourth lens decreases substantially monotonically form the center portion toward the periphery, and has no inflection points.

2. The imaging optical system according to claim 1, further comprising:

an aperture diaphragm located between the second lens and the third lens.

3. The imaging optical system according to claim 1, wherein:

the first lens has a light output surface that faces toward the image side, the light output surface of the first lens having an aspherical shape;

the light output surface of the first lens has a center portion through which an optical axis passes, and a periphery thereof; and the light output surface of the first lens has a portion where the negative refractive power becomes gradually stronger from the center portion toward the periphery thereof.

4. The imaging optical system according to claim 1, wherein:

the first lens is configured to satisfy the following conditional expression (1):

$$1.3<|f1|/f<3.1 \quad (1)$$

where:

f represents a focal distance of a whole of the imaging optical system; and f1 represents a focal distance of the first lens.

5. The imaging optical system according to claim 4, wherein:

the first lens is configured to satisfy the following conditional expression (2):

$$1.5<|f1/f<2.0 \quad (2)$$

6. The imaging optical system according to claim 1, wherein:

the second lens is configured to satisfy the following conditional expression (3):

$$2.9<|f2|/f \quad (3)$$

where:

f represents a focal distance of a whole of the imaging optical system; and f2 represents a focal distance of the second lens.

7. The imaging optical system according to claim 6, wherein:

the second lens is configured to satisfy the following conditional expression (4):

$$3.7<|f2|/f<5.0 \quad (4).$$

8. The imaging optical system according to claim 1, wherein:

the fourth lens is configured to satisfy the following conditional expression (5):

$$1.0<|f4|/f<2.1 \quad (5)$$

where:

f represents a focal distance of a whole of the imaging optical system; and f4 represents a focal distance of the fourth lens.

9. The imaging optical system according to claim 8, wherein:

the fourth lens is configured to satisfy the following conditional expression (6):

$$1.2<|f4|/f<1.5 \quad (6).$$

10. The imaging optical system according to claim 1, wherein:

the first lens has a light input surface that faces toward the object side; and the light input surface of the first lens is configured to have a convex shape.

11. The imaging optical system according to claim 1, wherein:

the light input surface of the fourth lens has a concave shape.

12. The imaging optical system according to claim 1, wherein:

the second lens has a light output surface that faces toward the image side; and at least one of the light input surface and light output surface of the second lens has an aspherical shape.

13. The imaging optical system according to claim 1, wherein:

at least one of the light input surface and light output surface of the third lens has an aspherical shape.

14. The imaging optical system according to claim 1, wherein:

the third lens has a relative refractive index, and has a temperature coefficient of the relative refractive index at a d-line of the third lens; and the temperature coefficient of the relative refractive index at the d-line of the third lens under an ambient temperature of 20° C. is configured to satisfy the following conditional expression (7):

$$|(dn/dT)_3|<10\times10^{-6}/° \text{ C.} \quad (7)$$

where $|(dn/dT)_3|$ represents the temperature coefficient of the relative refractive index at the d-line of the third lens.

15. The imaging optical system according to claim 14, wherein:

the temperature coefficient of the relative refractive index at the d-line of the third lens under the ambient temperature of 20° C. is configured to satisfy the following conditional expression (8):

$$|(dn/dT)_3|<6\times10^{-6}/° \text{ C.} \quad (8).$$

16. The imaging optical system according to claim 1, wherein:

the fifth lens has a relative refractive index, and has a temperature coefficient of the relative refractive index at a d-line of the fifth lens; and the temperature coefficient of the relative refractive index at the d-line of the fifth lens under an ambient temperature of 20° C. is configured to satisfy the following conditional expression (9):

$$|(dn/dT)_5|<10\times10^{-6}/° \text{ C.} \quad (9)$$

where $|(dn/dT)_5|$ represents the temperature coefficient of the relative refractive index at the d-line of the fifth lens.

17. The imaging optical system according to claim 16, wherein:

the temperature coefficient of the relative refractive index at the d-line of the fifth lens under the ambient temperature of 20° C. is configured to satisfy the following conditional expression (10):

$$|(dn/dT)_5|<6\times10^{-6}/° \text{ C.} \quad (10).$$

* * * * *